United States Patent [19]

Bogan et al.

[11] Patent Number: 4,530,086
[45] Date of Patent: Jul. 16, 1985

[54] PROCESSOR CONTROLLED ADJUSTMENT OF LINE CIRCUIT TRANSMISSION PARAMETERS

[75] Inventors: Leonard E. Bogan, Columbus; William R. Godwin, Delaware; Richard A. Hamersley, Columbus; Harold W. Poulsen; Robert L. Miller, both of Westerville, all of Ohio

[73] Assignee: International Telephone and Telegraph Corporation, New York, N.Y.

[21] Appl. No.: 370,609

[22] Filed: Apr. 22, 1982

[51] Int. Cl.³ .......................................... H04Q 11/04
[52] U.S. Cl. ............................................... 370/58
[58] Field of Search ............... 370/58, 85, 97; 375/98; 179/170.8

[56] References Cited

U.S. PATENT DOCUMENTS

| | | | |
|---|---|---|---|
| 3,761,637 | 9/1973 | Henrion | 370/58 |
| 4,261,051 | 4/1981 | Ohnishi et al. | 370/58 |
| 4,352,180 | 9/1982 | Schulze | 370/58 |
| 4,377,859 | 3/1983 | Dunning et al. | 370/58 |
| 4,382,294 | 5/1983 | Beuscher et al. | 370/58 |

OTHER PUBLICATIONS

H. Sueyoshi et al., "System Design of Digital Telephone Switching System-NEAX61," *IEEE Trans. on Comm.*, vol. COM-27, No. 7, Jul. 1979, pp. 993–1001.
N. Vanner, "Architecture of System X, Part 2—The Digital Trunk Exchange", *POEEJ*, vol. 72, Oct. 1979, pp. 142–148.
J. Smith, "The Subscriber Line Card in a Distributed Control Switching System", *ICC* 1981, Jun. 14–18, 1981, pp. 1.1.1–4.

*Primary Examiner*—Douglas W. Olms
*Assistant Examiner*—Wellington Chin
*Attorney, Agent, or Firm*—John T. O'Halloran; Jeffrey P. Morris

[57] ABSTRACT

A line switch for a digital telephone switching system utilizes distributed processing. The line switch comprises one or more switch modules. Each switch module is coupled to a central office switching system via one or more PCM lines which utilize common channel signaling. Each switch module comprises groups of line circuits, each line circuit being coupled to a subscriber line. Three separate distributed processor functions are provided in each line switch module. A first processor is utilized to communicate with the central office switching system is provided to control clock generation and rate conversion circuits. Each group of line circuits includes a third processor to control the operations of the line circuits and to gather information from the line circuit.

A test bus is routed to the line circuits. The third processor may be utilized to automatically measure and adjust various transmission parameters.

38 Claims, 79 Drawing Figures

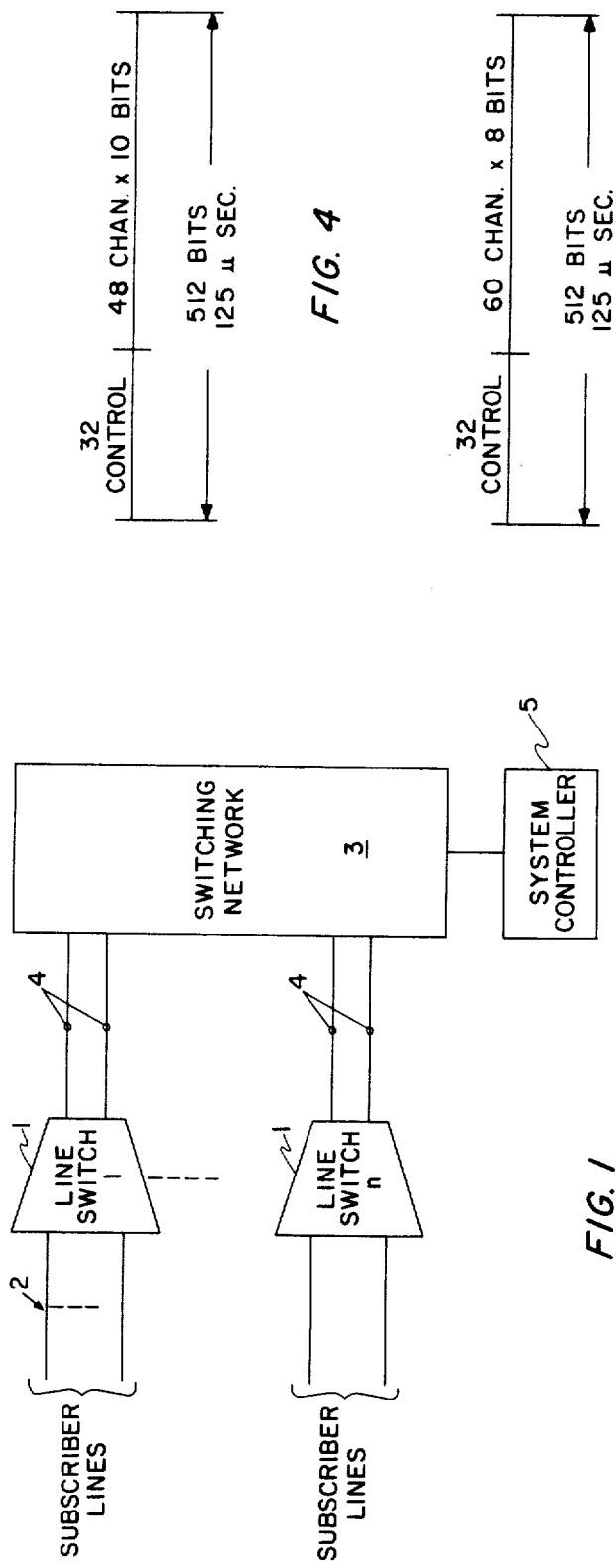
FIG. I
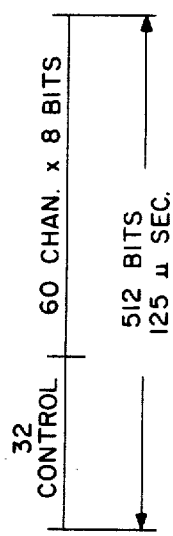
FIG. 4
FIG. 5
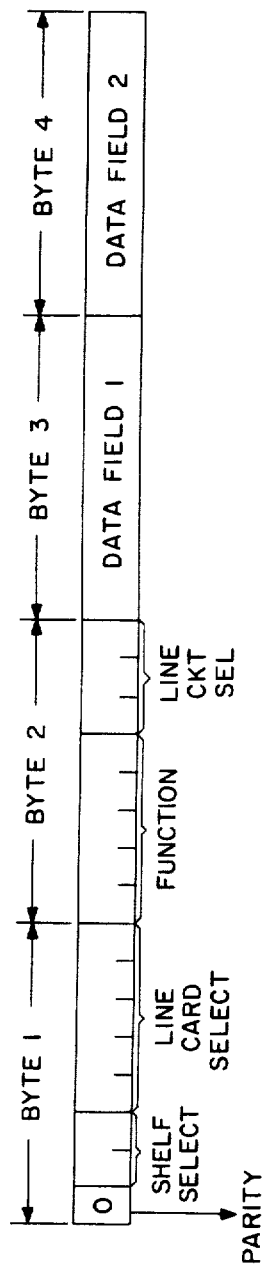
FIG. 31

| LINE SWITCH CONFIGURATION | TRAFFIC ||
| --- | --- | --- |
| | 24 CHANNEL | 32 CHANNEL |
| 160 SUBSCRIBER LINES — MODULE 1a / MODULE 1b — 160 SUBSCRIBER LINES; outputs PCMA, PCMA | 32.2E TOTAL .1E./LINE | 42.3E TOTAL .132 E/LINE |
| 160 SUBSCRIBER LINES — MODULE 1a / MODULE 1b — 160 SUBSCRIBER LINES; outputs PCMA, PCMB, PCMA | 52.7E TOTAL .164.E./LINE | 68.6E TOTAL .214 E./LINE |
| 160 SUBSCRIBER LINES — MODULE 1a / MODULE 1b — 160 SUBSCRIBER LINES; outputs PCMA, PCMB, PCMA, PCMB | 73.9E TOTAL .23.E./LINE | 95.5E TOTAL .298E./LINE |

FIG. 3

| LINE SWITCH CONFIGURATION | TRAFFIC | |
|---|---|---|
| | 24 CHANNEL | 32 CHANNEL |
| 160 SUBSCRIBER LINES / 192 SUBSCRIBER LINES — MODULE Ia, MODULE Ic, MODULE Ib — PCMA, PCMA / 160 SUBSCRIBER LINES | 32.2E TOTAL .063E/LINE | 42.3E TOTAL 0.83E/LINE |
| 160 SUBSCRIBER LINES / 192 SUBSCRIBER LINES — MODULE Ia, MODULE Ic, MODULE Ib — PCMA, PCMB, PCMA / 160 SUBSCRIBER LINES | 52.7E TOTAL .103E/LINE | 68.6E TOTAL |
| 160 SUBSCRIBER LINES / 192 SUBSCRIBER LINES — MODULE Ia, MODULE Ic, MODULE Ib — PCMA, PCMB, PCMA, PCMB / 160 SUBSCRIBER LINES | 73.9E TOTAL .144E/LINE | 95.5E TOTAL .186E/LINE |

FIG. 3A

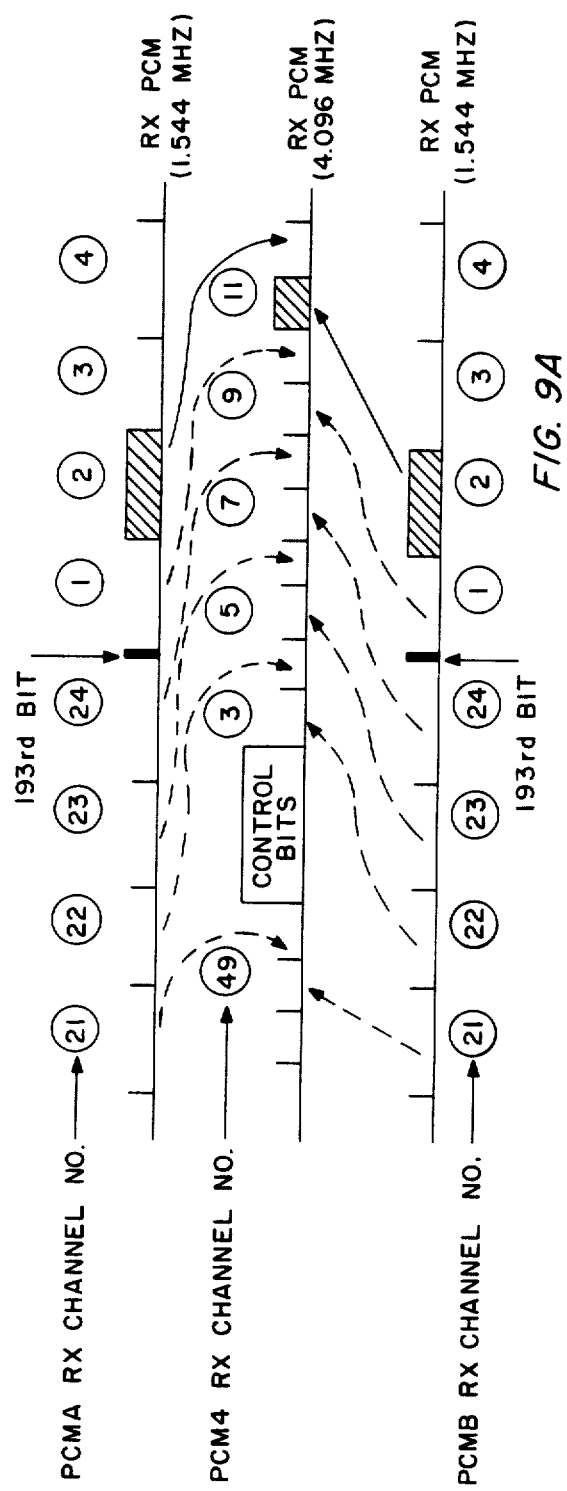
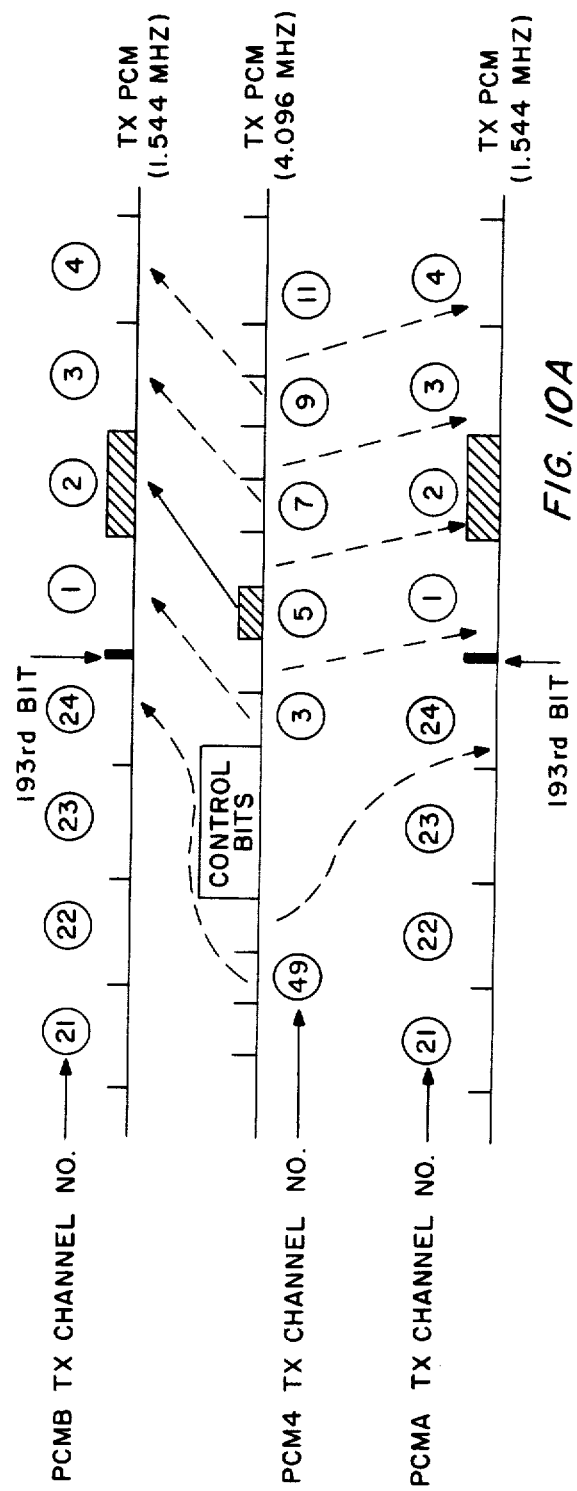
FIG. 9A
FIG. 10A

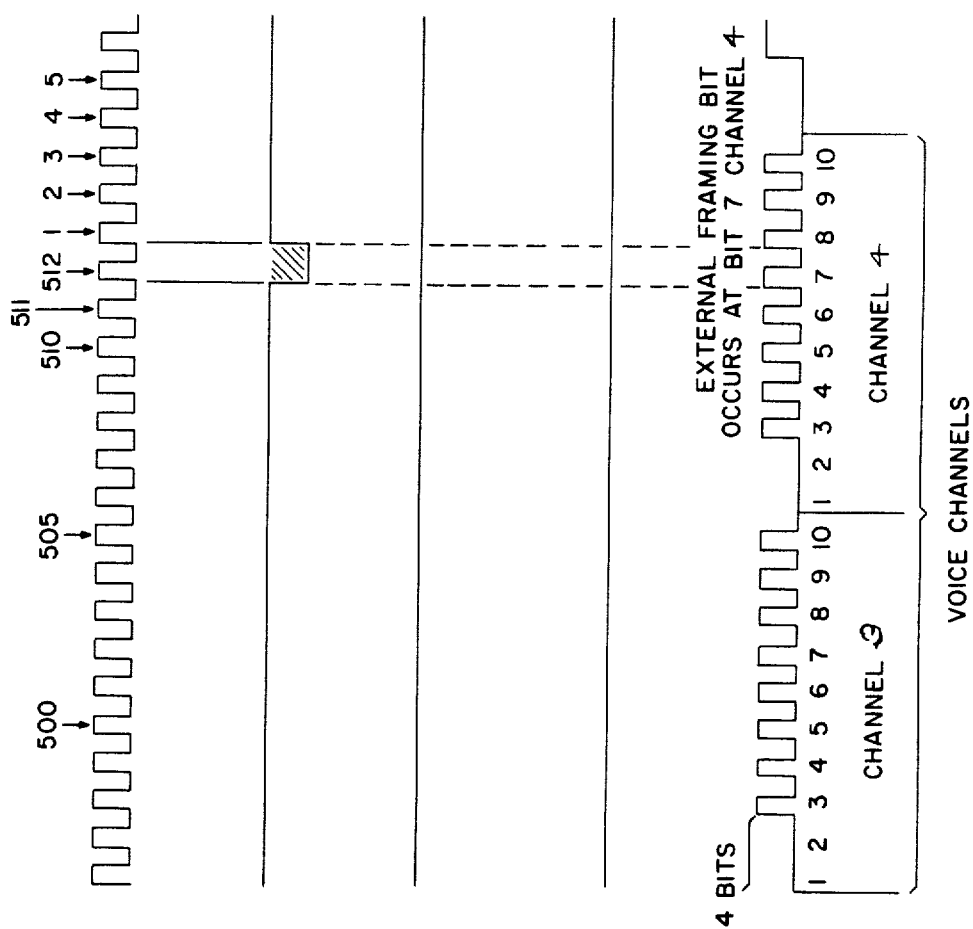

PER-LINE INTERFACE CONTROL FORMAT

| BIT 0 | 1 | 2 | 3 | 4 | 5 | 6 | 7 | 8 | 9 | 10 | 11 |
|---|---|---|---|---|---|---|---|---|---|---|---|
| R/W | ADDRESS | | | N/A | EURO. SEL. | POWER | TR | RR | LC ENA. | ILS | Ā/B SEL. |

(12 BITS)

*FIG. 26*

GAIN-BALANCE CONTROL FORMAT

| 0 | 1 | 2 | 3 | 4 | 5 | 6 | 7 | 8 | 9 | 10 | 11 | 12 13 14 15 16 17 18 19 | 20 21 22 23 24 25 26 27 |
|---|---|---|---|---|---|---|---|---|---|---|---|---|---|
| R/W | ADDRESS | | | CLK +/- | ✗ | ✗ | ✗ | LINE BALANCE | | | | Rx GAIN SETTING | Tx GAIN SETTING |

← 4 BITS → ← 8 BITS → ← 8 BITS →

*FIG. 28*

CODEC CONTROL FORMAT

| 0 | 1 | 2 | 3 | 4 | 5 | 6 | 7 | 8 | 9 | 10 | 11 |
|---|---|---|---|---|---|---|---|---|---|---|---|
| R/W | ADDRESS | | | CODEC MODE | | CHANNEL ASSIGNMENT | | | | | |

| BIT 1 | 2 | MODE |
|---|---|---|
| 0 | 0 | Tx & Rx CHANNEL |
| 0 | 1 | Tx CHANNEL |
| 1 | 0 | Rx CHANNEL |
| 1 | 1 | STANDBY |

*FIG. 29*

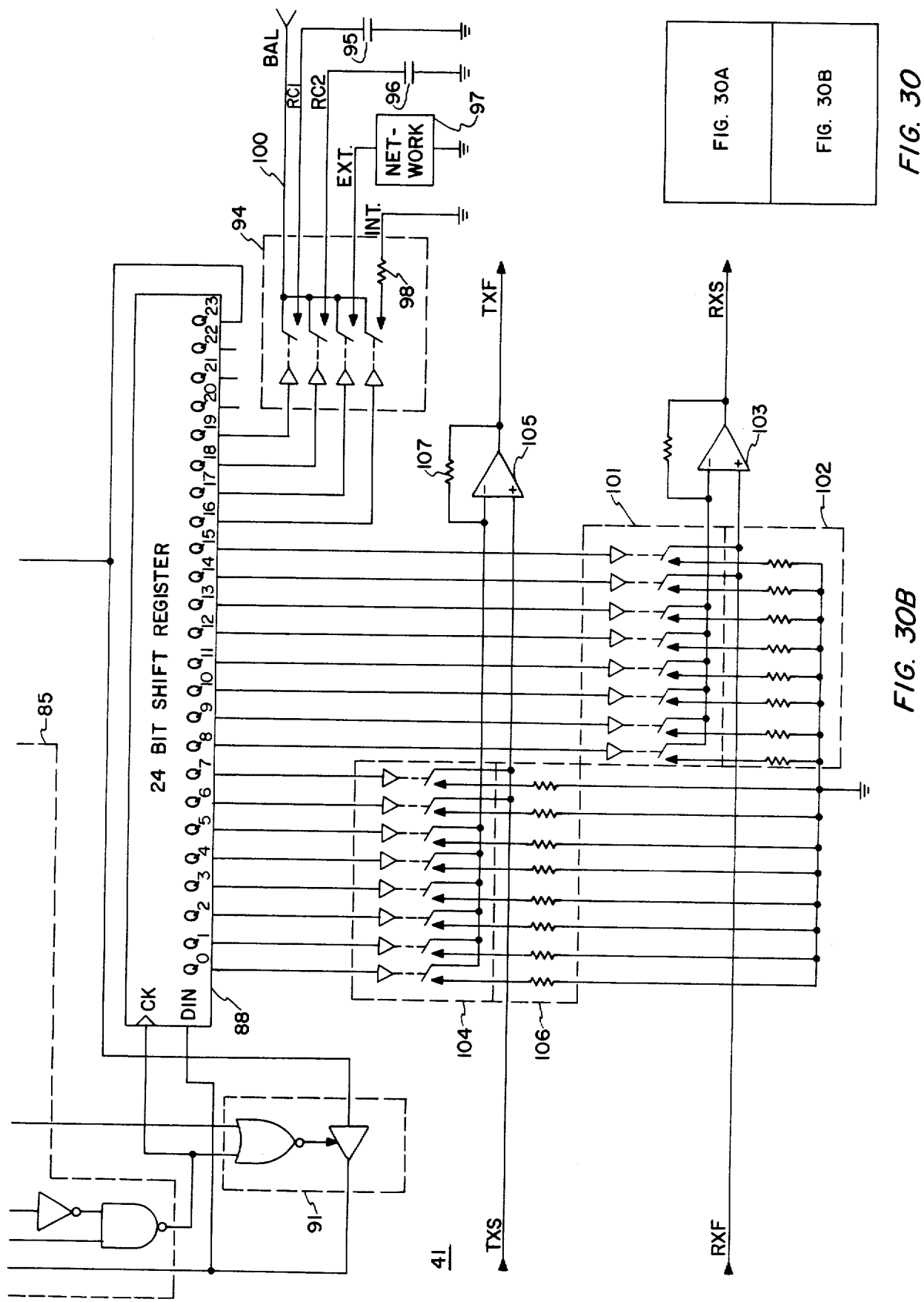

| FRAMES AFTER START OF TEST | 'A' CONTROL WORD REGISTER CONTENTS (HEX) | | | | 'B' CONTROL WORD REGISTER CONTENTS (HEX) | | | |
|---|---|---|---|---|---|---|---|---|
| | BYTE 1 | BYTE 2 | BYTE 3 | BYTE 4 | BYTE 1 | BYTE 2 | BYTE 3 | BYTE 4 |
| 0 | 63 | C1 | F8 | 0F | XX | XX | XX | XX |
| 1 | 07 | E0 | 3D | 8F | 07 | E0 | 3D | 8F |
| 2 | 80 | F6 | 3C | 1F | 80 | F6 | 3C | 1F |
| 3 | D8 | F0 | 7E | 03 | D8 | F0 | 7E | 03 |
| 4 | C1 | F8 | 0F | 63 | C1 | F8 | 0F | 63 |
| 5 | E0 | 3D | 8F | 07 | E0 | 3D | 8F | 07 |
| 6 | F6 | 3C | 1F | 80 | F6 | 3C | 1F | 80 |
| 7 | F0 | 7E | 03 | D8 | F0 | 7E | 03 | D8 |
| 8 (FINAL DATA) | F8 | 0F | 63 | C1 | F8 | 0F | 63 | C1 |

MATCHES DATA LOADED INTO FIXED ADDRESS REGISTER AT START OF TEST

FIG. 33

```
VERIFIES SHIFT OPERATION OF 'A' & 'B' CONTROL WORD REGISTERS
USING THE TEST DATA FEEDBACK FEATURE OF THE PIC.

INITIALIZE MODE REGISTER (PIC INTERNAL REG. LOCATION 0DH)
        MOV    R0,#0DH
        MOV    R,#8BH
        MOVX   CR0,A    ; WRITE 8BH INTO MODE REG.

LOAD 'A' CONTROL WORD REG. WITH TEST DATA
        MOV    R0,#0EH
        CLR    A
        MOVX   CR0,A    ; WRITE 0 INTO PIC CONTROL REG. POINTER (CRP)
        INC    R0       ; R0 POINTS TO CCRP (PIC INTERNAL REG. LOCATION 0FH)
        MOV    R5,#63H  ; C/R TEST DATA BYTE 1 (R5)
        MOV    R4,#0C1H ; C/R TEST DATA BYTE 2 (R4)
        MOV    R3,#0F8H ; C/R TEST DATA BYTE 3 (R3)
        MOV    R2,#0FH  ; C/R TEST DATA BYTE 4 (R2)

MOV    R1,#5    ; INITIALIZE TEST DATA BYTE POINTER (R1)
        MOV    R7,#4    ; INITIALIZE TEST DATA BYTE COUNTER (R7)

LOOP 1: MOV    A,CR1    ; FETCH NEXT BYTE OF TEST DATA
        MOVX   CR0,A    ;   AND WRITE IT INTO NEXT BYTE OF 'A' C/R
        DEC    R1       ; ADJUST TEST DATA POINTER
        DJNZ   R7,LOOP1 ; REPEAT LOOP 1 FOR ALL 4 TEST DATA BYTES

LOAD FIXED ADDRESS REGISTER WITH C/R BYTE 3 TEST DATA
        MOV    R0,#08H  ; PIC FIXED ADDRESS REG. INTERNAL ADDR.
        MOV    A,R3
        MOVX   CR0,A

INITIALIZE FRAME COUNTER AND START DYNAMIC TEST
        STOP   TCNT
        MOV    A,0F6H   ; -10 IN 2'S COMPLEMENT
        MOV    T,A
        JTF    $+2      ; RESET TIMER FLAG
        STRT   CNT

LOOP 2: MOV    A,T
        ADD    A,#8
        JNZ    LOOP 2   ; REPEAT LOOP 2 UNTIL FRAME COUNT REACHES 0F8H (-8)

MOV    R0,#0DH
        MOV    A,#8FH   ; WRITE 8FH INTO MODE REGISTER (SET CONTROL SHIFT ENR)
        MOVX   CR0,A    ; ENABLE SELF-TEST CONTROL SHIFTING
```

*FIG. 34*

```
WAIT FOR 8 FRAMES TO PASS (TF=1), I.E. LET C/R CYCLE THRU 8 TIMES
                                     42 CLOCK PULSES PER FRAME
LOOP 3: JTF      $+4      ; SKIP NEXT INSTRUCTION WHEN TIMER FLAG (TF) = 1
        JMP      LOOP 3

DISABLE CONTROL REGISTER SHIFTING
        CLR      A
        MOVX     CR0,A    ; WRITE 0 INTO MODE REGISTER

VERIFY THAT BOTH 'A' & 'B' CARD ADDRESS COMPARATORS INDICATE
    AN ADDRESS MATCH OCCURRED AFTER 8 FRAMES
        MOV      R0,#0CH  ; PIC INTERNAL REG. ADDRESS OF STATUS REGISTER
        MOV      A,CR0    ; FETCH STATUS BYTE
        CPL      A
        JB0      CFAIL    ; JUMP TO ERROR ROUTINE (CFAIL) IF ADDRESS MATCH
        JB1      CFAIL    ;   IS NOT INDICATED BY EITHER CARD ADDRESS COMPARATOR

VERIFY CONTENTS OF 'A' & 'B' CONTROL WORD REGS. MATCH EXPECTED CONTENTS
        MOV      A,R5
        XCH      A,R3     ; 63H EXPECTED IN C/R BYTE 3 (R3)
        XCH      A,R5     ; F8H EXPECTED IN C/R BYTE 1 (R5)
        MOV      A,R4
        XCH      A,R2     ; C1H EXPECTED IN C/R BYTE 4 (R2)
        XCH      A,R4     ; 0FH EXPECTED IN C/R BYTE 2 (R4)

MOV      R0,#0FH  ; PIC INTERNAL ADDR. OF CCRP

MOV      R6,#2
LOOP 4: MOV      R1,#5    ; INITIALIZE TEST DATA BYTE POINTER
        MOV      R7,#4    ; INITIALIZE TEST DATA BYTE COUNTER

LOOP 5: MOVX     A,CR0    ; FETCH NEXT C/R DATA BYTE
        XRL      A,CR1    ;   & COMPARE WITH EXPECTED DATA
        JNZ      CFAIL    ; JUMP TO ERROR ROUTINE (CFAIL) IF ANY DATA MIS-MATCH
                          ;   IS DETECTED
        DEC      R1       ; ADJUST TEST DATA POINTER
        DJNZ     R7,LOOP5 ; REPEAT LOOP 5 FOR ALL 4 BYTES OF C/R

DJNZ     R6,LOOP4 ; REPEAT LOOP 4 FOR BOTH 'B' & 'A' C/R'S

END OF PIC DYNAMIC OPERATION TEST
```

PROCESSOR CONTROLLED ADJUSTMENT OF LINE CIRCUIT TRANSMISSION PARAMETERS

BACKGROUND OF THE INVENTION

This invention pertains to telephone switching systems in general, and to an arrangement for automatically adjusting transmission circuit parameters in distributed control digital telephone switching systems in particular.

The ITT 1210 is an advanced digital switching system manufactured in the United States by International Telephone and Telegraph Corporation. The ITT 1210, which was priorly identified as DSS-1, is described by C. G. Svala, "DSS-1, A Digital Local Switching System With Remote Line Switches", National Telecommunications Conference, 1977, pp. 39: 5–1 to 39: 5–7. As described by C. G. Svala, the ITT 1210 comprises three basic elements, i.e., line switches, a switching network, and a system control. A line switch interfaces with subscriber lines and to one or more PCM (pulse code modulation) lines. A line switch may be co-located with the switching network or may be located remoted therefrom. The switching network coupled to the line switches by the PCM lines comprises a number of digital switching modules called switch groups each of which includes a time-space-time network. The system control includes a pair of processors with associated program and data memories. The system control directs the operation of the switching network and the line switches. Communication of control information between the system control and a line switch is via a common channel superimposed on each PCM line. This common channel approach is described in U.S. Pat. No. 4,125,743, issued Nov. 14, 1978 to R. E. Steidl and assigned to a common assignee.

A large percentage of the equipment costs in a digital switching system is attributable to the line switches. Also the line switch design determines the transmission performance per subscriber line, traffic handling and line signaling functions of the switching system.

It is therefore desirable to provide an improved line switch having a low cost per subscriber line and improved transmission peformance.

SUMMARY OF THE INVENTION

In accordance with the principles of the invention, a line switch is provided which has a low cost per subscriber line and improved transmission performance.

In an embodiment of the invention, a line switch comprises one or more line switch modules. Each module can terminate one or more PCM lines and each module interlaces PCM data from the PCM lines onto an internal PCM bus structure that operates at a higher data rate and has a greater number of channels per frame. Each line circuit of a module has access to all the channels of the internal PCM bus structure. Further, in accordance with the invention, a distributed processing control arrangement is provided wherein subscriber lines are arranged in groups and the line circuits associated with a group are controlled by a line group controller. A line switch processor contained in each line switch module is provided for communicating with the system control and for directing the operation of the line group controllers.

In accordance with one aspect of the invention, the internal PCM bus structure serves the dual functions of distributing time multiplexed PCM voice channels data and control data throughout the line switch. All control data exchanged between the line switch controller and the line group controller or any other circuit module is transmitted over the internal PCM bus structure. Thus, expansion of a module is easily accomplished by adding additional line circuit groups or other circuit modules and extending the PCM bus thereto.

Further, in accordance with the invention each line switch controller and line group controller incudes a multifunctional interface circuit which provides an interface between a microcomputer and the internal PCM bus structure.

An illustrative embodiment of the invention is a line switch having one or more line switch modules each terminating one of more PCM lnes which are connected to the system network. Each line switch module includes a line switch controller which communicates with the system controller via a common channel signaling arrangement over the PCM lines. The line switch controller directs the operation of the various circuits within the line switch module. Each PCM line carries frame organized PCM voice channels with "X" channels per frame. The internal PCM bus structure is arranged such that 2X channels are provided per frame. A rate converter circuit is provided for interlacing PCM channels from two lines onto the PCM bus structure and for demultiplexing PCM channels on the PCM bus structure to the PCM lines.

More specifically, a receive rate converter comprises memory into which PCM data from the PCM lines are stored at the PCM line rate. The memory is read at the PCM bus structure rate in such a fashion tht PCM voice channels data from the two PCM lines is alternately applied to the PCM bus Structure, i.e. first the PCM data for one channel from one PCM line is read and then the PCM data for one channel of the other PCM lines is read. A transmit rate converter likewise comprises memory into which PCM voice channel data from the internal PCM bus structure is stored at the PCM bus structure rate. The stored PCM voice channel data is read from the memory at the rate of the PCM line such that the stored PCM voice channels are read and alternately applied to the two PCM lines.

Additionally, the rate converter includes clock generator and phase-locked loop circuitry. The phase-locked loop permits clock signals which are generated in a line switch module to be in phase-locked synchronization with either of the PCM lines. When two or more lines switch modules are connected together to form a line switch, the phase-locked loop circuits of each module will utilize the same PCM line for phase-locking.

Buffer and distributor circuits are interposed in the PCM bus structure. One function the buffer and distributor circuits provide is that of connecting the PCM bus structure of the various line switch modules in a line switch. The buffer and distributor circuits include gates which permit intra-line switch calls to be connected within the line switch without utilizing the system switching network.

Further, in accordance with the principles of this invention, an arrangement is provided for automatic setting of the line circuits gain.

A further aspect of the invention is the provision of another interface circuit for interfacing each line circuit to its respective line group controller and to the PCM buses.

BRIEF DESCRIPTION OF THE DRAWINGS

Above-mentioned and other features and objects of this invention will become more apparent by reference to the following description taken in conjunction with the accompanying drawing, in which:

FIG. 1 illustrates in block diagram form a digital switching system in accordance with the principles of the present invention;

FIGS. 3 and 3A illustrate the traffic handling capability of the line switch of FIGS. 2 and 2A, respectively;

FIG. 4 illustrates the format of PCM frames that can be employed in the system of FIG. 1;

FIG. 5 illustrates an alternate PCM frame format that can be employed in the system of FIG. 1;

FIG. 9A illustrates the interleaving operation of the RX rate converter portion of interface logic 6 of FIG. 8;

FIG. 10A illustrates the demultiplexing operation of the TX rate converter of FIG. 8;

FIGS. 24A and 24B when arranged as shown in FIG. 24 are timing diagrams in the buffer and distributor 9 of FIG. 22;

FIG. 26 illustrates a command word format;

FIG. 28 illustrates the format of a control word directed to the per line control interface 44;

FIG. 29 illustrates the format of a control word directed to a CODEC 43 of FIG. 25;

FIGS. 30A and 30B when arranged as shown in FIG. 30 show in block diagram form the gain/balance circuit 41 of FIG. 25B;

FIG. 31 illustrates the format of a control word transmitted over buses PCMLCA, PCMLCB;

FIG. 33 illustrates the register status of interface 23 during a self-test operation FIGS. 34 and 35 are flow charts of the self-test operation of interface 33;

DETAILED DESCRIPTION

1. GENERAL (FIGS. 1 and 2)

Figure 2:
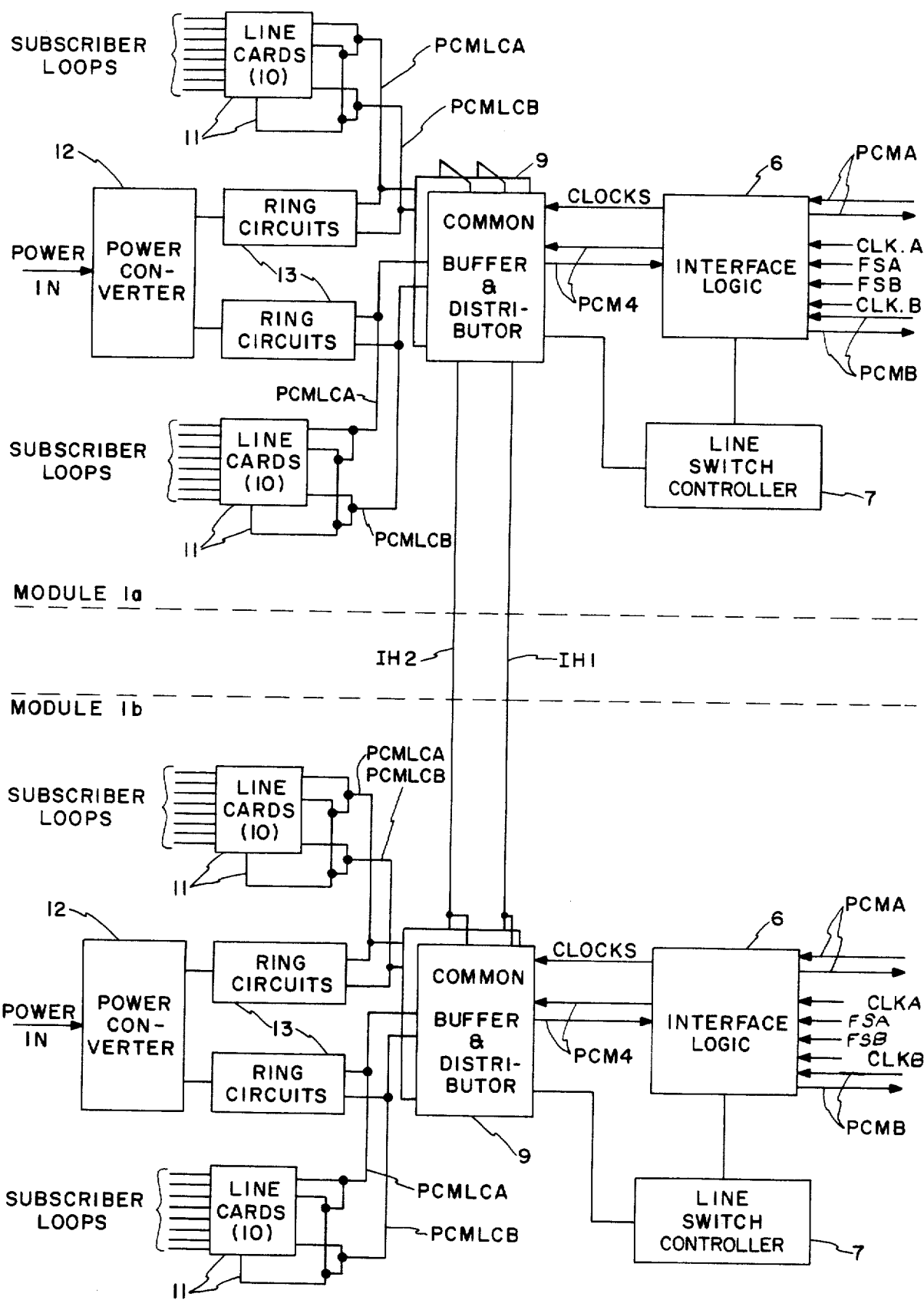
FIGS. 2 and 2A illustrate in block diagram form two embodiments of a line switch comprising two line modules that can be employed in the system of FIG. 1.
Figure 2A:
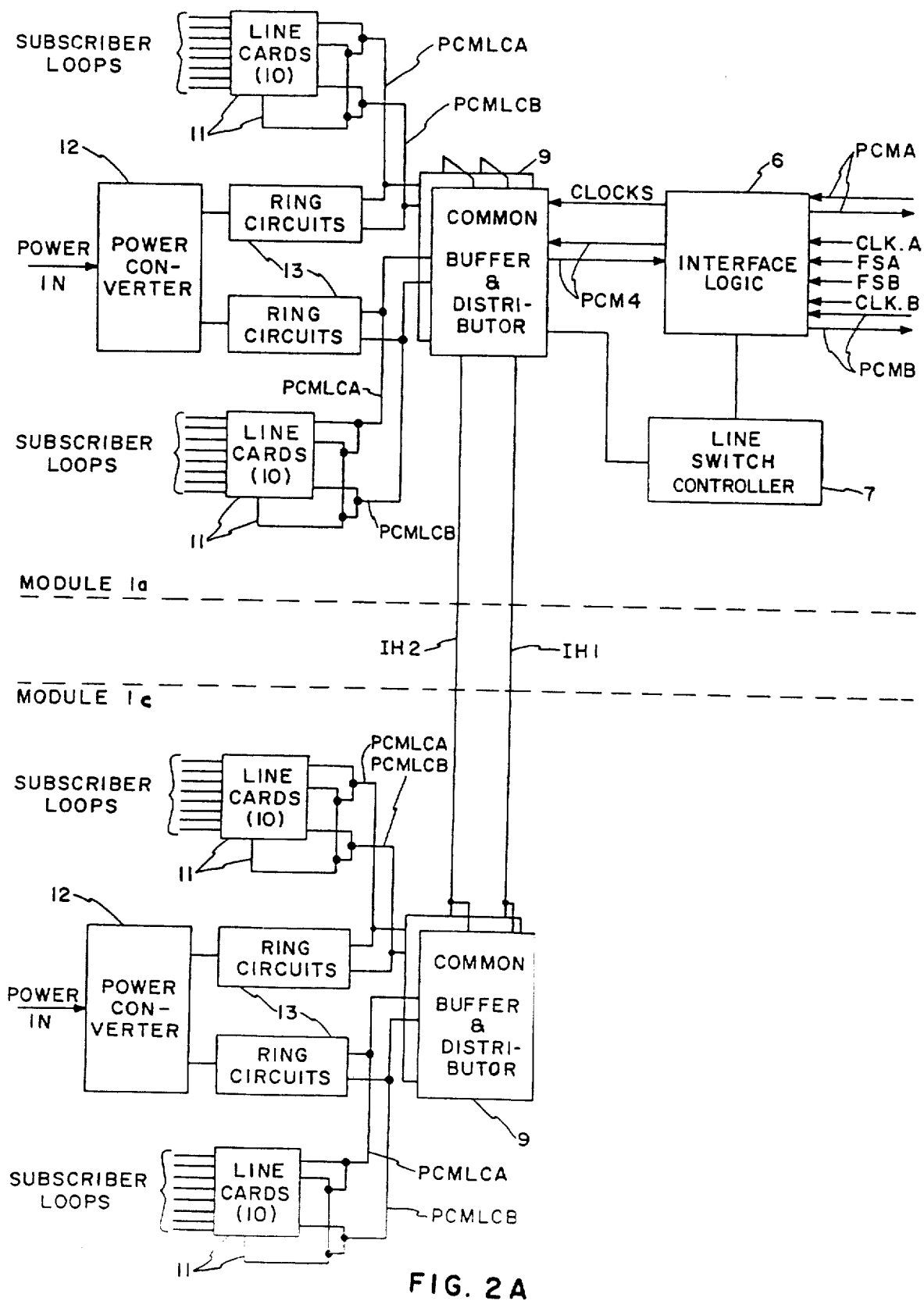

The stored program controlled switching system of FIG. 1 is a PCM-TDM digital switching system which includes a switching network 3 controlled by a system controller 5. A more detailed description of the system controller 5 and the switching network 3 is provided in the aforementioned C. G. Svala reference. The system further includes "n" line switches 1 each serving a number of subscriber lines 2. Each line switch is coupled to the switching network 3 via one or more PCM lines 4. PCM transmission between the line switches 1 and the switching network 3 takes place over the PCM lines 4. Each PCM line 4 includes, as is well understood, a path for PCM transmission from the switching network 3 to a line switch 1 and a second path for PCM transmission fom a line switch 1 to the switching network 3. Each PCM line 4 carries frame-organized data or speech at any conventional rate. Operation of the line switches 1 are controlled by the system controller 5. In one illustrative embodiment of the invention, a common channel signaling arrangement such as that taught in U.S. Pat. No. 4,125,743 issued Nov. 14, 1978 to R. E. Steidl is utilized such that control information between th system controller 5 and the lines switches 1 is transmitted over the PCM lines 4. Typical information is sent by a line switch to the system controller 5 including the following:
1. Report of line seizures which the line switch has detected; and
2. Report of a fault detected in the line switch.

Typical commands sent by the system control 5 to a line switch include the following:
1. Request for assignment of subscriber line to a channel or release of a line from a channel;
2. Request for ringing to a line;
3. Request for maintenance functions to be performed; and
4. Request for party test to identify the party on the line.

FIG. 2 illustrates one of the line switches in greater detail.

Reliability of operation and flexibility in expansion is provided by organizing the circuits of each line switch in clusters or "security blocks" of circuits that function as a unit. For any single fault, only the group of circuits within the security block containing the fault may be lost to service. Thus, a single fault will not cause a loss of service to the entire line switch. As will be evident to those skilled in the art, the various circuits in the illustrative line switch described herein may be organized without the security block arrangement shown or the size of the various security blocks may be changed.

In accordance with the security block organization of the line switch, the illustrative line switch is organized as two identical line switch modules. Each line switch module is self contained to the extent that it can operate as a line switch for a number of subscriber lines.

A further aspect of the novel line switch is that distributed processing is advantageously utilized. Three separate distributed processor functions are provided in each line switch module. First, one processor is utilized to communicate with the system controller 5 of FIG. 1 and to coordinate the operations within the line switch module. A second processor is provided within a line switch module to control clock generation and rate conversion circuits. A third processor is provided for a group of line circuits to control the operations of the line circuits and to gather information from the line circuits.

A further aspect of the line switch architecture is that an internal busing arrangement is provided wherein both control and PCM data are routed throughout the line switch. With this arrangement, a standardized interface between each processor and the PCM bus may be provided.

In addition to having the capability for establishing connections between subscriber lines connected to the line switch and the switching network 3, the present line switch has the capability of establishing intra-line switch connections without the switching network 3.

In accordance with the aforementioned security block organization the line switch 1 is organized as two identical line switch modules 1a, 1b. Each of the line switch modules 1a, 1b is self-contained to the extent that it can operate as a line switch and is connectable to up to 160 suscriber lines or loops. The 160 lines associated with a module are arranged as two clusters of lines. Each cluster is in turn divided into 10 groups of lines, each group includes 8 lines and in the illustrative embodiment each group of 8 lines has its associated line circuits arranged on one circuit card. It should be noted, that in other embodiments, a group may contain more or less lines and the lines may be arranged in one or more clusters.

Each line switch module 1a, 1b is coupled to the switching network 3 of FIG. 1 via two PCM lines PCMA, PCMB; bit clock lines CLKA, CLKB; and frame clock lines FSA, FSB. The PCM lines PCMA, PCMB operate at a 1.544 mbs. rate carrying 24 voice channels in a frame in the North American network or at a 2.048 mbs. rate carrying 30 voice channels in a frame in European and many foreign networks. Although two PCM lines are shown, the line switch module may be connected to only one PCM line.

The frame clock lines FSA, FSB each provide a 4 KHz signal from the switching network 3 of FIG. 1 and each is used to identify which incoming bit is a common channel signaling bit. The common channel signaling bits occur in the 193rd bit position of every other frame. The intermediate 193rd bits are synchronization bits and are used to determine the A and B signaling frames.

The bit clock lines CLKA, CLKB each provide a 1.544 mHz clock.

The interface logic 6 operates to derive various clocking signals for use in the line switch module. More significantly, interface logic 6 multiplexes and interlaces the PCM channels from the two PCM lines PCMA, PCMB onto bus PCM4 and demultiplexes and separates PCM channels from bus PCM4 to the PCM lines PCMA, PCMB. More specifically, the bus PCM4 operates at a 4.096 mbs. rate. Data transmitted over bus PCM4 is arranged in frames of 512 bits, 480 of which are used for PCM. If the lines PCMA, PCMB operate at a 1.544 mbs. rate with 24 channels per frame, the channels on the lines PCMA, PCMB will be interlaced and rate converted to provide 48 channels each 10 bits wide at a 4:096 mbs rate on bus PCM4. If the lines PCMA, PCMB operate at a 2.048 mbs rate with 30 channels per frame, they will be interlaced and rate converted to provide 60 channels each 8 bits wide at a 4.096 mbs. rate on bus PCM4. The remaining thirty two bits of each 512 bit frame on PCM4 are used for internal control of the line switch module.

The line switch controller 7 receives common channel commands from the system controller 5 of FIG. 1 over the PCM lines PCMA, PCMB and via the interface logic 6. The line switch controller 7 communicates with and controls the various circuits of the line switch module via bus PCM4 by utilizing the aforementioned 32 bits.

Buffer and distributor circuits 9 are connected to the bus PCM4 and serve to buffer PCM signals between the bus PCM4 and the line cards 11, ring circuits 13, and other circuits. Two buffer and distributor circuits 9 in each line switch module are provided to partition the PCM buses into segments, i.e., security blocks, which are isolated from each other to prevent propagation of faults in the line switch and the impact of faults in a group of lines upon all other lines in the line switch. Both buffer and distributor circuits in a line switch module contain identical circuitry for buffering and distributing PCM signals and each is connected to one of two clusters of line circuits. Additionally, the buffer and distributor circuits 9 provide buffering to the PCM buses in the other line switch module of the line switch. Thus, each line switch controller 7 has access to all the line circuits in both line switch modules of a line switch and PCM signals may be coupled to all circuits in a line switch. The buffer and distributor circuits 9 includes gating circuits which provide for intra-line switch calls between any two line circuits within the line switch without the need to route the calls through the switching network 3 of FIG. 1. Additionally, one of the buffer and distributors 9 of a line switch module includes circuitry for deriving various clocking signals from the various clock lines CLKA, CLKB, FSA and FSB.

Each buffer and distributor 9 is coupled to all th line and other circuits in a cluster by two PCM buses PCMLCA, PCMLCB each of which runs at a 4.096 mHz rate. One of the PCM buses, e.g. PCMLCA of line switch module 1a, is derived directly from the bus PCM4 in the same line switch module. The other of the PCM buses, e.g. PCMLCB of line switch module 1b, is derived from the bus PCM4 of the other module. In the North American Network each bus PCMLCA, PCMLCB will have 48 PCM channels at a 4.096 mHz rate. Thus each line circuit will have access to 96 PCM channels in the line switch.

As provided out hereinabove, each group of 8 line circuits is arranged on a single circuit card. Each of group circuits is controlled by a microprocessor which is in turn controlled by the line switch controller 7 via the 32 control bits available during each frame. By providing a microprocessor on each line card the work load on the line switch controller 7 is reduced, flexibility of application is obtained, and maintenance functions may be more easily provided.

Ring cards or circuits 13 are provided in the line modules. The ring cards 13 also include microprocessors which reside on the ring cards. The ring cards contain their own ring frequency generator and a ring card is controlled by the line switch controller 7 via the 32 control bits available during each frame. Timing of the ringing is done via the micro-processors which reside on each line card and on each ring card.

Each line module also includes a power converter 12.

2.0 TRAFFIC HANDLING CAPACITY (FIG. 3)

The line switch shown in FIG. 2 can as noted above be configured such that each line switch module 1a, 1b is connected to the switching network 3 of FIG. 1 by one or more PCM lines PCMA, PCMB. Also, the line switch may be operated as either a 24 or 32 channel system. FIG. 3 illustrates the traffic handling capability of the line switch of FIG. 2 for different numbers of PCM lines in 24 or 34 channel systems.

3.0 PCM BUSES (FIGS. 4, 5, 6 and 7)

Each of the PCM buses PCMLCA, PCMLCB and PCM4 in the line switch of FIG. 2 carries information in frames of 125 microsec. in duration. One frame comprises 512 bits. Two alternate arrangements for formatting the 512 bit frame are shown in FIGS. 4 and 5 which may be found on the same sheet as FIG. 1. If the line switch is to be used in a 24 channel system, the frames will be arranged as shown in FIG. 4. Forty-eight channels of 10 bits each and 32 additional bits which are utilized as control bits for control of internal line switch functions are provided. By providing 10 bit channels, the line switch may be readily utilized in integrated digital switches proposed for the future wherein each channel will be arranged as shown in FIG. 5. FIG. 5 shows each frame arranged as sixy 8-bit channels and 32 control bits. Other formats may easily be utilized for use in other systems.

Figure 6:
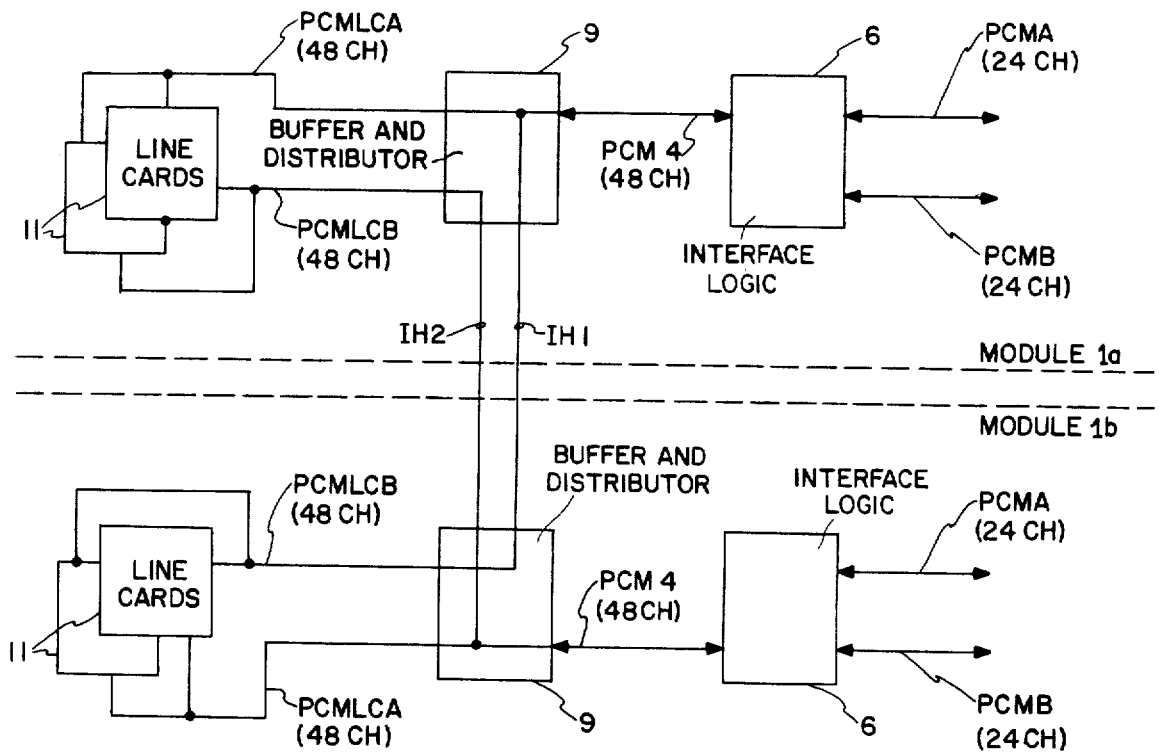
FIG. 6 illustrates in a general form the distribution of PCM channels within the two line modules of FIGS. 2 and 2A.

FIG. 6 illustrates the distribution of PCM channels in the line switch of FIG. 2 when used in a 24 channel system. To further simplify an understanding of the PCM channel distribution, only one cluster of line groups 11 and only one buffer and distributor 9 is shown for each line switch module 1a, 1b. The format of FIG. 4 is utilized. In each line switch module 1a, 1b two 24 channel, 1.544 mHz PCM lines PCMA, PCMB are connected to the interface logic 6. The interface logic 6 provides rate conversion and interlacing between th PCM lines PCMA, PCMB and the 48 channel, 4.096 mHz bus PCM4. The buffer and distributor 9 of each line module connects bus PCM4 to a 48 channel 4.096 mHz bus PCMLCA within the same module and via an inter highway bus 1H1 or 1H2 to a 48 channel, 4.096 mHz bus PCMLCB in the other module.

Therefore, each line circuit has access to a total of ninety-six 10 bit channels since PCMLCA and PCMLCB are each 48 channel buses. Further, with this configuration each line circuit has acces to the two 24 channel PCM lines PCMA, PCMB in the same module and also to the two 24 channel PCM lines PCMA, PCMB in the other module.

Figure 7:
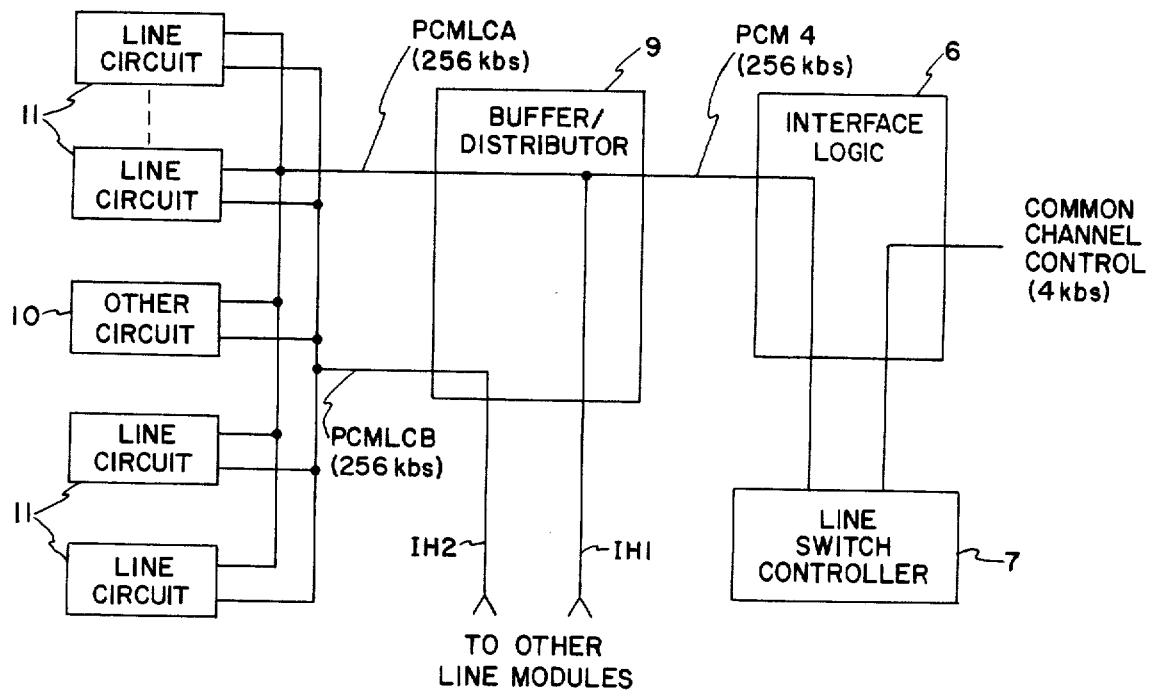
FIG. 7 illustrates in a general form the control communication paths within the line switch of FIG. 2.

As pointed out hereabove, th line switches 1 are controlled by the system controller 5 of FIG. 1. The line switch controller 6, in turn control the operation of the line circuits 11 and other circuits within a line switch. Turning now to FIG. 7, the line switch controller 7 communicates with the system controller 5 via a common channel signaling arrangement over the PCM lines PCMA, PCMB as described in the aforementioned R. E. Steidl patent. If it is assumed that the PCM lines operate at a 1.544 mHz rate and one common channel signaling bit is provided in every other frame, then the common signaling channel operates at a 4 kbs rate, i.e. 1 bit/2 frames × 8000 frame/sec = 4 kbs. The buses PCM4, PCMLCA, PCMLCB are used to transmit 32 bits of control data per frame, each frame being 125 microsec. in duration. The buses PCM4, PCMLCA, PCMLCB operate as 256 kbs control data channels, i.e., 32 bits/frame × 8000 frames/sec = 256 kbs. A line switch controller 7 thus provides a common 256 kbs control channel to each line circuit 11 or other circuit (which may be the ring circuit 13 or power converter circuit 12 of FIG. 2) via buses PCM4 and PCMLCA in a line switch module and additionally provides via bus 1H1 and 1H2 the same 256 kbs control data channel to other line switch modules in a line switch. Furthermore, bus 1H2 or 1H1 via bus PCMLCB provides a 256 kbs control channel from the other line switch modules in a line switch to the line circuits of the line switch module shown in FIG. 7.

4.0 INTERFACE LOGIC 6 (FIG. 8)

4.1 General

Figure 8:
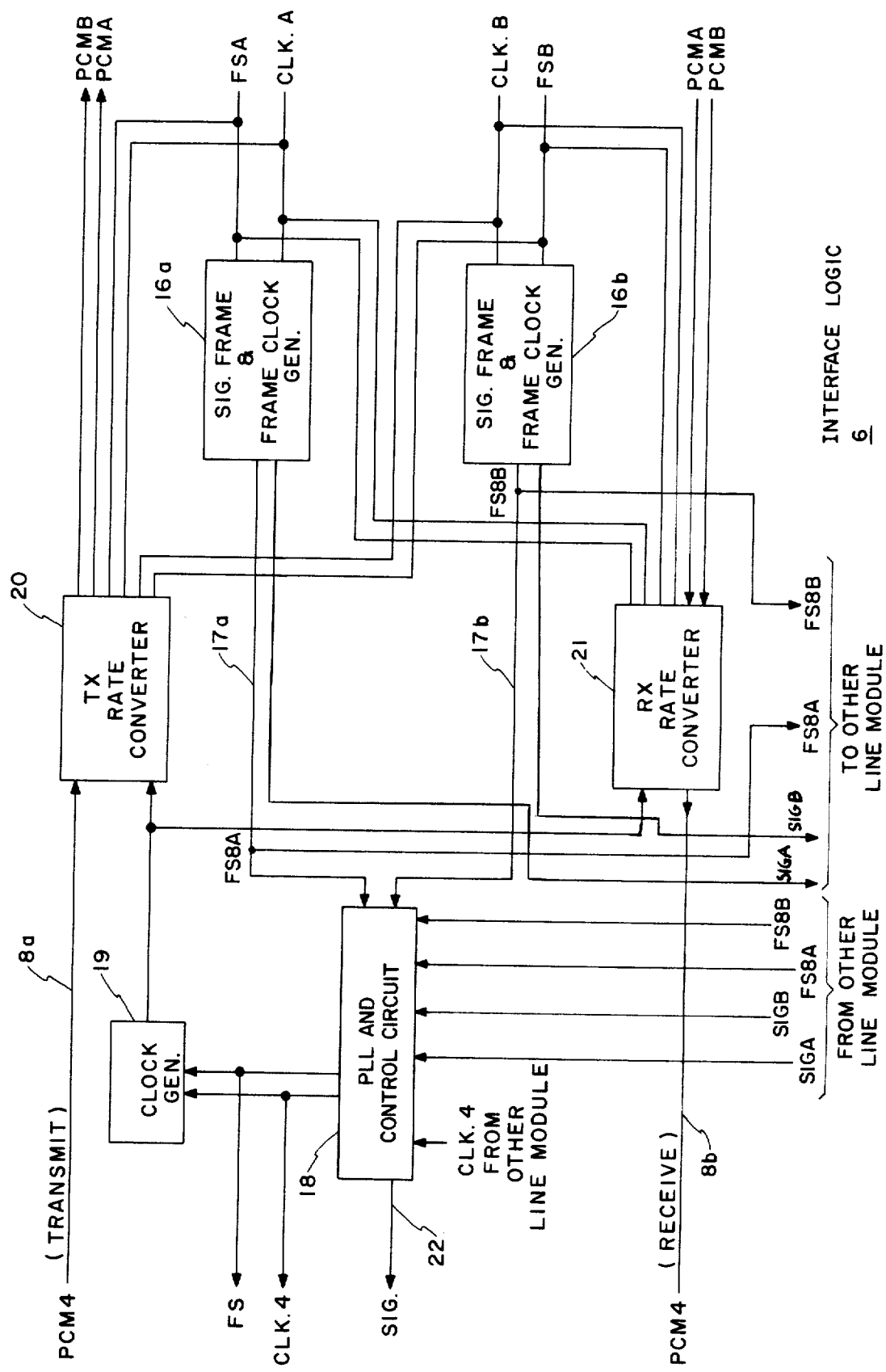
FIG. 8 illustrates in block diagram form the interface logic 6 of FIG. 2.

The interface logic 6 shown in block diagram form of FIG. 8 provides rate conversion and interlacing/demultiplexing of data between the two PCM lines PCMA, PCMB and the bus PCM4. Bus PCM4 and other PCM buses in the line switch are clocked at a 4.096 mHz bit rate. These buses must interface to the PCM lines PCMA, PCMB which clock PCM at a 1.544 mHz bit rate (or a 2.048 mHz bit rate in other applications). The interface logic 6 provides for the line switch internal clocks to be synchronized to the PCM line clocks CLKA, CLKB at frame boundaries such that no PCM bits are lost during rate conversion. This is accomplished by phase locking the internal clock to a PCM line clock by means of phase-locked loop (PLL) circuitry.

The rate converter portion of interface logic 6 includes memory elements for the PCM bit streams. The PCM data from bus PCM4 are written into a memory in the rate converter as the data for PCM lines PCMA, PCMB are read from the memory. Likewise, PCM data from lines PCMA, PCMB are written into a memory as the data for bus PCM4 is read from the memory.

Each of the two PCM lines PCMA, PCMB is connected to one of two corresponding identical signaling frame and frame clock generator circuits 16a, 16b. Each generator 16a, 16b derives an 8 khz clock signal on leads 17a, 17b, respectively, from the bit clock signal received via the respective bit clock leads CLKA and CLKB and determines the presence of a signaling frame, and generates a signaling frame signal. The 8 kHz clock is applied to a phase-locked loop and control circuit 18 and is supplied to a corresponding phase-locked loop and control circuit 18 in another interface logic 6 via leads FS8A or FS8B. The phase-locked loop and control circuit 18 generates a 4.096 mHz clock which is phase-locked to a selected 8 kHz clock on leads 17a, 17b or on the leads FS8A, FS8B which come from an interface logic circuit 6 of another line switch module. Thus, the phase-locked loop 18 of a line switch module may be locked to any one of four 8 kHz clocks. The 4.096 mHz clock is provided on lead CLK4 and also to a clock generator circuit 19. The generator 19 provides a framing signal at an 8 kHz rate and clock signals at a 4.096 mHz rate for the transmit (TX) and receive (RX) rate converter circuits 20 and 21 respectively.

The PLL and Control Circuit 18 selects which one of the four 8 kHz clocks on lead 17a, 17b, FS8A and FS8B is to be used as a master clock of the line switch. The phase-locked loop and control circuit 18 contains failure detection circuitry for all the 8 kHz clocks. When the absence of a clock pulse occurs the failure detector will insert a pulse to maintain the oscillation frequency of PLL, and another one of the remaining working 8 kHz clocks will be selected as a master.

Additionally, there is cooperation between the PLL and control circuits 18 in the modules of a line switch such that all will operate to select the same 8 kHz derived clock as a master. This assures that the PLL's of all line switch modules are synchronized to the same clock source.

Each PLL further includes self-check circuitry such that, if a PLL fails, the PLL will automatically disconnect itself from the 4.096 mHz line CLK4 and connect the line CLK4 to the output of the PLL in the other line switch module.

4.2 RX RATE CONVERTER (FIGS. 8, A-D)

Rate conversion and interlacing/demultiplexing are provided primarily by the TX rate converter 20 and the RX rate converter 21. The bus PCM4 includes a transmit path 8a and a receive path 8b. Likewise, the PCM lines PCMA, PCMB have both transmit and receive paths.

Incoming PCM signals from the switching network 3 over lines PCMA, PCMB are applied to the RX rate converter 21. The RX rate converter 21 operates as a FIFO type memory. Information received over the PCM lines PCMA, PCMB is stored at the rate of the PCM lines, i.e. 1.544 mHz for the North American Network or 2.048 mHz for the other systems. More specifically for the North American Network data from PCM line PCMA is clocked into RX rate converter 21 at a 1.544 mbs rate as determined by the 1.544 mHz PCM clock line CLKA of PCM line PCMA. Likewise, data from PCM line PCMB is clocked into the RX rate converter 21 as determined by CLKB. The data stored in the RX rate converter 21 is read at a 4.096 mbs rate as determined by the 4.096 mHz output of clock generator 19. The 1.544 mHz clocks signals received over CLKA, CLKB are not necessarily synchronized. However, the 4.096 mHz clock signals are phase locked to the clock signals of one of the PCM lines connected to a line switch.

Data from the two PCM lines PCMA, PCMB is alternately read from the RX rate converter and applied to the receive portion of bus PCM4, i.e., path 8b. FIG. 9A illustrates the interleaving of channels from the PCM lines PCMA, PCMB onto the bus PCM4.

Figure 9B:
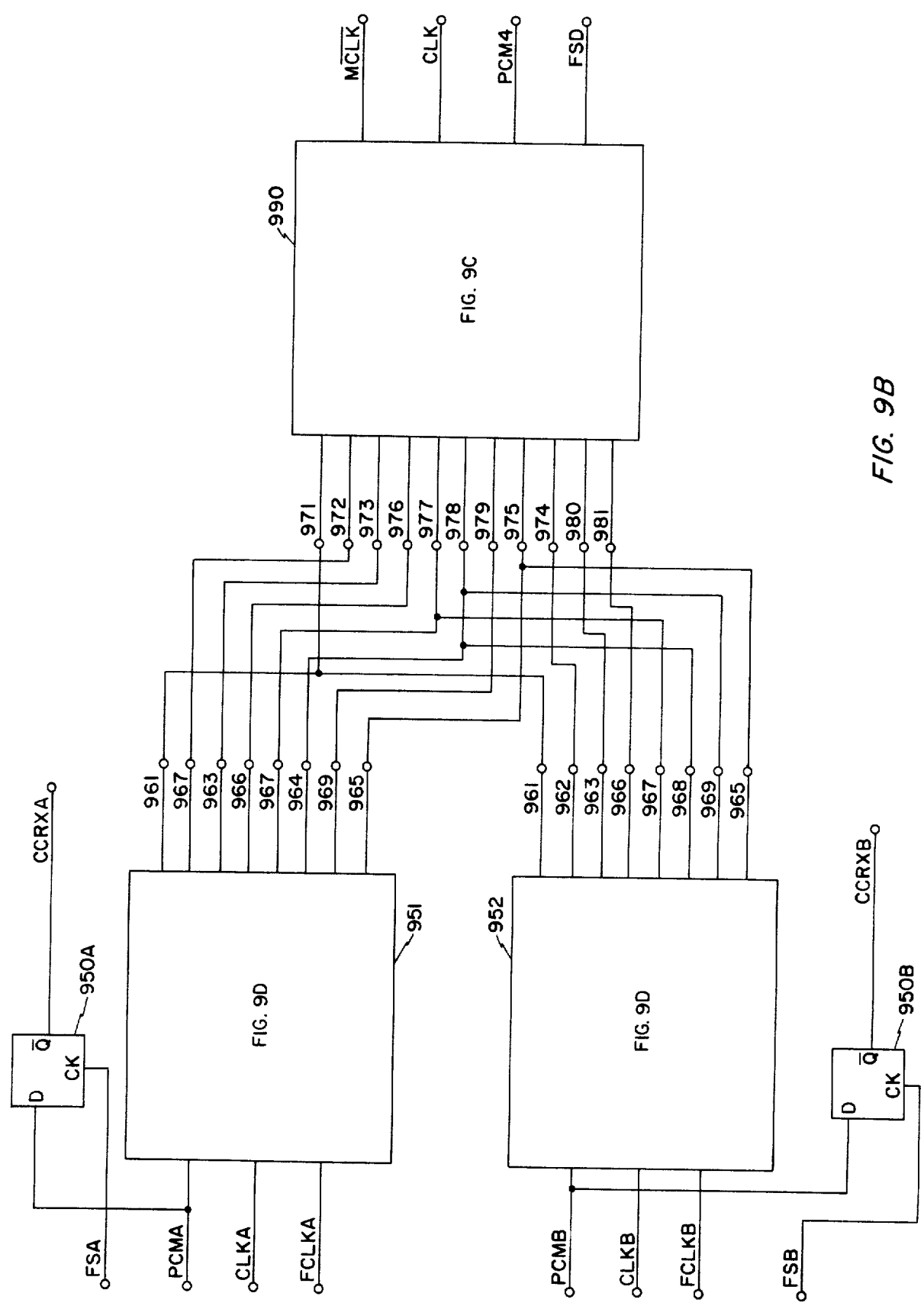
FIGS. 9B, 9C and 9D illustrate in block diagram form the RX rate converter 20 of FIG. 8.
Figure 9C:
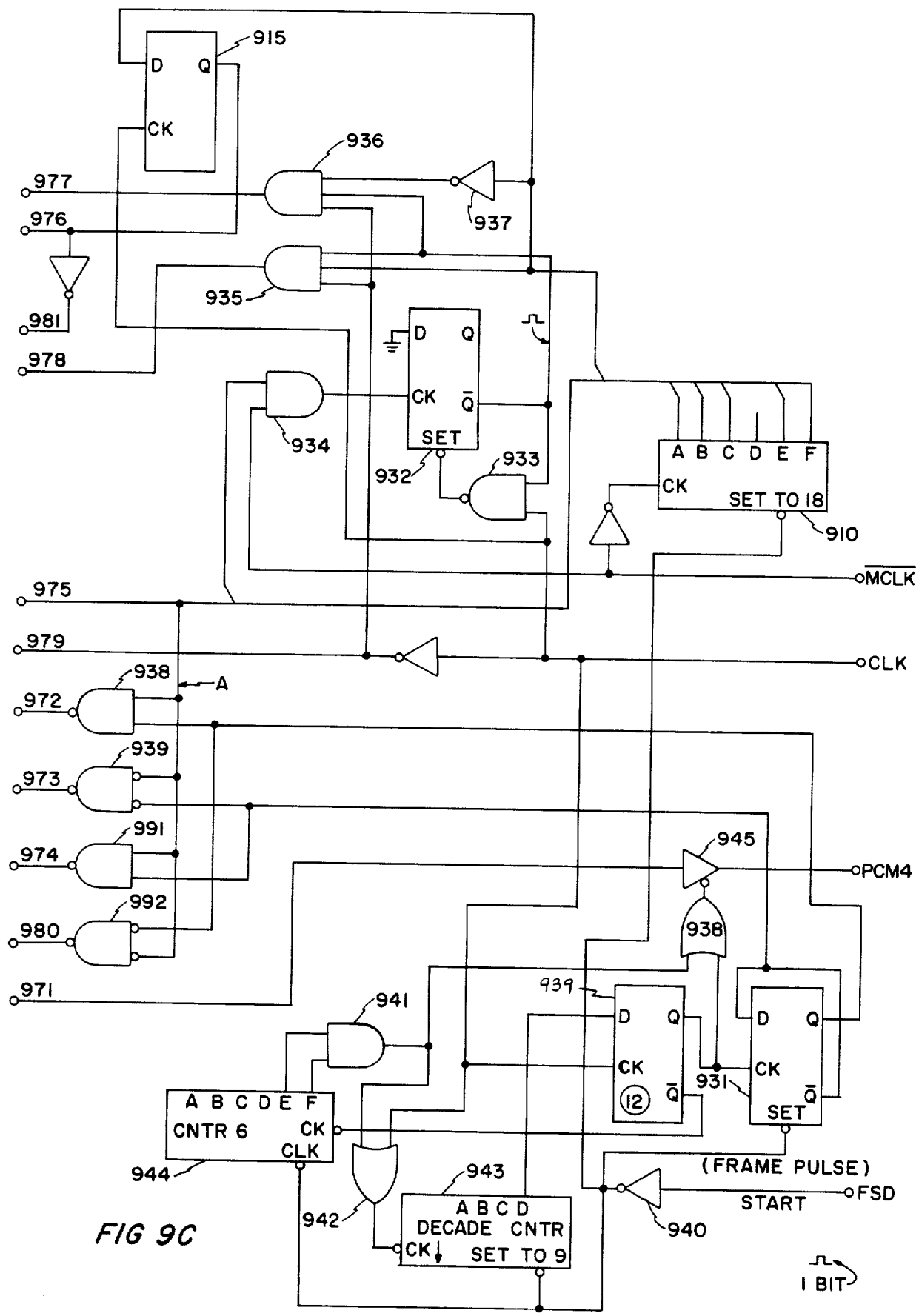
Figure 9D:
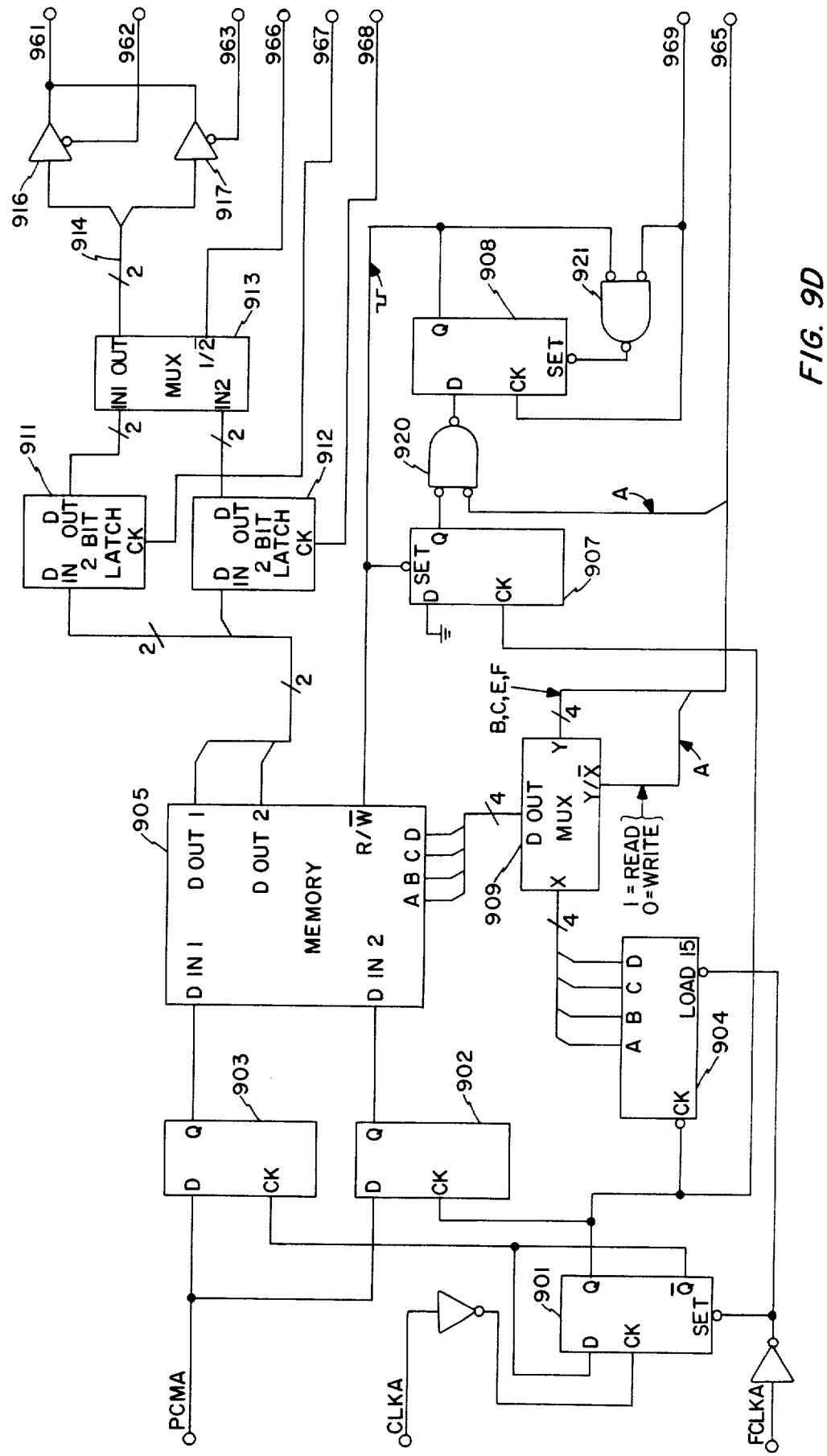

The RX rate converter 20 is shown in greater detail in FIGS. 9B, 9C and 9D. FIG. 9B illustrates the interconnection of the circuits of FIGS. 9C and 9D. The circuitry of box 951 for PCM line PCMA is duplicated in box 952 for PCM line PCMB and is shown in detail in FIG. 9D. FIG. 9C shows box 990 in detail. Turning now to FIGS. 9C and 9D, serial PCM data is received from PCM line PCMA. Alternately received bits are stored in buffer flip-flops 902 and 903 by flip-flop 901. After every other bit is stored in the flip-flops 902, 903, the write address counter 904 is advanced by one count and the two bits stored in flip-flops 902, 903 are stored in the memory 905. The flip flops 902, 903 act as a two bit serial to parallel converter and thus form two bit words for storing in the memory 905. Memory 905 is organized as sixteen 2 bit words and is a random access memory. Memory 905 includes four addresss bit inputs and read/write input. A read write control circuit comprising flip-flops 907, 908 and gates 920, 921 determines whether a read or write operation is to occur. An address selector 909 is used to select either a write address from counter 904 or a read address from counter 910.

When the data stored in flip-flops 902, 903 is to be stored in memory 905, the selector 909 selects the counter 904 as the source for the memory address and flip-flop 908 applies a write signal to the memory 905. When data is to be read from memory 905, selector 909 selects counter 910 as the source for the memory address and flip-flop 908 provides a read control signal to the memory 905. Data read from memory 905 is read as two bit words which are alternately stored in the two bit latches 911, 912. The flip flop 932 and gates 933, 934, 935, 936 and 937 control the loading of data read from memory 905 into the latches 911, 912. A selector 913 under control of flip-flop 915 alternately gates the outputs of the latches 911, 912 onto the two bit lines 914. Tri-state buffer gates 916, 917 controlled by gates 938, 939 alternately connect one of the lines 914 to the single line 961. The flip-flop 931 is used to select either the outputs from box 951 or 952 to be applied to the line 961. Flip-flop 931 changes its output state once for each voice channel on PCM4.

In effect, latches 911, 912; selector 913 and gates 916, 917 operate as a parallel to serial converter and flip-flop 931 operates to select either PCMA or PCMB as the source of data on PCM4. The read address counter 910 is driven by signal $\overline{MCLK}$ which as will be described below defines the format of PCM4. Pulses are provided by $\overline{MCLK}$ which correspond to the PCM voice bits on the bus PCM4.

The gates 938, 940, 941, 942, flip-flop 939, decade counter 934 and 6 bit counter 944 operate to control the tri-state buffer gate 945. Gate 945 is enabled when PCM data from either PCM line PCMA or PCMB is to be transmitted over PCM4. In accordance with the format for PCM4 shown in FIG. 4, gate 945 is enabled for the 8 PCM sample bit positions of each 10 bit channel and is disabled for the remaining two bits. Also, gate 945 is disabled for the 32 control bit positions in each frame.

4.3 TX RATE CONVERTER (FIGS. 8, 10A, B and C)

The TX rate converter 20 of FIG. 8 mirrors the operation of the RX rate converter 21. Specifically, the channels of data on the transmit portion 8a of bus PCM4 are stored in a FIFO memory of the TX rate converter 20. Information is received at a 4.096 mbs rate and stored under control of the 4.096 mHz clock signals of clock generator 19. Alternate channels of data stored by the TX rate converter are forwarded to the PCM lines PCMA, PCMB at a 1.544 mbs rate as determined by the respective clock signals CLKA, CLKB or the PCM lines. This demultiplexing operation is shown in FIG. A.

Figure 10B:
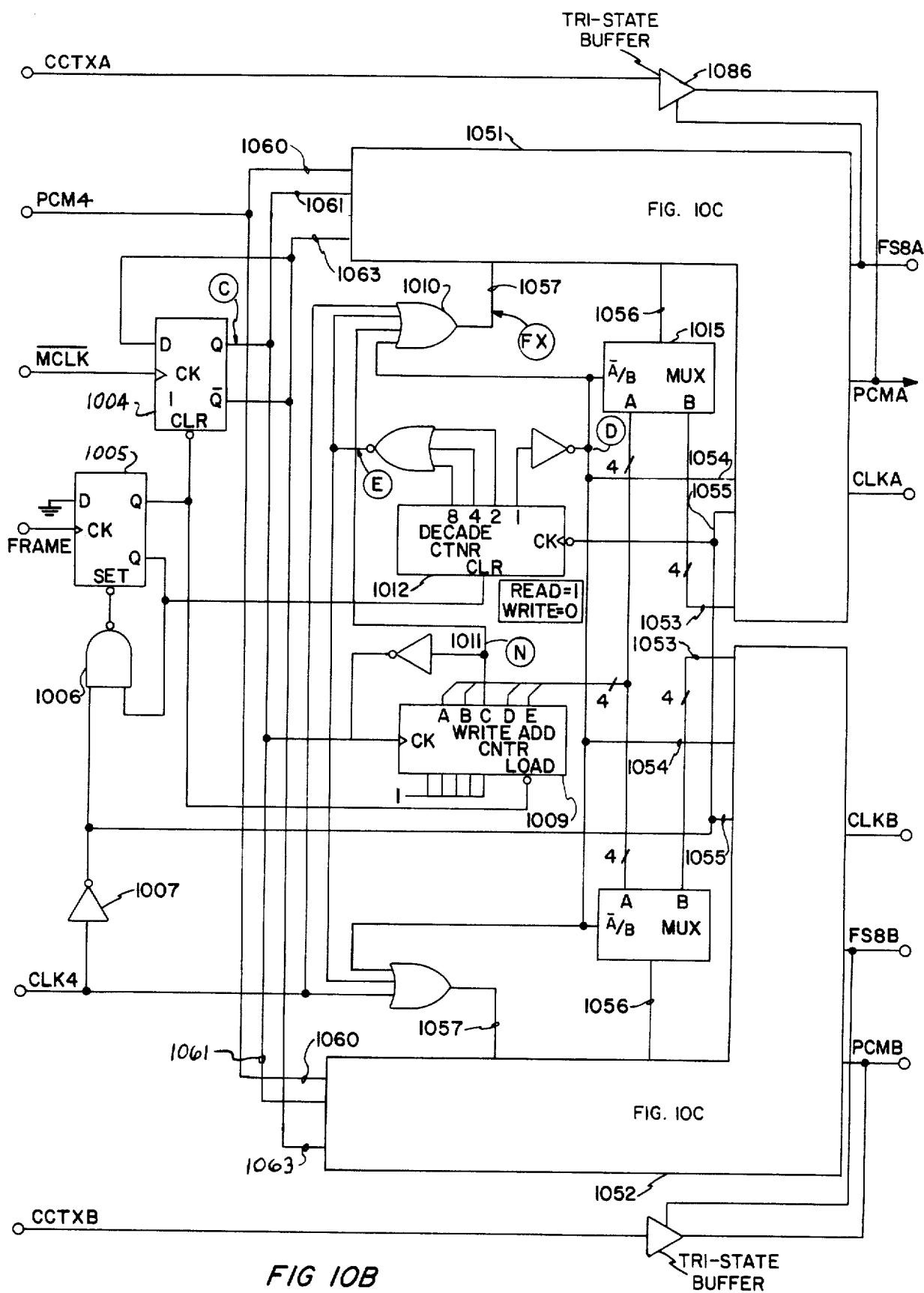
FIGS. 10B and 10C illustrate in block diagram form the TX rate converter 21 of FIG. 8.
Figure 10C:
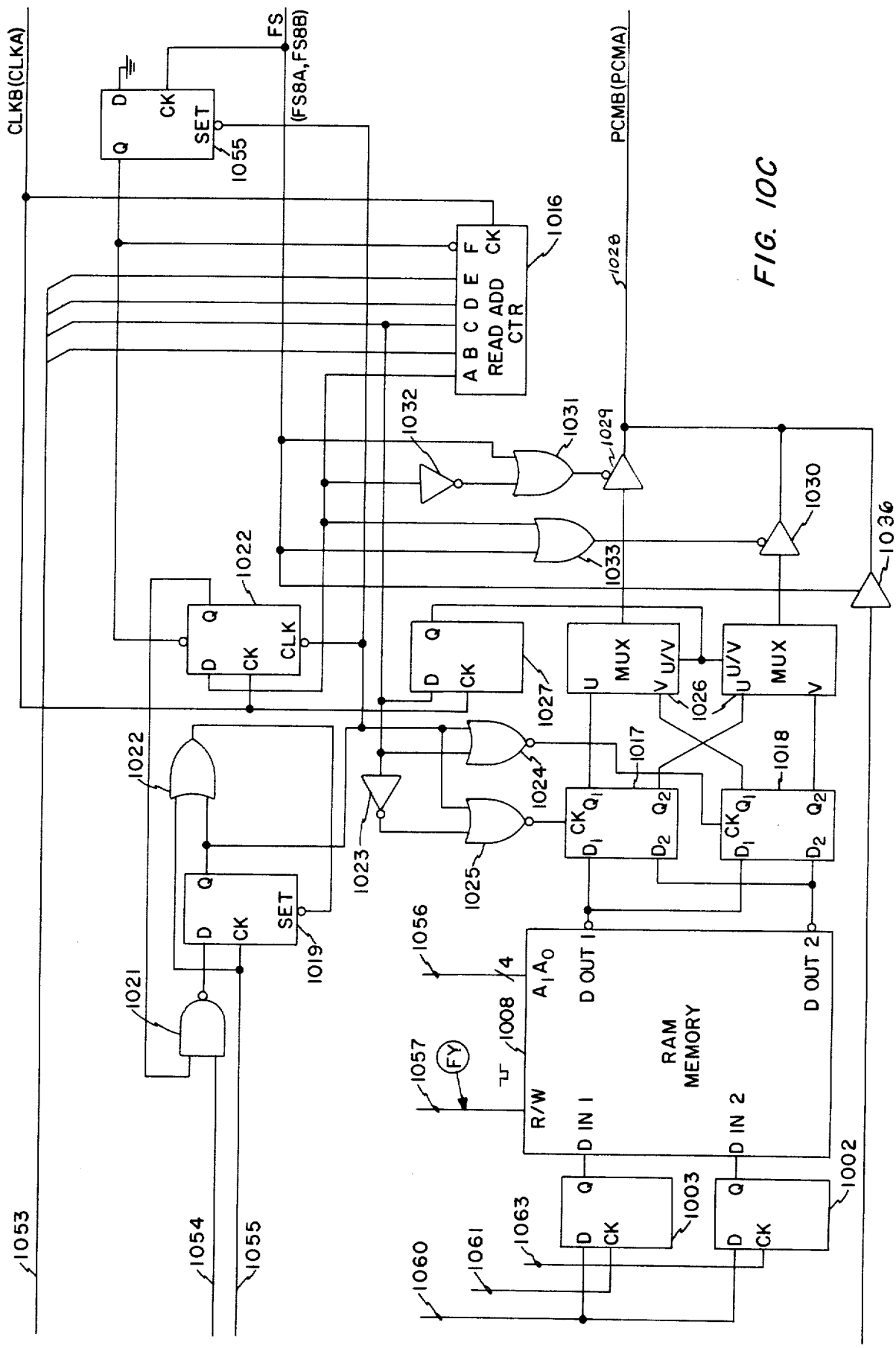

The TX rate converter 21 of FIG. 8 is shown in detail in FIGS. 10B and 10C. The circuitry in box 1051 for PCM line PCMA is duplicated in box 1052 for PCM line PCMB. Boxes 1051 and 1052 are shown in detail in FIG. 10C.

Serial PCM data is received over bus PCM4. Alternately received PCM sample bits are stored in the two buffer flip-flops 1002, 1003. Flip-flop 1004 which is clocked by the signal $\overline{MCLK}$ selects which of the flip-flops 1002 or 1003 into which a PCM bit is to be stored. The flip-flop 1005, and gates 1006, 1007 are used to synchronize the operation of flip-flop 1004 each frame. After every other bit is stored in the flip-flops 1002, 1003, the two stored bits are written into memory 1008. Memory 1008 is a random access memory organized as 16 words of two bits each. Memory write addresses are generated by the counter 1009. Counter 1009 is a 5 bit binary counter which is clocked at one half the rate of the $\overline{MCLK}$ signals by flip-flop 1004. The C output of the counter 1009 is used to control gate 1010 and through an inverter 1011 controls if the corresponding memory on box 1052 is to be written or read. Decode counter 1012 and gates 1013, 1014 control whether data is to be stored in or read from memory 1008 and also counts the number of bits (10) in each channel on bus PCM4.

When counter 1012 contains a count of 0 or 1, a memory write operation is inhibited. Address selector 1015 is used to select the address input to memory 1008. Specifically, the selector 1015 selects output from counter 1009 for memory write address and counter 1016 for a memory read address. Counter 1016 is a 5 bit binary counter and is clocked by the PCM line clock CLKA. When data is read from memory 1008, the two bit words are alternately stored in the two bit latches 1017, 1018. Flip-flops 1019, 1020 and gates 1021, 1022, 1024, 1025 provide control for gating the data into the latches 1017, 1018. Gate 1023 in combination with the "C" output of counter 1016 provides for alternately selecting the latches 1017, 1018 for storing the read data. The selector circuit 1026 under control of flip-flop 1027 alternately gates the contents of latches 1017 and 1018 on line 1028. Tri-state buffer gates 1029 and 1030 controlled by gates 1031, 1032, 1033 are alternately enabled to alternately connect the two outputs of the selector 1026 to PCM line PCMA. Latches 1017, 1018, selector 1026 and gates 1029, 1030 operates as a parallel to serial converter.

The flip-flop 1055 clears the counters 1016 whenever the framing bit position during a frame on the PCM line PCMA occurs.

Tri-state buffer gate 1036 is enabled during the framing bit position to permit common channel signaling or framing information to be gated onto line PCMA.

The above described interlacing and demultiplexing operations are premised upon the use of 24 channel 1.544 mHz PCM lines PCMA, PCMB and the bus PCM4 having the format of FIG. 4. If, however, the PCM lines PCMA, PCMB are 30 channel 2.048 mHz lines then the PCM clock lines CLKA, CLKB would operate at 2.048 mHz and the format of FIG. 5 would be used for bus PCM4.

4.4 PHASE-LOCKED LOOP AND CLOCK CIRCUIT (FIGS. 2, 8, 11–20)

The rate converters require that the clock frequency of bus PCM4, i.e., be exactly 512/193 times the clock frequency of the PCM lines PCMA, PCMB. The phase difference between the two clocks must be controlled such that it falls within the limits required by the rate converter hardware.

The maximum phase difference between the internal line switch clock and the PCM line clocks that is tolerable to the rate converter is limited only by the amount of memory storage in the rate converter. However, a large tolerance for phase variation requires a larger amount of memory storage and causes a larger nominal delay in the rate converter.

The rate converter inherently causes 20 microseconds of nominal delay interfacing the 4.096 mHz PCM to 1.544 mHz PCM. Additional delay is designed into the rate converter to tolerate the phase variation in the internal line switch clock relative to the PCM line clocks CLKA, CLKB. To design to rate converter for minimum delay requires the phase variance of the clocks be tightly controlled.

The rate converter requires a specific relationship between the two clocks. This relationship is a defined sequence which repeats every frame (125 microseconds). At frame boundaries, (Bit 193 of the PCM line clocks) the rising edges of both clocks are synchronous when they are in phase. Any deviation is considered a phase error of the line switch clock.

In the illustative embodiment of FIG. 2 two 4.096 mHz buses PCM4 are driven by the same clock, i.e. one bus in each of the line switch modules 1a, 1b. Up to four external PCM lines, PCMA, PCMB in both line switch modules, whose phase relative to one another can vary, will interface to the two buses PCM4. Since the 4.096 mHz clock will be phase-locked to an arbitrarily chosen PCM line, the rate converter must be capable of tolerating the phase difference relative to other PCM lines. Also, the failure of any one PCM line must not affect service on the other PCM lines. An extension of this philosophy requires that any single failure in the PLL circuitry not cause the loss of all four PCM liens. In summary, the

- PLL must have a phase error whose variance is minimized relative to the PCM lines;
- The PLL must be capable of using any one of the PCM lines as a reference so that a failure of any PCM line doesn't affect service on the other PCM lines; and
- Two PLL circuits must exist that are independently selectable to ensure that a single failure in the PLL does not affect the PCM clock CLK4.

Figure 11:
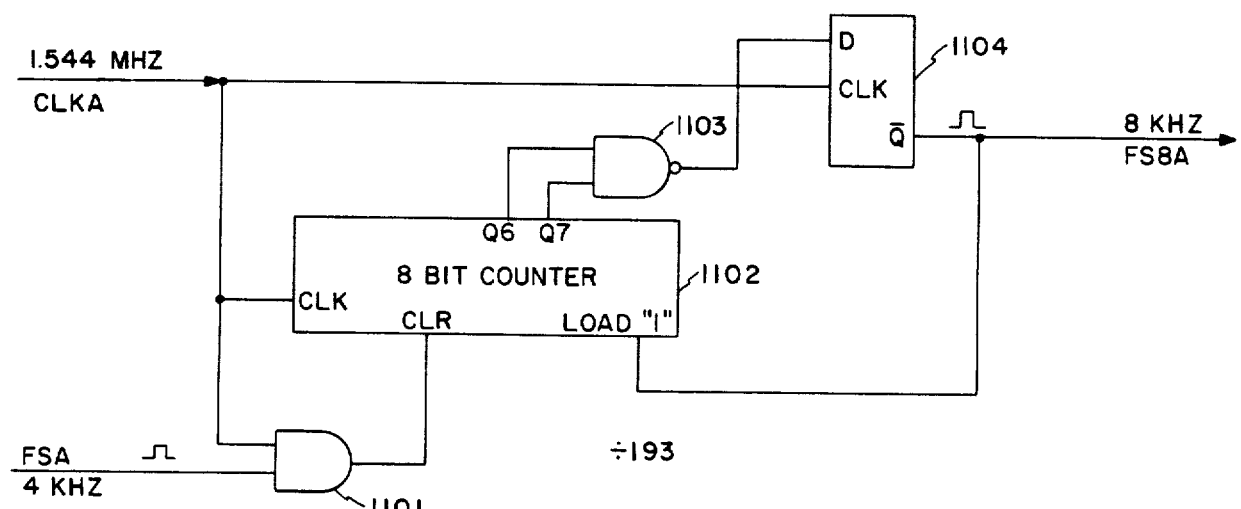
FIG. 11 illustrates in block diagram form a portion of generator 16a of FIG. 8.

The signaling frame and frame clock generators 16a, 16b of FIG. 8 includes a divider circuit to derive an 8 kHz signal from the 1.544 mHz PCM line clock and the signaling frame clock. The divider circuit for generator 16a is shown in detail in FIG. 11. The circuit includes gate 1101 connected to the input of an eight bit counter 1102. Decoder gate 1103 coupled to the eight bit counter provides an output to the "D" input of flip-flop 1104. Flip-flop 1104 has its clock input CLK connected to CLKA and its Q output provides an 8 kHz framing signal FS8A. The outputs FS8A and FS8B of generators 16a, 16b are provided as inputs to the PLLL and control circuit 18 of FIG. 8. Additionally these FS8A and FS8B outputs are provided to the other line switch module in a line switch. Similarly, FS8A and FS8B outputs from the other line switch module are provided as inputs to the PLL and control circuit 18 of FIG. 8. Thus, the PLL and control circuit has clock inputs derived from each of the four PCM lines connected to a line switch, i.e., the signals derived from CLKA and CLKB of line switch module 1a and those derived from CLKA and CLKB of line switch module 1b of FIG. 2. Additionally, each of the circuits 16a, 16b of FIG. 8 generates a signaling frame signal SIGA, SIGB respectively. The signaling frame signals are also supplied to the PLL and control circuit 18 from the circuits 16a, and 16b in both line switch modules.

Figures 12, 12B:
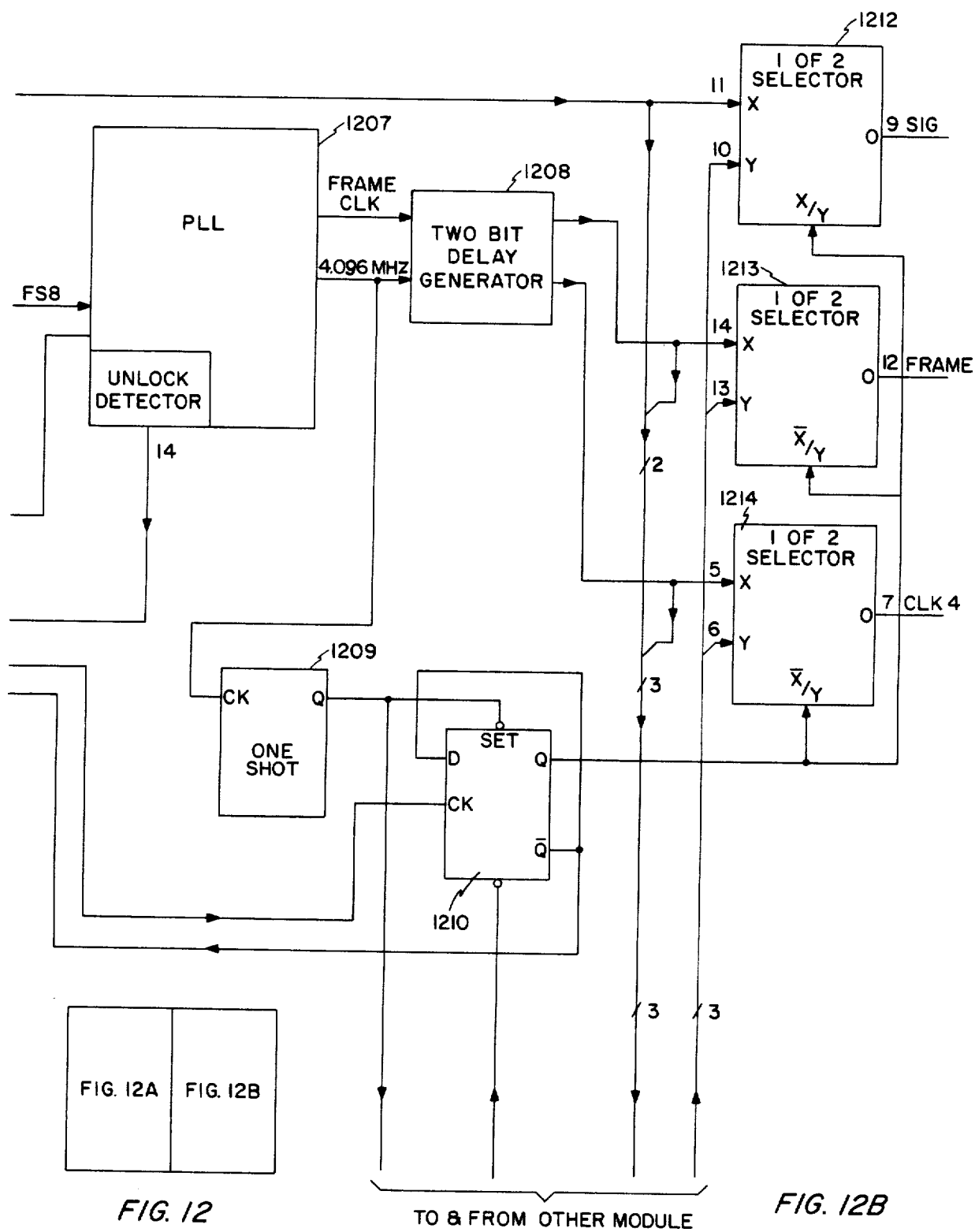
FIGS. 12A and 12B when arranged as shown in FIG. 12 illustrate in block diagram form the PLL and control circuit 18 of FIG. 8.
Figure 12A:
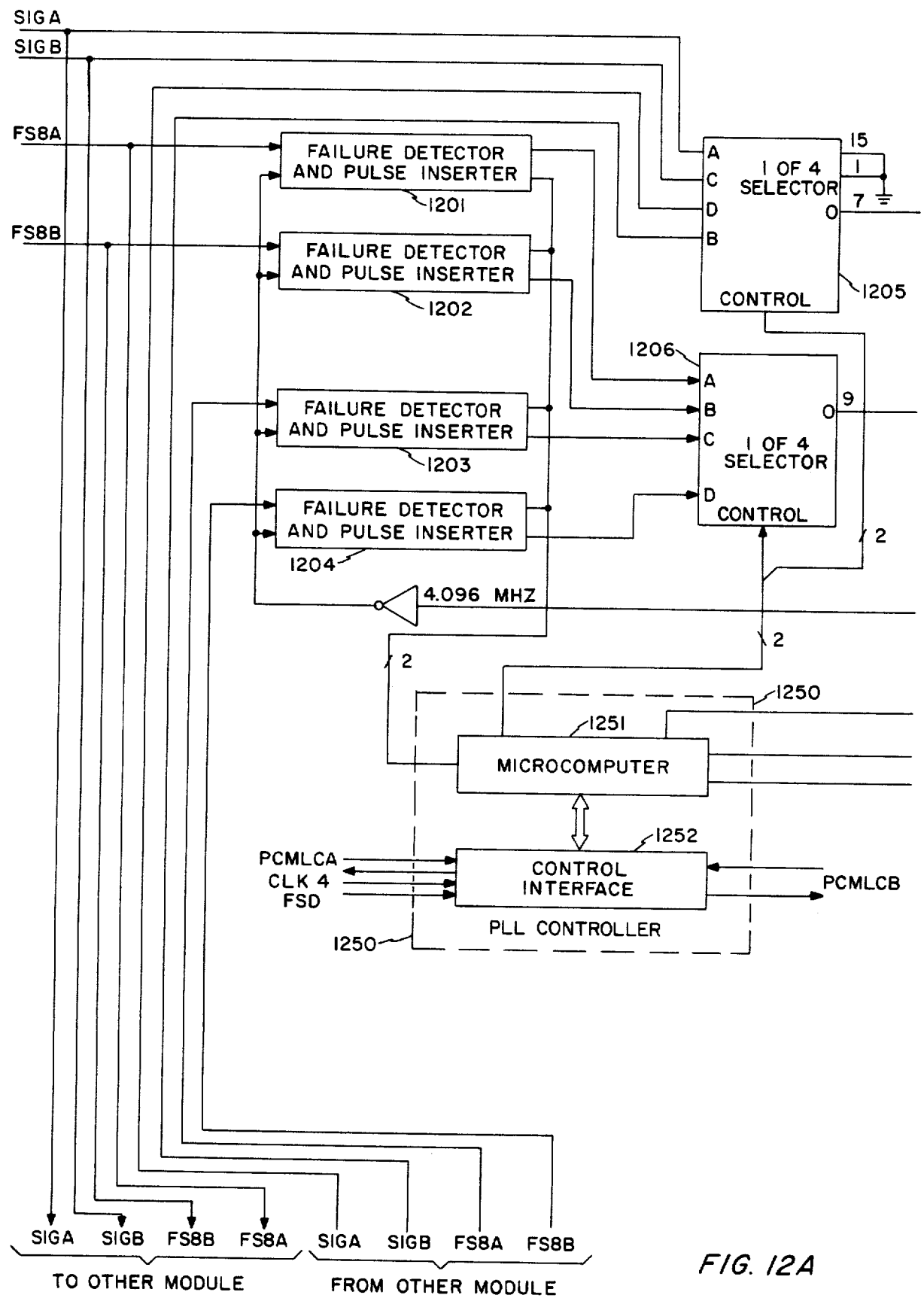
Figure 13:
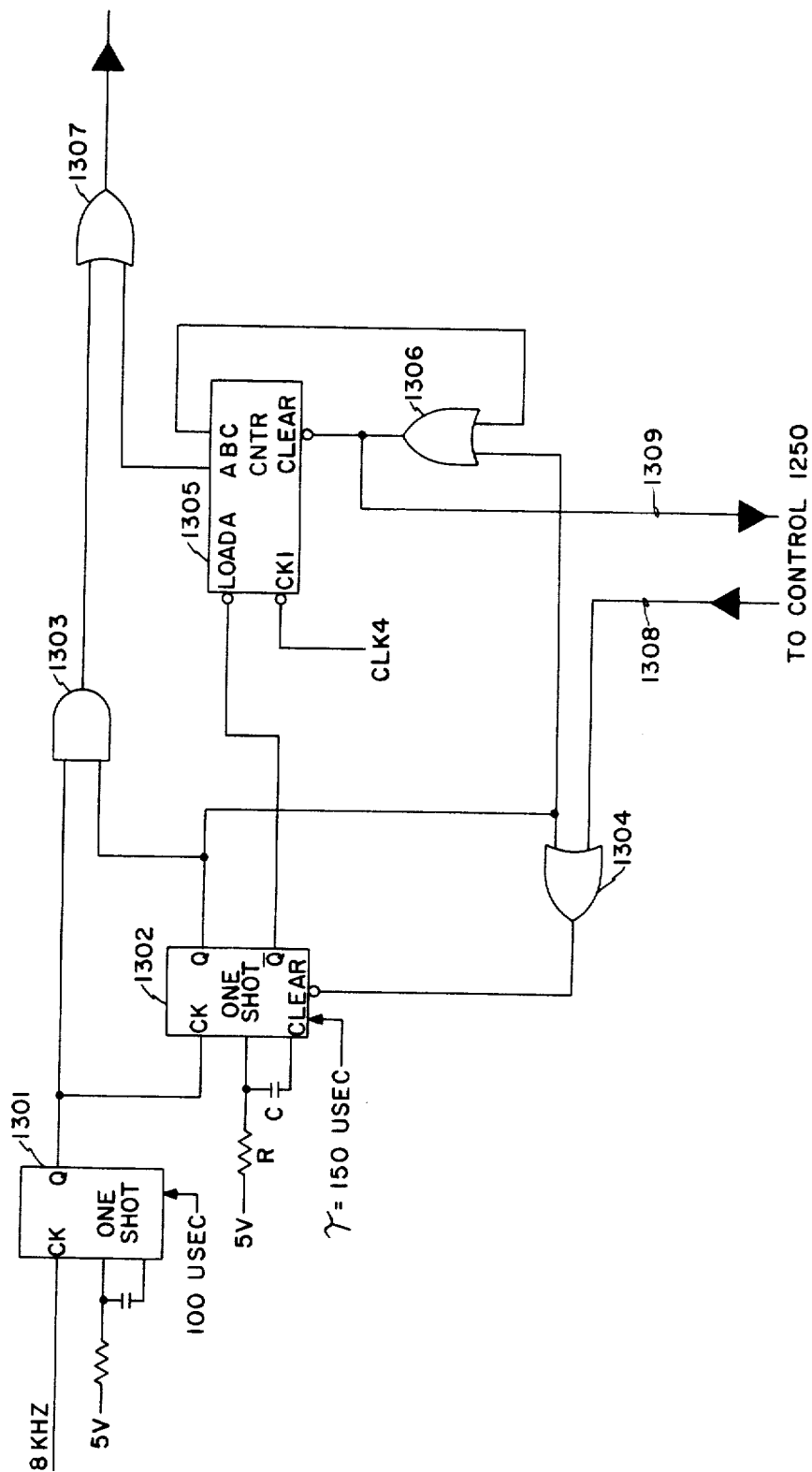
FIG. 13 illustrates in block diagram form failure detector 1201 of FIG. 12A.

Turning now to FIG. 12, the signaling frame signals SIGA and SIGB are coupled to a 1 of 4 selector 1205. Each of the four 8 kHz inputs FS8A, FS8B are individually connected to a failure detector circuit 1201, 1202, 1203, 1204. A 1 of 4 selector 1206 is to select one of the clock outputs from the failure detectors 1201, 1202, 1203, 1204 as the input FS8 to the phase-locked loop 1207. The selector 1206 as well as selector 1205 is controlled by the PLL controller 1250. The PLL 1207 is locked to the selected input. If a failure should occur in the PCM line from which the signal FS8 is derived, service to the other PCM lines would be interrupted if there was no capability of change from the PCM line to which it is phase-locked. The failure detectors 1201, 1202, 1203, 1204 detect failures in the PCM lines. FIG. 13 illustrates in detail the failure detector 1201. Normally, a clock pulse at the 8 kHz rate of FS8A arrives every 125 micorsec. If, however, the time between two pulses is less than a predetermine interval, i.e., 100 microsec., the one shot 1301 will prevent the fast pulse from being propagated. If the time interval between pulses is greater than 100 microseconds, (and less than a second predetermined interval as discussed below) the pulse will be transmitted through gates 1303 and 1307. If the time interval between pulses is greater than the second predetermined interval, i.e., 150 microseconds, the one shot 1302 will time out, its Q output will go low inhibiting gate 1303. Additionally, the PLL controller 1250 will maintain a logic low on lead 1308 with the result that the clear input to one shot 1302 is low. With the clear input low, the output Q is maintained low. Thus, the one shot 1302 is "latched" in the low state. When Q is low, Q̄ is high. Three bit binary counter 1305 is arranged such that when Q̄ is low, a binary 4 (ABC=001) is loaded and when Q̄ goes high, the counter 1305 may begin counting. Counter 1305 has a clock input coupled to the 4.096 mHz clock CLK4. When the counter reaches binary count 6 (ABC=011) a signal is provided at the output of gate 1307. The output signal will persist through a binary count of 7 (ABC=111) and will terminate at the next binary count (ABC=000) i.e., a binary count of 0. When a binary count 0 is reached, the output signal at gate 1307 is terminated, a low is applied to the clear input of counter 1305 causing counter 1305 to "latch-up".

Additionally, a signal is provided to the PLL controller 1250 on line 1309 indicating that a failure has occurred. Thus, if a pulse is absent for more than 150 microsec. a "phantom" pulse is provided and the PLL controller 1250 is informed of the failure. The PLL controller 1250 will select a different one of the PCM lines to use as a reference for the PLL 1207. The phantom pulse is required to insure that the PLL 1207 does not miss a pulse. If no pulse were to occur, the PLL 1207 would function as though it were an entire frame out of phase and would slow down the 4.096 mHz clock CLK4 to correct for this. This would result in the rate converter losing several frames of PCM before frame resynchronization had occurred. Since the phantom pulse is out of phase with a normal pulse stream, it does cause an aberration in the operation of PLL 1207. However, the PLL 1207 has a narrow loop bandwidth such that its output will be within the limits of the rate converter tolerance. The aberration in the PLL is less than 100 nanosec. of phase change.

Figure 14:
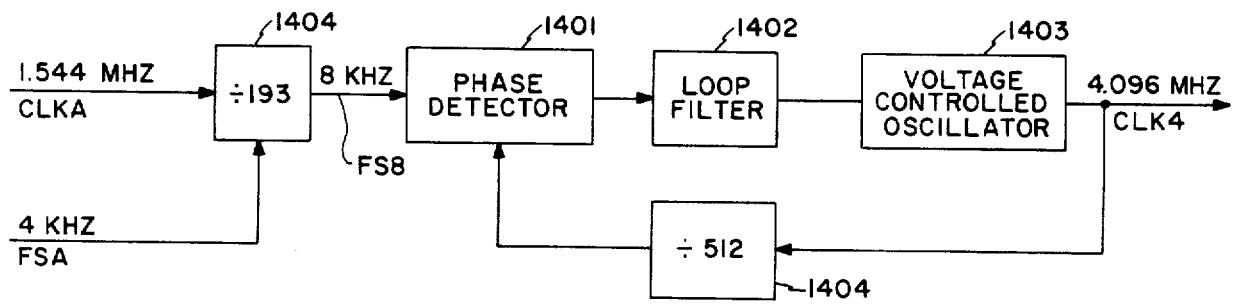
FIG. 14 is a block diagram of PLL 1207 of FIG. 12B.

A block diagram of the PLL 1207 is shown in FIG. 14.

The PLL 1207 comprises a clock inut FS8 to which a voltage controlled oscillator (VCO) 1403 is slaved. This is accomplished by dividing both the output of the VCO and the input clock to get a common frequency, i.e. 8 kHz. The signaling frame and frame clock generator 16a of FIG. 8 divides the incoming 1.544 mHz PCM line clock CLKA to obtain an 8 kHz output FS8A which is in this example selected by selector 1206 of FIG. 12 to provide signals on FS8. The divider 1404 of FIG. 14 divides the 4.096 mHz output of VCO 1403 to also generate an 8 kHz signal. The phase detector 1401 generates an error current which is integrated by the loop filter 1402 to control VCO 1403. When CLK4 is phase-locked to FS8, the frequency of VCO 1403 is exactly 512/193 times CLKA.

Figure 15:
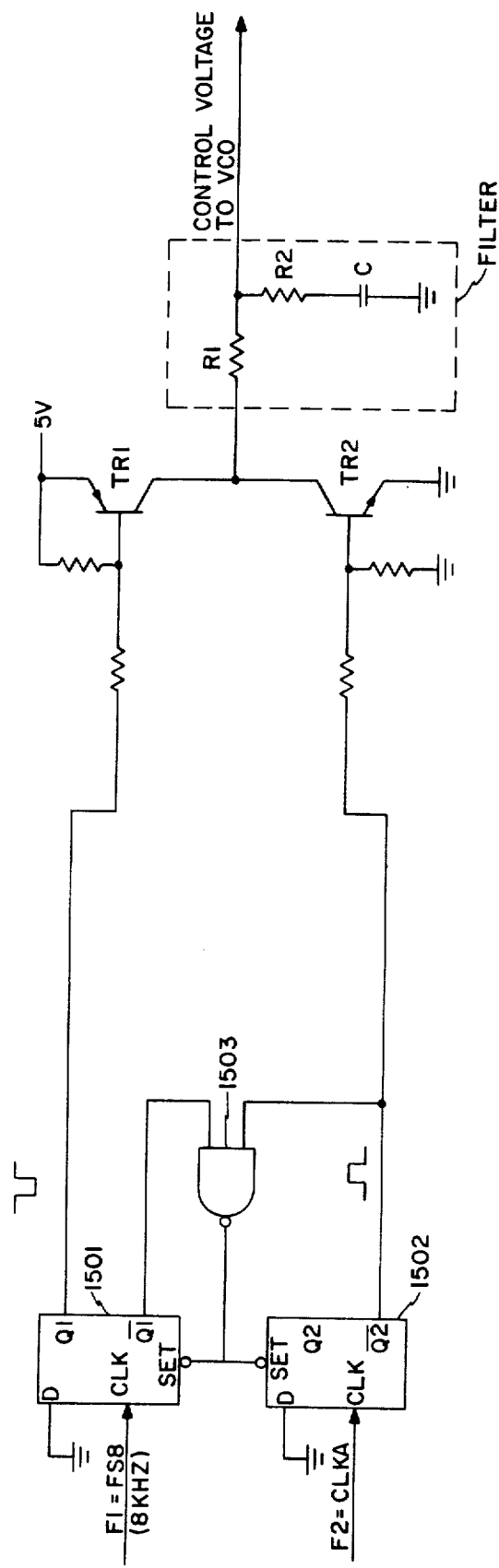
FIG. 15 illustrates in block diagram form the phase detector of FIG. 14.

In order to minimize the phase variance in the PLL 1207, a phase detector is provided that gives a phase error near zero under steady state conditions. A simple phase detector that meets this critical requirement is shown in FIG. 15.

This phase detector requires TTL compatible inputs and unlike a quadrature or an EXCLUSIVE-OR type of phase detector, it is not duty-cycle dependent on the inputs since it is strictly rising-edge sensitive which prevents phase lock from occurring on an integer multiple (harmonic) of the desired VCO frequency. It similarly rejects subharmonic phase lock.

Figure 16:
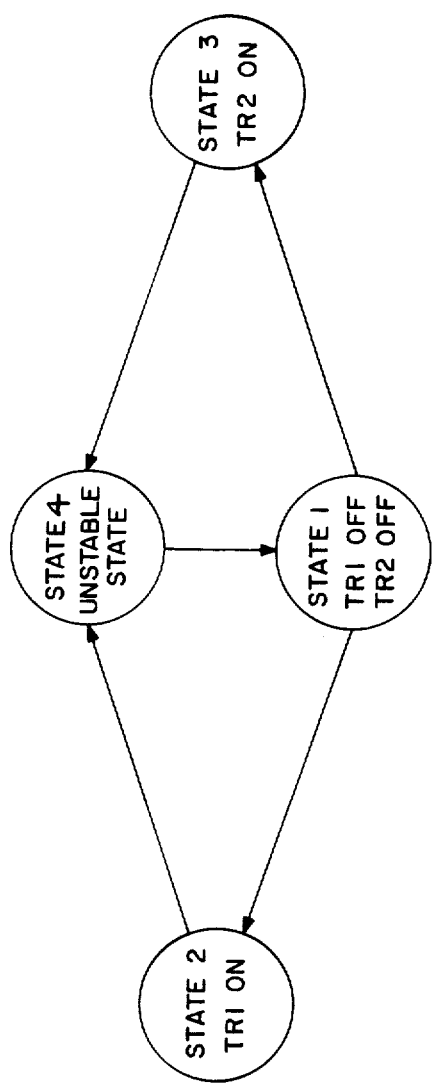
FIG. 16 is a state diagram for the phase detector of FIG. 14.

The outputs (Q1 and Q2) of flip-flops 1501, 1502 have the following four states:
 State 1 = Both Q1 and Q2 high
 State 2 = Q1 is low, Q2 is high
 State 3 = Q1 is high, Q2 is low
 State 4 = Both Q1 and Q2 low State 4 is an unstable condition since this causes a set pulse which returns the flip-flop pair to State 1. State 1 is the "off" state in that both transistor switches (TR1 and TR2) are turned off in that state. FIG. 16 shows the state diagram of the phase detector.

The phase detector cycles through the state diagram (FIG. 16) starting at State 1 progressing to either State 2 or 3, to State 4, and returns to State 1. It makes this cycle once every 125 microseconds staying in State 1 for a large duration of the cycle. If F2 lags F1 in phase, the detector cycles through State 2; if F2 leads F1, it cycles through State 3. The time it is in State 2 or 3 is equal to the phase difference between F1 and F2. Thus, the phase detector has a +360 degrees of phase error operating range. If the error exceeds 360 degrees in either direction or F2 is not equal to F1, the cycle time is not necessarily 125 microseconds (out of lock condition). However, the phase detector will always cycle through State 2 when F2 is less than F1 and through State 3 when F2 is grater than F1. Therefore, the phase detector will, in all cases, drive the control voltage toward a locked condition.

When in State 2 or 3, TR1 or TR2 is "on" causing current to be pumped into or out of the loop filter capacitor (C). When fed into an infinitely high impedance, the voltage on the capacitor represents the summation (or integral) of all past phase errors. This is extremely important, since different VCO's require different control voltages to oscillate at 4.096 mHz. The phase detector will operate at nearly zero phase error under steady state conditions independent of the DC voltage on the control voltage line. TR1 and TR2 need only to be turned on to correct for changes in PLL operating conditions and to replace the small amount of charge lost in the capacitor due to circuitry leakage during each 125 microsecond period. The phase error is independent of the vast majority of the PLL parameters including loop gain, supply voltage, loop filter values, and all VCO characteristics. In comparison, when using phase detectors in which the control line voltage is directly proportional to the phase error, the phase error is much mor difficult to control. With such phase detectors any required change in control voltage (due to part variance or temperature change) causes a proportional phase error change.

Figure 17:
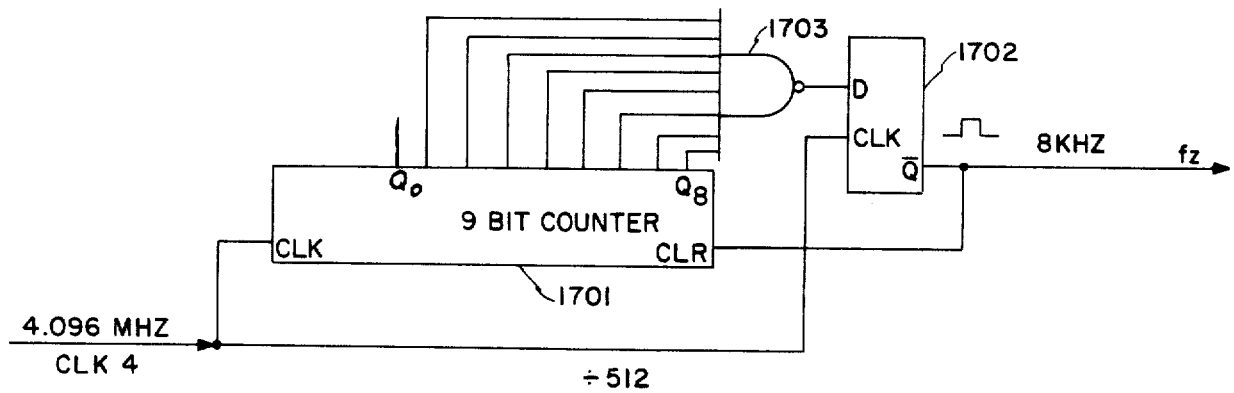
FIG. 17 is a block diagram of divider 1404 of FIG. 14.

Phase error between the VCO and its reference is dependent primarily on the propagation delay through the dividers (512 and 193) and the phase detector. The dividers were both designed with this consideration and have only one flip-flop delay from input to output. The −193 counter is that of FIG. 11 and the −512 counter is shown in FIG. 17. The phase detector uses two flip-flops that are inherently closely matched since they are in the same integrated circuit package.

The PLL has a measured nominal phase difference between F1 and F2 at the phase detector of 10 nanoseconds (less than 0.03 degrees). The total phase difference between CLK4 and CLKA or CLKB will be larger since there are additional circuit delay tolerances that affect the total phase difference. These include delay tolerances in the dividers, failure detector circuits, selectors and buffering circuits. The worst case phase difference between CLK4 and CLKA or CLKB is under 200 nanoseconds using LSI-TTL technology.

The phase/frequency discrimination attributes of the phase detector give the PLL a capture and lock range limited only by the frquency range of the VCO. This allows great flexibility in the design of the remaining portions of the PLL.

Figure 18:
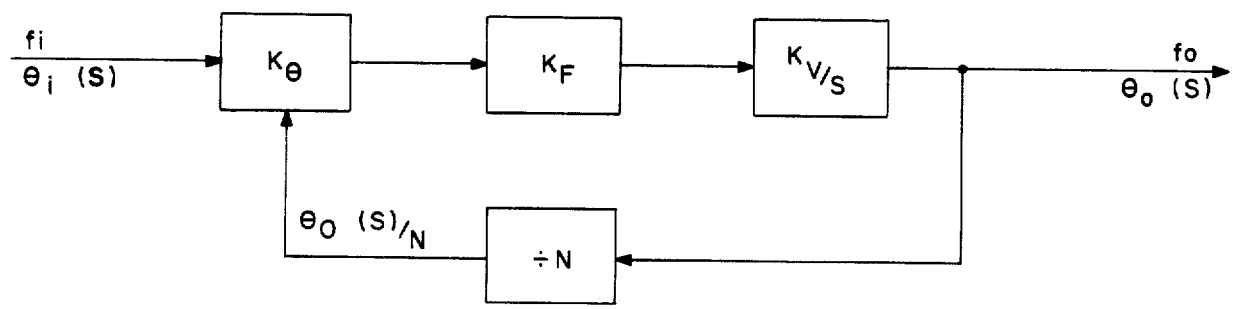
FIG. 18 is a block diagram of loop filter 1402 of FIG. 14.

The design of the loop filter 1402 of FIG. 14 involves several requirements. First, the loop must remain stable under all operating conditions. Secondly, the loop bandwidth must be selected such that the aberration i the 8 kHz rference caused by a PCM line failure, does not cause the VCO to shift in frequency excessively. A damping factor greater than 0.7 is desirable for stability. A damping factor under 0.7 is underdamped with zero being the limit before oscillations result. For stability analysis, the PLL can be modeled as shown in FIG. 18.

Figure 19A:
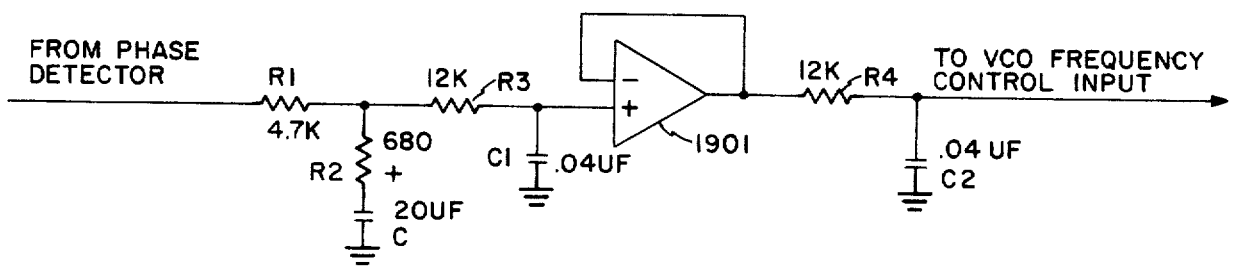
FIG. 19A is one embodiment of loop filter 1402 of FIG. 14.
Figure 19:
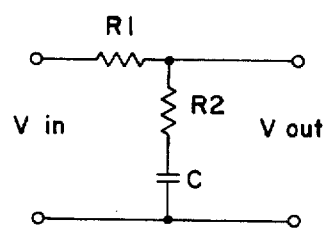
FIG. 19 is a basic loop filter circuit.

Using Laplace Transforms, it is possible to analyze the stability of the PLL. Using servo theory, $$\theta_o(s) = \frac{G(s)}{1 + G(s) H(s)} \theta_i(s)$$

where $\theta_o(s)$ = Output phase
$\theta_i(s)$ = Input phase
$G(s)$ = Forward gain product = $K_0 \times K_F \times K_V/s$
$H(s)$ = Feedback gain product = $1/N$ Three of the gain blocks ($K_0$, $K_V$, and N) are fixed. The transfer function of the loop filter is selectable. The loop filter of FIG. 19 is chosen for its great flexibility in determining both loop natural frequency ($\omega_n$) and damping factor ($\zeta$).

$$\frac{V_{out}}{V_{in}} = \frac{sR_2C + 1}{s(R_1 + R_2)C + 1} \quad (2)$$

$$K_F = F_{(s)} = \frac{\tau_2 s + 1}{\tau_1 s + 1}$$

where $\tau_2 = R_2 C$ $\tau_1 = (R_1 + R_2)C$

Referencing FIG. 18, forward gain and reverse gain products are entered into Equation 1 and reduced to Equation 4.

$$\frac{\theta_o(s)}{\theta_i(s)} = \frac{K_\theta K_V (\tau_2 s + 1)/\tau_1}{s^2 + 2\zeta\omega_n s + \omega_n^2}$$

where $$\omega_n = \sqrt{K_\theta K_V/\tau_1 N} \text{ rad/sec.} = \text{natural frequency of PLL}$$

and $$\zeta = \frac{1}{2}\left(\frac{1}{\tau_1 \omega_n} + \omega_n \tau_2\right) = \text{damping factor of PLL}$$

Table 1 lists the values of the PLL parameters used to determine the loop damping factor ($\zeta$) and natural frequency ($\omega_n$).

TABLE 1—PLL GAIN PARAMETERS $K_V = 550$ kHz/volt $= 3.46 \times 10^6$ rad/volt-sec.

$$K_0 = \frac{5V}{4\pi} \text{ volts/rad} = .398 \text{ volts/rad.}$$

$N = 512$ $$K_F = \frac{\tau_2 s + 1}{\tau_1 s + 1} \quad \tau_2 = 13.6 \text{ msec}; \tau_1 = 107.6 \text{ msec.}$$

These are used in Equation 4 to obtain the following:
$w_n = 158$ rad/sec. (25.1 Hz)
$\zeta = 1.09$
This indicates a PLL with a narrow loop bandwidth and is very stable since it is overdamped.

Figure 20:
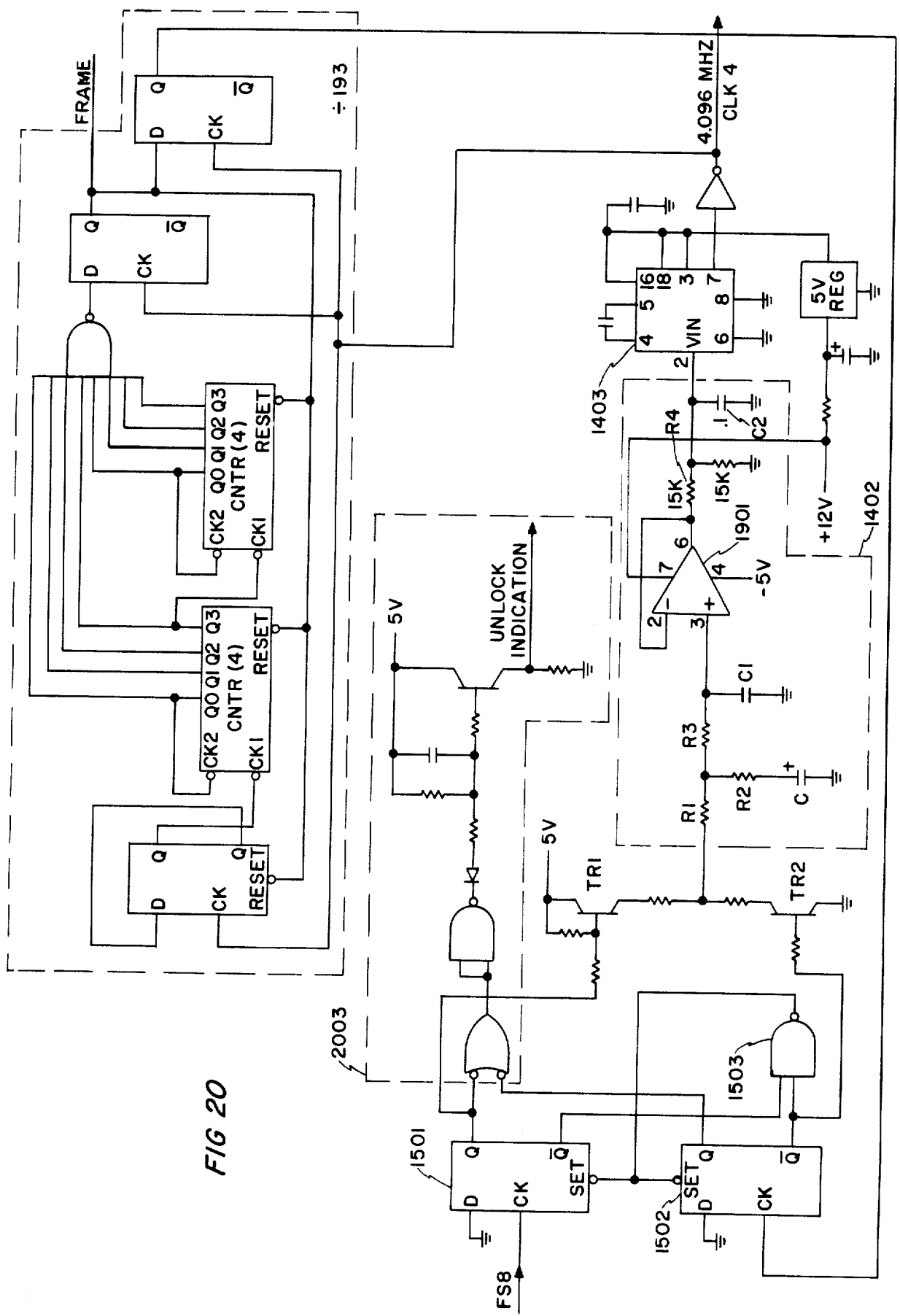
FIG. 20 is a schematic diagram partially in block form of the PLL 1207 of FIG. 12B.

Two low-pass sections were added to the basic loop filter shown in FIG. 19 in order to reduce the aberration caused by a PCM line failure. In addition, isolation is provided between the VCO and active loop filter circuitry at the VCO operating frequency of 4.096 mHz. Turning to FIG. 19A which illustrates the loop filter in simple form, the corner frequencies of the two low-pass filters R3, C1 and R4, C2 is more than an order of magnitude higher in frequency than the natural frequency of the PLL. Thus, the additional phase shift contributed by these filters is negligible and lowers the damping factor only slightly. A J-FET input op amp-1901 is used to provide the low leakage required since the VCO has an input impedance under 100K ohms. FIG. 20 illustrates in detail the complete phase-locked loop circuit combining the circuits of FIGS. 15, 17 and 19A. An unlock indication circuit 2003 provides a signal indicating if the phase-locked loop fails to maintain a locking.

The choice of the VCO is often the most important part of the design of a phase-locked loop. However, in this application, the PLL characteristics that the VCO determine are not critical. This includes phase noise, voltage to frequency conversion linearity, temperature sensitivity, frequency range and spectral purity. Three different VCO's were investigated. All were IC designs available from multiple sources and all met the requirements necessary for this application. The MC4024 and 74LS124 are TTL multivibrator designs using an RC network to determine frequency. These parts have very similar performance with approximately 4 nanoseconds of phase jitter at the phase detector. This correlates with the MC4024 specification of 120 Hz RMS (typical) frequency noise deviation at 4.096 mHz. The MC1648 VCO is an ECL IC oscillator design requiring an external varactor and coil. Because of the higher Q elements, it has superior phase noise and spectral purity. At 4.096 mHz, the RMS frequency deviation is specified at less than 20 Hz. This corresponds to a phase jitter at the phase detector of less than 1 nanosecond. With the test equipment available, no phase jitter could be detected.

Turning back to FIG. 12, the output of the PLL 1207 is coupled to a one shot 1209 which acts as a failure detector. If the PLL 1207 fails to be reset within 350 nanosec., it will set flip-flop 1210 and will provide a failure indication to the PLL controller 1250. Flip-flop 1210 will automatically operate the selector 1214 to switch to the phase-locked loop in the other line switch module, e.g., 1b of FIG. 2. The PLL controller 1250 must however switch the PCM line clock, e.g., CLKA, to the PLL 1207 in the other module without missing clock pulses. The 500 nanosec. delay 1208 permits switching to the other PLL without missing clock pulses since the delay 1208 provides clock pulses for 500 nanosec. after the first PLL 1207 has failed. The selectors 1212 and 1213 are also controlled by flip-flop 1210 to switch the source for SIG and FRAME to the other line switch module.

The PLL controller 1250 includes a microcomputer 1251 and an interface circuit 1252. The microcomputer 1251 in the illustrative embodiment is an INTEL 8049 microcomputer. The interface comprises a protocol interface circuit (PIC) which will be described in greater detail in conjunction with the line group controller. The INTEL 8049 microcomputer is described in INTEL COMPONENT CATALOG 1979, INTEL CORPORATION, 1979, pp 8–27 to 8–30.

The system controller 5 selects which PCM line clock is to be initially selected as the master clock to which the line switch clock circuits are to be synchronized. The system controller 5 informs the line switch controllers 7 in the line switch of the initial selection. The line switch controllers 7 then direct the respective microcomputers 1251 to the initial selection. If one of the line module microcomputers 1215 detects a failure in the clock circuits, it arbitrarily switches to another line clock to be used as a master. The failure detecting microcomputer will send information back to the system controller 5 via line switch controller 7 identifying the newly selected PCM line clock. The system controller 5 will then transmit command information to the other module microcomputer 1251 via the respective line switch control 7 directing the other modules microcomputer to select the same PCM line clock as master. Thus, all modules within the line switch utilize the same PCM line clock to derive the internal line switch clocks.

5.0 LINE SWITCH CONTROLLER (FIGS. 9B, 9E to 9N, 10B 10C)

The line switch controller 7 communicates with the system controller 5 of FIG. 1 via the PCM lines PCMA, PCMB. The line switch controller 7 transmits and receives information over the common channeling signaling bits of the PCM lines PCMA, PCMB via the RX and TX rate converters. More specifically, turning to FIG. 9B, each time a common channel signaling bit appears on the PCM line, PCMA or PCMB, the associated clock lead FSA or FSB will provide a pulse. The clock pulse on the lead, e.g. FSA will cause the common channel signaling bit to be loaded into a buffer flip-flop 950A or 950B. The output of buffer flip-flop 950 or 950B is present to the line switch controller via lead CCRXA or CCRXB. Information from the line switch controller 7 is inserted into the common channel signaling bit portions on lines PCMA and PCMB under control of the clock leads FS8A, FS8B. Turning to FIG. 10B, common channel signaling information from the line switch controller 7 for PCM line PCMA is provided on lead CCTXA and for PCM line PCMB on lead CCTXB. Tri-state buffer gate 1086 is enabled by CLKA during the common channel signaling bit time and gates the data bit from line CCTXA into PCM line PCMA. Likewise, data from lead CCTXB is gated onto PCM line PCMB.

Figure 9E:
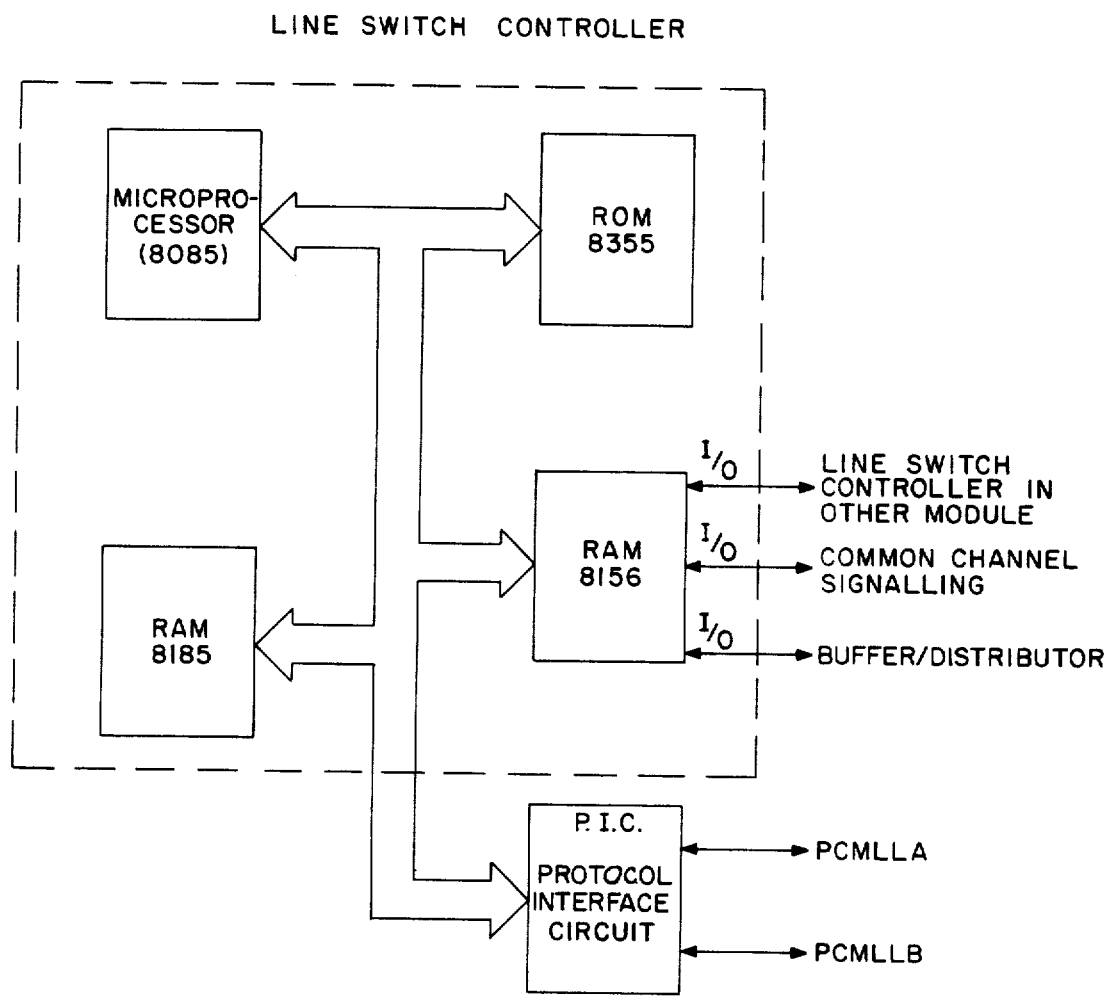
FIG. 9E illustrates in block diagram form the line switch controller of FIGS. 2 and 2A.

Turning now to FIG. 9E, the line switch controller is shown as comprising a Protocol interface circuit PIC and a microcomputer. The microcomputer utilized in the illustrative embodiment is the MCS-85 TM system available from INTEL CORPORATION which is described in *INTEL COMPONENT DATA CATALOG* 1979, Intel Corporation, 1979, 9–79 to 9–139. More specifically, the microcomputer configuration may be that shown in FIG. 1 at page 9–78 of the aforementioned Intel reference. The 8085 microprocessor, the 8156 RAM with I/O ports and timer, the 8355 ROM and the 8185 RAM shown are all described in detail in the aforementioned INTEL reference.

The protocol interface circuit PIC serve as a control data interface between the parallel data bus of the microcomputer and the high speed, bit serial PCM bus PCM4. The line switch controller 7 operates as the master in a master slave relationship with all circuits connected to the PCM buses PCM4, PCMLCA, PCMLCB. More specifically, only the line switch conroller 7 may transmit control word commands over the PCM buses. A circuit will transmit a control word response on the PCM buses ony after receiving a command addressing that circuit. The convention established for the line switch control communication specifies that commands and responses must occur in pairs, only a line switch controller 7 can initiate a command, and the response to a command always occurs a fixed number of frames after the command.

Figure 9F:
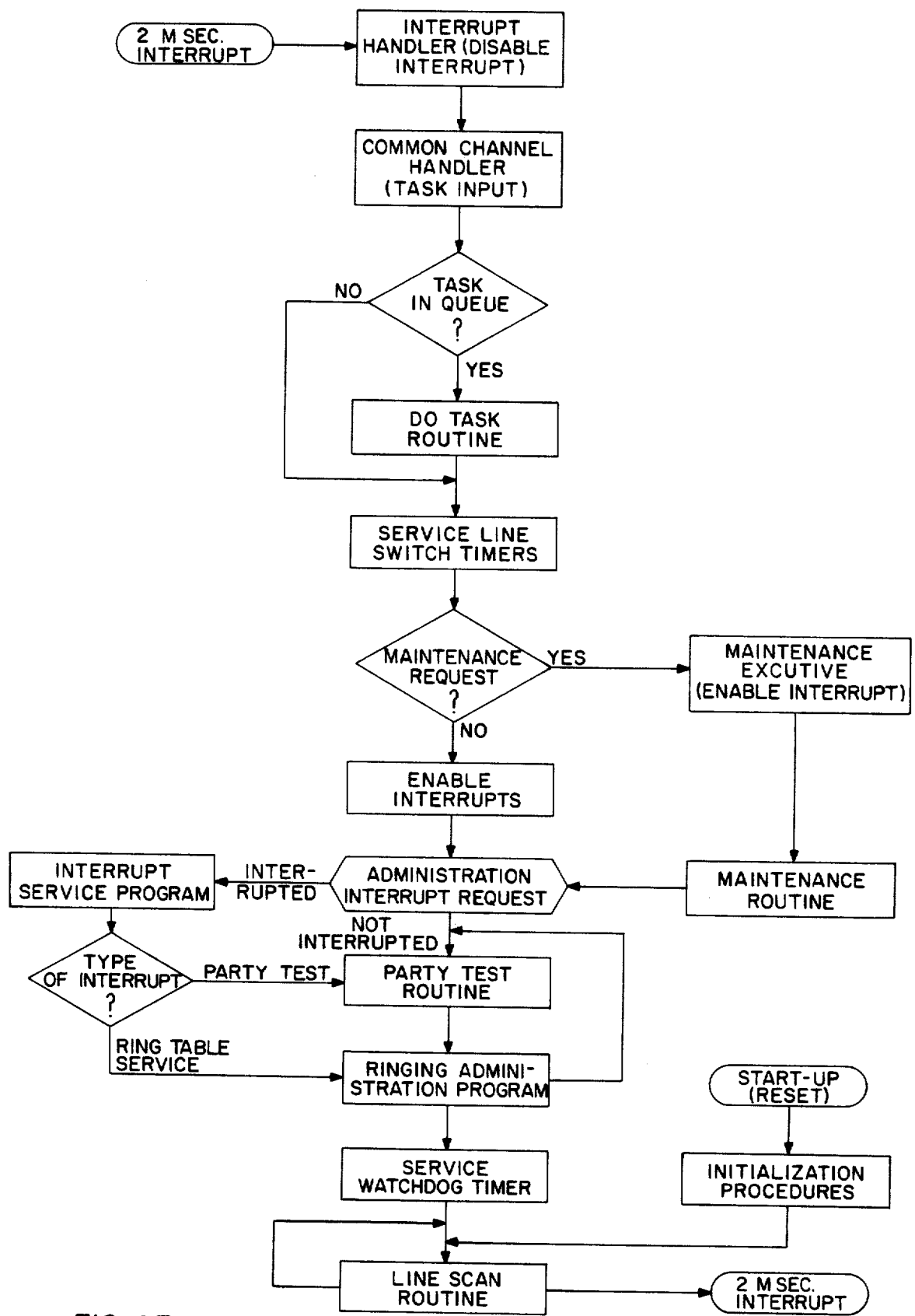
FIGS. 9F-9N are flow charts illustrating the operation of the line switch controller 7 of FIG. 9E.

FIG. 9F is a flow chart of the general software architecture of the line switch controller 7. Commands from the system control 5 of FIG. 1 are transmitted over the PCM lines PCMA, PCMB arriving at a rate of one byte (8 bits) every 2 msec. The line switch controller includes a 2 Msec. interrupt timer and when a 2 msec. interrupt occurs, an interrupt handler program calls a common channel data handler to process the received data byte. If the received data byte completes a command (each command may have 5 to 10 bytes), the previously received bytes for the command will be retrieved from a queue and the command will be executed. If the received byte does not complete a command, it will be stored in the queue. Typical of the tasks which the line switch controller 7 will be commanded to execute are: calling and called party channel assignments, initiating ringing, disconecting ringing, call disconnect maintenance, test, alarm and administrative functions. FIGS. 9G to 9N illustrate in greater detail the flow charts of various programs identified in FIG. 9F.

Figure 9G:
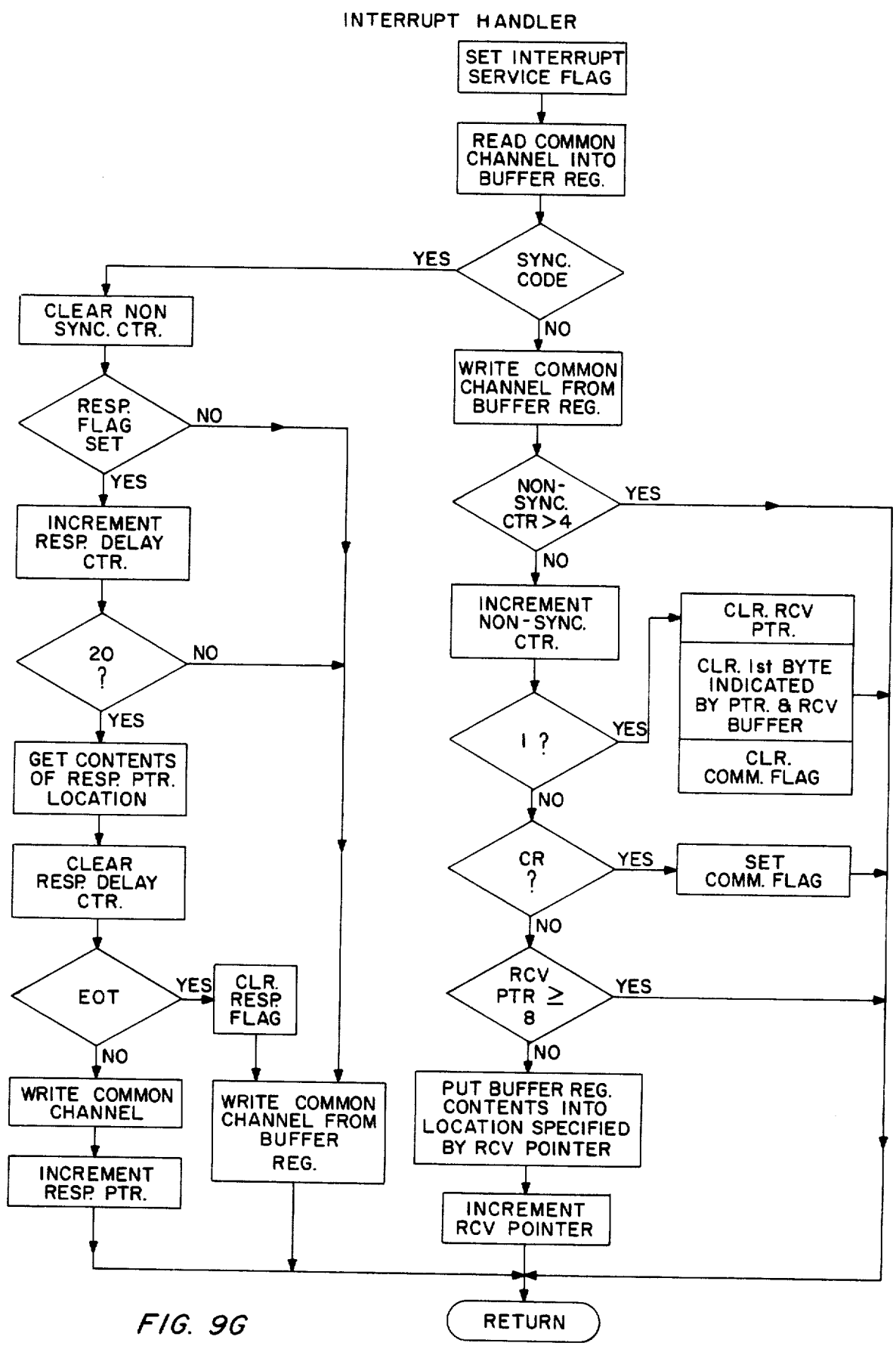
Figure 9H:
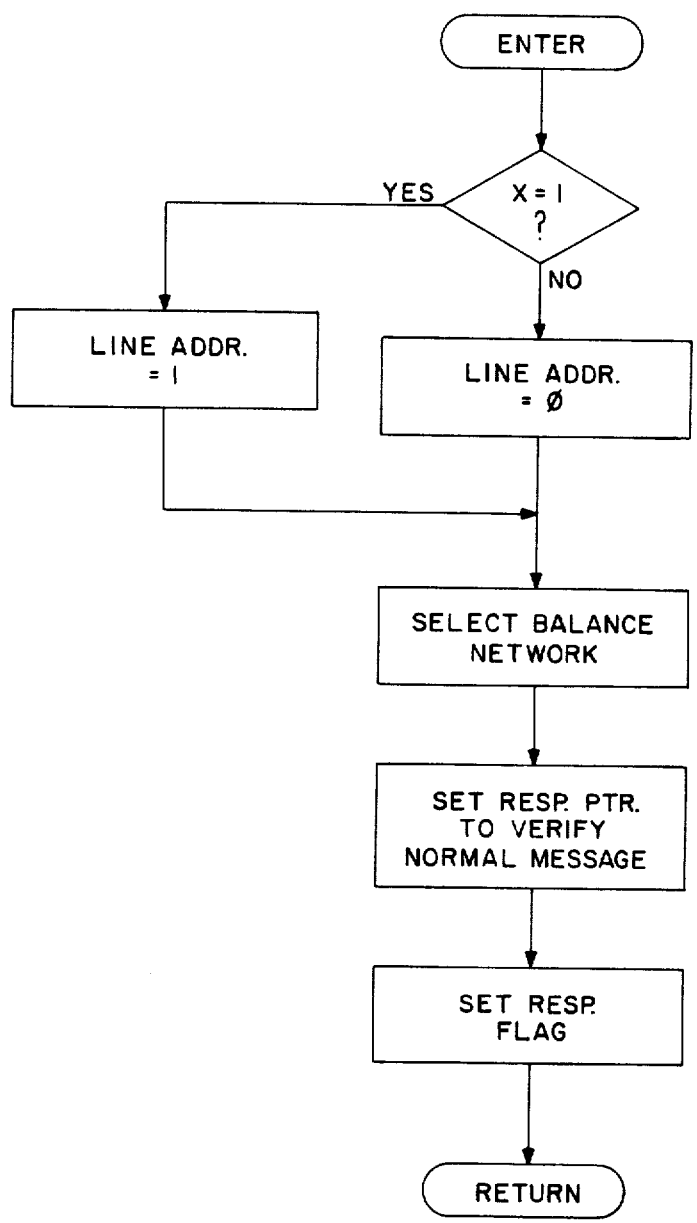
Figure 9I:
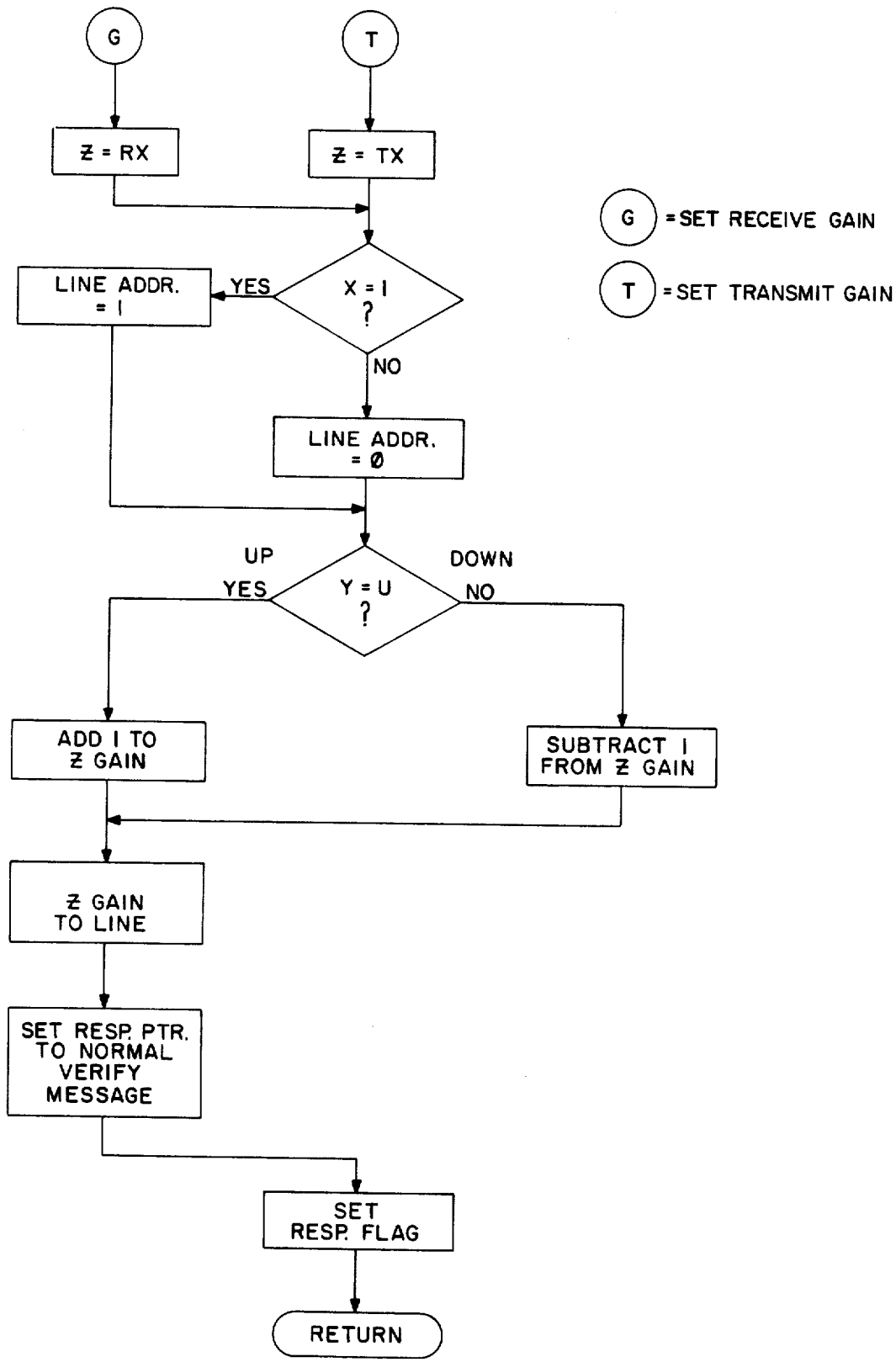
Figure 9J:
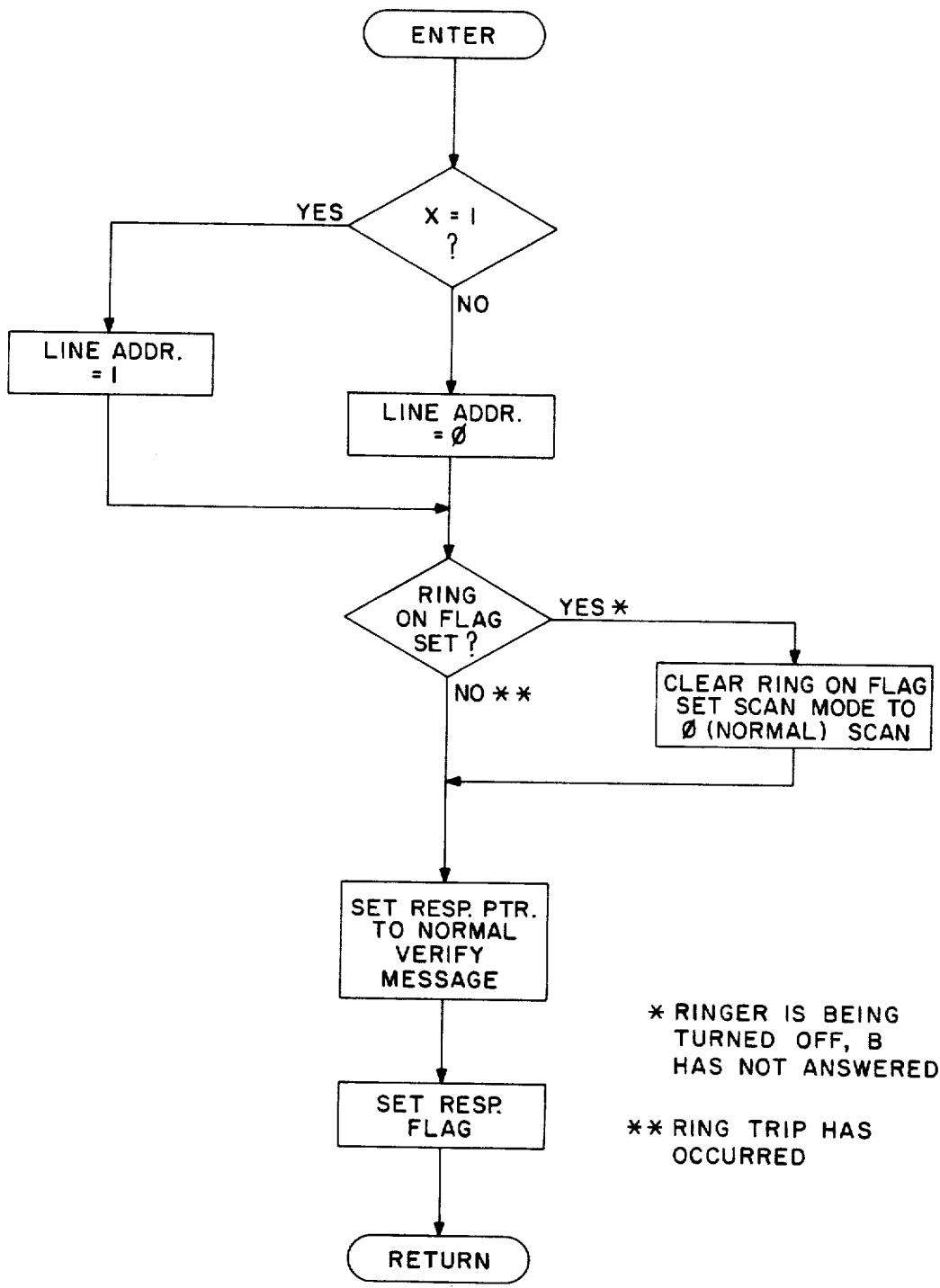
Figure 9K:
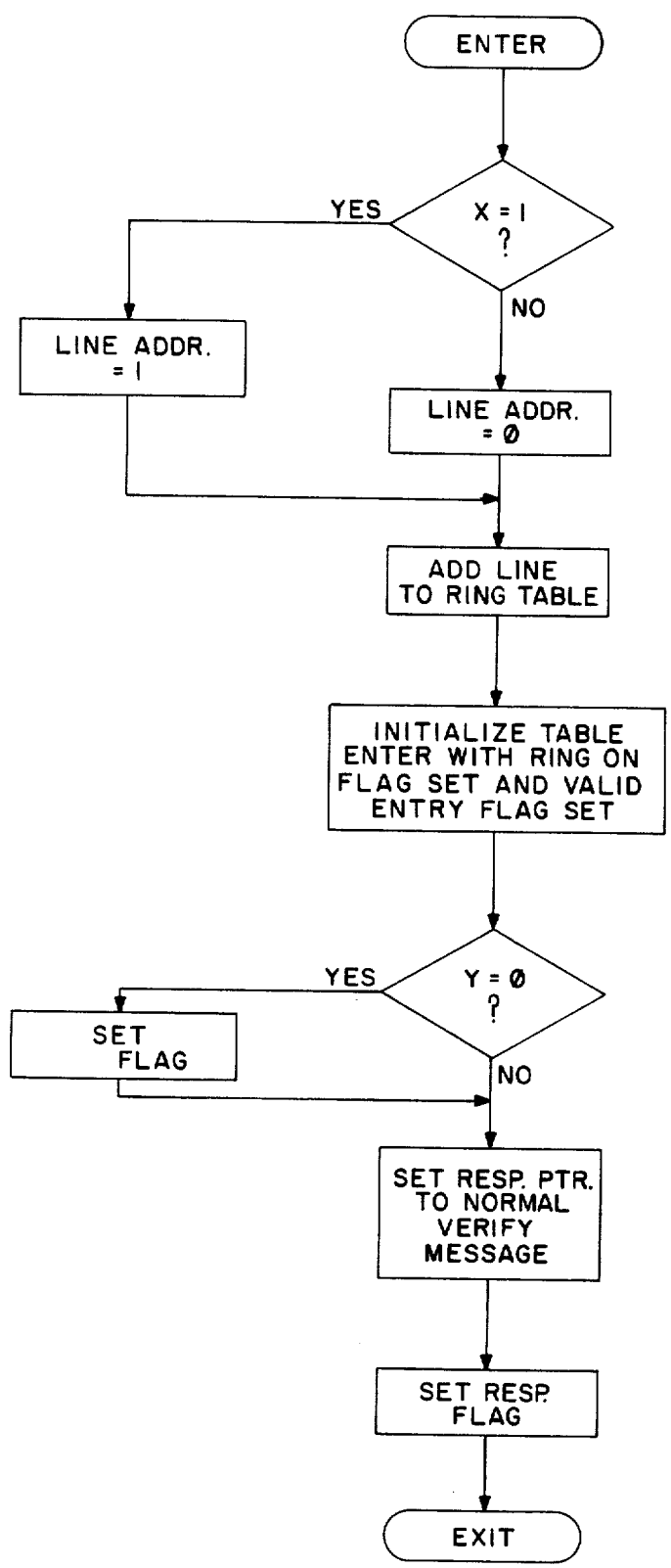
Figure 9L:
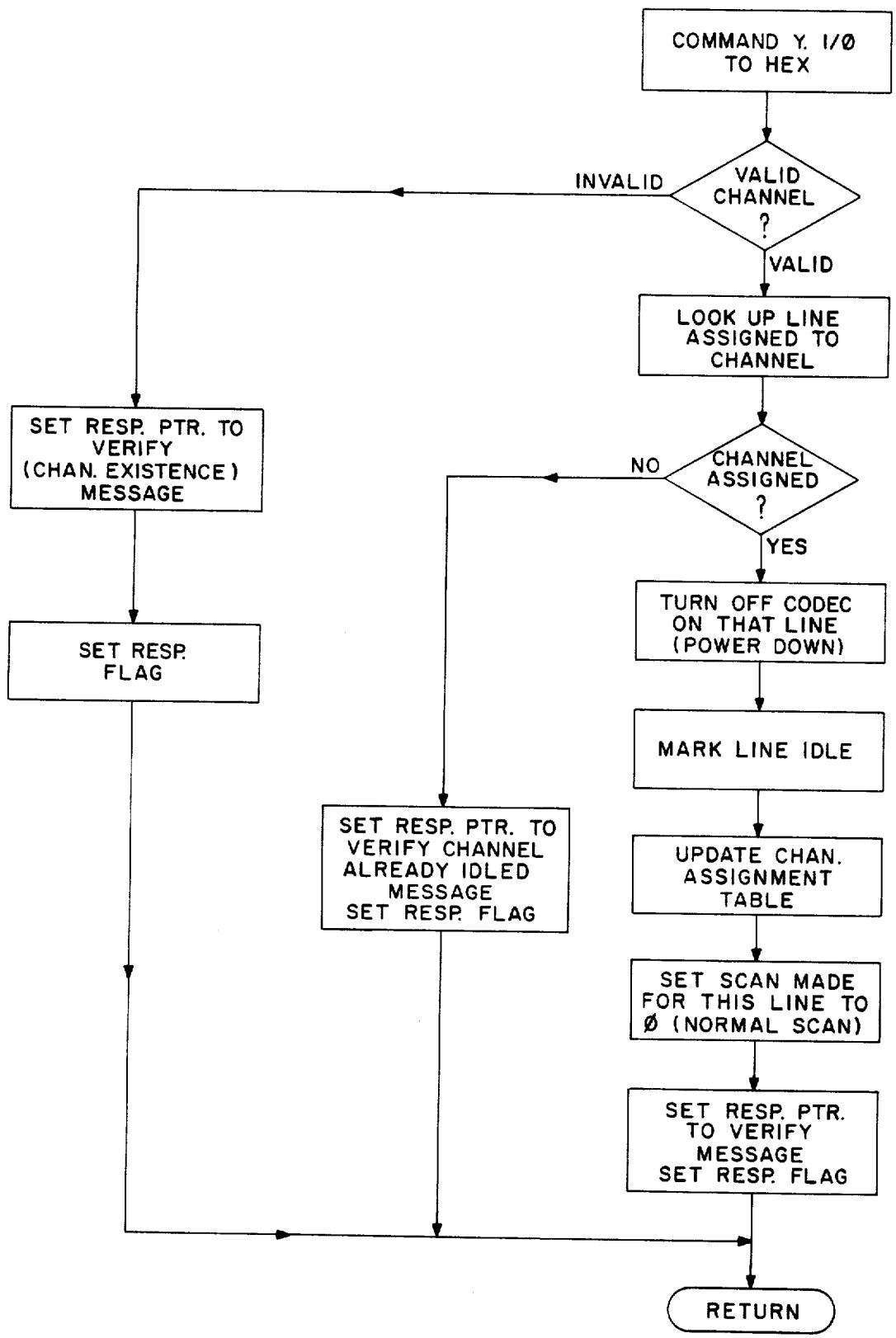

FIG. 9G illustrates the interrupt handler and common channel handle programs.

The following notes are appropriate to FIG. 9G.

EOT indicated end of test.

REV BUFF indicates receive buffer and is the first location of temporary storage for common channel commands.

RES PTR (response pointer) is set to the character in a command channel response or command.

RES Flag is set by the common channel routine when a response is to be sent.

RCU PTR is a receive pointer.

COMM FLAG indicates when a complete command has been received.

NON-SGAL CTR indicates when 5 consecutive non-signal codes have been received, this initializing resynchronization.

INT SERVFLAG indicates that a 2 millisec. interrupt has occurred.

RESP DLY CTR delays characters to 300 baud.

Figure 9M:
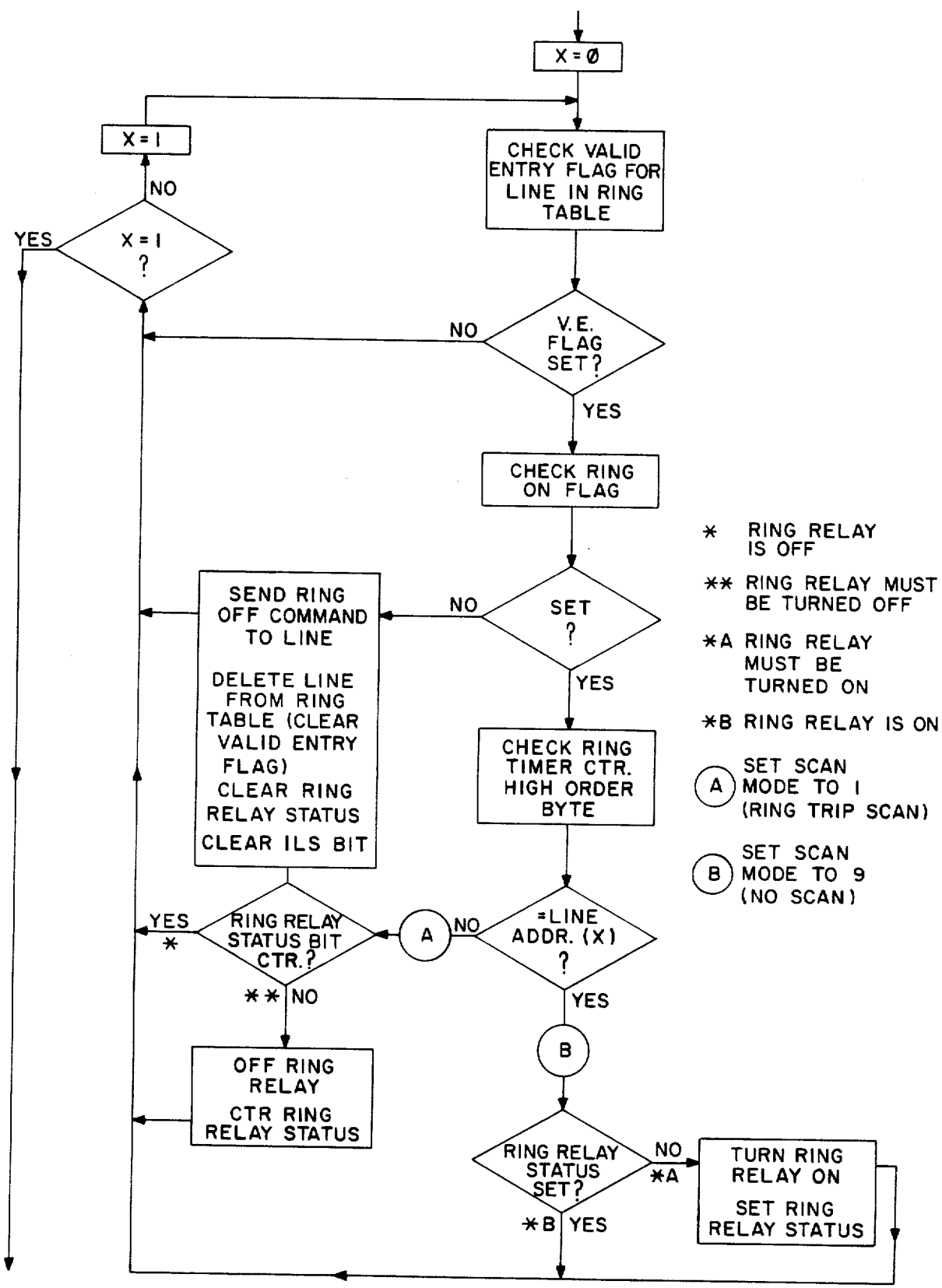
Figure 9N:
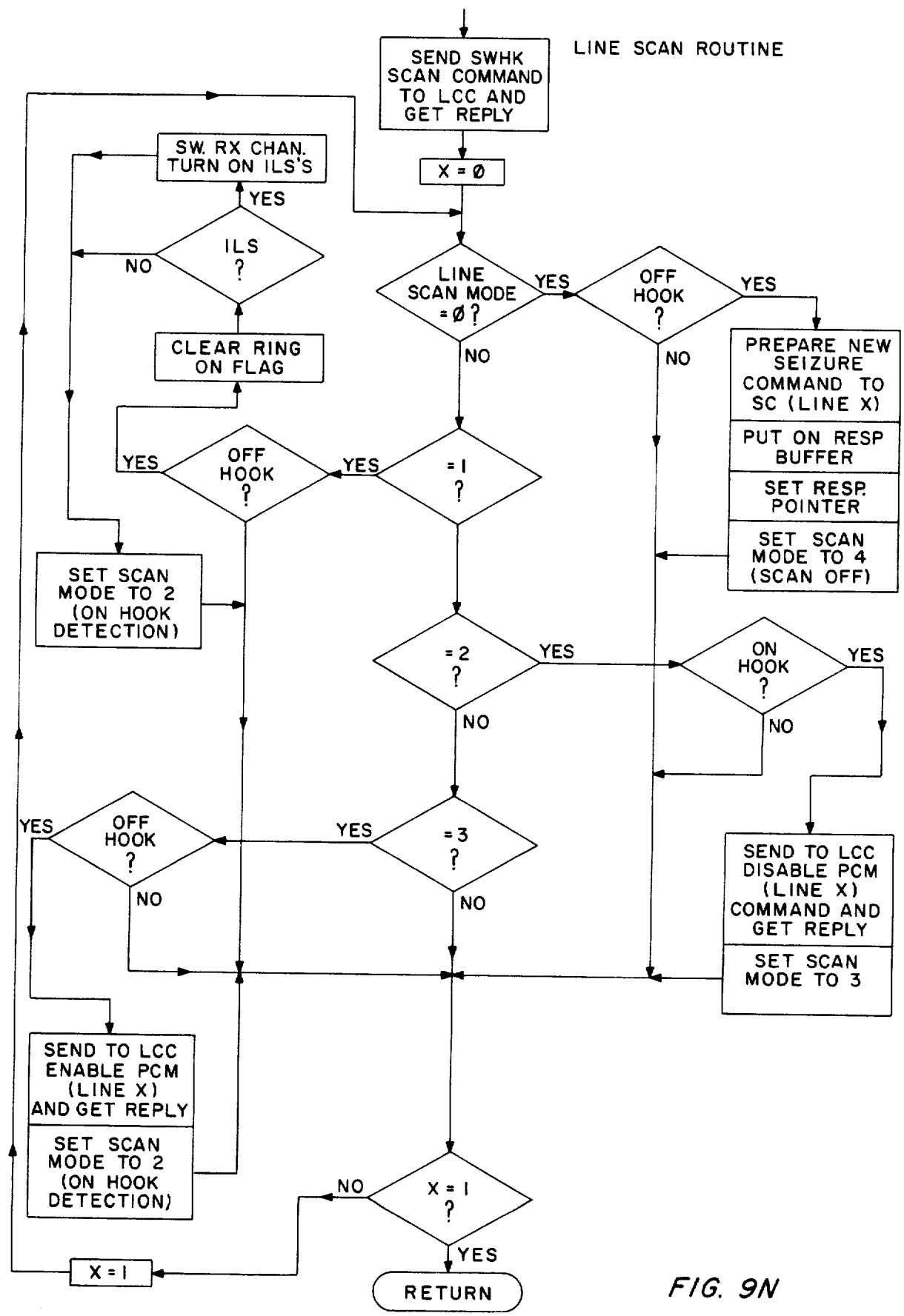

FIGS. 9H to 9L are flow charts for various task routines,

FIG. 9M is a flow chart of the ringing administration program;

FIG. 9N is a flow chart of the line scan routine.

6.0 BUFFER AND DISTRIBUTOR 9 (FIGS. 21, 22, 23)

Figure 21:
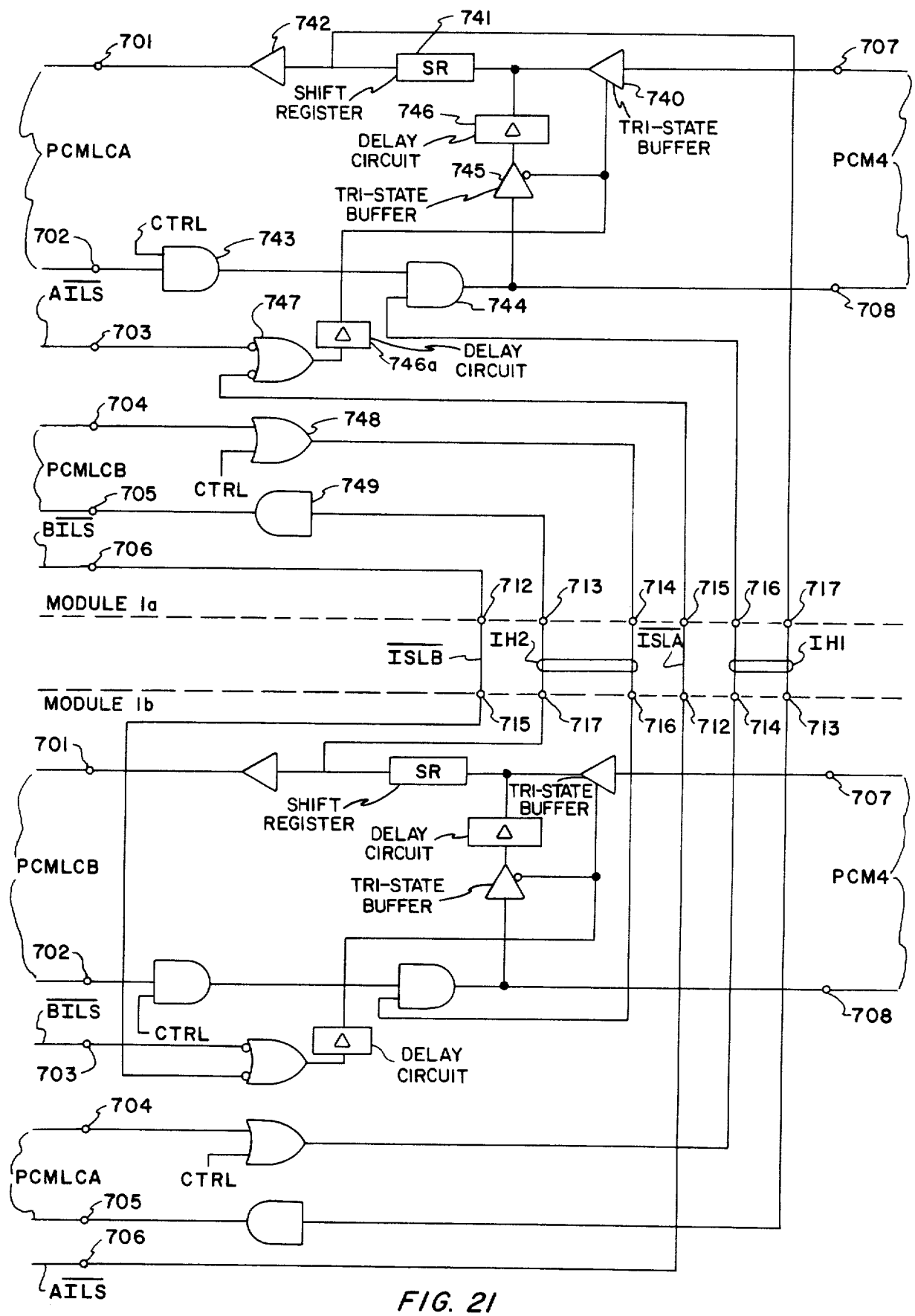
FIG. 21 illustrates in block diagram form one portion of the buffer and distributor 9 of FIGS. 2 and 2A.
Figure 22:
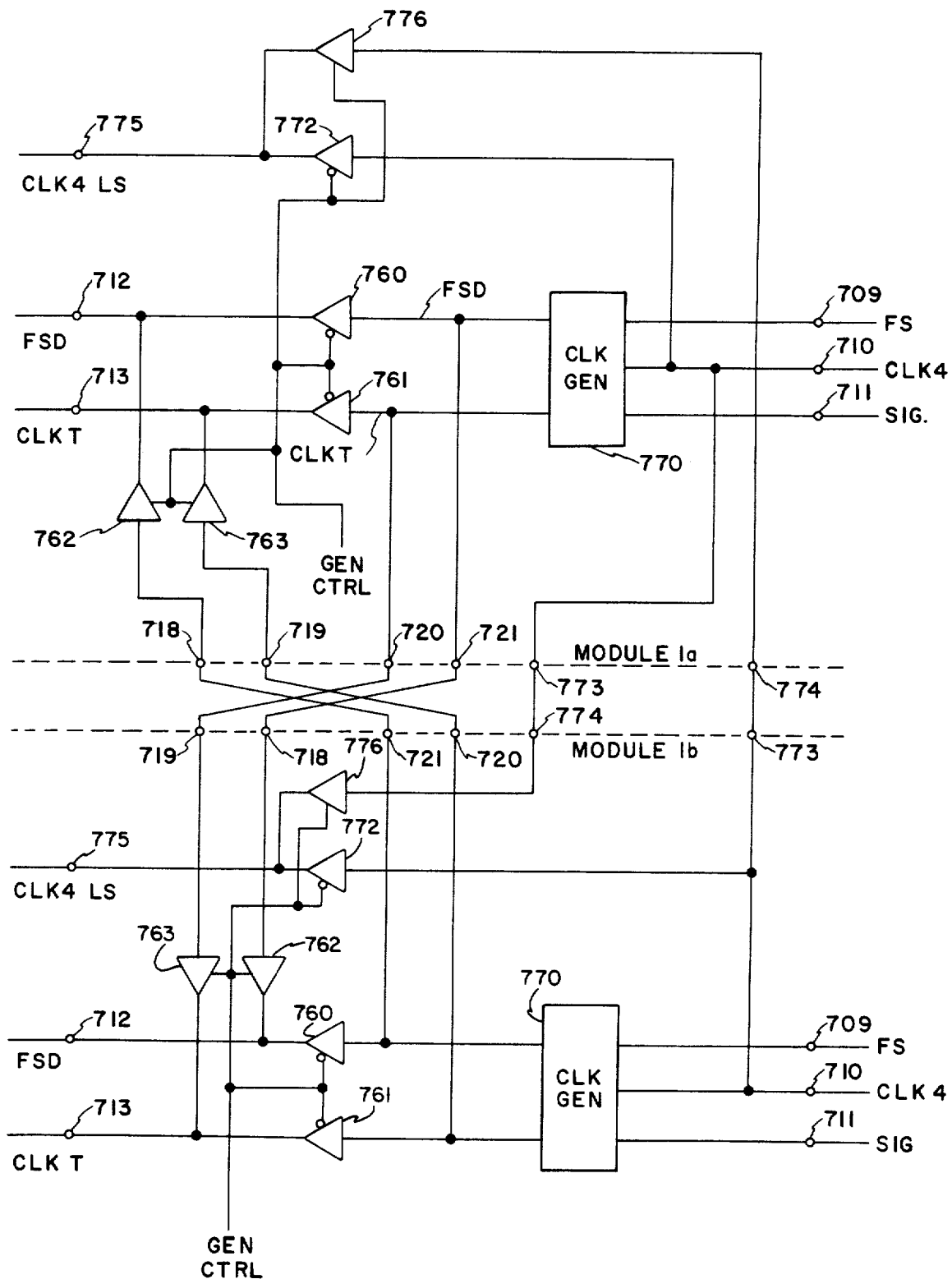
FIG. 22 illustrates in block diagram form another portion of the buffer and distributor 9 of FIGS. 2 and 2A.

FIGS. 21 and 22 illustrate the buffer and distributor circuits 9 of FIG. 2 in greater detail. For purposes of clarity, only one buffer and distributor 9 for each line switch module 1a, 1b is shown in FIGS. 21 and 22. If in accordance with the aforementioned security block concept each line switch module 1a, 1b includes more than one buffer and distributor 9, then one buffer and distributor 9 of each line switch module 1a, 1b will include both the circuitry of FIGS. 21 and 22 and the other buffer and distributor 9 of each line switch module 1a, 1b will include only the circuitry of FIG. 21. The circuitry of the buffer and distributor 9 for each of the line switch modules 1a, 1b shown in FIGS. 21 and 22 are identical and corresponding terminals of the buffer distributor circuits have identical designations. FIG. 21 illustrates the circuitry associated with the PCM buses PCM4, PCMLCA, PCMLCB and FIG. 22 illustrates the clock distribution circuit.

Figure 23:
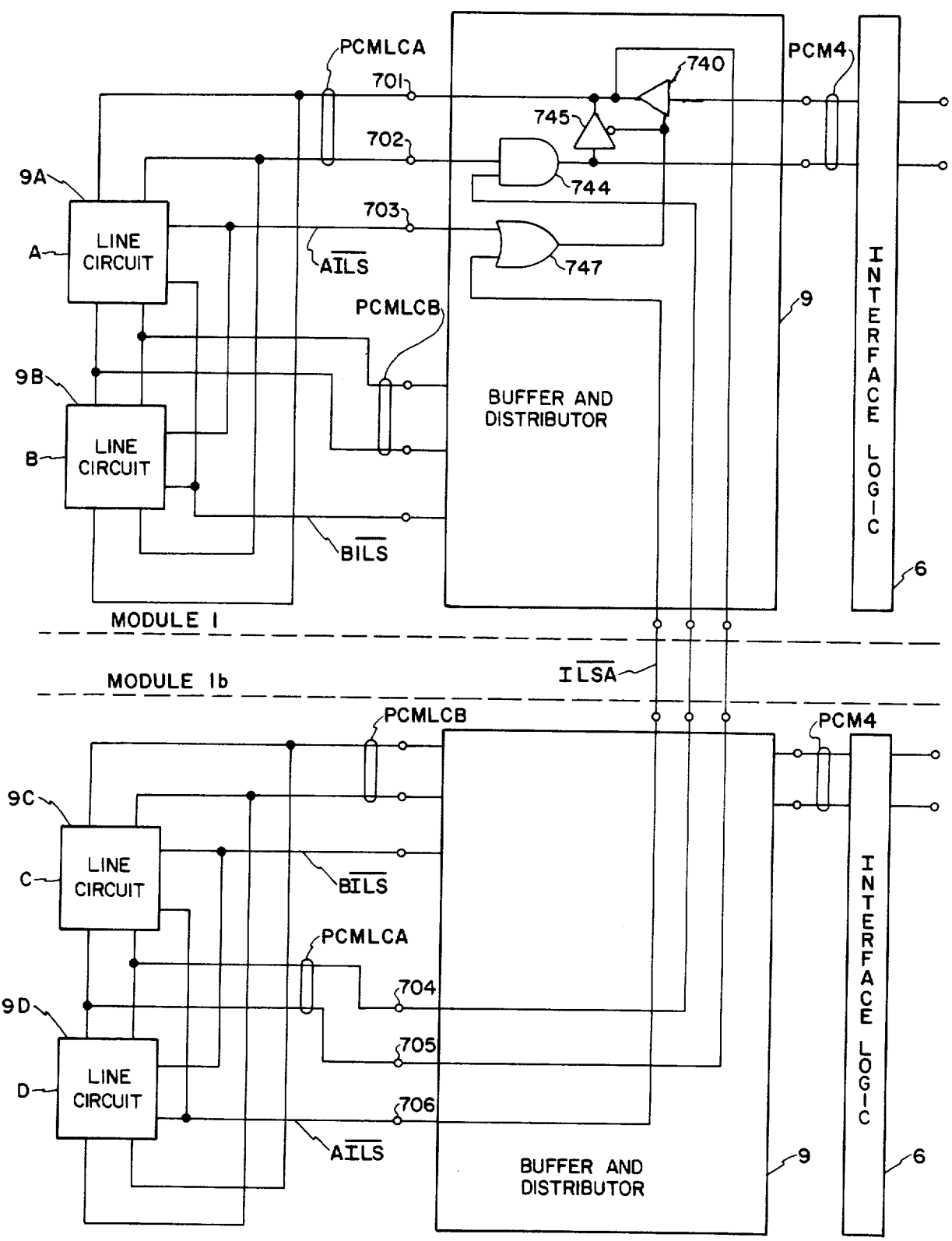
FIG. 23 is a block diagram illustrating the operation of the buffer and distributor 9 of FIGS. 2 and 2A.

6.1 BUFFER (FIGS. 21 and 23)

Line switch module 1a of FIG. 21 has terminals 707 and 708 connected to PCM bus PCM4, terminals 701 and 702 connected to PCM bus PCMLCA and terminals 704 and 705 connected to bus PCMLCB. Interposed between terminals 707 and terminal 701 are gate 740, shift register 741 and buffer gate 742. Interposed between terminals 702 and 708 are gates 743 and 744. A path is provided between the output of gate 744 to the lead between gate 740 and shift register 741 via gate 745 and delay circuit 746. Gates 740 and 745 are controlled by gate 747 through delay circuit 746a. Gate 747 has one input connected to terminal 703 and another input connected to terminal 715. Gates 740 and 745 are arranged such that gate 740 is normally closed and gate 745 is normally open, but when an appropriate signal state is present at terminals 703 or 715 gate 740 is open and gate 745 is closed. Together gates 740 and 745 operate as a crosspoint switch which is utilized for intra-line switch calls as described below.

Terminals 704 and 705 are respectively coupled to terminals 714 and 713 via gates 748 and 749. Terminal 706 is connected directly to terminal 712.

The two line switch modules 1a, 1b are interconnected via intra-line switch highways 1H1 and 1H2 and leads $\overline{ILSB}$ and $\overline{ILSA}$. It should be noted that the gates 743 and 748 include an additional input CTRL which may be individually controlled in the event of a fault to inhibit PCM transmission.

When the system controller 5 (shown in FIG. 1) determines that a subscriber connected to a line circuit has requested a connection to another subscriber connected to a second line circuit within the same line switch, the system controller 5 forwards commands to line switch controller 7 shown in FIG. 2 indicating that an intra-line switch connection is required. The line switch controller 7, in turn, provides control signals to the line circuits of the originating and terminating parties thereby loading status bits in the respective line circuits. The status bits in turn provide gating of control signals AILS, BILS to the crosspoint switches 740, 745 of FIG. 21 associated with the originating and terminating line circuits. The respective AILS and BILS signals are active only during the time period when the transmit channels occur, which the line switch controller 7 has assigned to the originating and terminating line circuits.

Turning now to FIG. 23, the operation of switches 740, 745 is described. FIG. 23 shows the two line switch modules 1a, 1b each connected to the corresponding interface logic 6. In line module 1a, only two line circuits 9A and 9B are shown and in line module 6 only two line circuits 9C and 9D are shown. It should be understood that only two line circuits are shown in each line switch module 1a, 1b for purposes of clarity.

Two intra-line switch call operations will now be described, with reference to FIG. 23. First, assume that the subscriber A connected to line circuit 9A has requested a connection to a subscriber B connected to line circuit 9B, i.e., to a subscriber connected to the same line module. The system controller 5 of FIG. 1 provides control signals to line switch controller 7 of line switch module 1a, that an intra-line switch call between line circuits 9A and 9B has been requested. Line circuit controller 7 transmits commands to the line circuit groups containing line circuits 9A and 9B, indicating that an intra-line switch call connection is to be established, and that bus PCMLCA is to be used. The transmit and receive channels for the two subscribers A and B are also assigned. When the transmit channel for subscriber A occurs, line circuit 9A provides an active signal on lead $\overline{AILS}$ which closes switch 745 and opens switch 740. The transmit lead of PCM bus PCMLCA connected to terminal 702 is thus connected to the receive lead of PCM bus PCMLCA connected to terminal 701. Thus, a PCM sample from subscriber A transmitted by line circuit 9A on the transmit portion of bus PCMLCA is "looped back" to the receive portion of bus PCMLCA. The receive channel assigned to subscriber B line circuit 9B is assigned such that it corresponds to the transmit channel of subscriber A of line circuit 9A. Therefore line circuit 9B receives the PCM sample transmitted by the line circuit 9A. Likewise, when the transmit channel for line circuit 9B occurs, line circuit 9B will apply an active signal to line AILS. Switch 740 will again open and switch 745 will again close for the duration of the transmit channel. Thus, the PCM sample transmitted by line circuit 9B on the transmit portion of PCM bus PCMLCA is "looped back" to receive portion of PCM bus PCMLCA. The receive channel assigned to line circuit 9A corresponds to the transmit channel assigned to line circuit 9B. Therefore, line circuit 9A will receive the PCM sample transmitted by line circuit 9B.

Second, assume that the subscriber A connected to line circuit 9A has requested a connection to a subscriber D connected to line circuit 9D, i.e., to a subscriber connected to a different line switch module within a line switch. The system control of FIG. 1 provides control signals to line switch controller 7 of FIG. 2 of the line switch module 1a that an intra-line switch call between line circuit 9A of line module 1a and line circuit 9D of line switch module has been requested and bus PCMLCA is to be used.

Line switch controller 7 of line switch module 1a assigns transmit and receive channels to line circuits 9A and 9D of FIG. 23. Again the assigned transmit channel of line circuit 9A will correspond to the receive channel of line circuit 9D and the assigned transmit channel of line circuit 9D will correspond to the receive channel of line circuit 9A. The crosspoint switches 740 and 745 are then operated in the same manner as described above, with the exception that line circuit 9D provides active signals to control the switches 740 and 745 instead of line circuit 9B.

Figure 24A:
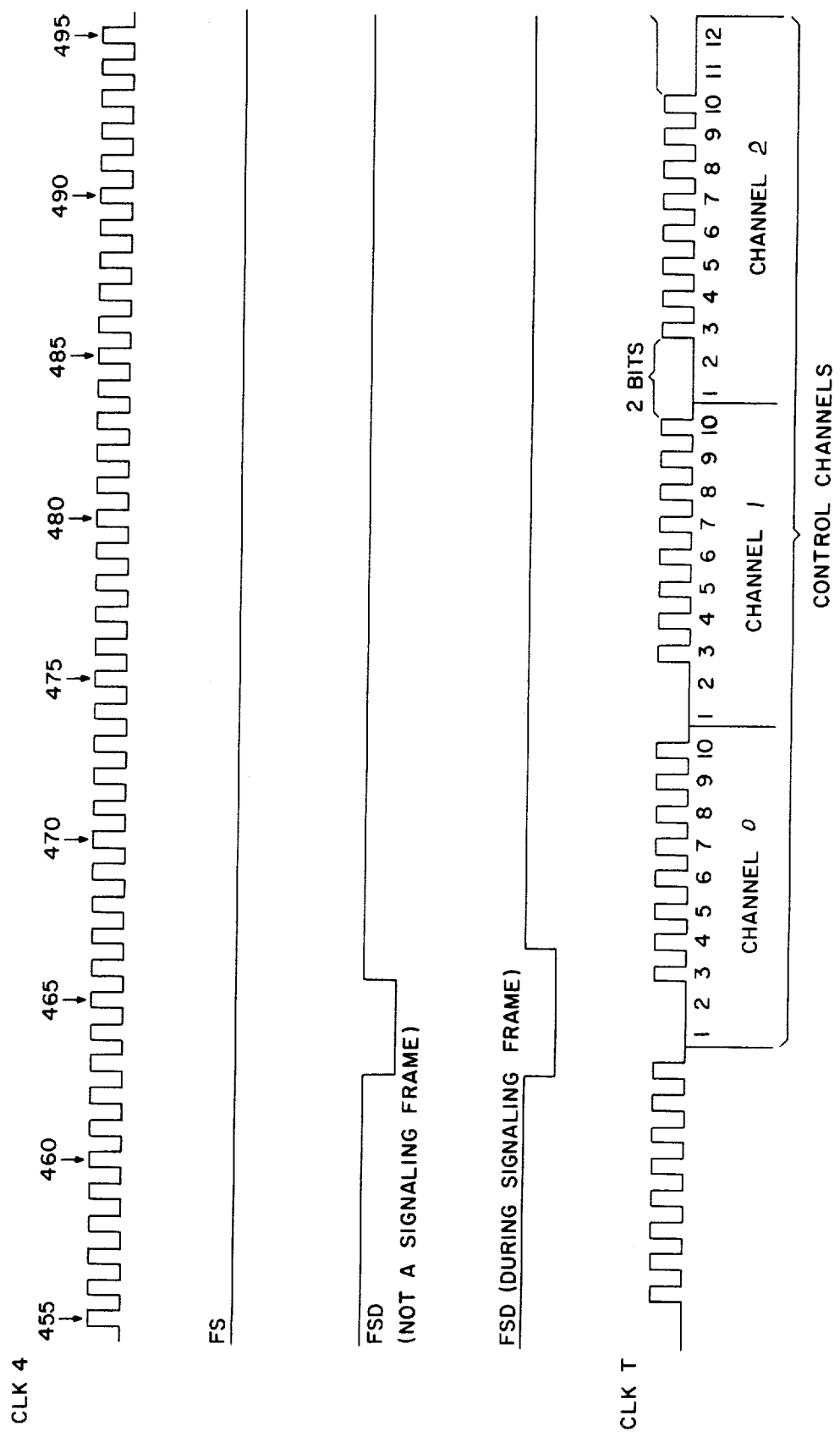

6.2 DISTRIBUTOR (FIGS. 22 and 24)

The clock distribution circuitry of the buffer and distributor circuits 9 for two line switch modules is shown in FIG. 22. Each buffer and distributor 9 has input terminals 709, 710, 711 connected to lines FS, CLK4, and SIG from a corresponding interface logic 6. A clock generator circuit 770 generates a CODEC clock signal CLKT and a frame clock signal FSD. The outputs FSD and CLKT are coupled to terminals 712 and 713 respectively via controlled switches 760 and 761 and are directly coupled to terminals 721 and 720. Input terminals 718 and 719 are coupled to terminals 712 and 713 respectively via controlled switches 762 and 763. Each of the switches 760, 761, 762, and 763 has a control input commony connected to lead GEN CTRL and operates such that when a signal having a first state is present on GEN CTRL, switches 760 and 761 are open and switches 762 and 763 are closed. When a signal having a second state is present on GEN CTRL switches 760 and 761 are closed and switches 762 and 763 are open. By means of the switches 760, 761, 762, 763, the FSD and CLKT signals for a line switch module may be supplied either by the clock generator 770 within the line switch module or by the clock generator in another line switch module. The GEN CTRL lead of a line switch module is connected to the line switch controller in the same line switch module.

Timing signal waveforms for the signals FS, CLK4, FSD and CLKT are shown in FIG. 24. A 9 stage counter within the clock generator 770 repetitively counts 512 4.096 mHz pulses before recycling.

The FS signal received from the interface logic 6 of FIG. 2 is a frame synchronization pulse which occurs every 125 microseconds. CLK4 is a 4.096 mHz clock signal from interface logic 6. SIG is otherwise provided by interface logic 6 of FIG. 8 and indicates the occurrence of signaling frame, i.e., SIG is normally low and goes high the frame before a signaling frame. CLKT is CODEC clock which generally comprises bursts of eight pulses of a 4.096 mHz clock. The relationship of CLKT to the CODEC channels is shown. When a frame bit FSD occurs, the next 32 bits received over the PCM bus are control bits. More specifically, in a system with 10-bit channels, the next three channels are reserved for control data and channel three is extended by two bits. In a system with 8-bit channels, four channels are reserved for control.

FSD is a framing signal which will vary as shown depending on whether it occurs during a signaling frame or not.

Turning back to FIG. 22, the CLK4 lead coupled to terminal 710 is connected to output terminal 775 via switch gate 772 and is connected directly to output terminal 773. Input terminal 774 is coupled to output terminal 775 via switch gate 776. The terminal 774 is connected to terminal 773 of the other line module. The switch gates 772 and 776 operate in the same manner and under control of the same GEN CTRL signal as the aforementioned switch gates 760, 761, 762, 763 so that either CLK4 from line module 1a or 1b may be utilized as the source for 4.096 mHz clock signals on lead CLK4LS.

7.0 LINE CARD OR GROUP (FIG. 25)

Figure 25:
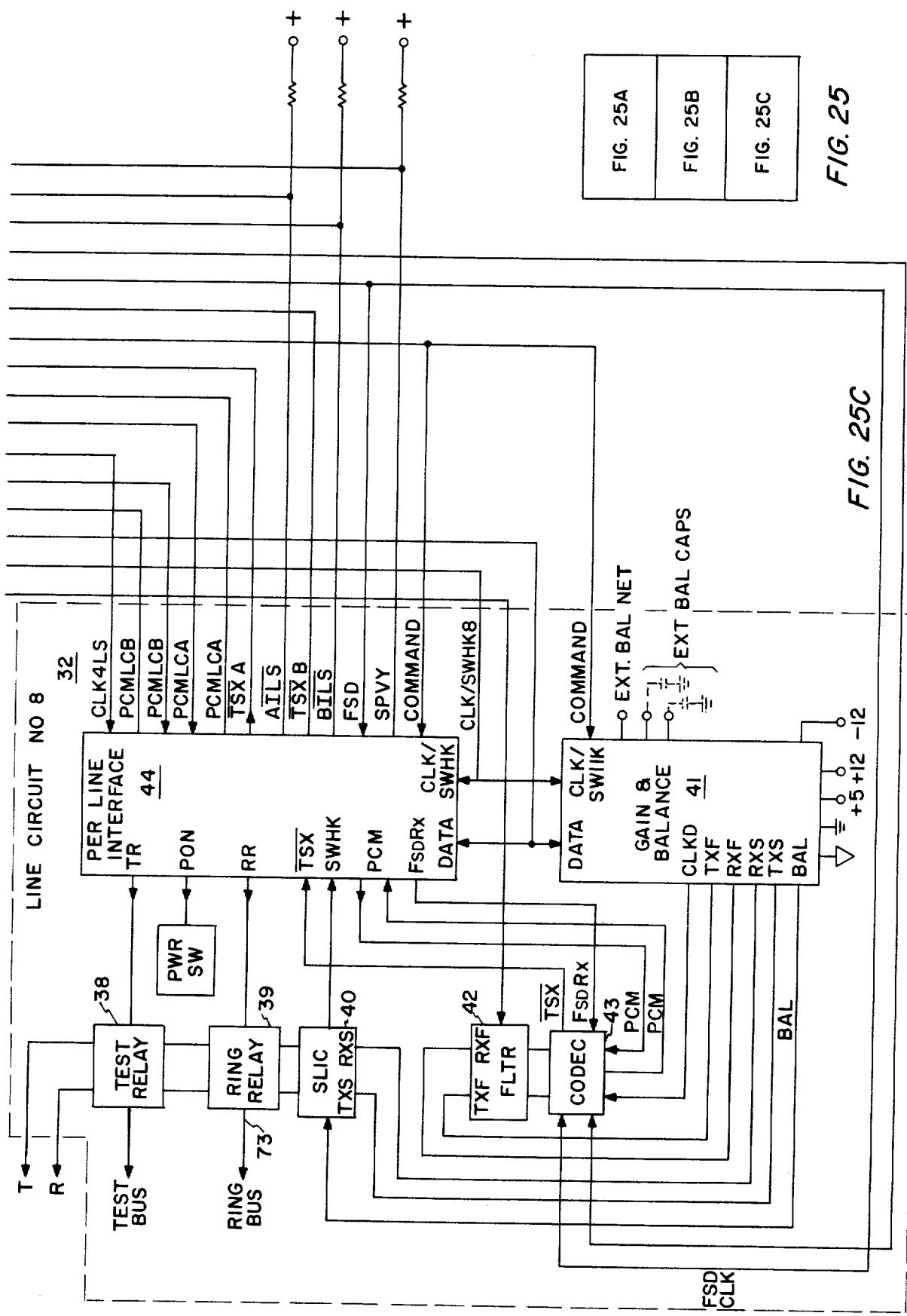
FIGS. 25A, 25B and 25C when arranged as shown in FIG. 25 illustrate in block diagram form a line circuit group in accordance with the principles of the present invention.
Figure 25A:
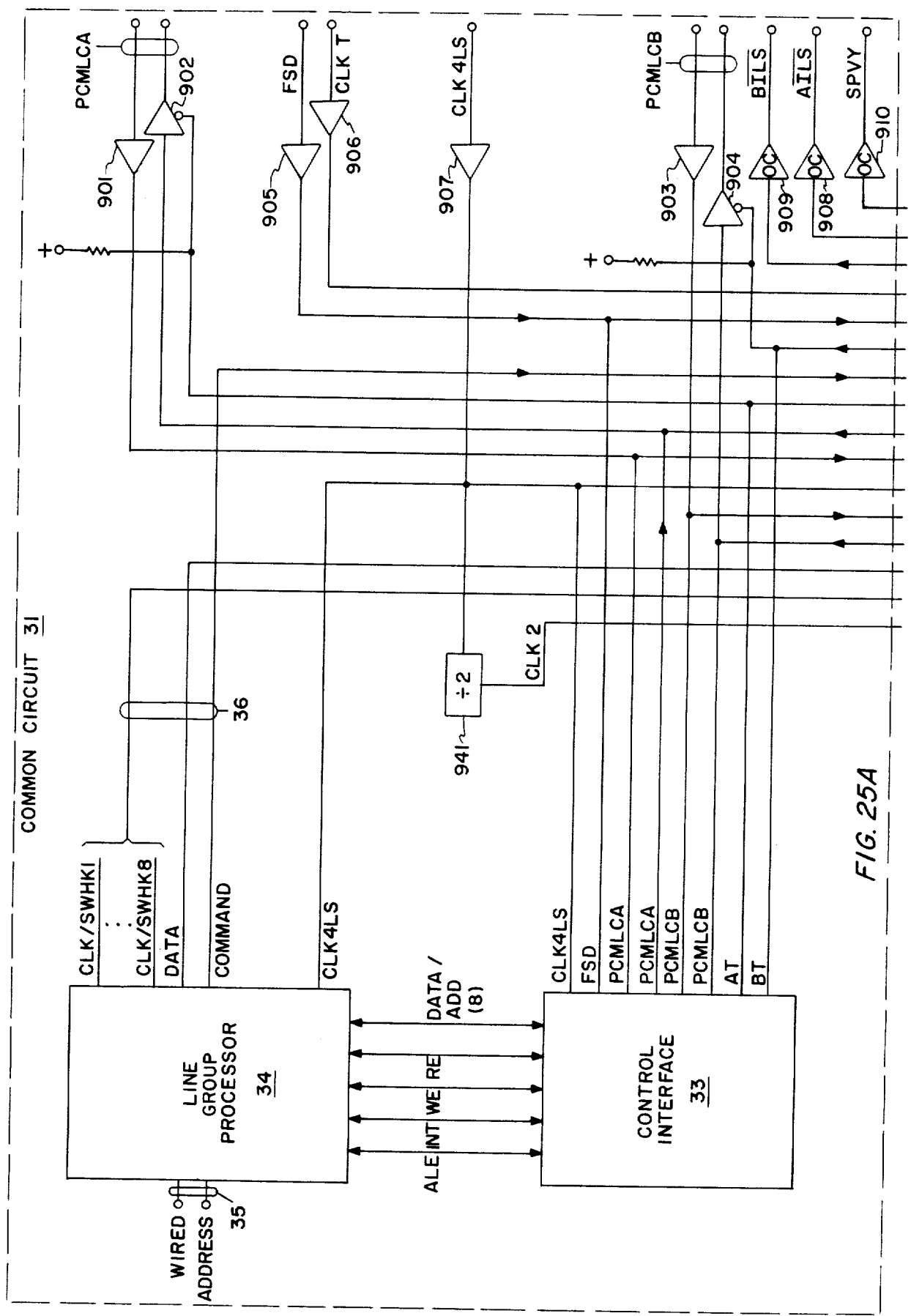
Figure 25B:
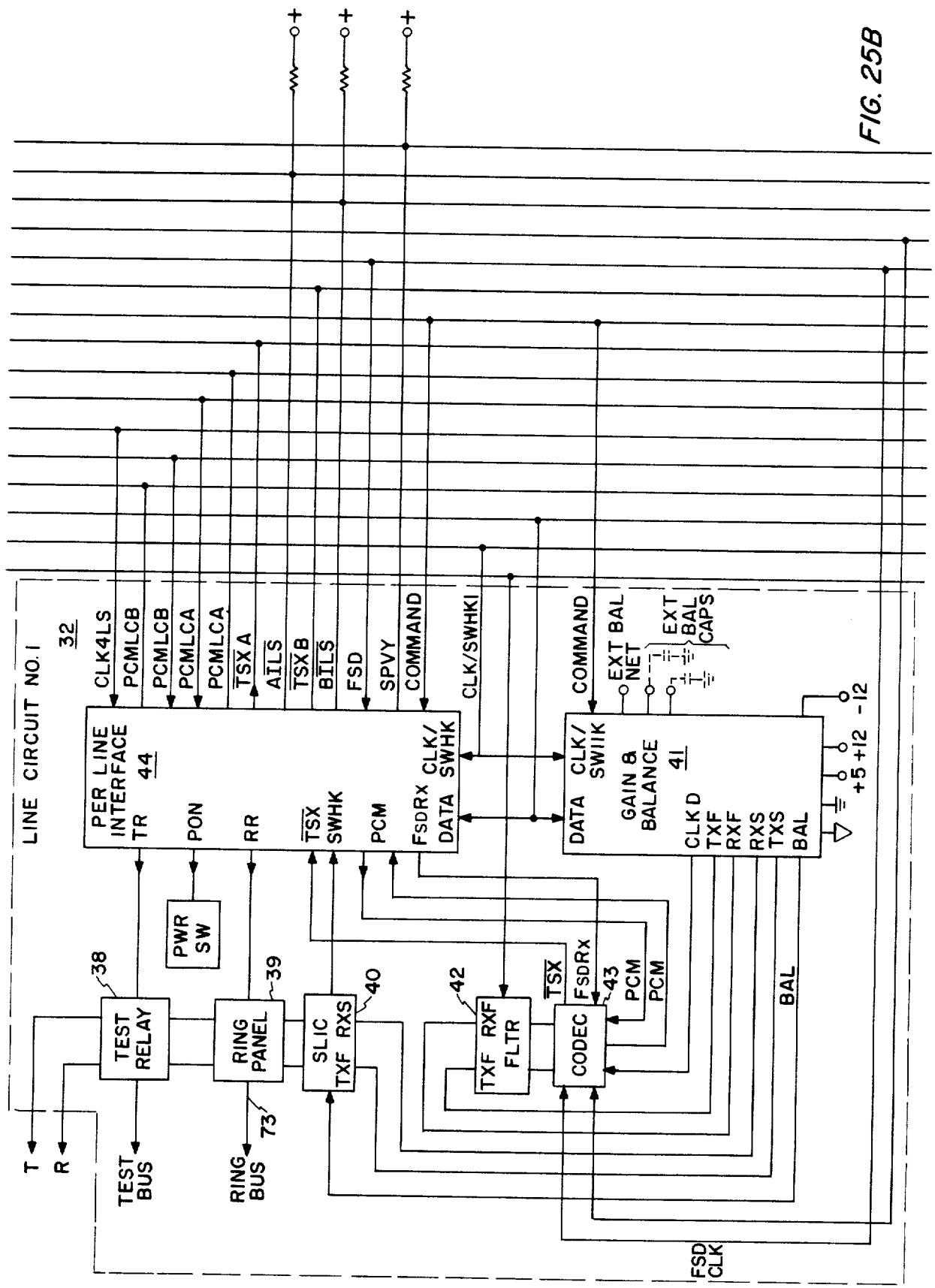

One of the line groups 11 of FIG. 2 is shown in detail in FIG. 25. Each line group includes a common circuit portion 31 and eight line circuits 32 in the illustrated embodiment. In other embodiments, the common circuit portion 31 may be on a separate circuit card and a line group may have more or less than eight line circuits. The common circuit portion includes a control interface 33 which is coupled to PCM bus PCMLCA via buffer 901 and switch gate 902, and to PCM bus PCMLCB via buffer 903 and switch gate 904. The control interface is also coupled to the FSD and CLKT leads via buffers 905 and 906, respectively. The interface 33 extracts and inserts control data bits which are transmitted and received over PCM buses PCMLCA and PCMLCB. Control data received over the buses are examined to determine if the address received matches the address of the line group. If the received address matches, an interrupt signal is sent via line INT to a line card processor 34 which may be a conventional microprocessor of a type well known in the art. It should be noted that the line group address, which the control interface 33 matches against is, in fact, supplied by the line group processor 34 and is stored by the control interface 33. The line group address is supplied to the processor 34 by leads 35 to provide a unique address to the line card.

Other control data are communicated between the processor 34 and the PCM buses PCMLCA, PCMLCB via the control interface 33, which acts as a data buffer. It should be noted that the control interface 33 is provided because the microprocessor 34 cannot operate at a high enough rate to handle 4.096 mbps serial rate on the PCM buses. In other applications, which do not utilize a high speed serial bus for control information, e.g., where control information is received in parallel, or at a slower rate, the control interface 33 may not be necessary. In other words, the microprocessor 34 may be directly coupled to the bus carrying the control information.

After the processor 34 determines that an operation is required within its associated line group, it will select the appropriate line circuit, as determined by portions of the control data received over PCM bus PCMLCA or PCMLCB.

The processor 34 is connected to the line circuits 32 via bus 36. Bus 36 includes ten separate leads, specifically, a separate clock lead CLK/SWHKn (n=1 to the number of circuits in a group) for each of the line circuits, a bidirectional data lead DATA, and an address latch enable lead COMMAND. Control and data information is transferred between the line group processor 34 and the per line control interfaces 44 over the common lead DATA. The information transfer is controlled by the COMMAND lead and the CLK/SWHKn leads.

Additional leads connected to the line group are CLK4LS, which is the 4.096 mHz clock signal, leads $\overline{AILS}$, $\overline{BILS}$, and SUPVY. The lead CLK4LS is distributed to the line circuits via a buffer gate 907. The per line control interface 44 of each of the eight line circuits 32 generates the signals $\overline{AILS}$, $\overline{BILS}$ and SUPVY. The $\overline{AILS}$ outputs of the line circuits are "wire-ored" to the input of buffer output gate 908. Likewise the $\overline{BILS}$ outputs are "wire-ored" to gate 909 and the SUPVY outputs are "wire-ored" to gate 910.

The 4.096 mHz clock ClK4LS is applied to a divide by two circuit 941 which provides a 2.048 mHz clock signal CLK2 for use by the line circuits.

7.1 LINE CIRCUIT (FIGS. 25, 26, 27)

Each line circuit 32 includes conventional line circuit transmission components: test and ring relays 38 and 39, a subscriber line interface circuit 40, a filter circuit 42 and a codec 43. The CODEC 43 is of a known type which is operable in a so called "microprocessor controlled mode" of operation, wherein the channel assigned by a line switch or system controller to the associated line circuit is stored by the CODEC and is used to determine when the CODEC will become active. The CODEC may be defined as "active" when the CODEC is transmitting or receiving over PCM buses. One such CODEC is commercially available from the INTEL Corporation and is identified as type number 2910A.

Each line circuit 32 further includes a per line control interface 44 which interfaces between the common circuit 31 and the line circuit transmission components.

Control of portions of the per line control interface 44 is achieved by the processor 34 transmitting control words over bus 36. Each of these control words is 12 bits in length and arranged in format as shown in FIG. 26. Bit 0 determines whether the control operation is a read or write; bits 1-3 are address bits for the per line conrol interface 44; bit 4 is unused; bit 5 is set according to whether the line card is in a system using 8 bit or 10 bit PCM words on its buses; bits 6, 7 and 8 are used to control external components such as power control, device test relay, and ring relay; bit 9 enables the line circuit; bit 10 is used to signify intraline switch calls; and bit 11 selects which of the two PCM buses PCMLCA or PCMLCB will be utilized by the line circuit.

Figures 27, 27B:
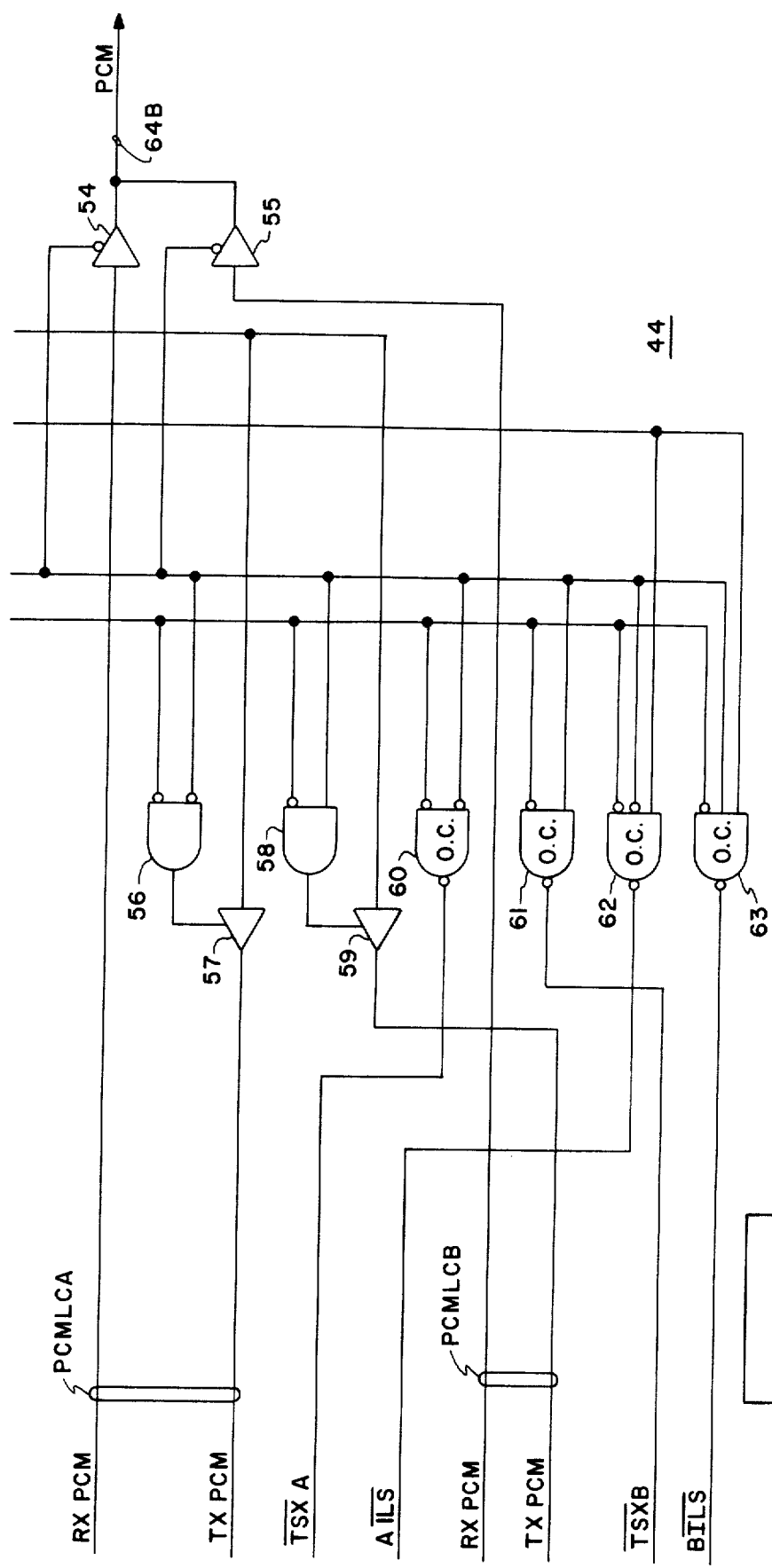
FIGS. 27A and 27B when arranged as shown in FIG. 27 illustrate in block diagram form the per line control interface 44 of FIG. 25.
Figure 27A:
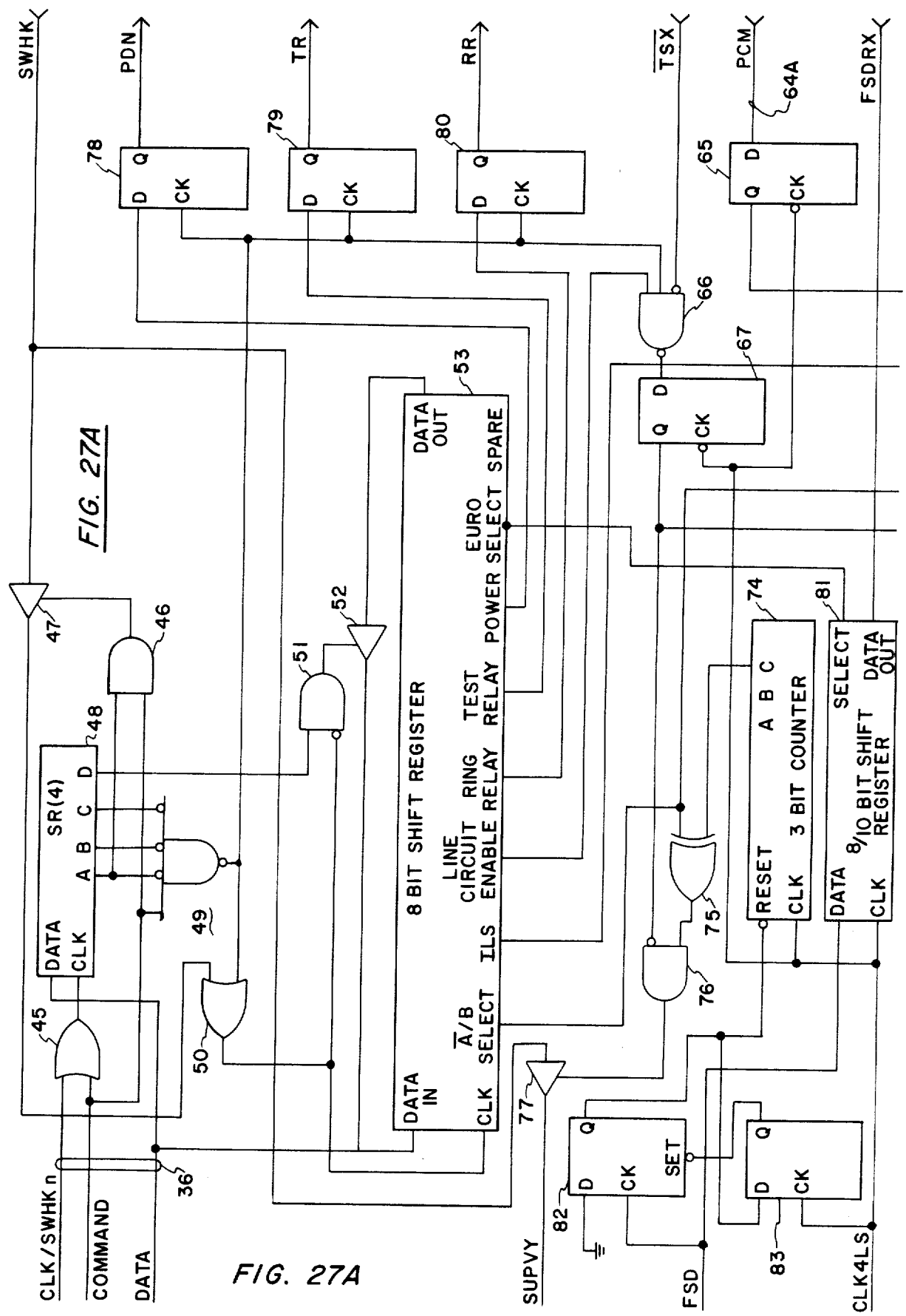

One of the per line interfaces 44 of FIG. 25 is shown in greater detail in FIG. 27. The CLK/SWHKn lead is a dual function lead. More specifically, one function of this lead is that of a normal clock lead to clock data into or out of the line interface circuits 44. The other function of the CLK/SWHKn lead is to return switch hook status to the line group microprocessor 34 of FIG. 25. The selection as to which of the above two functions is provided is determined by the state of the COMMAND lead and register 48. When the COMMAND lead is high, and when bit 0 of the control word indicates a read, then gate 46 enables tri-state buffer 47 thereby coupling the lead SWHKn, which is connected to the SLIC 40 of FIG. 25 and indicates current switch hook status, to the line card processor 34 of FIG. 25 via CLK/SWHKn lead. When the COMMAND head is low, gate 45 is enabled and control bits from the DATA lead of bus 36 are shifted into shift register 48. After the four control bits 0-3 are loaded in register 48, the COMMAND lead goes high disabling gate 45 thereby holding the control bits in register 48. Gates 49 and 50 form a decoder circuit to gate clock pulses from the CLK/SWHKn lead to shift register 53. Similarly, gates 51 and 52 determine whether data will be stored in or read from register 53. If data is to be stored in register 53, the next eight bits, i.e., bits 4-11 of the control word are shifted into the register 53 from the Data lead. The A/B select lead conrol gates 54, 55, 56, 58 to connect either bus PCMLCA, or PCMLCB to the coded PCM bus 64A, 64B. Flip-flop 65 provides buffer timing for the transmit PCM signal from bus 64A The $\overline{TSX}$ lead provides timing from the CODEC 43 of FIG. 25. Gate 66 controls gating of the $\overline{TSX}$ signal into buffer flip-flop 67. The Q output of flip-flop 67 is connected to gates 60 and 61 which are conrolled by the A/B select bit to steer the $\overline{TSX}$ signal to leads $\overline{TSXA}$ or $\overline{TSXB}$. The Q output of flip-flop 67 is also coupled to gates 62 and 63 which are controlled by the A/B select bit and the ILS bit. The outputs of gates 62 and 63 are coupled respectively to leads $\overline{AILS}$ and $\overline{BILS}$.

In some applications it may be desirable to return switch hook information at a rate fast enough to detect dial pulsing without utilizing the A/B signaling bits of the PCM bus. To accomplish this, switch hook information from lead SWHK from the line circuit 32 is gated onto the supervisory lead SUPVY during one half of the channel time assigned to that circuit. The channel during which switch hook information is gated is determined by a signal on lead $\overline{TSX}$ from the CODEC 43 of FIG. 25.

A counter 74 divides each channel into two parts. Flip-flops 82, 83 provide synchronization for counter 74. The A/B select bit controls gate 75 to determine in which of the two parts of a channel the switch hook information is to be gated. Gates 76 and 77 gate the switch hook information from flip-flop 67 to supervisory lead SUPVY. The line circuit enable bit controls gating of the lead $\overline{TSX}$ at gate 66 for maintenance purposes, i.e., if it is determined that CODEC 43 of FIG. 25 is defective, the line circuit enable bit is utilized to prevent the CODEC 43 from interfering with the operation of the remainder of the system. The ring relay, test relay and power control flip-flops 80, 79, 78, respectively control the application of ringing signals from bus 73 of FIG. 14 conrol connections to a test bus and to apply power to the entire transmission circuit elements of FIG. 14. Register 81 delays the frame clock FSD from the buffer-distributor 9 of FIG. 22 by one channel time to provide a receive frame clock which is coupled to a CODEC 43 of FIG. 25 via lead FSDRX. The Euro Select bit, i.e., bit 5 of FIG. 26, determines whether the channel delay corresponds to 8 or 10 bits.

7.2 GAIN/BALANCE (FIGS. 25, 28, 29, 30, 31)

Turning back to FIG. 25, the gain/balance control circuit 41 provides software selection of transmit gain, receive gain and balance for the line circuit. Control of the gain/balance circuit 41 is achieved by the line card processor 34 transmitting control words over the serial data bus 36 in a manner similar to that described with respect to the per line controller interface circuit 44 hereinabove. The control words are illustrated in FIGS. 28 and 29. As shown in FIG. 28, a control word for the gain/balance operations comprises 28 bits arranged as follows: a read/write bit, three address bits, a clock control bit, three unused bits, four bits for line balance network selection and eight bits each for transmit and receive gain selection. As shown in FIG. 29, a control word for CODEC control comprises 12 bits which includes a read/write bit, three address bits, two mode bits and six channel assignment bits.

Figure 30A:
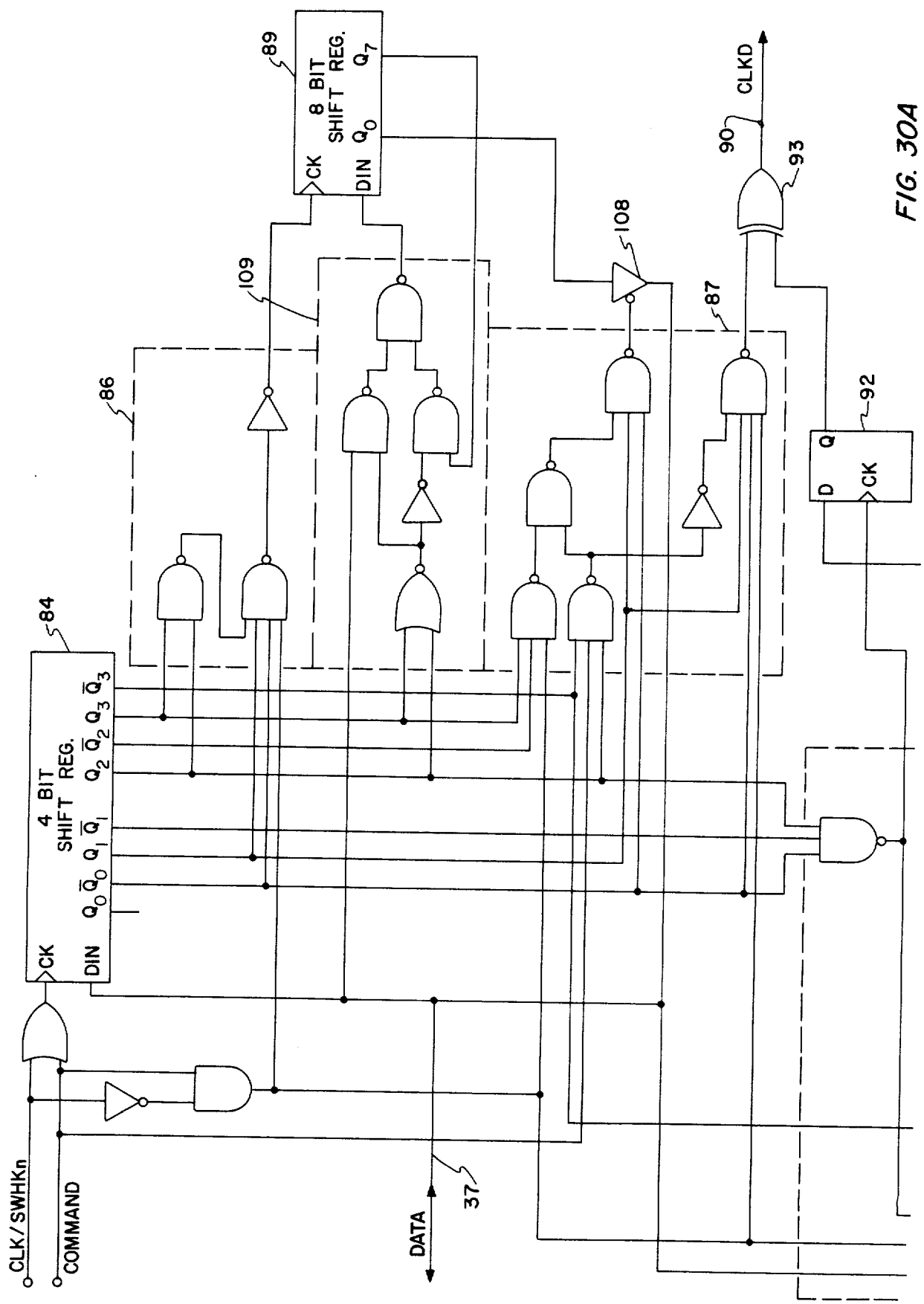

The gain/balance circuit 41 is shown in detail in FIG. 30. The first four bits of a control word are loaded into and stored by register 84 in the same manner as described for register 48 of FIG. 27. Address decoders 85, 86, 109 and 87 decode the contents of the register 84. Decoder 85 determines if the control word is to provide gain/balance settings to be stored in register 88. Decoder 86 permits loading of assigned channel information into a register 89. Decoder 87 controls the loading of channel assignment information from register 89 into the CODEC using data clock lead CLKD.

If the first four bits of the control word shown in FIG. 28 stored in register 84 as indicated above active decoder 85, the next 24 bits are then stored in register 88. The clock control bit stored in bit Q23 of register 89 conrols the state of flip-flop 92 which in turn is connected the EXCLUSIVE-OR gate 93 to determined whether the clock signal on lead CLKD is inverted or not. The four line balance network selection bits of shift register 88 control analog solid state switches 94 to selectively connect capacitors 95 and 96, network 97 and 98, to the SLIC circuit via the balance selection lead BAL. It should be noted that the capacitors 95 and 96 and resistor 98 may be replaced with other network components or with entire networks.

Gain control amplifiers 103 and 105 are connected such that they are interposed in the transmission path between the SLIC 40 and Filter 42 as shown in FIG. 25. More specifically, receive amplifier 103 has one input connected to lead RXF connected to the receive filter and an output lead RXS connected to the receive path of the SLIC. Amplifier 105 has one input connected to SLIC transmit lead TXS and an output connected to transmit filter lead TXF.

The eight receive gain control bits stored in register 88 control analog solid state switches 101 to selectively connect resistors 102 to one input of amplifier 103. Likewise the eight transmit gain control bits stored in register 88 control analog switches 104 to selectively connect resistors 106 to one input or amplifier 105.

It is desirable to maintain closely controlled gain steps, e.g., less than 0.1 db, over a wide range of environmental conditions. Typically, gain circuits comprise a resistive ladder similar to that formed by resistors 106, each leg of the ladder having an analog switch connected in series with a resistor. The ladder in turn forms a resistive divider with another resistor 107. The analog switches have a finite impedance which will vary from unit to unit and with environmental changes. Typically, analog solid state switches have impedances of nominally 50 to 150 ohms in the on-state. The variation of the on-state impedance would thus contribute a significant change to the ratio of the dividers previously used.

This problem is significantly reduced in the gain control circuits shown in FIG. 30. Specifically, an amplifier having an extremely high input impedance such as a FET differential input amplifier, e.g. 103 or 105, is connected in the divider network. The resistance values may then be made relatively high, for example, in the order of tens of thousands of ohms, and accordingly, the impedance variations in analog switches, which are on the order of a hundred ohms, will have a negligible effect on the gain through the circuit.

The gates 91 are controlled by the read/write bit of the control word to determine whether a portion of a control word is to be stored in register 88, or whether the contents of register 88 are to be read via the data bus 37.

A CODEC control word has two distinct addresses. One address (hereinafter first address) will result in either the register 89 being loaded or read by the line card processor 34, and the other address (hereinafter second address) will cause the contents of register 89 to be loaded into a CODEC 43. If the control word contains the first address and the read/write bit indicates a write operation, the mode and channel assignment portion of the control work is loaded into register 89 via decoder 86. If the control word contains the first address and the read/write bit indicated a read operation, the contents of register 89 are supplied to data bus 37 via gate 108, which is controlled by portion of the decoder 87. When the register 89 is read, the gates 109 will feed each bit, as read, back into the register such that after a read of the register 89, the contents of register 89 are unchanged.

If the control word contains the second address, the contents of register 89 are supplied to the CODEC over data bus 37 via gate 108. Gate 108 is controlled by portions of the decoder 87. Other portions of decoder 87, when enabled, supply clock pulses to a CODEC via gate 93 and line 90 to clock the data from bus 37 into the CODEC. The gates 109 will again operate to loop the data bits loaded into the CODEC from register 89 back into register 89.

As noted hereinabove the control words transmitted between the line groups and the line switch controller 7 of FIG. 2 over the buses PCMLCA and PCMLCB as shown in FIGS. 2 and 6 comprise 32 bits. FIG. 31 illustrates the format of these control words. Each control word transmitted from the line switch controller 7 of FIG. 2 comprises four eight bit bytes, indicated as Bytes 1-4. Byte 1 may include one parity bit which is calculated over the entire word, and includes seven address bits. Byte 2 includes five function bits which control the function that line card processor 34 is to perform, and three bits to designate which one of the eight line circuits on a line card is to be affected. Bytes 3 and 4 contain control data as required for the function specified by the function bits. After a control word is transmitted to the line card by the line switch controller 7, the processor 34 will respond by returning the same control word back to the line switch controller 7 if the control word indicates a write operation. If the control word indicates a read operation, the line card processor 34 will return bytes 1 and 2 as originally transmitted from the line switch controller 7 and will include respose data in Bytes 3 and 4.

7.3 PROTOCOL INTERFACE CIRCUIT/CONTROL INTERFACE 33 (FIGS. 25, 32)

Figures 32, 32A:
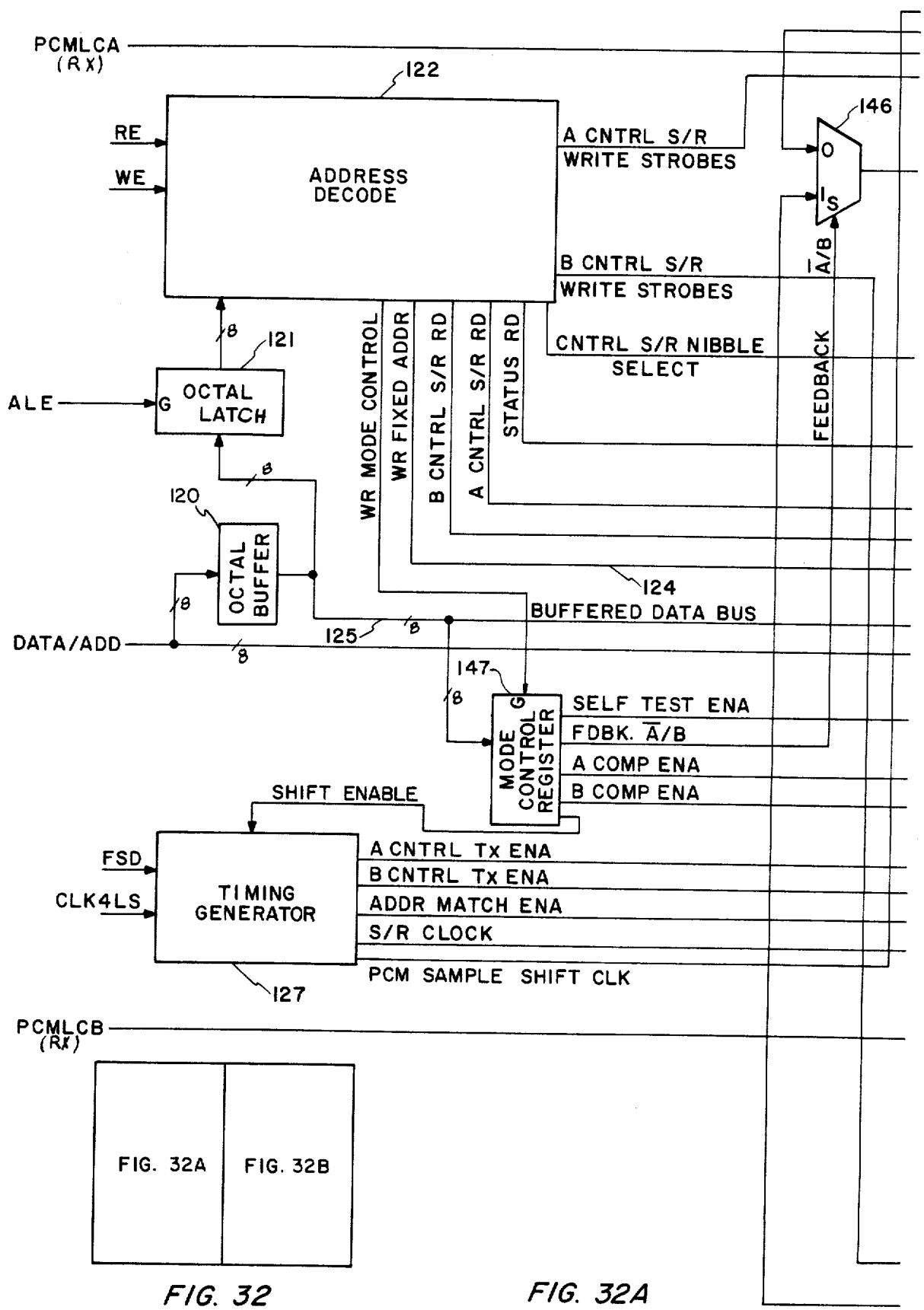
FIGS. 32A and 32B when arranged as shown in FIG. 32 illustrate in block diagram form the control interface 33 of FIG. 25A.
Figure 32B:
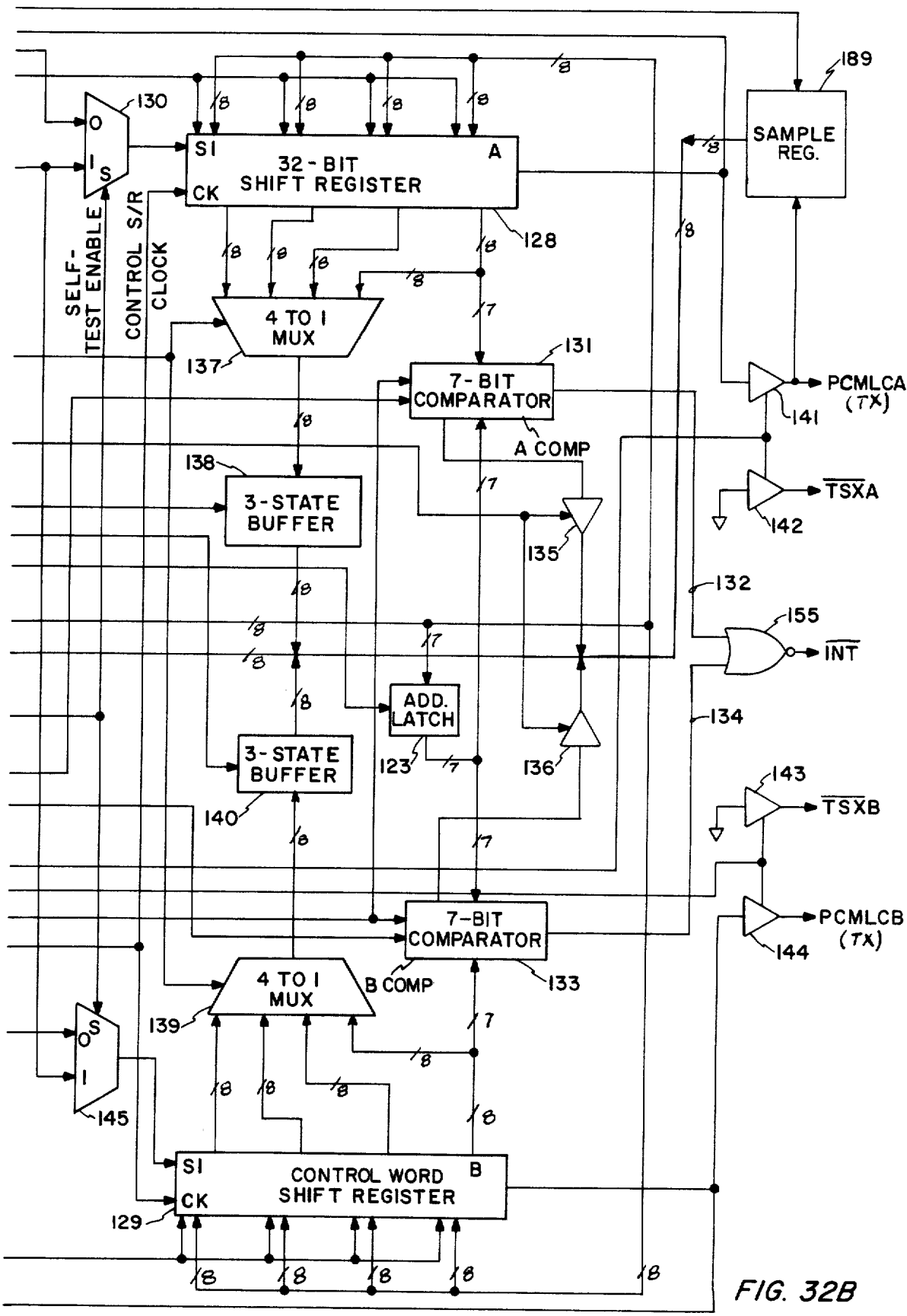

The control interface 33 of FIG. 25 comprises the protocol interface circuit PIC and as shown in detail block diagram form in FIG. 32 is connected to buses PCMLCA and PCMLCB. For purposes of clarity, single lines are used to represent multi-line buses and the number of lines in a bus is indicated at various points along the bus.

Initially, the line group processor 34 of FIG. 25 reads the line card address from leads 35 as shown in FIG. 25 and loads this address into the control interface latch 123 of FIG. 32 in the following manner. The processor 34 transmits the address to the latch 123 over the DATA/ADD lines to the control interface 33. This internal register address is buffered by buffer circuit 120 and is presented to the input of register 121. The line card processor 34 concurrently transmits a signal over the ALE lead which causes the internal register address to be stored in register 121. The internal register address decoder 122 decodes the address to apply an enable signal WR FIXED ADDR on lead 124. The line card processor 34 then transmits a data word which contains the line card wired address. The data word is applied to the input of register 123 via bus 125 and is gated therein via lead 124 by address decoder 122 upon receipt of a strobe signal from the processor on write enable lead WE. The register 123 then contains the wired address of the line card.

A timing generator circuit 127 receives the FSD and CLK4LS clock signals from the buffer distributor 9 of FIG. 21 and generates various timing signals for controlling the operation of the control interface 33. The FSD signal is used to control the timing of a clock signal on lead S/R clock. The clock signal on S/R clock controls the storing or transmitting of control words between bus PCMLCA and register 128 and between bus PCMLCB and register 129. Initially, a control word is received on one of the two buses e.g., PCMLCA. As the control word appears on bus PCMLCA in serial form it is gated via selector circuit 130 to shift register 128 using S/R clock. Registers 128 and 129 are 32 bit registers. After the proper number of clock pulses have been provided by S/R clock, a strobe signal is applied to the ADDR MATCH ENA lead thereby enabling a comparator 131 which compares the address portion of the control word in register 128 with the line group address stored in latch 123 and generates a signal on lead 132 if the addresses are the same. Similarly control word received on bus PCMLCB are stored in register 129 via selector 145 and the address portion thereof is compared to the line circuit address by comparator 133 which generates a signal on lead 134 if those addresses are the same. Gate 155 logically "or's" lead 132 and 134 and will provide a signal to the line group microprocessor 34 of FIG. 25 on its interrupt lead INT if an address match occurs for either bus PCMLCA or PCMLCB.

After the line group processor 34 is interrupted it will then obtain the control word by first transmitting an addres over the DATA/ADD bus. The address is stored in latch 121 and decoded by decoder 122 which, in turn activates the STATUS RD line. The STATUS RD line enables gates 135 and 136 which provide indications on the DATA/ADD bus as to which of the two comparators 131 or 133 detected the line card address.

The line group processor 34 will then, via a series of commands, obtain 24 bits of the control word from the appropriate one of the registers 128 or 129. If the control is obtained from register 128, then multiplexer 137 and buffer 138 are utilized. Similarly if the control word is to be obtained from register 129 then multiplexer 139 and buffer 140 are utilized.

Response data from the line group processor 34 may be returned to the line switch controller 7 via buses PCMLCA or PCMLCB.

Response data from the line group processor 34 is stored in a preselected one of the registers 128, 129 by a series of commands from the processor 34 which controls the gating of data through buffer 120 via bus 125 from register 128 or 129. The response data is witten into register 128 or 129 as eight bit parallel bytes. The response data is transmitted from the registers 128, 129 over the buses PCMLCA, PCMLCB respectively by the S/R clock signals in the following manner.

After the last byte of data is stored in the selected register 128, 129, the timing generator 127 will generate an enable signal at a predetermined time over leads A CONTRL or B CONTRL respectively. The outputs of gates 141 and 144 are connected to buses PCMLCA and PCMLCB respectively. The outputs of gates 142 and 143 are "wire-ored" with the leads $\overline{TSXA}$ and $\overline{TSXB}$ respectively from the line circuits. The S/R clock is used to shift the response data onto PCMLCA or PCMLCB. More specifically, the S/R clock provides pulses at a 4.096 mHz rate, with 42 pulses being supplied in a burst during one frame. The first 32 clock pulses of the 42 pulse burst are used to clock the response data from the registers 128 or 129 onto bus PCMLCA or PCMLCB.

The last 32 clock pulses of the 42 pulse burst are used to clock the control data from the bus PCMLCA or PCMLCB into the register 128 or 129. During the time when the middle 22 pulses are provided, control data is being written into registers 128 or 129 while simultaneously response data is being read from the register 128 or 129. This arrangement is provided because system timing constraints require a 10 bit skew between the receive PCM data bus and the transmit PCM data bus.

Selector 146 is provided for maintenance purposes. The register 147 is also provided for maintenance purposes and permits the processor 34 to disable either or both of the comparators 131, 133 and to control selectors 130, 145 and 146.

7.4 SELF TEST (FIGS. 32, 33, 34, 35)

One feature of the control interface 33 is that it includes a self-test mode of operation in which the serial output of one of the shift registers 128 or 129 is selected as the serial input data source for both of the registers 128 and 129. Selectors 145, 146 and 130 provide feedback paths for the registers 128, 129 during the self-test mode. In this test mode, the shift registers 128 and 29 are loaded with test data by the microprocessor and allowed to shift for several frames. Proper operation of the shifting function of the registers 128, 129 and the address decoder circuit 122 can thus be verified without affecting the PCM buses PCMLCA, PCMLCB.

A self-test program routine is executed during power-on initialization of the line switch. This self-test routine exercises the circuitry of the control interface 33 and produces a go/no-go result.

The test initialized the control interface by loading a code in the mode control register 147 which provides a signal on the SELF TEST ENA line to operate selector 130 and a signal on the FDBK A/B line operates selector 146 such that a feedback path for register 128 is enabled. A signal is provided to the timing generator 127 which responds to preventing transmission over the buses PCMLCA, PCMLCB, and by inhibiting the shifting of the registers 128, 129. The A comparator 131 and B comparator 133 are enabled.

Next, A register 128 is loaded with the following test data (in hexadecimal): byte 1=63, byte 2=C1, byte 3=F8, byte 4=0F. The address latch 123 is loaded with F8, i.e., the same as byte 3 on register 128. After the A register and address latch 123 have been loaded, the A and B registers 128 and 129 are allowed to shift for eight PCM frames. FIG. 33 illustrates the contents of the A and B registers 128, 129 at the start of the self-test and after each frame of shifting. Note that the A and B registers 128 and 129 are clocked 42 times each frame as explained above. The A and B control registers are 32 bits long. Therefore, the test data in the A register 128 will be in effect rotated left (left being defined as toward the most significant bit position) a total of 10 (42 modulo 32) places after each 42 pulse clock burst. After eight frames of shifting the test data in the A and B registers 128 and 129 will have been rotated 16 (42×8 modulo 32) places left of the position of the test data at the start of the test. Since the address latch 123 contains F8 and the A and B address comparators 131 and 133 are enabled an address match should occur with both comparators only during the eighth frame of shifting. If both comparators 131 and 133 do not indicate a match condition during the eighth frame, a failure has occurred. If both comparators do indicate a match, the contents of both the A and B registers 120, 129 are compared with the following expected data: byte 1=F8, byte 2=OF, byte 3=63 and byte 4=C1. Any mismatch of the data in the A and B registers 128 and 129 with the expected data indicates a failure.

FIGS. 34 and 35 are a program listing in MCS-48 assembly language code implementing the self-test operation for a line group controller.

7.5 AUTOMATIC GAIN SETTING (FIGS. 25, 30, 32, 36, 37 A-C)

The control interface 33 of FIG. 32 includes a voice channel data sampling register 189 which permits the microprocessor to monitor channel data appearing on one of the PCM buses PCMLCA. This channel sampling feature allows the line group processor to measure and thus provide automatic gain setting of the line circuits. Register 189 is an 8 bit shift register that is serially loaded every frame with data appearing on a predetermined channel of bus PCMLCA. The PCM SAMPLE SHIFT clock from timing generator 127 clocks the serial data from PCMLCA into the register 189. Between the 8-pulse clock bursts, data in register 189 can be read by the microprocessor sending an appropriate command to the control interface. Note that for clarity, the connection from the address decoder 122 to the register 189 has not been shown.

The above described variable gain circuit of FIG. 30 permits adjustment of the gain of the amplifiers 103 and 105 to a predetermined value without costly hand selection of parts. The analog switches 101, 104 respectively control portions of a resistance divider 102, 106 to change the gain of amplifiers 103, 105, respectively.

In the embodiment shown, the predetermined value for amplifier 103 is set such that the overall loss in the receive path of the line circuit is −0.25 dB (decibel). The predetermined value for amplifier 105 is set such that the overall gain in the transmit path of the line circuit is 0 dB. The accuracy of these settings is made to within ±0.1 dB. The incremental difference between adjacent steps of PCM representations representing the peak required signal levels (of around 0 dBm (decibel relative to a milliwatt test tone)) is approximately 0.4 dB for mu-law encoding. As shown below, it is possible to use the PCM representations to measure analog signals peaks with an accuracy greater than that of the PCM steps.

The frequency for a reference signal used in measuring the gain of the transmission circuit is chosen as 1.024 kHz sampling rate. By chosing the frequency of the reference signal in this manner, the reference signal will be sampled at or near its peak amplitude a predictable number of times over a predetermined number of cycles.

For a 1.024 kHz signal sampled at an 8 kHz rate, 16 cycles are required before the PCM representations are repeated. During a 16 cycle period, 125 PCM representations are generated.

From mu-law tables it can be determined that the maximum linear level of a signal that can be encoded is 8159 linear units and, by definition, corresponds to the peak of a signal having an rms (root means square) level of +3.17 dBm. The peak value of the 0 dBm reference signal can be calculated by reducing 8159 by 3.17 dB. In this manner, the peak value of 0 dBm signal is determined to be 5664.1785 linear units. From mu-law tables it can be determined that 5664.1785 linear units lies between level 118 which represents 5599 linear units and level 119 which represents 5855 linear units. It can be calculated that levels 118 and 119 are approximately 0.4 dB apart.

If 125 successive PCM samples are monitored and at least one sample corresponds to level 119 or a higher level, the signal represented by that group of 125 samples is greater than 0 dBm by more than 0.278 dB.

If all samples in a group of 125 successive PCM samples are less than level 118 then the signal represented is less than 0 dBm by more than 0.1 dB. For a 0 dBm signal, the number of samples N out of 125 successive PCM sample that are at level 118 either positive and negative polarity is determined as follows:

The reference signal may be represented as A sin ωt. If decision level 118 is represented by A' then $$A' = A \sin(\pi/2 - Q) \quad (1)$$

where $\pi/2 - Q$ represents the angular displacement from zero degree where the reference signal reaches level 118.

Solving equation (1) for Q yields $$Q = \frac{\pi}{2} - \sin^{-1}\frac{A'}{A} \quad (2)$$

The probability that any one PCM sample in a group of 125 successive samples will be above level 118 is $$P = \frac{4Q}{2\pi} = \frac{2Q}{\pi} \quad (3)$$

Substituting equation 2 in equation 3 yields $$P = \frac{2}{\pi}\left(\frac{\pi}{2} - \sin^{-1}\frac{A'}{A}\right) = 1 - \frac{2}{\pi}\sin^{-1}\frac{A'}{A} \quad (4)$$

The number of PCM samples in a group of 125 successive samples which will be at level 118 for a 0 dBm signal is $$N = 125\,P \quad (5)$$

For a 0 dBm signal $$A = 5664$$

$$A' = 5599$$

and N may be calculated at 12.08.

Equations 1-5 may be used to determine the signal level corresponding to the number of occurrences N of level 118 samples in a successive group of 125 PCM samples yielding the results shown in the table below:

TABLE

| N | A(dBm) | N | A(dBm) | N | A(dBm) |
|---|--------|---|--------|---|--------|
| 1 | −.0998 | 9 | −.0447 | 16 | +.0762 |
| 2 | −.0978 | 10 | −.032 | 17 | +.0992 |
| 3 | −.0944 | 11 | −.0173 | 18 | +.1236 |
| 4 | −.0896 | 12 | −.0014 | 19 | +.1494 |
| 5 | −.0834 | 13 | +.0159 | 20 | +.1767 |
| 6 | −.0758 | 14 | +.0346 | 21 | +.2055 |
| 7 | −.0669 | 15 | +.0547 | 22 | +.2357 |
| 8 | −.0565 | | | | |

In the illustrative embodiment, if 9 to 16 level 118 samples occur during 125 successive PCM samples, it is assumed that the samples represent a signal of 0 dBm. From the above table it is seen that this sample range represents 0 dBm over a range of −0.0447 dBm to +0.0762 dBm.

Advantageous use of the variable gain circuitry is made to permit automatic adjustment of the gain setting. Each line circuit shown in FIG. 25 is connected via a test relay 38 to a test bus. The test bus is multiplied to all the test relays of a line group and may also be multiplied to all line groups in a line switch module. Alternatively, the serial test buses may be utilized within a line switch module, each test bus being multiplied to one or more line groups. To set the TX gain of a line circuit, i.e., the gain of amplifier 105, the line switch controller will connect an analog milliwatt generator to the proper test bus.

Figure 36:
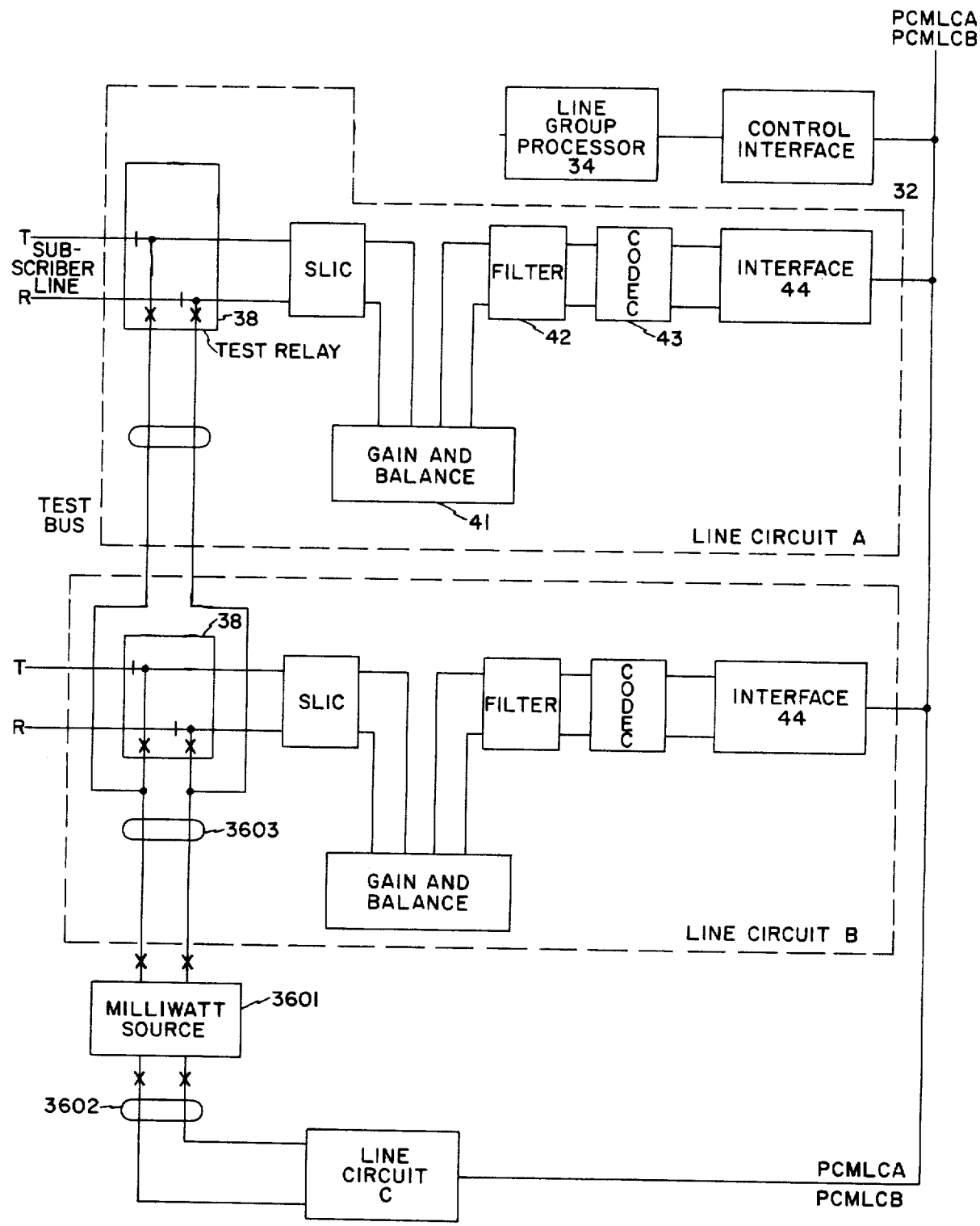
FIG. 36 illustrates in block diagram form an automatic gain setting feature in accordance with the principles of the present invention.

FIG. 36 illustrates the arrangement for setting the transmit gain in a line circuit, the line switch controller 7 will connect a milliwatt generator 3601 to the proper test bus. The line group processor 34 of the line circuit which is to have its transmit gain set will then actuate the test relay 38 of the line circuit. By means of the sample register 189 of the control interface 33 shown in FIG. 32, the line group processor will monitor the PCM output of the line circuit. The line group processor will then incrementally change the gain of the transmit amplifier 105 in FIG. 30 and balance circuit 41 by selectively actuating the analog switches 104 shown in FIG. 30. After each incremental change in the gain, the line group controller will monitor the PCM data. The iterative process will continue until the monitored PCM signals represent a signal of 0 dbm±0.1 dB. The line group processor 34 will then release the test relay 38 and signal the line switch controller 7 that the transmit gain has been set. The line switch controller 7 can then direct a line group processor 34 to set the transmit gain of other line circuits. To set the receive gain, i.e., that of amplifier 103 in FIG. 30, the line switch controller will cause a digital signal representing a signal 0.25 dB greater than 1 milliwatt to be applied on a PCM channel that can be used for testing. One way in which this may be done is for the line switch controller 7 to connect the milliwatt source 3601 providing a 0.2 dB signal to a test bus 3602 and direct the line group processor 34 to connect a line circuit, e.g., line C, which has had its transmit gain adjusted to the desired level connected to the test bus 3602. The line circuit C will then provide PCM signals representative of the milliwatt source on a predetermined channel of the PCM bus PCMLCA or PCMLCB. If it is assumed that line circuit A is to have its receive gain set, then line group processor 34 will actuate test relay 38 connecting the output of line circuit A to the test bus 3603. Another line circuit B which has previously had its transmit gain set will be connected to the same test bus 3603 by actuating its test relay 38. Thus, the analog output of line circuit A will be connected to the analog input of line circuit B. The line circuit B will be directed by the line group processor 34 to receive the PCM channel which is carrying the digital PCM tone signal from line circuit C.

The PCM output of the line circuit A will be monitored by its line group processor 34 again utilizing the sample register 189 of the control interface 33.

The line group processor willincrementally change the gain of the receive amplifier in line circuit A until the output is again 0 dBm±0.1 dB. Thus the transmit gain of any circuit can be set to 0±1 db and the receive gain of any circuit can be set to 0.25 dB±0.1 dB.

Figure 37A:
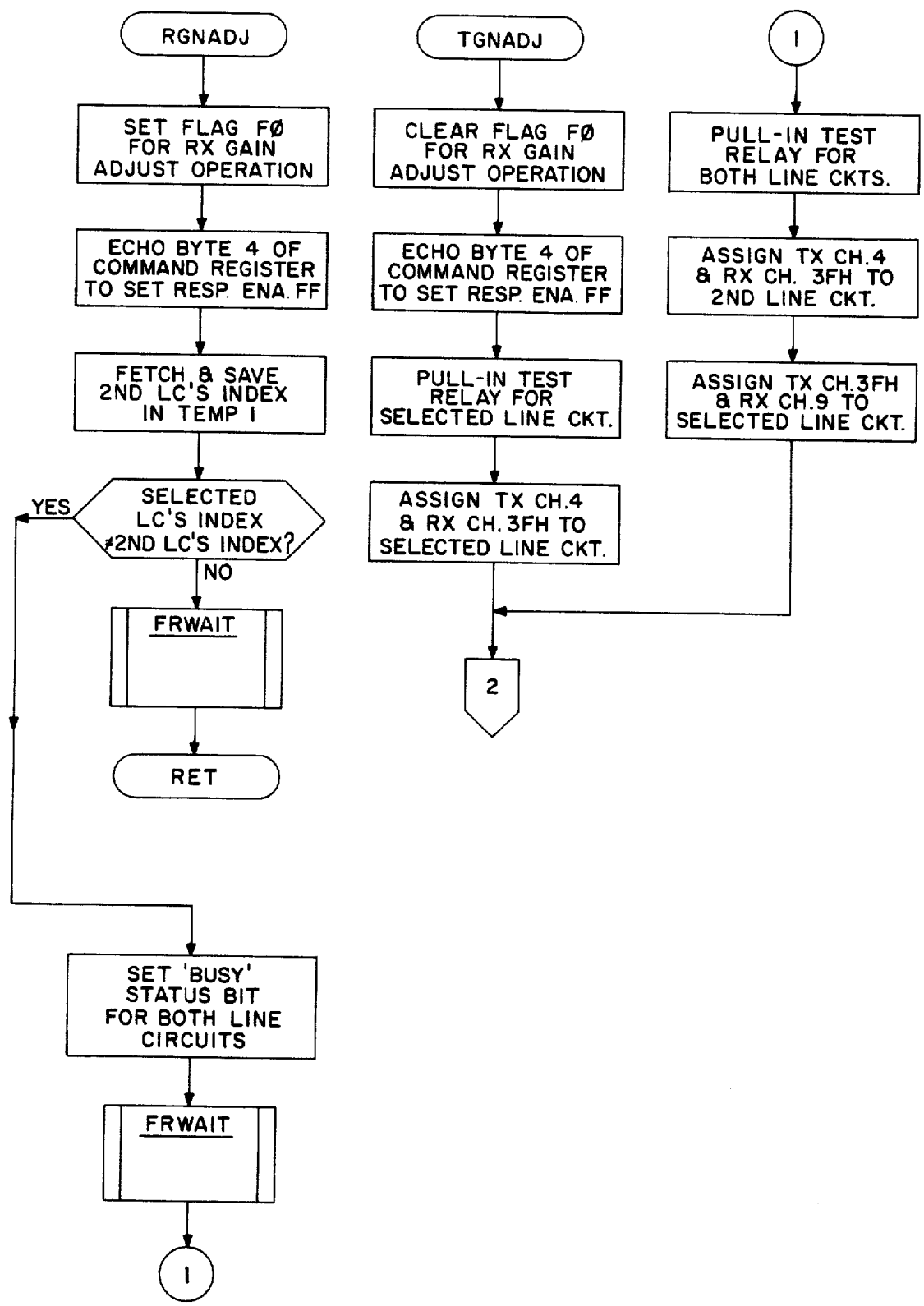
FIGS. 37A, 37B and 37C are flow charts of programs for automatic gain setting according to FIG. 36.
Figure 37B:
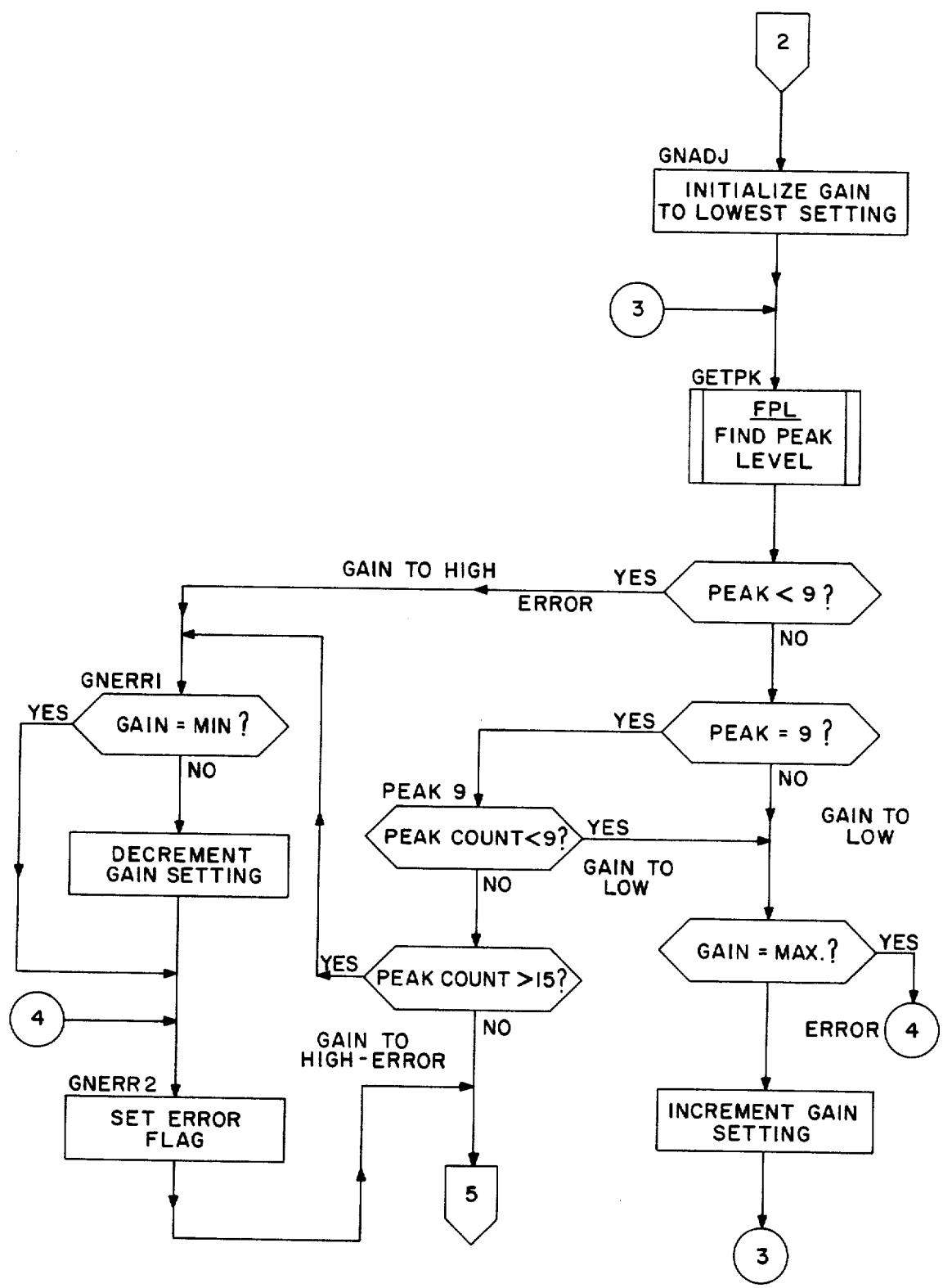
Figure 37C:
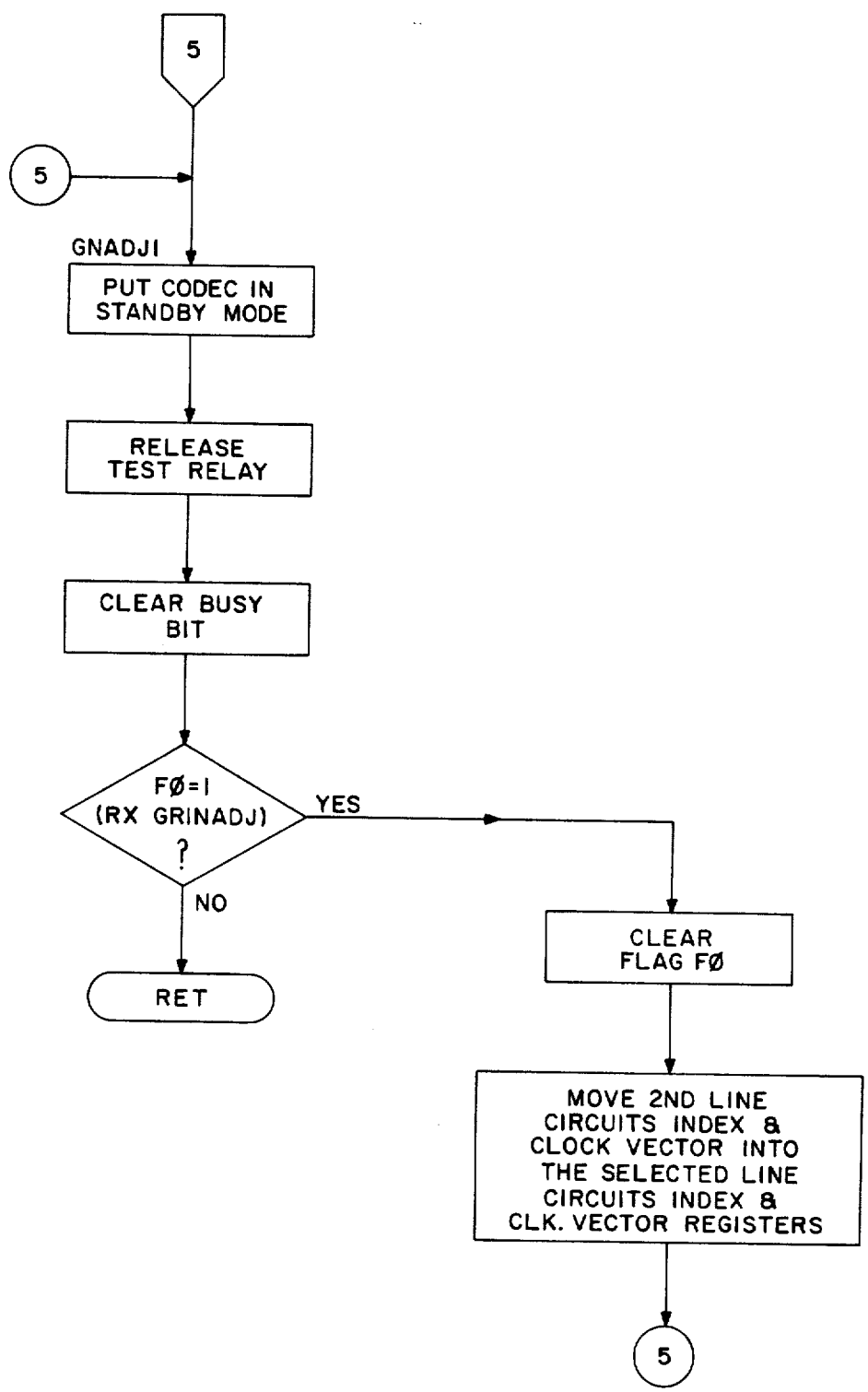

FIGS. 37 A, B and C illustrated in flow chart form the program for setting the transmit and receive gain.

8.0 OTHER LINE CARD ARRANGEMENTS (FIGS. 25, 38, 39 and 40)

Figure 38:
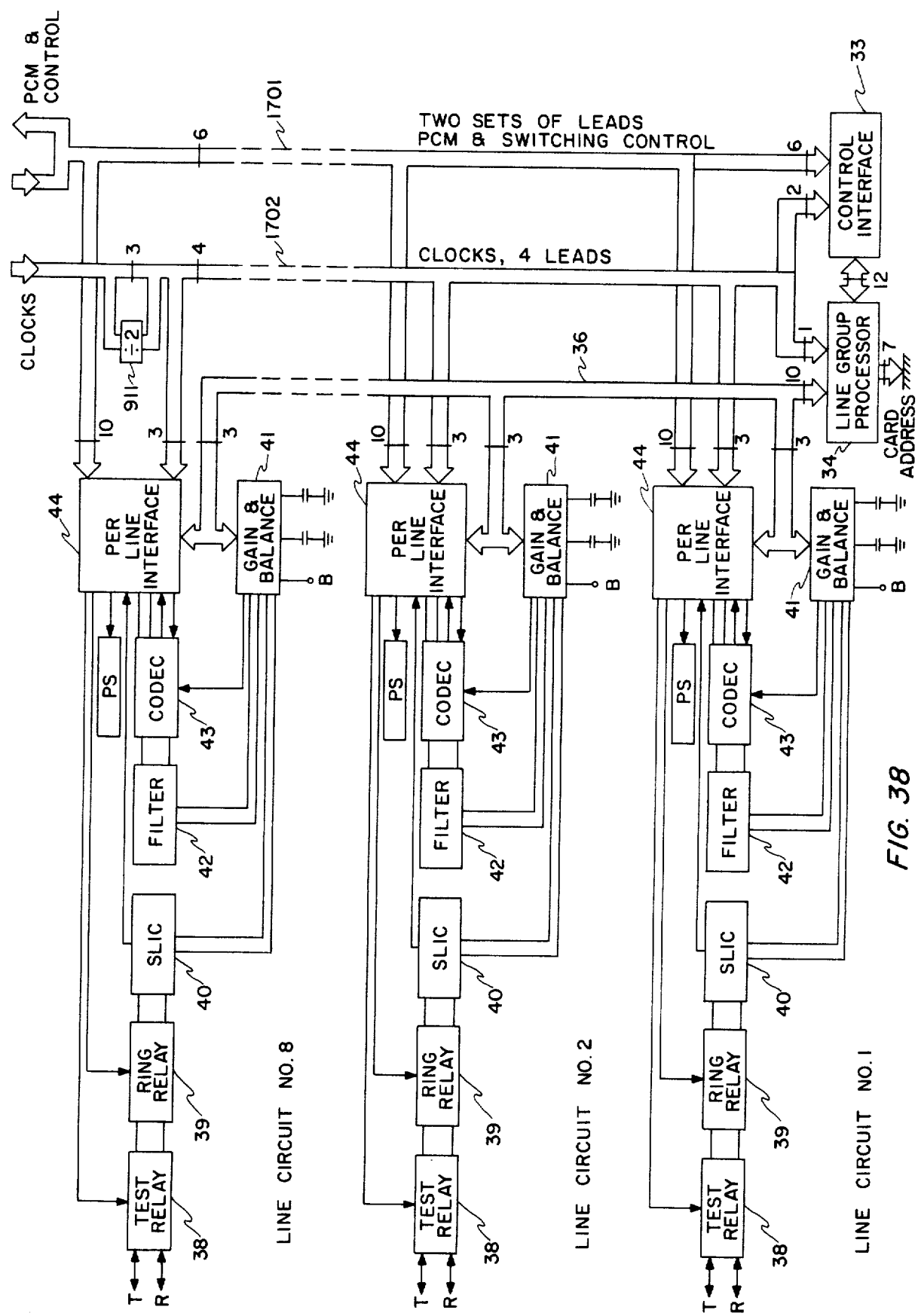
FIG. 38 is a general block diagram of the detailed drawing of FIG. 14.

The detailed drawing of FIG. 25 may be redrawn in general block diagram form with various leads grouped into buses as shown in FIG. 38. Bus 1701 includes PCMLCA, PCMLCB, $\overline{\text{AILS}}$, and $\overline{\text{BILS}}$. Bus 1702 includes CLK4LS, FSD, CLKT and CLK2.

The line card control interface 33 as described hereinabove interfaces between the line group processor 34 and the PCM buses PCMLCA and PCMLCB for the interchange of control information over the PCM buses.

Figure 39:
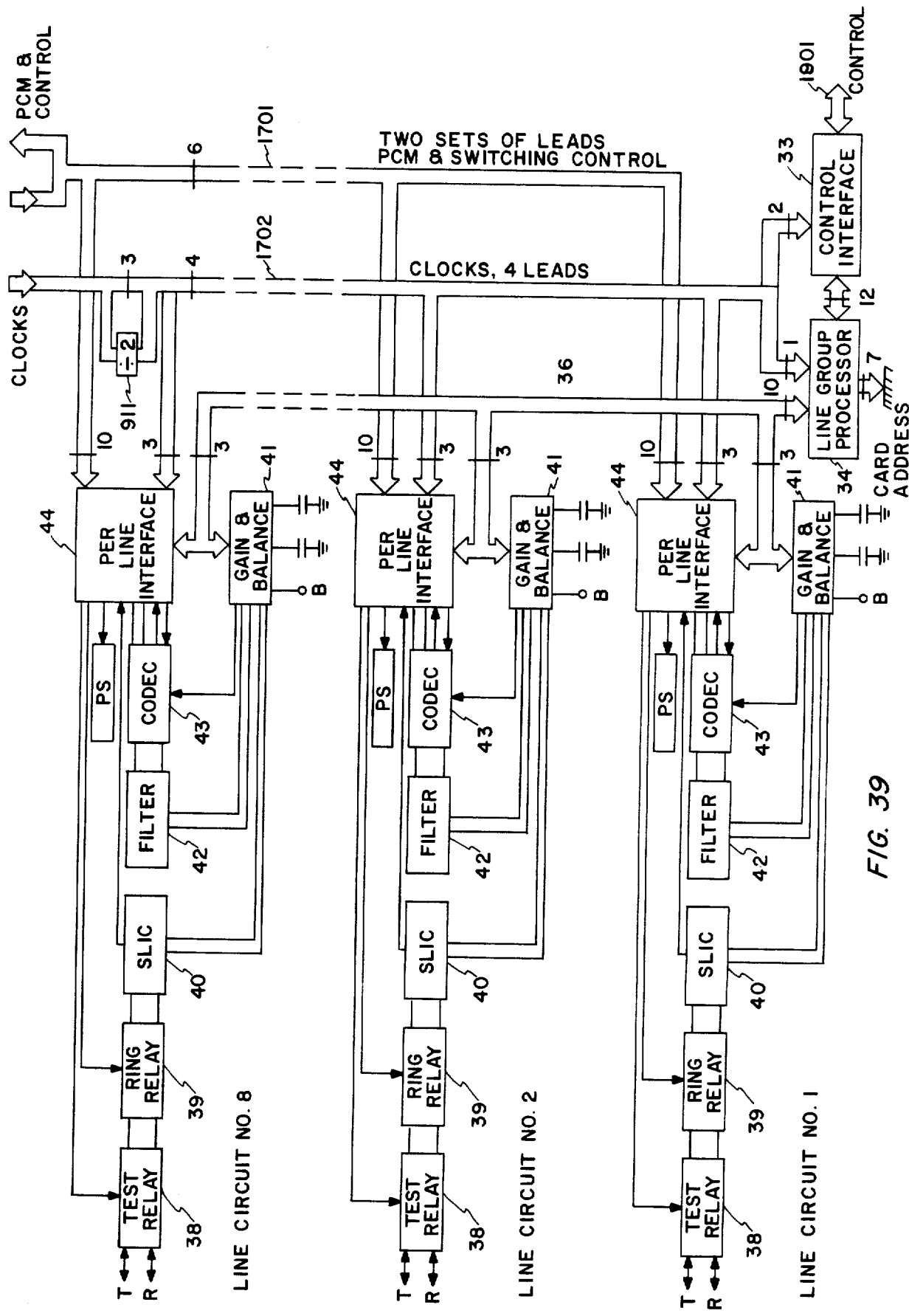
FIG. 39 is a general block diagram of another embodiment of FIG. 14.

In another embodiment of the invention shown in FIG. 39, a separate control bus 1801 is provided and the line group control interface 33 is not connected to the PCM bus 1701. In this arrangement, control information may be exchanged between the line card control interface 33 and a line switch control 7 in the system control 5 over a control bus 1801.

Figure 40:
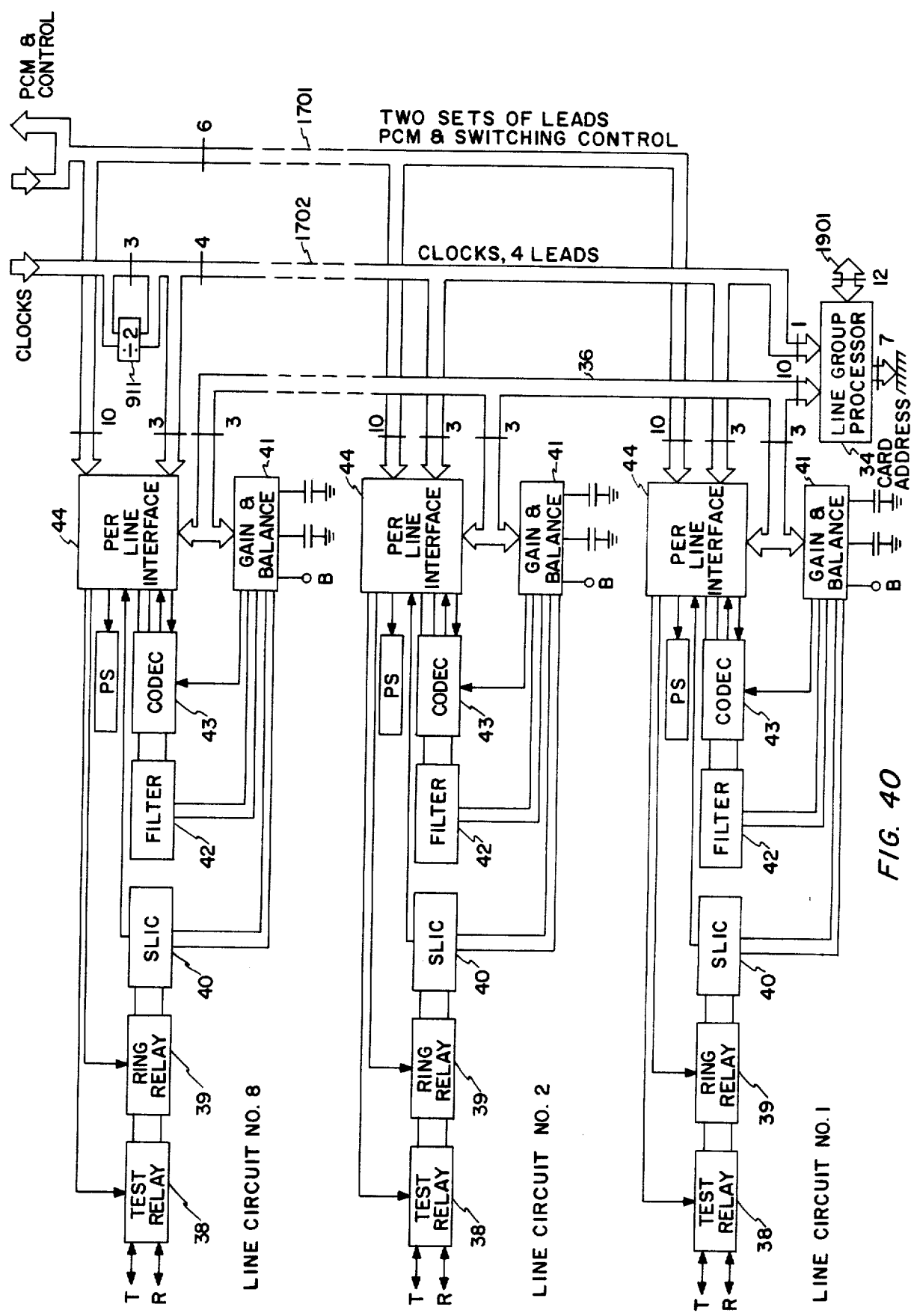
FIG. 40 is a general block diagram of a third embodiment of FIG. 14.

In yet another embodiment of the invention shown in FIG. 40, the line group processor 34 may directly communicate via bus 1901 with the line switch control 7 or the system control 5.

Figure 41:
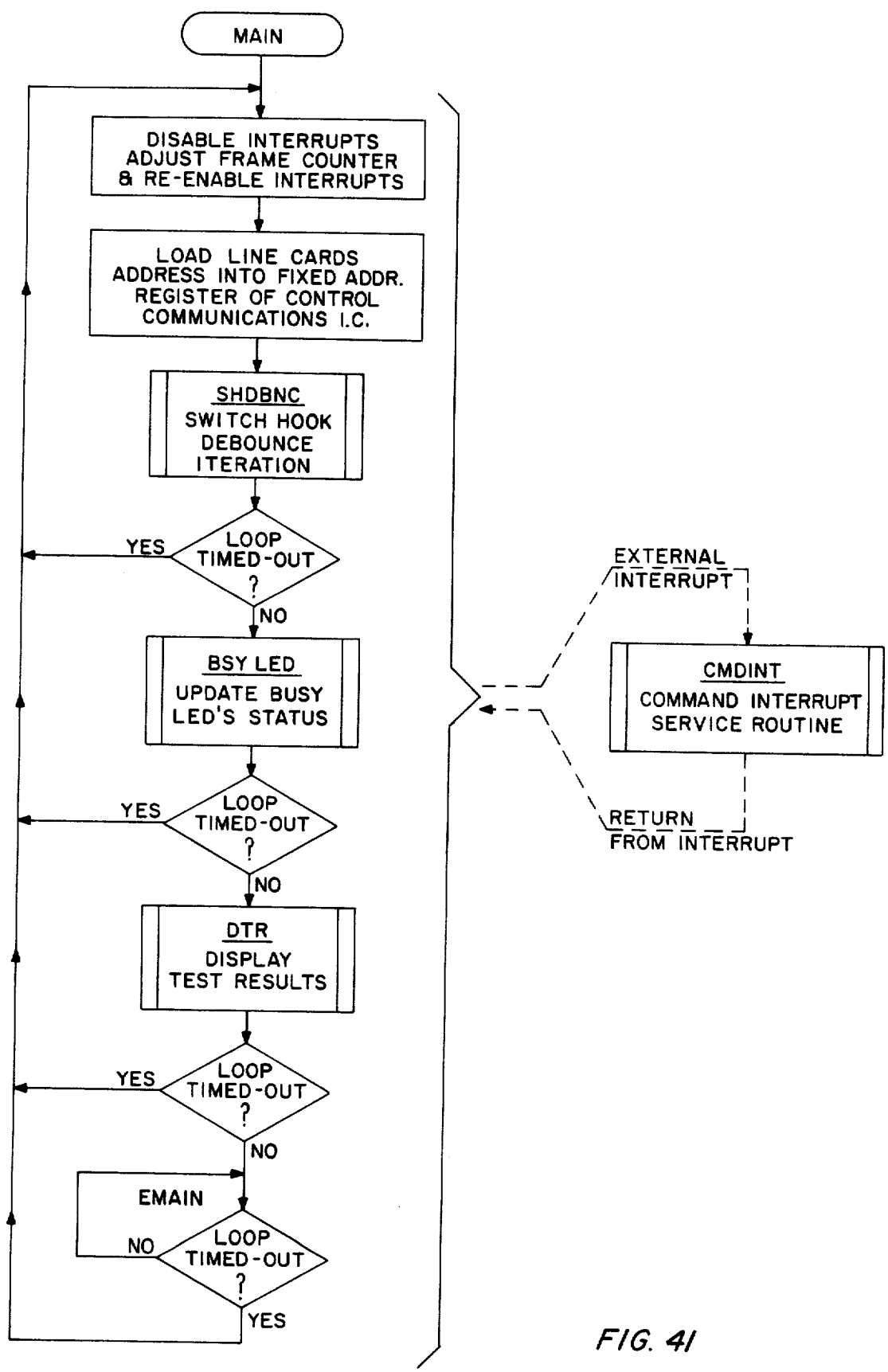
FIG. 41 is a flow chart of the software architecture of the line switch controller 7.
Figures 42, 42A, 42B:
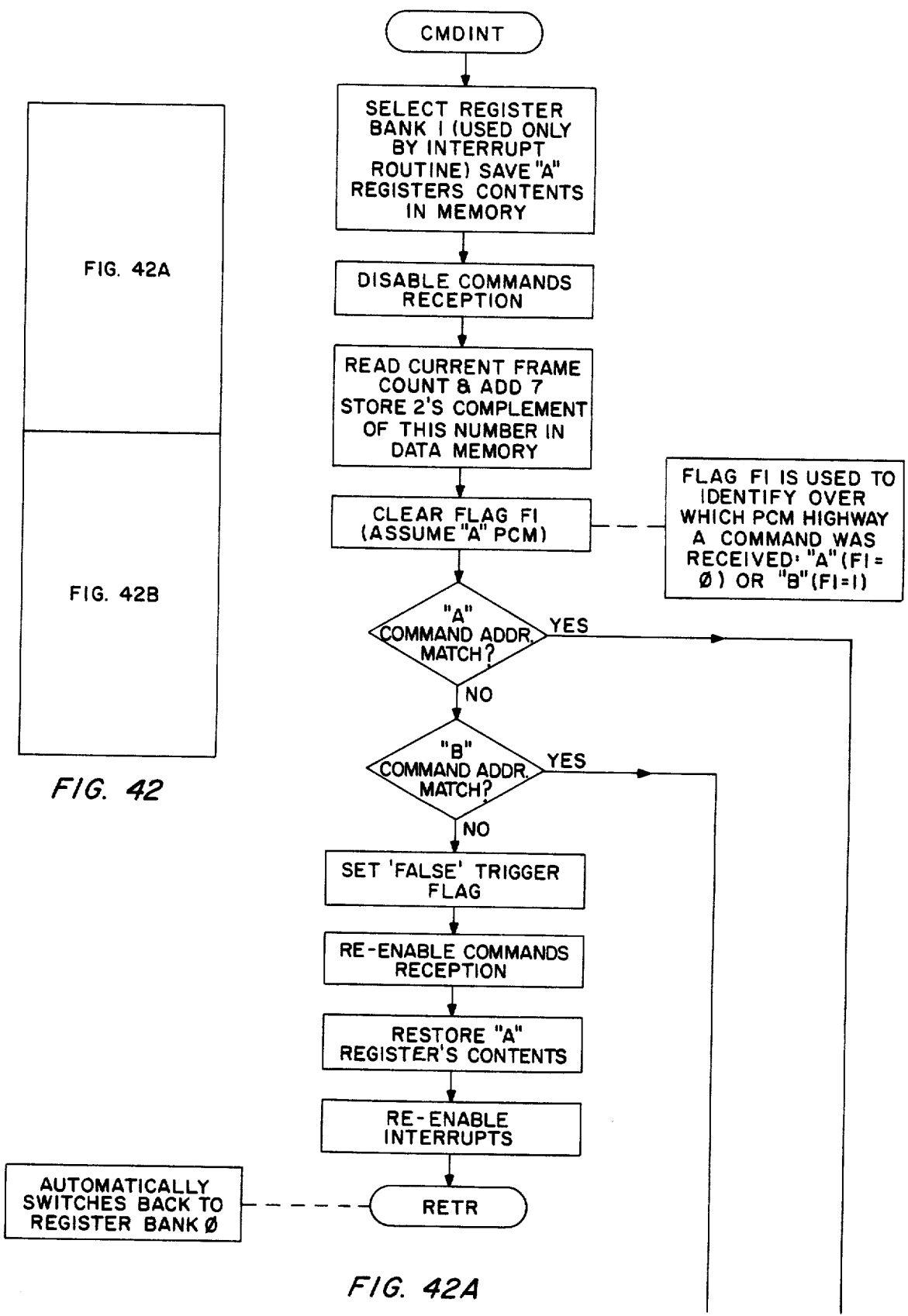
FIGS. 42A and 42B when arranged as shown in FIG. 42 and FIGS. 43A and 43B when arranged as shown in FIG. 43 are flow charts of programs for the line group processor 34.
Figure 42B:
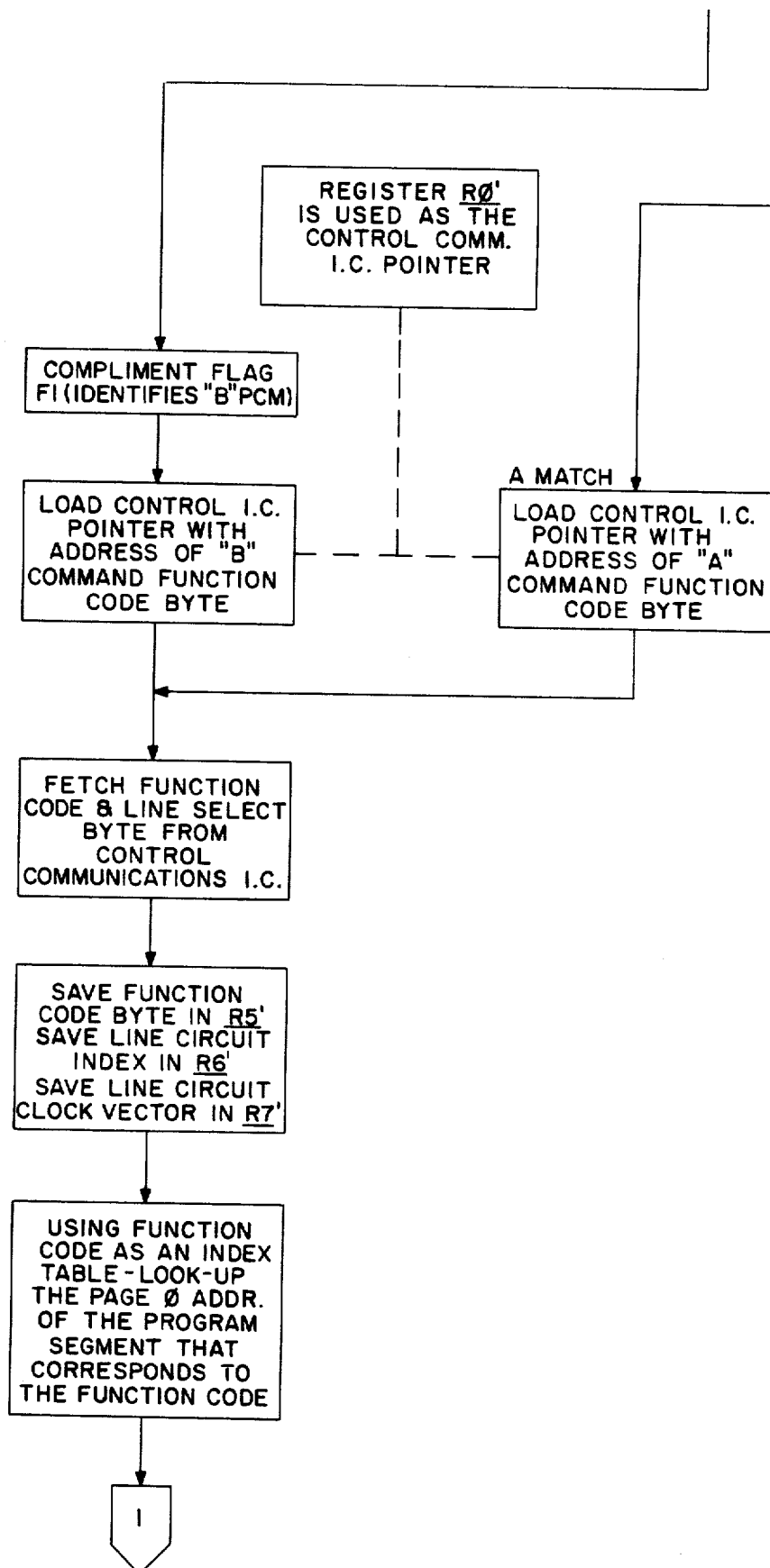
Figures 43, 43B:
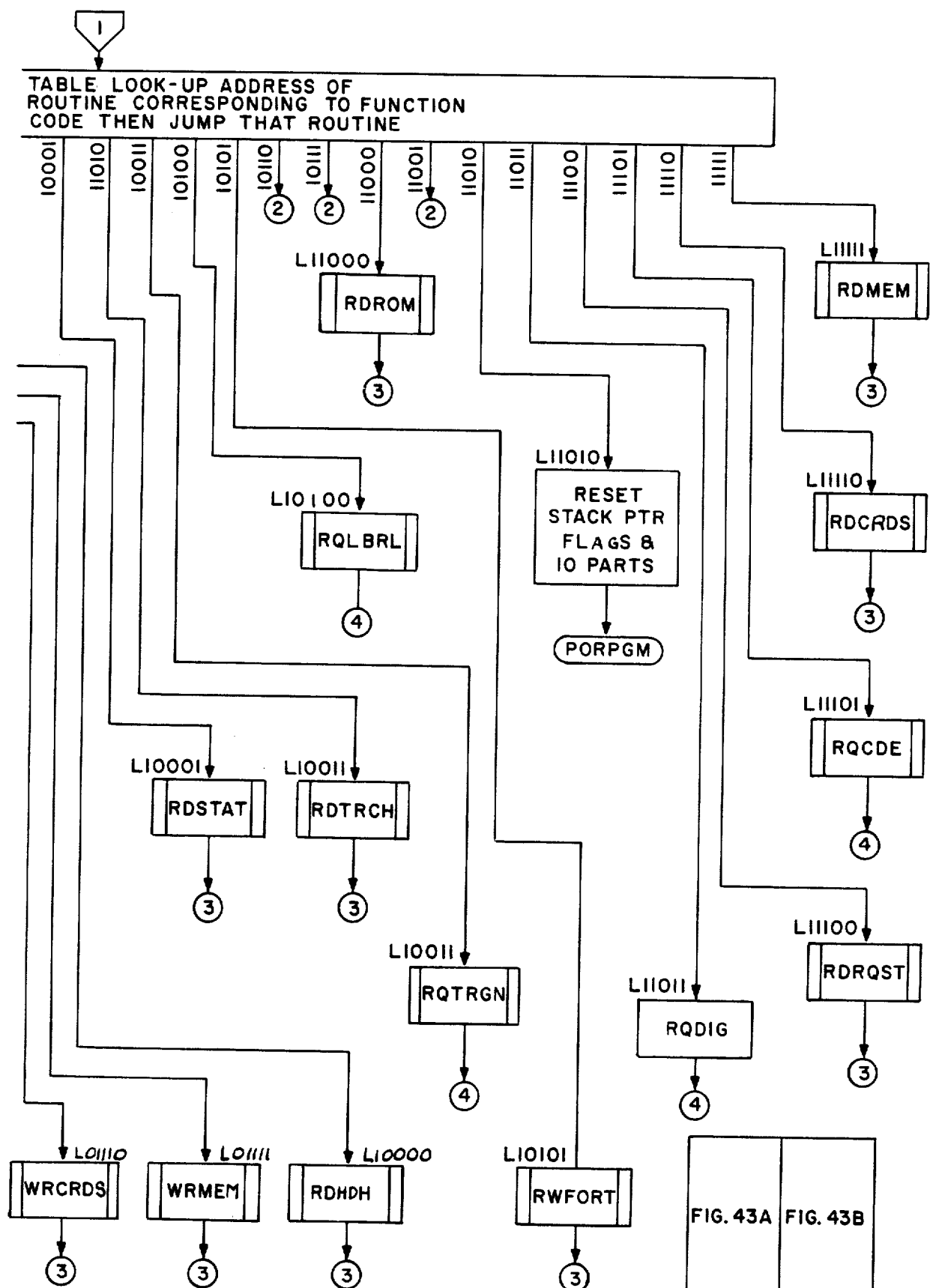
Figure 43A:
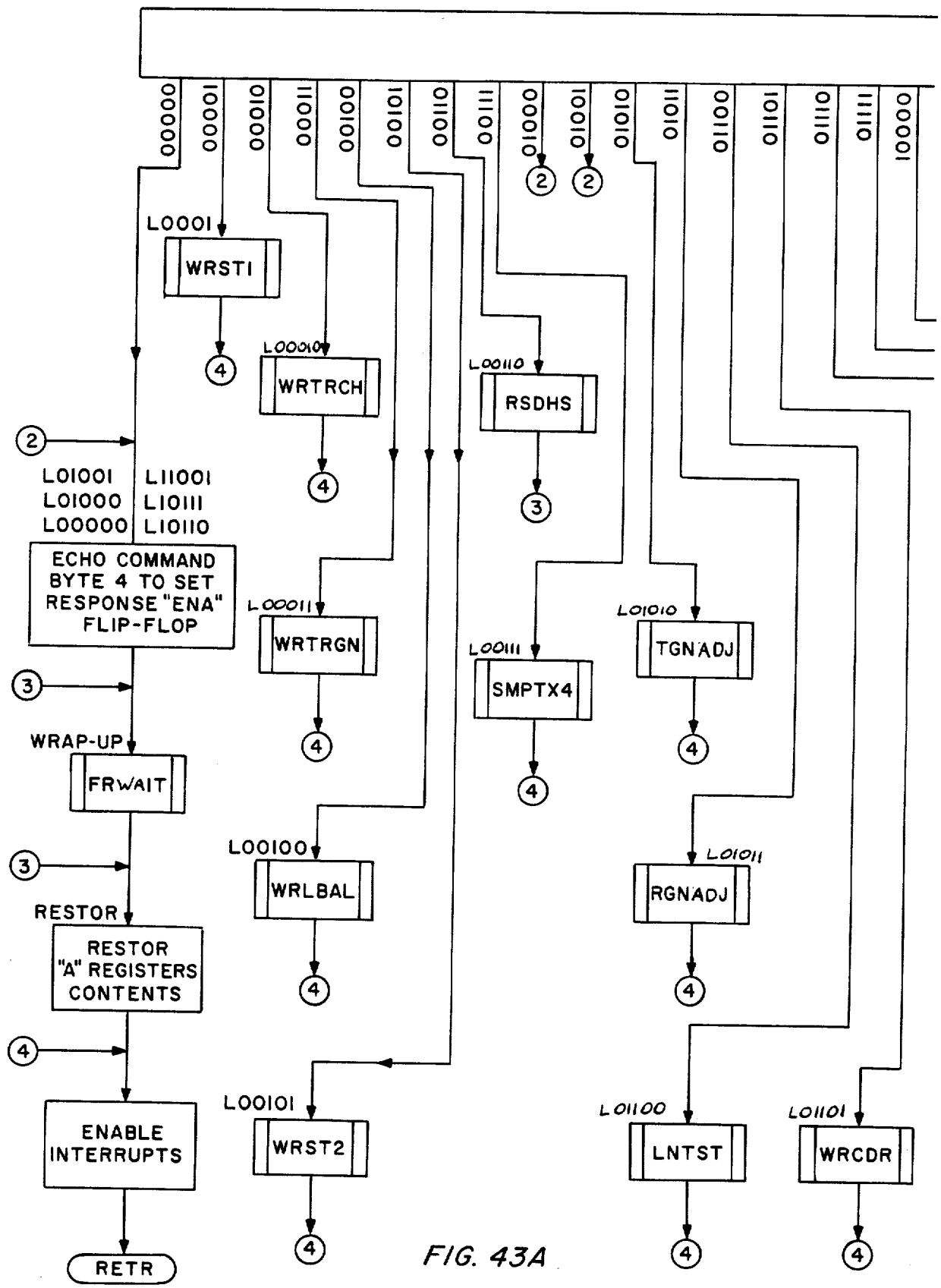

9.0 LINE GROUP PROCESSOR 34 (FIGS. 41, 42 and 43)

The line group processor 34 in the illustrative embodiment comprises an INTEL 8049 microprocessor which is described in the aforementioned INTEL reference at pages 8-31 to 8-35. FIG. 41 illustrates in flow chart form the main program loop of the software utilized in the illustrative embodiment. FIG. 42 illustrates the interrupt service routine of FIG. 41 in greater detail. FIG. 43 illustrates in flow chart form the table look-up addresses of various routines called by the command interrupt service routine. Program listings for the line group processor program are shown in the attached appendix.

CALL SET-UP (FIGS. 1, 2, 25)

When a subscriber line (A) goes off-hook, the line switch controller 7 of FIG. 2 transmits a common channel command to the system control 5 of FIG. 1 informing the system control 5 of a new sequence. The system control 5 responds by transmitting a common channel command to the line switch controller 7 assigning a PCM channel A and providing dial tone.

The line switch controller 7 transmits a channel assignment command (32 bit control word) to a line group processor 34 of FIG. 25. The line group processor 34 activates power to the line circuit for A, assigns transmit and receive channels at the CODEC for A, and updates the status of line circuit. The system control 5 will then monitor dial pulses from A.

When the system control 5 determines the called line (B), the system control 5 will transmit a common channel command to the line switch controller 7 of the line switch to which B is terminated. The line switch controller 7 will request the busy/idle status of B from the line group processor 34 associated with the group of lines including B. The line group processor 34 responds by transmitting B's busy/idle status to the line switch controller 7. If B is idle, the line switch controller 7 transmits the channel assignment to the line group processor 34. The line group processor 34 then enables power to B's line circuit, assigns the transmit and receive channels to B's CODEC, and updates the line circuit status.

9.1 RINGING AND CALL CONNECT (FIGS. 1, 2 and 25)

The system control 5 sends a common channel command to the second line switch controller 7 to connect ringing to B, and turns on a ring-back tone generator to provide ring-back tone to A. If A and B are both terminated at the same line switch, the system control 5 may also indicate an intra-line switch call. The second line switch control 7 sends ring commands to a ring circuit B of FIG. 2 and to the line group processor 34 for B. The line group processor 34 begins a ringing routine.

When B answers, the system control 5 sends a stop ringing command to the line switch controller 7. The line switch controller 7 in turn sends ring terminate command to the ring circuit 13 and line group processor 34. The line group processor 34 terminates the ring routine.

If the call is an intra-line switch call, the receive channels for A and B are switched upon commands from the line switch controller 7 to the line group processors 34.

9.2 CALL DISCONNECT (FIGS. 1, 2 and 25)

When A and B go on-hook, the system control 5 sends a common channels command to one of the line switch controllers 7 to release the line. The line switch controller in turn sends a disconnect command to the line group processor 34. The line group processor 34 removes power from the line circuit and updates the line circuit status. This procedure is repeated for the other party.

While we have described above the principles of our invention in connection with specific apparatus, it is to be clearly understood that this description is made only by way of example and not as a limitation to the scope of our invention as set forth in the objects thereof and in the accompanying claims.

APPENDIX

```
LOC  OBJ    LINE      SOURCE STATEMENT

1 ;      NAME      MASTER
             2
             3 ;
             4 ;
             5 ;
             6
             7 ;      MASTER -- SOFTWARE FOR THE ALS OCTAL LINE CARD CONTROLLER
             8
             9 $EJECT
            10
            11 ;      NAME      MEMMAP
            12
            13 ;
```

```
                14 ;
                15 ;
                16
0020            17  LNCRDS  EQU    20H    ; ADDR. OF 'LINE CARD STATUS BYTE'
                18
0021            19  HSW     EQU    21H    ; ADDR. OF 'HOOK SWITCH STATUS BYTE'
0022            20  DLTAHS  EQU    22H    ; ADDR. OF 'DELTA HOOK SWITCH STATUS BYTE'
0023            21  TMPDHS  EQU    23H    ; ADDR. OF 'TEMP. DLTA HOOK SWITCH'
0024            22  HSCNT   EQU    24H    ; ADDR. OF 'SWITCH HOOK DEBOUNCE ITERATION COUNTER'
                23
0025            24  RQFNCD  EQU    25H
0026            25  RQBYT1  EQU    26H
0027            26  RQBYT2  EQU    27H
                27
0028            28  RSPCNT  EQU    28H    ; ADDR. OF 'RESPONSE FRAME COUNT' BYTE
0029            29  ASAVE   EQU    29H    ; ADDR. OF 'A REG. SAVE AREA'
                30
002A            31  TESTR   EQU    2AH    ; ADDR. OF 'TEST RESULTS' BYTE
002B            32  TESTRC  EQU    2BH    ; ADDR. OF 'CDR TEST RESULTS'
002C            33  TESTRD  EQU    2CH    ; ADDR. OF 'DIGITAL I.C. TEST RESULTS'
002D            34  TESTRA  EQU    2DH    ; ADDR. OF 'ANALOG I.C. TEST RESULTS'
002E            35  GDCNT   EQU    2EH    ; ADDR. OF 'GOOD BOARD LED BLINK COUNTER'
002F            36  BLINKC  EQU    2FH    ; ADDR. OF 'LED BLINK COUNTER'
                37
0030            38  LCST1   EQU    30H    ; BASE ADDR. OF 'LINE CKT STATUS 1' BYTES
0038            39  LCST2   EQU    38H    ; BASE ADDR. OF 'LINE CKT STATUS 2' BYTES
0040            40  TXCH    EQU    40H    ; BASE ADDR. OF 'TX CHAN. ASSIGNMENTS'
0048            41  RXCH    EQU    48H    ; BASE ADDR. OF 'RX CHAN. ASSIGNMENTS'
0050            42  GNBAL   EQU    50H    ; BASE ADDR. OF GAIN & BALANCE SETTINGS
                43
0068            44  RELAYD  EQU    68H
0069            45  GNDEL   EQU    69H
006A            46  SHDCNT  EQU    6AH
006B            47  TEMP1   EQU    6BH
                48
                49  $EJECT
                50 ;************************************************
                51 ; CONTROL COMMUNICATIONS I.C. INTERNAL REGISTERS
                52 ;************************************************
0001            53  ACRB2   EQU    01H    ; 'A PCM' CONTROL SHIFT REG. BYTE 2 ADDRESS
0005            54  BCRB2   EQU    05H    ; 'B PCM' CONTROL SHIFT REG. BYTE 2 ADDRESS
0008            55  CFXADD  EQU    08H    ; ADDR. OF 'FIXED ADDRESS' REGISTER
000C            56  CSTS    EQU    0CH    ; ADDR. OF CONTROL COMM. I.C.'S STATUS REG.
000D            57  CMODE   EQU    0DH    ; ADDR. OF CONTROL COMM. I.C.'S MODE REG.
000E            58  CRP     EQU    0EH    ; ADDR. OF 'CONTROL REG. POINTER'
000F            59  ATCRP   EQU    0FH    ; ADDR. OF CONTROL S/R BYTE POINTED TO BY 'CRP'
                60
                61 ;************************************************
                62 ; LINE CIRCUIT COMMAND CODES (4-BIT CODE----BITS 7-4)
                63 ;************************************************
0000            64  WRDIG   EQU    00H    ; 'WRITE TO DIGITAL I.C. REG.' CODE (BITS 7-4)
0020            65  WRCDRC  EQU    20H    ; 'WRITE TO CODEC DATA REG.' CODE
0040            66  WRANA   EQU    40H    ; 'WRITE TO ANALOG I.C. REG.' CODE
0060            67  LDCDDC  EQU    60H    ; 'LOAD CODEC' CODE
0080            68  RDDIG   EQU    80H    ; 'READ DIG. I.C. REG.' CODE
00A0            69  RDCDR   EQU    0A0H   ; 'READ CODEC DATA REG.' CODE
```

```
00C8              70 RDANA  EQU    0C8H    ; 'READ ANALOG I.C. REG.' CODE
                  71
                  72 ;*********************************
                  73 ;               ; INITIALIZATION VALUES
                  74 ;*********************************
0018              75 IDIG   EQU    18H
00FF              76 ICODEC EQU    0FFH
0084              77 IANA1  EQU    84H
0000              78 IANA2  EQU    00H
0000              79 IANA3  EQU    00H
                  80
                  81 ;*********************************************
                  82 ; ADDRESS OF LAST BYTE OF 8049'S DATA MEMORY
                  83 ;*********************************************
007F              84 LSTBYT EQU    7FH
                  85
                  86 ;******************
                  87 ; RESPONSE DELAY
                  88 ;******************
0008              89 RSPNCD EQU    8      ; NUMBER OF FRAMES DELAY THAT RESPONSE
                  90                      ;   FOLLOWS COMMAND.
                  91
                  92 $EJECT
                  93
                  94 ;        NAME        PORPGM
                  95
                  96 ;
                  97 ;
                  98 ;
                  99
                 100 ; PORPGM -- POWER-ON RESET PROGRAM
                 101
                 102 ; ENTERED AFTER A POWER-ON OR MANUAL RESET
                 103
0000             104        ORG    0
                 105 RESET:
0000 C5          106        SEL    RB0     ; REG. BANK 0 IS USED EVERYWHERE EXCEPT IN
0001 6400        107        JMP    PORPGM  ;   INTERRUPT SERVICE ROUTINES.
                 108
0300             109        ORG    300H
                 110 PORPGM:
0300 15          111        DIS    I
                 112 ; INITIALIZE ALL LINE CIRCUITS
0301 54A6        113        CALL   LINERS
                 114
                 115 ; IS SELF-TEST TO BE SKIPPED (P23=0)?
0303 0A          116        IN     A,P2
0304 7211        117        JB3    POR1
                 118
                 119 ; SKIPPING SELF-TEST--------CLEAR TEST RESULTS BYTES
0306 B82D        120        MOV    R0,#TESTR+3
0308 B904        121        MOV    R1,#4
030A B000        122        MOV    @R0,#0
030C C8          123        DEC    R0
030D E90A        124        DJNZ   R1,$-3
```

```
030F 6413       125         JMP     STRET   ; RETURN TO PORPGM
                126
                127 POR1:
                128 ; PERFORM SELF-TEST OF LINE CARD HARDWARE
0311 C400       129         JMP     SLFTST
                130 STRET:          ; SELF-TEST ROUTINE'S RETURN ADDRESS
                131
                132 ; INITIALIZE DATA RAM
0313 7445       133         CALL    RAMRS
                134
                135 ; ENABLE RECEPTION OF COMMANDS FROM ALS CONTROLLER
0315 748F       136         CALL    CNTLRS
0317 1404       137         CALL    CNTLEN
                138
                139 ; INITIALIZE FRAME COUNTER BEFORE ENTERING 'MAIN'
0319 2318       140         MOV     A,#18H
031B 65         141         STOP    TCNT
031C 62         142         MOV     T,A
                143 ; ENTER MAIN LOOP
                144
                145 ;*** END OF PORPGM ***
                146 $EJECT
                147
                148 ;       NAME            MAIN
                149
                150 ;
                151 ;
                152 ;
                153
                154 MAIN:
031D C5         155         SEL     RB0
                156
                157 ;##############################################################
031E 15         158         DIS     I       ; DISABLE INTERRUPT WHILE FRAME COUNTER
031F 65         159         STOP    TCNT    ;   IS STOPPED
0320 42         160         MOV     A,T     ; READ CURRENT COUNTER VALUE AND SUBTRACT
                161                         ;   16 (DECIMAL) IN ORDER TO RESET THE
                162                         ;   COUNTER FOR THE 2 MILLISEC MAIN LOOP
                163                         ;   DELAY. (EQUIV. TO ADDING 0F0H MOD 256)
0321 03F0       164         ADD     A,#0F0H ; (ADDING 0F0H IS EQUIV. TO SUBTRACTING 10H
                165                         ;   IN MODULO 256 ARITHMETIC)
0323 62         166         MOV     T,A     ; LOAD NEW VALUE INTO COUNTER
                167 ;##############################################################
                168
0324 05         169         EN      I       ; RE-ENABLE INTERRUPTS NOW THAT COUNTER HAS
                170                         ;   BEEN RESTARTED.
0325 45         171         STRT    CNT     ; RESTART COUNTER
                172
                173 ; RE-LOAD LINE CARD'S FIXED ADDRESS INTO CONTOL COMM. I.C.
0326 9408       174         CALL    LDFXAD
                175
                176 ; PERFORM S/H DEBOUNCE ITERATION
0328 7498       177         CALL    SHDBNC
032A 7439       178         CALL    LOOPCK  ; CHECK FOR LOOP TIME-OUT
                179
                180 ; UPDATE LINE CARD 'BUSY INDICATION LED'
```

```
032C 7404      181       CALL    BSYLED
032E 7439      182       CALL    LOOPCK ; CHECK FOR LOOP TIME-OUT
               183
               184 ; SCAN TEST RESULTS REGISTERS FOR HARDWARE MALFUNCTION
               185 ; AND BLINK LED IF BOARD IS BAD.
0330 9454      186       CALL    DTR    ; DISPLAY TEST RESULTS SUBROUTINE
0332 7439      187       CALL    LOOPCK ; CHECK FOR LOOP TIME-OUT
               188
               189 $EJECT
               190
               191
               192 ;     OTHER MAIN LOOP SUBROUTINES WILL BE INSERTED HERE
               193
               194 ; END OF MAIN LOOP
               195 ; WAIT UNTIL 2 MS HAS ELAPSED BEFORE RESTARTING MAIN LOOP
               196 EMAIN:
0334 45        197       STRT    CNT
0335 7439      198       CALL    LOOPCK ; CHECK FOR LOOP TIME-OUT
               199
0337 6434      200       JMP     EMAIN
               201
               202 ; SUBROUTINE LOOPCK *****************************
               203 LOOPCK:
0339 42        204       MOV     A,T    ; READ FRAME COUNT
033A 03E8      205       ADD     A,#0E8H ; HAS FRAME COUNT EXCEEDED 18H (LOOP TIME-OUT VALUE)?
033C F63F      206       JC      $+3    ; IF CARRY OCCURRED, THEN LOOP HAS TIMED-OUT.
033E 83        207       RET            ; LOOP HAS NOT TIMED OUT——PERFORM NEXT OPERATION
               208
               209 ; LOOP HAS TIMED OUT——RESET STACK POINTER & RESTART MAIN LOOP
033F C7        210       MOV     A,PSW
0340 53F8      211       ANL     A,#0F8H ; CLEAR 'SP' BITS
0342 D7        212       MOV     PSW,A
0343 641D      213       JMP     MAIN
               214
               215 ; END OFF SUBROUTINE LOOPCK *******************
               216
               217 ;*** END OF MAIN ***
               218 $EJECT
               219
               220 ;     NAME            RAMRS
               221
               222 ;
               223 ;
               224 ;
               225
               226 ; RAMRS — INITIALIZES CONTENTS OF DATA RAM
               227
               228 RAMRS:
               229 ; INITIALIZE UNUSED PORTION OF RAM TO ZERO
0345 B87F      230       MOV     R0,#LSTBYT ; ADDR. OF LAST BYTE OF DATA RAM
0347 B918      231       MOV     R1,#18H ; (24 BYTES)
0349 B000      232       MOV     @R0,#0
034B C8        233       DEC     R0
034C E949      234       DJNZ    R1,$-3 ; REPEAT LAST 3 INSTRUCTIONS UNTIL R1=0
               235
               236 ; INITIALIZE GAIN & BALANCE SETTINGS BYTES
```

```
034E B908      237         MOV    R1,#8
               238
0350 2304      239 RAMRS3: MOV    A,#IANA1
0352 A0        240         MOV    @R0,A
0353 C8        241         DEC    R0
0354 2300      242         MOV    A,#IANA2
0356 A0        243         MOV    @R0,A
0357 C8        244         DEC    R0
0358 2300      245         MOV    A,#IANA3
035A A0        246         MOV    @R0,A
035B C8        247         DEC    R0
035C E950      248         DJNZ   R1,RAMRS3
               249
               250 ; INITIALIZE CHANNEL ASSIGNMENT BYTES
035E B910      251         MOV    R1,#10H
0360 B03F      252 RAMRS4: MOV    @R0,#3FH
0362 C8        253         DEC    R0
0363 E960      254         DJNZ   R1,RAMRS4     ; REPEAT LAST 3 INSTRUCTIONS UNTIL R1=0
               255
               256 ; INITIALIZE 'LC STATUS 2' BYTES TO 00000000B
0365 B908      257         MOV    R1,#8
               258
0367 B000      259 RAMRS5: MOV    @R0,#0
0369 C8        260         DEC    R0
036A E967      261         DJNZ   R1,RAMRS5
               262
               263 $EJECT
               264 ; INITIALIZE 'LC STATUS 1' BYTES TO 00011000B
036C B908      265         MOV    R1,#8
               266
036E B018      267 RAMRS6: MOV    @R0,#IDIG
0370 C8        268         DEC    R0
0371 E96E      269         DJNZ   R1,RAMRS6
               270
               271 ; INITIALIZE 'GOOD BOARD LED BLINK COUNTER'
0373 B82E      272         MOV    R0,#GDCNT
0375 B002      273         MOV    @R0,#2
0377 B82F      274         MOV    R0,#BLINKC
0379 B000      275         MOV    @R0,#0
               276
               277 ; RESET 'LNCRDS', 'HSW', 'DLTAHS', ... , 'ASAVE' (20H-29H)
037B B829      278         MOV    R0,#29H
037D B90A      279         MOV    R1,#10
               280
037F B000      281 RAMRS7: MOV    @R0,#0
0381 C8        282         DEC    R0
0382 E97F      283         DJNZ   R1,RAMRS7
               284
               285 ; INITIALIZE RELAY DEBOUNCE DELAY & GAIN SET DELAY BYTES
0384 B868      286         MOV    R0,#RELAYD
0386 B032      287         MOV    @R0,#50 ; 50 MILLISEC DEFAULT RELAY DEBOUNCE DELAY
0388 18        288         INC    R0
0389 B005      289         MOV    @R0,#5  ; 5 MILLISEC DEFAULT GAIN ADJ. DELAY
               290
               291 ; INITIALIZE S/H DEBOUNCE CYCLE ITERATION COUNT
```

```
038B 18        292         INC     R0
038C B014      293         MOV     @R0,#20  ; DEFAULTS TO 20 ITERATIONS
               294
038E 83        295         RET
               296
               297 ;*** END OF RAMPS ***
               298 $EJECT
               299
               300 ;       NAME            CNTLRS
               301
               302 ;
               303 ;
               304 ;
               305
               306
               307 ; CNTLRS -- CONTROL PROTOCOL I.C. INITIALIZATION ROUTINE
               308
               309 ; INITIALIZES MODE REG., CRP, & FIXED ADDR.
               310
               311 CNTLRS:
               312 ; INITIALIZE MODE REGISTER
039F B80D      313         MOV     R0,#CMODE ; ADDR. OF MODE REG.
0391 2303      314         MOV     A,#03H   ; 'B COMP ENA' & 'A COMP ENA' = 1
0393 90        315         MOVX    @R0,A
               316
               317 ; CLEAR CRP (CONTROL REGISTER POINTER)
0394 B80E      318         MOV     R0,#CRP  ; ADDR. OF 'CNTRL REG POINTER'
0396 27        319         CLR     A
0397 90        320         MOVX    @R0,A
               321
               322 ; LOAD FIXED ADDRESS
0398 9480      323         CALL    LDFXAD
               324
039A 83        325         RET
               326
               327 ;*** END OF CNTLRS ***
               328 $EJECT
               329
               330 ;       NAME            SHDBNC
               331
               332 ;
               333 ;
               334 ;
               335
               336 ; SHDBNC -- SWITCH-HOOK DEBOUNCE SUBROUTINE
               337
               338 SHDBNC:
               339 ; READ CURRENT S/H DEBOUNCE ITERATION COUNTER TO SEE IF
               340 ;   DEBOUNCING IS CURRENTLY IN PROGRESS.
039B B824      341         MOV     R0,#HSCNT
039D F0        342         MOV     A,@R0           ; READ 'HOOK STATUS COUNTER'
039E 96AF      343         JNZ     SHLOOP
               344
               345 ; TEST FOR ANY CHANGES OF S/H VALUES (COMPARED) TO THE CURRENT
               346 ;   STORED VALUES OF 'HOOK SWITCH STATUS')
03A0 B921      347         MOV     R1,#HSW
```

```
03A2 09        348       IN     A,P1         ; READ S/H VECTOR FROM PORT 1
03A3 D1        349       XRL    A,@R1        ; 'TMPDHS'=S/H VECTOR 'XOR' HOOK STATUS
03A4 B923      350       MOV    R1,#TMPDHS
03A6 A1        351       MOV    @R1,A        ; STORE TMPDHS
03A7 96AA      352       JNZ    SHNEW
03A9 93        353       RETR
               354
               355 SHNEW:
               356 ; AT LEAST ONE S/H LINE HAS CHANGED STATUS----START DEBOUNCING ITERATIONS
               357 ; INITIALIZE ITERATION COUNTER
03AA B96A      358       MOV    R1,#SHDCNT
03AC F1        359       MOV    A,@R1
03AD A0        360       MOV    @R0,A
03AE 93        361       RETR
               362
               363 SHLOOP:
               364 ; NORMAL S/H DEBOUNCE ITERATION SEQUENCE
03AF B921      365       MOV    R1,#HSW
03B1 09        366       IN     A,P1
03B2 D1        367       XRL    A,@R1        ; 'TMPDHS'=S/H VECTOR 'XOR' HOOK STATUS
               368
               369 ; 'AND' THE CURRENT VALUE OF 'TMPDHS' WITH THE LAST VALUE OF 'TMPDHS'
               370 ;   IF THE RESULT IS ZERO THEN ABORT THE DEBOUNCING
03B3 B923      371       MOV    R1,#TMPDHS
03B5 51        372       ANL    A,@R1
03B6 A1        373       MOV    @R1,A
03B7 AA        374       MOV    R2,A         ; SAVE 'TMPDHS' VALUE IN R2
03B8 C6C0      375       JZ     ABORT
               376
               377 $EJECT
               378 ; HAVE ALL ITERATIONS BEEN PERFORMED?
03BA F0        379       MOV    A,@R0
03BB 07        380       DEC    A            ; DECREMENT ITERATION COUNTER & TEST FOR ZERO
03BC A0        381       MOV    @R0,A
03BD C6C3      382       JZ     DONE
03BF 93        383       RETR
               384
               385 ABORT:
               386 ; RESET S/H DEBOUNCE ITERATION COUNTER
03C0 B000      387       MOV    @R0,#0       ; RESET 'HSCNT' TO ZERO
03C2 93        388       RETR
               389
               390 DONE:
               391 ; UPDATE CURRENT VALUES OF 'HOOK SWITCH STATUS' & 'DELTA HOOK STATUS'
03C3 FA        392       MOV    A,R2         ; FETCH 'TMPDHS' VALUE
03C4 B921      393       MOV    R1,#HSW
03C6 D1        394       XRL    A,@R1        ; UPDATE &
03C7 A1        395       MOV    @R1,A        ;  SAVE HOOKSW
03C8 B922      396       MOV    R1,#DLTAHS
03CA FA        397       MOV    A,R2
03CB 41        398       ORL    A,@R1        ; UPDATE &
03CC A1        399       MOV    @R1,A        ;  SAVE DLTAHS
03CD B928      400       MOV    R1,#LNCRDS
03CF F1        401       MOV    A,@R1
03D0 4301      402       ORL    A,#01H       ; SET "OR'D DELTA H/S" BIT OF 'LNCRDS'
03D2 A1        403       MOV    @R1,A
```

```
                    404
03D3 93             405         RETR
                    406
                    407 ;*** END OF SHDENC ***
                    408 $EJECT
                    409
                    410 ;       NAME            BSYLED
                    411
                    412 ;
                    413 ;
                    414 ;
                    415
                    416 ;  BSYLED -- LINE CARD 'BUSY INDICATE LED' UPDATE ROUTINE
                    417
                    418 BSYLED:
03D4 B838           419         MOV     R0,#LCST2   ; ADDR. OF 'LC STATUS 2' BYTE
03D6 BA08           420         MOV     R2,#8
                    421
                    422 ; IF ANY OF THE LINE CIRCUITS ARE BUSY TURN-ON 'BUSY LED'
                    423
                    424 BLED1:
03D8 F0             425         MOV     A,@R0
03D9 F2E1           426         JB7     BLED2
03DB 18             427         INC     R0
03DC EAD8           428         DJNZ    R2,BLED1    ; IF COUNT#0, CHECK NEXT LINE CKT BUSY STATUS
                    429
                    430 ; NO LINES BUSY ----- TURN-OFF 'BUSY LED'
                    431
03DE 9AEF           432         ANL     P2,#0EFH    ; TURN-OFF 'BUSY INDICATE LED' (P24)
                    433                             ;     & RETURN TO MAIN LOOP
03E0 93             434         RETR
                    435
                    436 BLED2:
                    437
                    438 ; AT LEAST ONE LINE IS BUSY ----- TURN-ON 'BUSY LED'
                    439
03E1 8A10           440         ORL     P2,#10H     ; TURN-ON 'BUSY INDICATE LED' (P24)
                    441                             ;     & RETURN TO MAIN LOOP
                    442
03E3 93             443         RETR
                    444
                    445 ;*** END OF BSYLED ***
                    446 $EJECT
                    447
                    448 ;       NAME            RTNSH
                    449
                    450 ;
                    451 ;
                    452 ;
                    453
                    454
                    455 ;   RTNSH -- RETURN SWITCH HOOK: SENDS RETURN S/H COMMAND
                    456 ;                    TO ALL LINE CIRCUITS ON THE CARD.
                    457
                    458 RTNSH:
03E4 8A40           459         ORL     P2,#40H         ; SET 'DATA' LINE TO 1
```

```
03E6 9A7F      460          ANL     P2,#07FH    ; SET 'CMD ENA BAR' TO 0
03E8 9900      461          ANL     P1,#0       ; PULSE CLOCK LINES LOW
03EA 89FF      462          ORL     P1,#0FFH    ;    THEN HIGH
03EC 8A80      463          ORL     P2,#80H ; SET 'CMD ENA BAR' TO 1 TO RETURN S/H
               464 ;                                   ON CLK/SH(7:0)
               465
03EE 83        466          RET
               467
               468 ;*** END OF RTNSH ***
               469 $EJECT
               470
               471 ;       NAME            CLKVCT
               472
               473 ; CLKVCT — CLOCK VECTOR LOOK-UP TABLE
               474
               475 CLKVCT:
03EF FE        476          DB      11111110B
03F0 FD        477          DB      11111101B
03F1 FB        478          DB      11111011B
03F2 F7        479          DB      11110111B
03F3 EF        480          DB      11101111B
03F4 DF        481          DB      11011111B
03F5 BF        482          DB      10111111B
03F6 7F        483          DB      01111111B
               484
               485
               486 ;*** END OF CLKVCT ***
               487 $EJECT
               488
               489 ;       NAME            TIMINT
               490
               491 ; TIMINT — TIMER INTERRUPT SERVICE ROUTINE
               492
0007           493          ORG     7
               494 TIMINT:
0007 93        495          RETR
0008 00        496          NOP
               497
               498 ;*** END OF TIMINT ***
               499 $EJECT
               500
               501 ;       NAME            CMDINT
               502
               503 ;
               504 ;
               505 ;
               506
               507 ; CMDINT — COMMAND INTERRUPT SERVICE ROUTINE
               508
0003           509          ORG     3
               510 CMDINT:
0003 D5        511          SEL     RB1
0004 45        512          STRT    CNT
0005 0409      513          JMP     ICMT    ; SKIP OVER 'TIMER INTERRUPT' VECTOR LOCATION (7-8)
               514
0009           515          ORG     9
```

```
                516 ICONT:
                517 ; SAVE 'A' REGISTER'S CONTENTS
0009 B929       518        MOV     R1,#ASAVE
000B A1         519        MOV     @R1,A      ; SAVE CONTENTS OF 'A' REG.
                520
                521 ; DISABLE COMMANDS RECEPTION
000C B880       522        MOV     R0,#CMODE
000E 2303       523        MOV     A,#03H
0010 90         524        MOVX    @R0,A      ; DISABLE COMMANDS RECEPTION CIRCUITRY
                525
                526 ; CALCULATE AND SAVE 2'S COMPLEMENT OF RESPONSE FRAME COUNT.
0011 42         527        MOV     A,T
0012 0307       528        ADD     A,#(RSPNCD-1)
0014 37         529        CPL     A
0015 17         530        INC     A          ; 2'S COMP. IN A REG.
0016 C9         531        DEC     R1         ; R1 NOW POINTS TO 'RESPONSE COUNT' SAVE AREA
0017 A1         532        MOV     @R1,A
                533
                534 ; CLEAR FLAG F1 (ASSUME COMMAND RECEIVED OVER "A" PCM HIGHWAY)
                535 ; (F1 = A BAR/B)
0018 A5         536        CLR     F1
                537
0019 C8         538        DEC     R0         ; R0 POINTS TO CNTRL STATUS BYTE
001A 80         539        MOVX    A,@R0      ; FETCH STATUS INFO.
001B 1228       540        JB0     AMATCH
001D 3223       541        JB1     BMATCH
                542
                543 ; NEITHER ADDRESS COMPARATOR FLAG ---
                544 ;    ***** CONTROL COMMUNICATONS I.C. HARDWARE ERROR *****
001F D4C7       545        CALL    CFAIL
0021 04AF       546        JMP     RESTOR
                547
                548 $EJECT
                549 BMATCH:
                550 ; SET FLAG F1 (IDENTIFY "B" PCM HIGHWAY AS SOURCE OF COMMAND)
0023 B5         551        CPL     F1
0024 B885       552        MOV     R0,#BCRB2  ; LOAD R0 WITH ADDR. OFF "B" COMMAND BYTE 2
0026 042A       553        JMP     $+4        ; SKIP OVER NEXT INSTRUCTION
                554
0028 B881       555 AMATCH: MOV   R0,#ACRB2  ; LOAD R0 WITH ADDR. OF "A" COMMAND BYTE 2
                556
                557 ; FETCH FUNCTION CODE & LINE SELECT BYTE FROM COMMAND REG.
                558 ; AND SAVE IN R5.
002A 80         559        MOVX    A,@R0      ; FETCH FUNCTION CODE BYTE
002B AD         560        MOV     R5,A       ;   & SAVE IN R5
                561
                562 ; SAVE LINE CIRCUIT INDEX IN R6.
002C 5307       563        ANL     A,#07H     ; MASK OFF FUNCTIN BITS
002E AE         564        MOV     R6,A       ;   & SAVE 'LINE CKT. INDEX' IN R6
                565
                566 ; CALCULATE LINE CIRCUIT'S CLOCK VECTOR AND SAVE IN R7.
                567 ;      ('CLOCK VECTOR' LOOK-UP TABLE RESIDES IN PROG. MEM. PAGE 3)
002F 03EF       568        ADD     A,#(LOW CLKVCT)
0031 E3         569        MOVP3   A,@A       ; TABLE LOOK-UP 'CLOCK VECTOR' &
0032 AF         570        MOV     R7,A       ;   SAVE 'CLOCK VECTOR' IN R7
                571
```

```
                572 ; INCREMENT POINTER TO POINT AT COMMAND/RESPONSE DATA BYTE 1
0033 18         573         INC     R0
                574
                575
                576 ; DECODE 'FUNCTION CODE' BY USING 'FUNCTION CODE' AS AN INDEX TO
                577 ;   THE 'FUNCTION CODE' JUMP TABLE
                578
0034 FD         579         MOV     A,R5
0035 77         580         RR      A
0036 77         581         RR      A
0037 77         582         RR      A           ; FUNCTION CODE BITS IN LSB POSITIONS
0038 531F       583         ANL     A,#1FH      ; MASK OFF LINE CKT. SELECT BITS
003A 0384       584         ADD     A,#FNCODE   ; ADD FUNCTION CODE JUMP TABLE BASE ADDR.
003C B3         585         JMPP    @A          ; JUMP TO FUNCTION CODE'S SERVICE ROUTINE
                586
                587 ; ASSIGNMENT OF WORKING REGISTERS AT THIS POINT IS:
                588 ;   R0      POINTS TO BYTE 3 OF THE COMMAND/RESPONSE S/R
                589 ;   R1      GEN. PURPOSE POINTER
                590 ;   R2      GEN. PURPOSE
                591 ;   R3      GEN. PURPOSE
                592 ;   R4      GEN. PURPOSE
                593 ;   R5      CONTAINS COMMAND FUNCTION CODE
                594 ;   R6      CONTAINS LINE CKT. INDEX
                595 ;   R7      CONTAINS LINE CKT. 'CLOCK VECTOR'
                596 ;ZZZZZZZZZZZZZZZZZZZZZZZZZZZZZZZZZZZZZZZZZZZZZZZZZZZZZZZZZZ
                597 $EJECT
003D 3400       598 L00001: CALL    WRST1       ; 'WRITE LINE CIRCUIT STATUS 1'
003F 04AF       599         JMP     RESTOR
                600
0041 3438       601 L00010: CALL    WRTRCH      ; 'WRITE TX & RX CHAN. ASSIGNMENTS'
0043 04AF       602         JMP     RESTOR
                603
0045 3486       604 L00011: CALL    WRTRGN      ; 'WRITE TX & RX GAIN SETTINGS'
0047 04AF       605         JMP     RESTOR
                606
0049 34AA       607 L00100: CALL    WRLBAL      ; 'WRITE LINE BALANCE SETTING BYTE'
004B 04AF       608         JMP     RESTOR
                609
004D 34B5       610 L00101: CALL    WRST2       ; 'WRITE LINE CIRCUIT STATUS 2'
004F 04AF       611         JMP     RESTOR
                612
0051 94AC       613 L00110: CALL    RSDHS       ; RESET 'DELTA HOOK STATUS' BIT
0053 04AD       614         JMP     WRAPUP
                615
0055 94B0       616 L00111: CALL    SMPTX4      ; SAMPLE TX CH. 4
0057 04AF       617         JMP     RESTOR
                618
0059 B442       619 L01010: CALL    TGNADJ      ; TX GAIN AUTOMATIC ADJUSTMENT
005B 04AF       620         JMP     RESTOR
                621
005D B400       622 L01011: CALL    RGNADJ      ; RX GAIN AUTOMATIC ADJUSTMENT
005F 04AF       623         JMP     RESTOR
                624
0061 9495       625 L01100: CALL    LNTST       ; TEST SPECIFIED LINE CKT.
0063 04AF       626         JMP     RESTOR
```

```
                627
0065 5480       628 L01101: CALL    WRCDR   ; 'WRITE BYTE INTO CODEC CONTROL REG.'
0067 84AF       629         JMP     RESTOR
                630
0069 5418       631 L01110: CALL    WRCRDS  ; 'UPDATE SPECIFIED BITS OF LINE CARD STATUS'
006B 84AD       632         JMP     WRAPUP
                633
006D 5406       634 L01111: CALL    WRMEM   ; 'WRITE BYTE INTO DATA MEMORY'
006F 84AD       635         JMP     WRAPUP
                636
0071 542A       637 L10000: CALL    RDHDHS  ; 'READ "HOOK STATUS" & "DELTA HOOK STATUS"'
0073 84AD       638         JMP     WRAPUP
                639
0075 34EE       640 L10001: CALL    RDSTAT  ; 'READ LINE CIRCUIT STATUS BYTE'
0077 84AD       641         JMP     WRAPUP
                642
0079 5433       643 L10010: CALL    RDTRCH  ; 'READ TX & RX CHANNEL ASSIGNMENTS'
007B 84AD       644         JMP     WRAPUP  ;   (AS STORED IN DATA MEMORY)
                645
007D 5441       646 L10011: CALL    RQTRGN  ; 'REQUEST TX & RX GAIN SETTINGS DATA'
007F 84AF       647         JMP     RESTOR
                648
                649 $EJECT
0081 5458       650 L10100: CALL    RQLBAL  ; 'REQUEST LINE BALANCE SETTING DATA'
0083 84AF       651         JMP     RESTOR
                652
0085 54E8       653 L10101: CALL    RWPORT  ; READ/WRITE I/O PORTS 1 & 2
0087 84AD       654         JMP     WRAPUP
                655
0089 94CF       656 L11000: CALL    RDROM   ; 'READ BYTE OF PROGRAM MEMORY'
008B 84AD       657         JMP     WRAPUP
                658
008D 27         659 L11010: CLR     A       ; 'COMMAND RESET'--RESTARTS OLC CTR SOFTWARE
008E D7         660         MOV     PSW,A   ; RESET FLAGS & STACK POINTER
008F 65         661         STOP    TCNT
0090 E5         662         SEL     MB0
0091 37         663         CPL     A
0092 39         664         OUTL    P1,A
0093 3A         665         OUTL    P2,A
0094 0400       666         JMP     RESET
                667
0096 546E       668 L11011: CALL    RQDIG   ; 'REQUEST DIGITAL PER-LINE CHIP CONTENTS'
0098 84AF       669         JMP     RESTOR
                670
009A 5480       671 L11100: CALL    RDRQST  ; 'READ REQUESTED DATA'
009C 84AD       672         JMP     WRAPUP
                673
009E 548C       674 L11101: CALL    RQCDR   ; 'REQUEST CODEC DATA REG.' ROUTINE
00A0 84AF       675         JMP     RESTOR
                676
00A2 549E       677 L11110: CALL    RDCRDS  ; 'READ CARD STATUS' ROUTINE
00A4 84AD       678         JMP     WRAPUP
                679
00A6 5400       680 L11111: CALL    RDMEM   ; 'READ BYTE OF DATA MEMORY' ROUTINE
00A8 84AD       681         JMP     WRAPUP
```

```
682 ;////////////////////////////////////////////////
683 L00000:                    ; 'NO OPERATION COMMAND'
684
685 ; UNDEFINED FUNCTION CODES------TREATED AS NO-OPS
686 L01000:
687 L01001:
688 L10110:
689 L10111:
690 L11001:
00AA 18        691         INC     R0      ; FUNCTION CODE IS UNDEFINED----ECHO BYTE 4
00AB 80        692         MOVX    A,@R0   ;    TO SET 'RESPONSE ENA' FLIP-FLOP
00AC 90        693         MOVX    @R0,A
               694
               695 $EJECT
               696
               697 WRAPUP:
               698 ; WAIT FOR FRAME COUNT TO REACH RESPONSE FRAME COUNT-1
00AD 14E4      699         CALL    FRWAIT
               700 RESTOR:
               701 ; RESTORE 'A' REGISTER'S CONTENTS
00AF 8929      702         MOV     R1,#ASAVE
00B1 F1        703         MOV     A,@R1   ; RESTORE 'A' REG. CONTENTS
               704
               705 ; RE-ENABLE INTERRUPTS
00B2 05        706         EN      I
               707
               708 ; RETURN TO INTERRUPTED ROUTINE AT THE POINT WHERE
               709 ; INTERRUPTED AFTER RESTORING STATUS (CARRY FLAG, AUX. CARRY,
               710 ; FLAG F0, REG. BANK SELECT)
00B3 93        711         RETR
               712
               713 ;*** END OF CMDINT ***
               714 $EJECT
               715
               716 ;       NAME            FNCODE
               717
               718 ; FNCODE — FUNCTION CODE SERVICE ROUTINE ADDRESS LOOK-UP TABLE
               719
               720 FNCODE:
00B4 AA        721         DB      L00000, L00001, L00010, L00011
00B5 3D
00B6 41
00B7 45
00B8 49        722         DB      L00100, L00101, L00110, L00111
00B9 4D
00BA 51
00BB 55
00BC AA        723         DB      L01000, L01001, L01010, L01011
00BD AA
00BE 59
00BF 5D
00C0 61        724         DB      L01100, L01101, L01110, L01111
00C1 65
00C2 69
00C3 6D
00C4 71        725         DB      L10000, L10001, L10010, L10011
```

```
00C5 75
00C6 79
00C7 7D
00C8 81      726         DB      L10100, L10101, L10110, L10111
00C9 85
00CA AA
00CB AA
00CC 89      727         DB      L11000, L11001, L11010, L11011
00CD AA
00CE 8D
00CF 96
00D0 9A      728         DB      L11100, L11101, L11110, L11111
00D1 9E
00D2 A2
00D3 A6
             729
             730 ;*** END OF FNCODE ***
             731 $EJECT
             732
             733 ;         NAME           CNTLEN
             734
             735 ;
             736 ;
             737 ;
             738
             739 ; CNTLEN -- ENABLE CUSTOM CONTROL COMM. I.C. FOR COMMANDS RECEPTION
             740
             741 CNTLEN:
             742 ; WAIT UNTIL 'CONTROL WINDOW' HAS PASSED
00D4 45      743         STRT    CNT     ; START FRAME COUNTER
00D5 42      744         MOV     A,T
00D6 37      745         CPL     A
00D7 07      746         DEC     A       ; 2'S COMPLEMENT OF STARTING FRAME COUNT
00D8 A9      747         MOV     R1,A
             748
00D9 42      749 CNTLE1: MOV     A,T
00DA 69      750         ADD     A,R1
00DB 96D9    751         JNZ     CNTLE1  ; LOOP UNTIL STARTING FRAME BEGINS
             752
             753 ; ENABLE COMMANDS RECEPTION
00DD B980    754         MOV     R1,#CMODE
00DF 81      755         MOVX    A,@R1
00E0 4304    756         ORL     A,#04H  ; SET 'CNTRL RX ENA'
00E2 91      757         MOVX    @R1,A
00E3 83      758         RET
             759
             760 FRWAIT:
             761 ; CHECK TO SEE IF FRAME COUNT HAS REACHED OR EXCEEDED THE
             762 ; RESPONSE FRAME COUNT.
00E4 B928    763         MOV     R1,#RSPCNT
00E6 F1      764         MOV     A,@R1   ; FETCH RESPONSE COUNT REFERENCE BYTE
00E7 A9      765         MOV     R1,A    ; & PUT IN R1
00E8 42      766         MOV     A,T
00E9 69      767         ADD     A,R1
00EA F6EE    768         JC      TOOLAT
```

```
00EC 04D9     769           JMP     CNTLE1
              770
              771 TOOLAT:
              772 ; RESET 'RESPONSE ENABLE FLIP-FLOP' IN CONTROL COMM. I.C.
00EE B980     773           MOV     R1,#CMODE
00F0 81       774           MOVX    A,@R1
00F1 4308     775           ORL     A,#08H   ; PULSE 'RESP. ENA FLIP-FLOP RESET' HIGH
00F3 91       776           MOVX    @R1,A
00F4 53F7     777           ANL     A,#0F7H  ; THEN LOW AGAIN.
00F6 91       778           MOVX    @R1,A
00F7 04D4     779           JMP     CNTLEN   ; RE-ENABLE COMMANDS RECEPTION
              780
              781 ;*** END OF CNTLEN ***
              782 $EJECT
              783
              784 ;      NAME          WRST1
              785
              786 ;
              787 ;
              788 ;
              789
              790 ; WRST1 -- WRITE LINE CIRCUIT STATUS 1 (SELECTED BITS)
              791 ;          COMMAND DATA BYTE 1 CONTAINS 'NEW STATUS DATA'
              792 ;          COMMAND DATA BYTE 2 CONTAINS 'CHANGE MASK'
              793
0100          794           ORG     100H
              795 WRST1:
0100 80       796           MOVX    A,@R0    ; FETCH NEW STATUS BYTE
0101 AA       797           MOV     R2,A     ;   AND SAVE IN R2
              798
0102 85       799           CLR     F0
0103 B206     800           JB5     $+3      ; SKIP NEXT INSTRUCTION IF 'PWR' BIT=1
0105 95       801           CPL     F0       ; SET F0 IF 'PWR' BIT = 0 (F0='PWR BAR')
              802
              803 ; F0 = 'PWR BAR'
0106 2330     804           MOV     A,#LCST1
0108 6E       805           ADD     A,R6     ; ADD 'LC INDEX' TO 'LINE CKT STAT' BASE ADDR.
0109 A9       806           MOV     R1,A
              807
010A 18       808           INC     R0
010B 80       809           MOVX    A,@R0    ; FETCH STATUS WRITE MASK
              810
010C B20F     811           JB5     $+3      ; SKIP NEXT INSTR. IF 'PWR MASK' = 1
010E 85       812           CLR     F0
              813
              814 ; F0 = ('PWR BAR' AND 'PWR MASK')
010F 2A       815           XCH     A,R2     ; EXCHANGE PLACES WITH 'NEW STATUS' BYTE
0110 5A       816           ANL     A,R2     ; CLR 'NEW STATUS' BYTE BIT POSITIONS NOT CHANGING
0111 2A       817           XCH     A,R2
0112 37       818           CPL     A        ; COMPLEMENT STATUS WRITE MASK
0113 51       819           ANL     A,@R1    ; CLEAR BIT POSITIONS WHICH ARE TO BE MODIFIED
0114 4A       820           ORL     A,R2     ; NEW STATUS BYTE
0115 A1       821           MOV     @R1,A
0116 C8       822           DEC     R0
0117 90       823           MOVX    @R0,A    ; PUT UPDATED STATUS BYTE IN RESPONSE REG.
0118 AA       824           MOV     R2,A     ; & SAVE IN R2
```

```
                    825
0119 18             826         INC     R0
011A 34F5           827         CALL    RDST2   ; PUT CURRENT 'STATUS 2' BYTE IN RESPONSE REG.
                    828
                    829 ; ENABLE RESPONSE TRANSMISSION
011C 14E4           830         CALL    FRWAIT
                    831
                    832 $EJECT
                    833 ; CHECK TO SEE IF LINE CIRCUIT IS BEING POWERED-DOWN
011E 95             834         CPL     F0
011F B631           835         JF0     NOPDWN
                    836
                    837 PDWN:
                    838 ; LINE CIRCUIT IS BEING POWERED-DOWN---PUT CODEC IN 'STAND-BY' MODE
0121 23FF           839         MOV     A,#0FFH
0123 942F           840         CALL    CODEC
0125 2340           841         MOV     A,#TXCH
0127 6E             842         ADD     A,R6
0128 A9             843         MOV     R1,A
0129 B13F           844         MOV     @R1,#3FH    ; RESET TX CHAN. ASSIGN. BYTE IN DATA MEM.
012B 2348           845         MOV     A,#RXCH
012D 6E             846         ADD     A,R6
012E A9             847         MOV     R1,A
012F B13F           848         MOV     @R1,#3FH    ; RESET RX CHAN. ASSIGN. BYTE IN DATA MEM.
                    849
                    850 NOPDWN:
                    851 ; TRANSMIT MODIFIED STATUS TO DIGITAL PER-LINE CUSTOM I.C.
0131 2300           852 LDDIG:  MOV     A,#WRDIG
0133 9400           853         CALL    XMIT4
0135 FA             854         MOV     A,R2    ; UPDATED STATUS IN 'A' REG.
0136 9406           855         CALL    XMIT8   ; SEND MODIFIED STATUS TO LINE CKT.
                    856
                    857 ; RETURN S/H VECTOR ON PORT 1 INPUTS
0138 74E4           858         CALL    RTNSH
                    859
013A 83             860         RET
                    861
                    862 ;*** END OF WRST1 ***
                    863 $EJECT
                    864
                    865 ;       NAME            WRTRCH
                    866
                    867 ;
                    868 ;
                    869 ;
                    870
                    871 ; WRTRCH -- WRITE TX & RX CHANNEL ASSIGNMENTS INTO DATA MEMORY
                    872 ;           AND TO THE CODEC.
                    873
                    874 WRTRCH:
                    875 ; READ TX CHANNEL ASSIGNMENT AND STORE IN DATA MEMORY.
013B 2340           876         MOV     A,#TXCH
013D 6E             877         ADD     A,R6    ; ADD LC INDEX TO TX CHAN. BASE ADDR.
013E A9             878         MOV     R1,A
                    879
013F 80             880         MOVX    A,@R0   ; FETCH NEW TX CHANNEL ASSIGNMENT
```

```
0140 A1        881        MOV     @R1,A    ; STORE NEW TX CHAN. ASSIGNMENT IN RAM
0141 533F     882        ANL     A,#3FH   ; MASK OFF 2 MSB'S
              883
              884 ; FORMAT TX CHANNEL ASSIGNMENT FOR CODEC
0143 85       885        CLR     F0
0144 95       886        CPL     F0       ; SET F0 (ASSUME ODD CHAN.)
0145 97       887        CLR     C
0146 67       888        RRC     A        ; ROTATE LSB INTO CARRY FLAG
0147 F64B     889        JC      WTRCH1   ; SKIP NEXT TWO INSTRUCTIONS IF ODD
              890
0149 85       891        CLR     F0       ; CLEAR F0 & DECREMENT ACCUMULATOR TWICE
014A 07       892        DEC     A        ;   IF EVEN TX CHAN.
              893
014B 07       894 WTRCH1: DEC    A
014C 4340     895        ORL     A,#40H   ; APPEND '01' PREFIX TO 'TX CHAN.'
014E AC       896        MOV     R4,A     ; & SAVE IN R4
              897
              898 ; READ RX CHANNEL ASSIGNMENT AND STORE IN DATA MEMORY.
014F 2348     899        MOV     A,#RXCH
0151 6E       900        ADD     A,R6
0152 A9       901        MOV     R1,A
0153 18       902        INC     R0       ; R0 NOW POINTS TO COMMAND REG. BYTE 4
              903
0154 80       904        MOVX    A,@R0    ; FETCH NEW RX CHAN. ASSIGNMENT
0155 90       905        MOVX    @R0,A    ; ECHO BYTE 4 TO SET RESPONSE ENA FF
0156 A1       906        MOV     @R1,A    ; STORE NEW RX CHAN. ASSIGNMENT IN RAM
0157 533F     907        ANL     A,#3FH   ; MASK OFF 2 MSB'S
              908
              909 ; FORMAT RX CHANNEL ASSIGNMENT FOR CODEC
0159 4380     910        ORL     A,#80H   ; PREFIX CHAN. WITH '10' CODEC FUNCTION BITS
015B AD       911        MOV     R5,A     ; & SAVE IN R5
              912
              913 $EJECT
              914 ; UPDATE LINE STATUS 'EVEN BAR/ODD', 'POWER', & 'LC ENA' BITS
015C 2330     915        MOV     A,#LCST1
015E 6E       916        ADD     A,R6
015F A8       917        MOV     R0,A
              918
0160 F0       919        MOV     A,@R0    ; FETCH 'LINE CIRCUIT STATUS' BYTE
0161 43A4     920        ORL     A,#0A4H  ; SET 'EVEN BAR/ODD', 'POWER', & 'LC ENA' BITS
0163 B667     921        JF0     $+4      ; SKIP NEXT INSTRUCTION IF ODD
              922
0165 537F     923        ANL     A,#7FH   ; CLEAR 'EVEN BAR/ODD' BIT IF EVEN
              924
0167 A0       925        MOV     @R0,A    ; STORE UPDATED 'LINE CKT STATUS' BYTE
              926
              927 ; SET LINE CIRCUIT'S 'BUSY' BIT
0169 2338     928        MOV     A,#LCST2
016A 6E       929        ADD     A,R6
016B A9       930        MOV     R1,A     ; ADD 'LC INDEX' TO 'HW STATUS' BASE ADDR
              931
016C F1       932        MOV     A,@R1
016D 4380     933        ORL     A,#80H   ; SET 'BUSY' BIT
016F A1       934        MOV     @R1,A
              935
              936 ; CLEAR 'DELTA HOOK STATUS' BIT FOR THIS LINE CKT.
```

```
0170 94AC        937        CALL    RSDHS
                 938
                 939 ; ENABLE RESPONSE TRANSMISSION. THEN CONTINUE WRITING CHANNEL
                 940 ;       ASSIGNMENTS TO CODEC.
0172 14E4        941        CALL    FRWAIT
                 942
                 943 ; SEND NEW 'LC STATUS 2' DATA TO PER-LINE DIG. CUSTOM I.C.
0174 2300        944        MOV     A,#WRDIG
0176 9400        945        CALL    XMIT4   ; PUT DIGITAL CUSTOM I.C. IN WRITE MODE
0178 2330        946        MOV     A,#LCST1
017A 6E          947        ADD     A,R6
017B A9          948        MOV     R1,A
017C F1          949        MOV     A,@R1   ; FETCH 'LCST1' BYTE
017D 9406        950        CALL    XMIT8
                 951
                 952 ; SEND TX CHANNEL ASSIGNMENT TO CODEC
017F FC          953        MOV     A,R4
0180 942F        954        CALL    CODEC
                 955
                 956 ; SEND RX CHANNEL ASSIGNMENT TO CODEC
0182 FD          957        MOV     A,R5
0183 942F        958        CALL    CODEC
                 959
0185 83          960        RET
                 961
                 962 ;*** END OFF WRTRCH ***
                 963 $EJECT
                 964
                 965 ;       NAME            WRTRGN
                 966
                 967 ;
                 968 ;
                 969 ;
                 970
                 971 ; WRTRGN -- WRITE NEW TX & RX GAIN SETTINGS INTO SELECTED
                 972 ;           LINE CKT'S CUSTOM ANALOG I.C.
                 973
                 974 WRTRGN:
                 975 ; SET UP R1 AS THE DATA MEMORY POINTER FOR GAIN & BAL. SETTINGS
0186 54E1        976        CALL    RGNADD
0188 C9          977        DEC     R1      ; R1 POINTS TO TX GAIN SETTING BYTE
                 978
                 979 ; FETCH & SAVE NEW TX GAIN SETTING
0189 80          980        MOVX    A,@R0
018A A1          981        MOV     @R1,A
018B 18          982        INC     R0
                 983
                 984 ; FETCH & SAVE NEW RX GAIN SETTING
018C 19          985        INC     R1      ; R1 POINTS TO RX GAIN SETTING BYTE
018D 80          986        MOVX    A,@R0
018E 90          987        MOVX    @R0,A   ; ECHO BYTE 4 TO SET 'RESPONSE ENA' FF
018F A1          988        MOV     @R1,A
                 989
                 990 ; ENABLE RESPONSE TRANSMISSION. THEN CONTINUE WRITING GAIN SETTINGS.
0190 14E4        991        CALL    FRWAIT
                 992
```

```
                993 ; WRITE GAIN & BALANCE SETTINGS INTO ANALOG CUSTOM I.C.
0192 2340       994 LOGAIN:  MOV     A,#WRANA
0194 9400       995          CALL    XMIT4
                996
0196 54E1       997          CALL    RGNADD
0198 19         998          INC     R1          ; R1 POINTS TO CURRENT LINE BAL. BYTE
0199 F1         999          MOV     A,@R1
019A 9406      1000          CALL    XMIT8       ; RE-WRITE CURRENT LINE BAL. INTO I.C.
               1001
019C 54E1      1002          CALL    RGNADD      ; R1 POINTS TO RX GAIN BYTE
019E F1        1003          MOV     A,@R1
019F 9406      1004          CALL    XMIT8       ; WRITE NEW RX GAIN SETTING
               1005
01A1 54E1      1006          CALL    RGNADD
01A3 C9        1007          DEC     R1          ; R1 POINTS TO TX GAIN BYTE
01A4 F1        1008          MOV     A,@R1
01A5 9406      1009          CALL    XMIT8       ; WRITE NEW TX GAIN SETTING
               1010
               1011 ; RETURN S/H VECTOR ON PORT.1 INPUTS
01A7 74E4      1012          CALL    RTNSH
               1013
01A9 83        1014          RET
               1015 ;*** END OF WRTGN ***
               1016 $EJECT
               1017
               1018 ;       NAME            WRLBAL
               1019
               1020 ;
               1021 ;
               1022 ;
               1023
               1024 ; WRLBAL -- WRITE NEW LINE BALANCE SETTING INTO THE SELECTED
               1025 ;           LINE CKT'S CUSTOM ANALOG I.C.
               1026
               1027 WRLBAL:
               1028 ; SET UP R1 TO POINT TO LINE BAL. DATA MEMORY BYTE
01AA 54E1      1029          CALL    RGNADD
01AC 19        1030          INC     R1          ; R1 POINTS TO LINE BAL. BYTE
               1031
               1032 ; READ & ECHO NEW LINE BALANCE SETTING
01AD 18        1033          INC     R0          ; R0 POINTS TO BYTE 4 OF COMMAND REG.
01AE 80        1034          MOVX    A,@R0
01AF 90        1035          MOVX    @R0,A
01B0 A1        1036          MOV     @R1,A       ; SAVE NEW LINE BAL. SETTING IN RAM
               1037
               1038 ; ENABLE RESPONSE TRANSMISSION. THEN CONTINUE WRITING LINE BALANCE
01B1 14E4      1039          CALL    FRWAIT
               1040
               1041 ; WRITE NEW LINE BALANCE SETTING INTO BYTE 1 OF ANALOG I.C.'S
               1042 ;  24-BIT CONTROL REGISTER
01B3 2492      1043          JMP     LOGAIN      ; (LOGAIN IS LOCATED IN WRTGN)
               1044
               1045 ;*** END OF WRLBAL ***
               1046 $EJECT
               1047
               1048 ;       NAME            WRST2
```

```
                1049
                1050 ;
                1051 ;
                1052 ;
                1053
                1054 ;  WRST2 — WRITE STATUS 2 TO THE SELECTED LINE CKT.
                1055
                1056 ; BIT POSITION ASSIGNMENTS
                1057 ;      BIT 7 = 'BUSY'  (LINE BUSY)
                1058 ;      BIT 6 = 'LK'    (LOCKOUT)
                1059 ;      BIT 5 = 'RV'    (REVERTIVE CALL)
                1060 ;      BIT 4 = N/A     (NOT ASSIGNED)
                1061 ;      BIT 3 = N/A
                1062 ;      BIT 2 = N/A
                1063 ;      BIT 1 = N/A
                1064 ;      BIT 0 = N/A
                1065
                1066 ;    COMMAND WORD DATA BYTE 1 = 'NEW STATUS DATA'
                1067 ;    COMMAND WORD DATA BYTE 2 = 'CHANGE MASK'
                1068
                1069 ;    ONLY THE BITS INDICATED BY '1' IN THE 'CHANGE MASK' ARE
                1070 ;    TO BE AFFECTED BY THIS COMMAND.
                1071
                1072 ;    LINE CIRCUIT IS POWERED-DOWN IF 'BUSY' STATUS IS CLEARED.
                1073
                1074 WRST2:
01B5 80         1075         MOVX    A,@R0    ; FETCH NEW STATUS BYTE
01B6 AA         1076         MOV     R2,A     ;  & SAVE IN R2
                1077
01B7 85         1078         CLR     F0
01B8 F2BB       1079         JB7     $+3      ; SET FLAG F0 TO 'BUSY BAR'
01BA 95         1080         CPL     F0
                1081
                1082 ; F0 = 'BUSY BAR'
01BB 2338       1083         MOV     A,#LCST2
01BD 6E         1084         ADD     A,R6
01BE A9         1085         MOV     R1,A     ; R1 NOW POINTS TO 'LC STATUS 2' BYTE
                1086
01BF 18         1087         INC     R0
01C0 80         1088         MOVX    A,@R0    ; FETCH 'LINE STATUS 2' WRITE MASK
                1089
01C1 F2C4       1090         JB7     $+3
01C3 85         1091         CLR     F0       ; CLEAR F0 IF 'BUSY MASK' = 0
                1092
                1093 $EJECT
                1094 ; F0 = ('BUSY BAR' AND 'BUSY MASK')
01C4 2A         1095         XCH     A,R2     ; EXCHANGE PLACES WITH 'NEW STATUS' BYTE
01C5 5A         1096         ANL     A,R2     ; CLEAR BIT POSITIONS WHICH ARE NOT BEING CHANGED
01C6 2A         1097         XCH     A,R2
01C7 37         1098         CPL     A        ; COMPLEMENT WRITE MASK
01C8 51         1099         ANL     A,@R1    ; CLEAR BIT POSITIONS WHICH ARE TO BE CHANGED
01C9 4A         1100         ORL     A,R2     ; NEW STATUS BYTE
01CA A1         1101         MOV     @R1,A
                1102
01CB C8         1103         DEC     R0
01CC 34EE       1104         CALL    RDSTAT
```

```
                  1105
                  1106 ; WAIT FOR RESPONSE FRAME
01CE 14E4         1107         CALL    FRWAIT
                  1108
01D0 B6D3         1109         JF0     PDWN2
                  1110
01D2 83           1111 NOPD2:  RET
                  1112
01D3 23FF         1113 PDWN2:  MOV     A,#0FFH
01D5 942F         1114         CALL    CODEC   ; PUT CODEC IN STANDBY MODE
01D7 2340         1115         MOV     A,#TXCH
01D9 6E           1116         ADD     A,R6
01DA A9           1117         MOV     R1,A
01DB B13F         1118         MOV     @R1,#3FH ; RESET TX CHAN. BYTE
01DD 2348         1119         MOV     A,#RXCH
01DF 6E           1120         ADD     A,R6
01E0 A9           1121         MOV     R1,A
01E1 B13F         1122         MOV     @R1,#3FH ; RESET RX CHAN. BYTE
01E3 2330         1123         MOV     A,#LCST1
01E5 6E           1124         ADD     A,R6
01E6 A9           1125         MOV     R1,A
01E7 2318         1126         MOV     A,#IDIG
01E9 A1           1127         MOV     @R1,A   ; RESET 'LC STATUS 1' BYTE
01EA AA           1128         MOV     R2,A    ;          AND
01EB 3431         1129         CALL    LDDIG   ; DIGITAL PER-LINE CUSTOM I.C.
                  1130
01ED 83           1131         RET
                  1132
                  1133 ;*** END OF WRST2 ***
                  1134 $EJECT
                  1135
                  1136 ;       NAME            RDSTAT
                  1137
                  1138 ;
                  1139 ;
                  1140 ;
                  1141
                  1142 ; RDSTAT — READ LINE CIRCUIT STATUS WORD
                  1143
                  1144 RDSTAT:
01EE 2330         1145         MOV     A,#LCST1        ; ADDR. OF 'LC STATUS 1'
01F0 6E           1146         ADD     A,R6    ; ADD LINE CIRCUIT INDEX
01F1 A9           1147         MOV     R1,A    ;  TO LINE CKT. INDEX AND PUT IN R1
                  1148
01F2 F1           1149         MOV     A,@R1   ; FETCH 'LC STATUS 1' BYTE
01F3 90           1150         MOVX    @R0,A
01F4 18           1151         INC     R0
                  1152
                  1153
                  1154 ; RDHWS — READ 'HW STATUS'
                  1155
                  1156 RDST2:
01F5 2338         1157         MOV     A,#LCST2
01F7 6E           1158         ADD     A,R6
01F8 A9           1159         MOV     R1,A
                  1160
```

```
01F9 F1        1161            MOV     A,@R1    ; FETCH 'LC STATUS 2' BYTE
01FA 90        1162            MOVX    @R0,A    ; PUT 'LC STATUS 2' IN RESPONSE REG.
               1163
01FB 83        1164            RET
               1165
               1166 ;*** END OF RDSTAT ***
               1167 $EJECT
               1168
               1169 ;       NAME            RDMEM
               1170
               1171 ;
               1172 ;       :
               1173 ;       .
               1174
               1175 ;  RDMEM -- READ ONE BYTE OF DATA MEMORY
               1176
               1177 ;       R0 POINTS TO ADDRESS BYTE (BYTE 3)
               1178
0200           1179            ORG     200H
               1180 RDMEM:
0200 80        1181            MOVX    A,@R0    ; FETCH ADDRESS
0201 18        1182            INC     R0
0202 A9        1183            MOV     R1,A
0203 F1        1184            MOV     A,@R1    ; DATA IN 'A' REG
0204 90        1185            MOVX    @R0,A    ; WRITE DATA INTO CONTROL REG. BYTE 3
               1186
0205 83        1187            RET
               1188
               1189 ;*** END OF RDMEM ***
               1190 $EJECT
               1191
               1192 ;       NAME            WRMEM
               1193
               1194 ;
               1195 ;
               1196 ;
               1197
               1198 ;  WRMEM -- WRITE ONE BYTE INTO DATA MEMORY
               1199
               1200 ;       R0 POINTS TO ADDRESS BYTE (BYTE 3)
               1201 ;       BYTE 4 CONTAINS DATA TO BE WRITTEN INTO DATA MEMORY
               1202
               1203 WRMEM:
0206 80        1204            MOVX    A,@R0    ; FETCH ADDRESS
0207 18        1205            INC     R0
0208 A9        1206            MOV     R1,A
0209 80        1207            MOVX    A,@R0    ; FETCH DATA
020A A1        1208            MOV     @R1,A    ;   AND WRITE INTO DATA MEMORY
020B 90        1209            MOVX    @R0,A    ; SET RESPONSE ENABLE FLIP-FLOP BY
               1210                             ;   WRITING INTO CONTROL REG. BYTE 4
020C 83        1211            RET
               1212
               1213 ;*** END OF WRMEM ***
               1214 $EJECT
               1215
               1216 ;       NAME            WRCDR
```

```
                1217
                1218 ;
                1219 ;
                1220 ;
                1221
                1222 ; WRCDR — WRITE CONTROL DATA INTO CODEC
                1223
                1224 WRCDR:
                1225 ; FETCH CODEC CONTROL BYTE FROM COMMAND REG. BYTE 3
020D 80         1226         MOVX    A,@R0
020E AC         1227         MOV     R4,A
                1228
                1229 ; ECHO COMMAND REG. BYTE 4 TO SET 'RESPONSE ENABLE' FLIP-FLOP
020F 18         1230         INC     R0
0210 80         1231         MOVX    A,@R0
0211 90         1232         MOVX    @R0,A
                1233
                1234 ; WAIT FOR RESPONSE FRAME
0212 14E4       1235         CALL    FRWAIT
                1236
                1237 ; SEND CONTROL BYTE TO CODEC
0214 FC         1238         MOV     A,R4
0215 942F       1239         CALL    CODEC
                1240
0217 83         1241         RET
                1242
                1243 ; *** END OF WRCDR ***
                1244 $EJECT
                1245
                1246 ;       NAME            WRCRDS
                1247
                1248 ;
                1249 ;
                1250 ;
                1251
                1252 ; WRCRDS — WRITE NEW DATA INTO LINE CARD STATUS BYTE FROM
                1253 ;                 LINE SWITCH CONTROLLER.  THE FIRST COMMAND
                1254 ;                 WORD DATA BYTE CONTAINS THE NEW DATA; THE
                1255 ;                 SECOND COMMAND DATA BYTE CONTAINS THE CHANGE
                1256 ;                 MASK IN WHICH A '1' INDICATES THAT THAT BIT
                1257 ;                 POSITION(S) IN THE CURRENTLY STORED LINE CARD
                1258 ;                 STATUS BYTE IS(ARE) TO BE UPDATED TO THE VALUES
                1259 ;                 IN THE FIRST COMMAND DATA BYTE.
                1260
                1261 ;         NOTE THAT IF ALL BITS OF THE 'CHANGE MASK' ARE
                1262 ;         '0' THEN THE COMMAND IS EQUIVALENT TO A READ
                1263 ;         OF THE CURRENT LINE CARD STATUS BYTE.
                1264
                1265 WRCRDS:
0218 80         1266         MOVX    A,@R0   ; FETCH NEW DATA WORD &
0219 AB         1267         MOV     R3,A    ;   SAVE IN R3
021A 18         1268         INC     R0
021B 80         1269         MOVX    A,@R0   ; FETCH DATA CHANGE MASK
021C AA         1270         MOV     R2,A    ;   & SAVE IN R2
021D 5B         1271         ANL     A,R3    ; 'AND' MASK WITH NEW DATA BYTE &
```

```
021E A8      1272        MOV     R3,A    ; SAVE 'MASKED NEW DATA BITS' IN R3
             1273
021F B920    1274        MOV     R1,#LNCRDS
0221 FA      1275        MOV     A,R2
0222 37      1276        CPL     A       ; COMPLEMENT 'CHANGE MASK' (ONE'S IN BIT
             1277                        ;   POSITIONS NOT TO BE UPDATED)
0223 51      1278        ANL     A,@R1   ; ZERO BIT POSITIONS OF CURRENT CARD STATUS
             1279                        ;   BYTE WHICH ARE NOT TO CHANGE
0224 4B      1280        ORL     A,R3    ; UPDATED LINE CARD STATUS BYTE
0225 A1      1281        MOV     @R1,A
             1282
             1283 ; LOAD 'CARD STATUS' & 'S/H VECTOR' INTO RESPONSE REGISTER
0226 C8      1284        DEC     R0
0227 549E    1285        CALL    RDCRDS
             1286
0229 83      1287        RET
             1288
             1289 ;*** END OF WRCRDS ***
             1290 $EJECT
             1291
             1292 ;       NAME            RDHDHS
             1293
             1294 ;
             1295 ;
             1296 ;
             1297
             1298 ; RDHDHS — READ 'HOOK STATUS VECTOR' & 'DELTA HOOK STATUS VECTOR'
             1299 ;           THEN RESET 'DELTA HOOK STATUS VECTOR' & "OR'D DLTA HS"
             1300
             1301 RDHDHS:
022A B921    1302        MOV     R1,#HSW ; ADDR. OF 'HOOK SWITCH STATUS VECTOR'
022C F1      1303        MOV     A,@R1
022D 90      1304        MOVX    @R0,A   ; WRITE 'HOOK STATUS VECTOR' INTO BYTE 3
022E 18      1305        INC     R0
022F 19      1306        INC     R1
0230 F1      1307        MOV     A,@R1
0231 90      1308        MOVX    @R0,A   ; WRITE 'DELTA HS VECTOR' INTO BYTE 4
             1309
0232 83      1310        RET
             1311
             1312 ;*** END OF RDHDHS ***
             1313 $EJECT
             1314
             1315 ;       NAME            RDTRCH
             1316
             1317 ;
             1318 ;
             1319 ;
             1320
             1321 ; RDTRCH — READ MOST RECENT TX & RX CHANNEL ASSIGNMENTS
             1322 ;           FOR THE SPECIFIED LINE CIRCUIT.
             1323
             1324 RDTRCH:
0233 2340    1325        MOV     A,#TXCH
0235 6E      1326        ADD     A,R6    ; ADD LC INDEX TO TX CHAN. BASE ADDR.
0236 A9      1327        MOV     R1,A    ;   AND MOVE INTO POINTER REG. R1
```

```
                1328
0237 F1         1329        MOV     A,@R1       ; FETCH STORED TX CHANNEL ASSIGNMENT
0238 90         1330        MOVX    @R0,A       ; AND MOVE TX CHAN. INTO CNTRL. S/R BYTE 3
0239 18         1331        INC     R0
                1332
023A 2348       1333        MOV     A,#RXCH
023C 6E         1334        ADD     A,R6         ; ADD LC INDEX TO RX CHAN. BASE ADDR.
023D A9         1335        MOV     R1,A
                1336
023E F1         1337        MOV     A,@R1        ; FETCH STORED RX CHANNEL ASSIGNMENT
023F 90         1338        MOVX    @R0,A        ; AND MOVE RX CHAN. INTO CNTRL S/R BYTE 4
                1339                             ; (WHICH ALSO SETS RESPONSE ENA FLIP-FLOP)
                1340
0240 83         1341        RET
                1342
                1343 ;*** END OF RDTRCH ***
                1344 $EJECT
                1345
                1346 ;      NAME            RQTRGN
                1347
                1348 ;
                1349 ;
                1350 ;
                1351
                1352 ; RQTRGN — REQUEST CURRENT TX & RX GAIN SETTINGS FOR THE
                1353 ;          SELECTED LINE CIRCUIT.
                1354
                1355 RQTRGN:
0241 9440       1356        CALL    RQST        ; 'REQUEST' COMMAND PRELIMINARY TASKS
                1357
0243 2308       1358        MOV     A,#RDANA
0245 9460       1359        CALL    XMIT4
                1360
                1361 ; ENABLE RESPONSE TRANSMISSION, THEN FETCH REQUESTED DATA.
0247 14E4       1362        CALL    FRWAIT
                1363
                1364 ; SKIP OVER LINE BALANCE BYTE IN ANALOG PER-LINE I.C.
0249 54C7       1365        CALL    CKBRST
                1366
                1367 ; FETCH RX GAIN SETTING
024B 941C       1368        CALL    RCV8
024D B927       1369        MOV     R1,#RGBYT2
024F A1         1370        MOV     @R1,A       ; 'RGBYT2' = RX GAIN SETTING
                1371
                1372 ; FETCH TX GAIN SETTING
0250 941C       1373        CALL    RCV8
0252 B926       1374        MOV     R1,#RGBYT1
0254 A1         1375        MOV     @R1,A       ; 'RGBYT1' = TX GAIN SETTING
                1376
                1377 ; RETURN S/H VECTOR ON PORT 1 INPUTS
0255 74E4       1378        CALL    RTNSH
                1379
0257 83         1380        RET
                1381
                1382 ;*** END OFF RQTRGN ***
                1383 $EJECT
```

```
                1384
                1385 ;         NAME            RQLBAL
                1386
                1387 ;
                1388 ;
                1389 ;
                1390
                1391 ; RQLBAL -- REQUEST CURRENT LINE BALANCE SETTING
                1392
                1393 RQLBAL:
                1394 ; 'REQUEST' COMMAND PRELIMINARY OPERATIONS
0258 9440       1395         CALL    RQST
                1396
025A 23C0       1397         MOV     A,#RDANA ; SET ANALOG CHIP FOR READ MODE
025C 9400       1398         CALL    XMIT4
                1399
                1400 ; ENABLE RESPONSE TRANSMISSION, THEN CONTINUE TO FETCH REQUESTED DATA
025E 14E4       1401         CALL    FRWAIT
                1402
                1403 ; FETCH LINE BALANCE SETTING BYTE FROM ANALOG PER-LINE I.C.
0260 941C       1404         CALL    RCV8
0262 B926       1405         MOV     R1,#RQBYT1
0264 A1         1406         MOV     @R1,A    ; 'RQBYT1' = 'LINE BALANCE BYTE'
                1407
0265 19         1408         INC     R1
0266 A1         1409         MOV     @R1,A    ; 'RQBYT2' = 'RQBYT1'
                1410
                1411 ; SKIP OVER RX & TX GAIN SETTINGS
0267 54C7       1412         CALL    CKBRST
0269 54C7       1413         CALL    CKBRST
                1414
                1415 ; RETURN S/H VECTOR ON PORT 1 INPUTS
026B 74E4       1416         CALL    RTNSH
                1417
026D 83         1418         RET
                1419
                1420 ;*** END OF RQLBAL ***
                1421 $EJECT
                1422
                1423 ;         NAME            RQDIG
                1424
                1425 ;
                1426 ;
                1427 ;
                1428
                1429 ; RQDIG -- REQUEST DIGITAL PER-LINE CUSTOM I.C.'S CONTENTS
                1430
                1431 RQDIG:
                1432 ; 'REQUEST' COMMAND PRELIMINARY OPERATIONS
026E 9440       1433         CALL    RQST
                1434
                1435 ; SEND 'READ DIGITAL I.C.' COMMAND TO LINE CIRCUITS
0270 2380       1436         MOV     A,#RDDIG
0272 9400       1437         CALL    XMIT4
                1438
```

```
                1439 ; ENABLE RESPONSE TRANSMISSION. THEN CONTINUE TO FETCH REQUESTED DATA
0274 14E4       1440        CALL    FRWAIT
                1441
                1442 ; FETCH CONTENTS OF DIGITAL PER-LINE I.C.
0276 941C       1443        CALL    RCV8
0278 B926       1444        MOV     R1,#RQBYT1
027A A1         1445        MOV     @R1,A    ; 'RQBYT1' = DIGITAL I.C.'S CONTENTS
                1446
027B 19         1447        INC     R1
027C A1         1448        MOV     @R1,A    ; 'RQBYT2' = 'RQBYT1'
                1449
                1450 ; RETURN S/H VECTOR ON PORT 1 INPUTS
027D 74E4       1451        CALL    RTNSH
                1452
027F 83         1453        RET
                1454
                1455 ;*** END OF RQDIG ***
                1456 $EJECT
                1457
                1458 ;      NAME         RDRQST
                1459
                1460 ;
                1461 ;
                1462 ;
                1463
                1464 ; RDRQST -- READ DATA CURRENTLY IN THE 'REQUESTED DATA'
                1465 ;            LOCATIONS OF DATA MEMORY. ONE BYTE RETURNED
                1466 ;            WILL BE THE FUNCTION CODE BYTE WHICH LAST
                1467 ;            REQUESTED DATA AND THE REMAINING TWO BYTES
                1468 ;            ARE THE ACTUAL REQUESTED DATA BYTES.
                1469
                1470 RDRQST:
0280 C8         1471        DEC     R0
0281 B925       1472        MOV     R1,#RQFNCD ; LOCATION WHERE 'RQST FUNCTION CODE'
                1473                           ;   IS STORED.
0283 BA03       1474        MOV     R2,#3      ; 3 BYTES TO BE MOVED
0285 F1         1475 RQNEXT: MOV    A,@R1
0286 90         1476        MOVX    @R0,A
0287 18         1477        INC     R0
0288 19         1478        INC     R1
0289 EA85       1479        DJNZ    R2,RQNEXT
                1480
028B 83         1481        RET
                1482
                1483 ;*** END OF RDRQST ***
                1484 $EJECT
                1485
                1486 ;      NAME         RQCDR
                1487
                1488 ;
                1489 ;
                1490 ;
                1491
                1492 ; RQCDR -- REQUEST CODEC DATA REGISTER CONTENTS
                1493
                1494
```

```
                    1495 RQCDR:
                    1496 ;  'REQUEST' COMMAND PRELIMINARY OPERATIONS
028C 9440           1497        CALL    RQST
                    1498
                    1499 ;  SEND 'READ CODEC DATA REG.' COMMAND TO PER-LINE I.C.'S
028E 23A0           1500        MOV     A,#RDCDR
0290 9400           1501        CALL    XMIT4
                    1502
                    1503 ;  ENABLE RESPONSE TRANSMISSION, THEN CONTINUE TO FETCH REQUESTED DATA
0292 14E4           1504        CALL    FRWAIT
                    1505
                    1506 ;  FETCH CODEC DATA REGISTER CONTENTS
0294 941C           1507        CALL    RCV8
0296 B926           1508        MOV     R1,#RQBYT1  ; RQBYT1='CODEC DATA REG.' CONTENTS
0298 A1             1509        MOV     @R1,A
0299 19             1510        INC     R1
029A A1             1511        MOV     @R1,A       ; 'RQBYT2' = 'RQBYT1'
                    1512
                    1513 ;  RETURN S/H VECTOR ON PORT 1 INPUTS
029B 74E4           1514        CALL    RTNSH
                    1515
029D 83             1516        RET
                    1517
                    1518 ;*** END OF RQCDR ***
                    1519 $EJECT
                    1520
                    1521 ;      NAME            RDCRDS
                    1522
                    1523 ;
                    1524 ;
                    1525 ;
                    1526
                    1527 ;  RDCRDS -- READ LINE CARD STATUS
                    1528
                    1529 RDCRDS:
                    1530 ;  FETCH CURRENT LINE CARD STATUS BYTE FROM DATA MEMORY
                    1531 ;  AND MOVE INTO RESPONSE REG. BYTE 3
                    1532
029E B928           1533        MOV     R1,#LNCRDS
02A0 F1             1534        MOV     A,@R1
02A1 90             1535        MOVX    @R0,A
                    1536
                    1537 ;  PUT S/H VECTOR INTO RESPONSE REG. BYTE 4
                    1538
02A2 18             1539        INC     R0
02A3 09             1540        IN      A,P1        ; READ S/H VECTOR
02A4 90             1541        MOVX    @R0,A
                    1542
02A5 83             1543        RET
                    1544
                    1545 ;*** END OF RDCRDS ***
                    1546 $EJECT
                    1547
                    1548 ;      NAME            LINERS
                    1549
                    1550 ;
```

```
1551 ;
1552 ;
1553
1554 ; LINE -- RESET ALL LINE CIRCUITS ON LINE CARD
1555
1556 ; DIGITAL PER-LINE CUSTOM I.C.'S INITIALIZATION VALUES
1557 ;BIT 7  EVEN BAR/ODD=   0 (EVEN 4 MHZ CHAN.)
1558 ;BIT 6  EURO SEL=       0 (NON-EUROPEAN FORMAT)
1559 ;BIT 5  POWER=          0 (LINE CKT. POWERED DOWN)
1560 ;BIT 4  TR=             1 (TEST RELAY OPEN)
1561 ;BIT 3  RR=             1 (RING RELAY OPEN)
1562 ;BIT 2  LC EN=          0 (LINE CKT'S PCM DRIVERS IN HI-Z STATE)
1563 ;BIT 1  ILS=            0 (ILS NOT SELECTED)
1564 ;BIT 0  A BAR/B SEL=    0 (DEFAULTS TO 'A' PCM)
1565
1566 ; CODEC IS PUT IN 'STANDBY' MODE
1567
1568 ; ANALOG PER-LINE CUSTOM I.C.'S INITIALIZATION VALUES
1569 ;       'CLKC +BAR/-'   IS SET TO 1
1570 ;       'LINE BAL'      IS SET TO 'STD BAL SETTING' (4H)
1571 ;       'RX GAIN'       IS SET TO 'STD RX GN SETTING' (20H)
1572 ;       'TX GAIN'       IS SET TO 'STD TX GAIN SETTING' (20H)
1573
1574 LINERS:
1575 ; WRITE TO DIGITAL PER-LINE CHIPS
02A6 BF00      1576        MOV     R7,#0    ; CLOCK VECTOR FOR ALL LINE CKTS
02A8 2300      1577        MOV     A,#WRDIG ; 'WRITE TO DIGITAL CHIP' CODE
02AA 9400      1578        CALL    XMIT4
02AC 2318      1579        MOV     A,#IDIG  ; INIT. DIG. CHIP CONTENTS TO 00011000B
02AE 9406      1580        CALL    XMIT8
               1581
               1582 ; WRITE TO CODECS
02B0 23FF      1583        MOV     A,#ICODEC
02B2 942F      1584        CALL    CODEC    ; PUT CODECS IN 'STANDBY' MODE
               1585
               1586 ; WRITE TO ANALOG PER-LINE CHIP
02B4 2340      1587        MOV     A,#WRANA ; 'WRITE TO ANALOG CHIP' CODE
02B6 9400      1588        CALL    XMIT4
02B8 2384      1589        MOV     A,#IANA1 ; INITIAL 'CLKC' & 'LINE BAL' SETTINGS
02BA 9406      1590        CALL    XMIT8
02BC 2300      1591        MOV     A,#IANA2 ; INITIAL 'RX GAIN SETTING'
02BE 9406      1592        CALL    XMIT8
02C0 2300      1593        MOV     A,#IANA3 ; INITIAL 'TX GAIN SETTING'
02C2 9406      1594        CALL    XMIT8
               1595
               1596 ; RETURN S/H ON PORT 1
02C4 74E4      1597        CALL    RTNSH
02C6 83        1598        RET
               1599 ;*** END OF LINERS ***
               1600 $EJECT
               1601
               1602 ;       NAME            CKBRST
               1603
               1604 ;
               1605 ;
               1606 ;
```

```
            1607
            1608
            1609 ;  CKBRST — PULSES CLOCK LINE 8 TIMES AT MAX. RATE
            1610
            1611 ;  R7 CONTAINS CLOCK VECTOR UPON ENTRY
            1612 ;
            1613
            1614 CKBRST:
02C7 FF     1615        MOV     A,R7    ; MOVE CLOCK VECTOR INTO A
02C8 39     1616        OUTL    P1,A
02C9 89FF   1617        ORL     P1,#0FFH
02CB 39     1618        OUTL    P1,A
02CC 89FF   1619        ORL     P1,#0FFH
02CE 39     1620        OUTL    P1,A
02CF 89FF   1621        ORL     P1,#0FFH
02D1 39     1622        OUTL    P1,A
02D2 89FF   1623        ORL     P1,#0FFH
02D4 39     1624        OUTL    P1,A
02D5 89FF   1625        ORL     P1,#0FFH
02D7 39     1626        OUTL    P1,A
02D8 89FF   1627        ORL     P1,#0FFH
02DA 39     1628        OUTL    P1,A
02DB 89FF   1629        ORL     P1,#0FFH
02DD 39     1630        OUTL    P1,A
02DE 89FF   1631        ORL     P1,#0FFH
            1632
02E0 83     1633        RET
            1634
            1635 ;*** END OF CKBRST ***
            1636 $EJECT
            1637
            1638 ;      NAME            RGNADD
            1639
            1640 ;
            1641 ;
            1642 ;
            1643
            1644 ; RGNADD — LOADS REG. R1 WITH THE ADDRESS OF THE RX GAIN SETTING
            1645 ;          BYTE FOR THE SELECTED LINE CKT.
            1646
            1647 RGNADD:
02E1 FE     1648        MOV     A,R6
02E2 E7     1649        RL      A
02E3 6E     1650        ADD     A,R6            ; 3 * 'LC INDEX'
02E4 0351   1651        ADD     A,#(GNBAL+1)    ; ADD BASE ADDR. OF RX GAIN SETTING BYTE
02E6 A9     1652        MOV     R1,A
            1653
02E7 83     1654        RET
            1655
            1656 ;*** END OF RGNADD ***
            1657 $EJECT
            1658
            1659 ;      NAME            RWPORT
            1660
            1661 ;
            1662 ;
```

```
       1663 ;
       1664
       1665 ; RWPORT -- READ/WRITE DATA FROM/TO I/O PORTS 1 & 2
       1666
       1667 ; BIT 1 OF FUNCTION CODE BYTE (COMMAND BYTE 2) = R/W BAR PORT 1
       1668 ;  "  2 "    "    "    "  (  "    "    ") = R/W BAR PORT 2
       1669
       1670 RWPORT:
       1671 ; TEST IF READ OR WRITE OPERATION ON PORT 1
82E8 FD    1672      MOV    A,R5     ; FETCH FUNCTION CODE BYTE
82E9 32ED  1673      JB1    $+4      ; SKIP NEXT TWO INSTRUCTIONS IF READ COMMAND
82EB 80    1674      MOVX   A,@R0    ; FETCH NEW PORT 1 DATA
82EC 39    1675      OUTL   P1,A     ; & WRITE INTO PORT 1
82ED 09    1676      IN     A,P1     ; READ PORT 1
82EE 90    1677      MOVX   @R0,A    ; & RETURN IN RESPONSE BYTE 3
           1678
           1679 ; TEST IF READ OR WRITE OPERATION ON PORT 2
82EF 18    1680      INC    R0
82F0 FD    1681      MOV    A,R5
82F1 12F5  1682      JB0    $+4      ; SKIP NEXT TWO INSTRUCTIONS IF READ COMMAND
82F3 80    1683      MOVX   A,@R0    ; FETCH NEW PORT 2 DATA
82F4 3A    1684      OUTL   P2,A     ; & WRITE INTO PORT 2
82F5 0A    1685      IN     A,P2     ; READ PORT 2
82F6 90    1686      MOVX   @R0,A    ; & RETURN IN RESPONSE BYTE 4
           1687
82F7 83    1688      RET
           1689
           1690 ;*** END OF RWPORT ***
           1691 $EJECT
           1692
           1693 ;     NAME           XMIT
           1694
           1695 ;
           1696 ;
           1697 ;
           1698
           1699 ;     XMIT -- TRANSMIT DATA TO LINE CIRCUIT
           1700
           1701 ;     ASSUMED CONTENTS OF REGISTERS UPON ENTRY:
           1702 ;           R7       CLOCK VECTOR(I.E. BIT CORRESPONDING
           1703 ;                       TO SELECTED LINE CKT IS A LOGIC
           1704 ;                       '0', ALL OTHER BITS MUST BE '1')
           1705 ;           A        DATA TO SENT TO LINE CKT. (MSB 1ST)
           1706 ;           R1       BIT COUNTER: NUMBER OF BITS TO BE SENT
           1707 ;                       (NORMALLY 1-8)
           1708
           1709 ;           R3       HOLDS INTERMEDIATE RESULTS
           1710 ;           P26      DATA LINE TO LINE CIRCUITS
           1711 ;           P27      'CMD ENA BAR' LINE TO LINE CIRCUITS
           1712 ;           P1       PORT 1 IS THE CLOCK/SH VECTOR INTERFACE
           1713 ;                       TO THE LINE CIRCUITS(BIT 0 GOES
           1714 ;                       TO LC #1, BIT 1 TO LC #2, ETC.)
           1715
           1716
8400       1717      ORG    400H
           1718 XMIT4:
```

```
0400 B904        1719            MOV     R1,#4
0402 9A7F        1720            ANL     P2,#7FH ; 'CMD ENA BAR' = 0
0404 8408        1721            JMP     XMIT
                 1722
0406 B908        1723 XMIT8:     MOV     R1,#8
                 1724
                 1725 XMIT:
0408 AB          1726            MOV     R3,A
0409 F20F        1727            JB7     XMIT1   ; IS '0' OR '1' TO BE SENT NEXT?
040B 9ABF        1728 XMIT0:     ANL     P2,#0BFH        ; SET DATA LINE TO 0
040D 8411        1729            JMP     CKPSL
                 1730
040F 8A40        1731 XMIT1:     ORL     P2,#40H ; SET DATA LINE TO 1
0411 FF          1732 CKPSL:     MOV     A,R7    ; LOAD CLOCK VECTOR INTO A
0412 39          1733            OUTL    P1,A    ;       PULSE CLOCK LINE LOW
0413 89FF        1734            ORL     P1,#0FFH ;      THEN HIGH
                 1735
0415 FB          1736            MOV     A,R3    ; HAVE ALL BITS BEEN TRANSMITTED?
0416 E7          1737            RL      A
0417 E908        1738            DJNZ    R1,XMIT
                 1739
0419 8AC0        1740            ORL     P2,#0C0H        ; SET 'CMD ENA BAR' AND 'DATA' TO 1
041B 83          1741            RET
                 1742
                 1743 ;*** END OF XMIT ***
                 1744 $EJECT
                 1745
                 1746 ;        NAME            RCV
                 1747
                 1748 ;
                 1749 ;
                 1750 ;
                 1751
                 1752 ; RCV — RECEIVE 1 TO 8 BITS OF DATA FROM THE LINE CIRCUIT
                 1753 ;         SPECIFIED BY THE CLOCK VECTOR STORED IN R2 UPON ENTRY.
                 1754
                 1755 ; ENTRY POINT 'RCV8' RECEIVES 8 BITS OF DATA RETURNED IN 'A' REG
                 1756
                 1757 RCV8:
041C B908        1758            MOV     R1,#8
                 1759 RCV:
041E FF          1760            MOV     A,R7    ; MOVE CLOCK VECTOR INTO A
041F 39          1761            OUTL    P1,A    ; 'CLOCK LINE' = 0
0420 0A          1762            IN      A,P2    ; READ IN NEXT BIT OF DATA
0421 89FF        1763            ORL     P1,#0FFH ;'CLOCK LINE' = 1
0423 97          1764            CLR     C       ; CLEAR CARRY FLAG (ASSUME DATA = 0)
0424 37          1765            CPL     A
0425 D228        1766            JB6     RD0     ; SKIP NEXT INSTR. IF 'DATA' = 0
0427 A7          1767 RD1:       CPL     C       ; SET CARRY FLAG (SINCE DATA = 1)
0428 FB          1768 RD0:       MOV     A,R3
0429 F7          1769            RLC     A       ; MOVE NEXT DATA BIT INTO LSB
042A AB          1770            MOV     R3,A    ;       POSITION OF R3
                 1771
042B E91E        1772            DJNZ    R1,RCV  ; HAVE ALL BITS BEEN RECEIVED?
                 1773
```

```
042D FB        1774            MOV     A,R3    ; LOAD 'A' WITH RECEIVED DATA AND RETURN
               1775                            ;   TO CALLING ROUTINE.
042E 83        1776            RET
               1777
               1778 ;*** END OF RCV ***
               1779 $EJECT
               1780
               1781 ;       NAME            CODEC
               1782
               1783 ;
               1784 ;
               1785 ;
               1786
               1787 ; CODEC -- THE DATA CONTAINED IN THE 'A' REG. UPON ENTRY
               1788 ;              IS TRANSMITTED TO THE SELECTED LINE CIRCUIT'S
               1789 ;              CODEC.
               1790
               1791 ; ASSUMED REG. CONTENTS UPON ENTRY:
               1792 ;      R7=CLOCK VECTOR
               1793 ;       A=CODEC CONTROL DATA
               1794
               1795 CODEC:
042F AC        1796            MOV     R4,A    ; SAVE CODEC CONTROL DATA
0430 2320      1797            MOV     A,#WRCDRC
0432 9400      1798            CALL    XMIT4   ; PUT ANALOG CUSTOM I.C. IN 'WRITE TO CDR' MODE
0434 FC        1799            MOV     A,R4
0435 9406      1800            CALL    XMIT8   ; LOAD DATA INTO CODEC DATA REG.
               1801
0437 2360      1802            MOV     A,#LDCODC
0439 9400      1803            CALL    XMIT4   ; PUT DIG. I.C. IN 'LOAD CODEC' MODE
043B 54C7      1804            CALL    CKBRST  ; LOAD DATA INTO CODEC
               1805
043D 74E4      1806            CALL    RTNSH   ; PUT CUSTOM I.C. IN 'RETURN S/H' MODE
               1807
043F 83        1808            RET
               1809
               1810 ;*** END OF CODEC ***
               1811 $EJECT
               1812
               1813 ;       NAME            RQST
               1814
               1815 ;
               1816 ;
               1817 ;
               1818
               1819 ; RQST -- PERFORM THE PRELIMINARY STUFF THAT'S COMMON TO
               1820 ;              ALL 'RQXXXX' SUBROUTINES.
               1821
               1822 RQST:
               1823 ; ECHO COMMAND BYTE 4 TO SET 'RESPONSE ENABLE' FLIP-FLOP
0440 18        1824            INC     R0
0441 80        1825            MOVX    A,@R0
0442 90        1826            MOVX    @R0,A
               1827
               1828 ; MOVE FUNCTION CODE BYTE OF REQUEST COMMAND INTO 'RQFNCD'
0443 B925      1829            MOV     R1,#RQFNCD
```

```
0445 FD            1830        MOV     A,R5
0446 A1            1831        MOV     @R1,A
                   1832
                   1833 ; SET 'RQST A BAR/B' TO THE VALUE OF FLAG F1
0447 B920          1834        MOV     R1,#LNCRDS     ; ADDR. OF LINE CARD STATUS BYTE
0449 F1            1835        MOV     A,@R1
044A 7650          1836        JF1     $+6            ; SKIP NEXT 3 INSTRUCTIONS IF 'F1' = 1
                   1837
                   1838 ; REQUEST COMMAND WAS RECEIVED OVER 'A' PCM HIGHWAY
044C 53FB          1839        ANL     A,#0FBH        ; CLEAR 'RQST A BAR/B' (BIT 2)
044E A1            1840        MOV     @R1,A
044F 83            1841        RET
                   1842
                   1843 ; REQUEST COMMAND WAS RECEIVED OVER 'B' PCM HIGHWAY
0450 4304          1844        ORL     A,#04H         ; SET 'RQST A BAR/B' (BIT 2)
0452 A1            1845        MOV     @R1,A
0453 83            1846        RET
                   1847
                   1848 ;*** END OF RQST ***
                   1849 $EJECT
                   1850
                   1851 ;      NAME            DTR
                   1852
                   1853 ;
                   1854 ;
                   1855 ;
                   1856
                   1857 ; DTR -- DISPLAY SELF-TEST RESULTS AND FLASH THE 'BUSY INDICATE'
                   1858 ;       LED IF A HARDWARE FAILURE WAS DETECTED
                   1859
0454 BA04          1860 DTR:   MOV     R2,#4
0456 B82A          1861        MOV     R0,#TESTR
0458 27            1862        CLR     A
0459 40            1863 DTR2:  ORL     A,@R0          ; READ NEXT 'TEST RESULTS' BYTE
045A 9671          1864        JNZ     BAD8           ; JUMP TO BAD8 IF ANY ERROR WAS DETECTED
045C 18            1865        INC     R0
045D EA59          1866        DJNZ    R2,DTR2        ; REPEAT FOR ALL TEST RESULTS BYTES
                   1867
                   1868 ; BOARD GOOD -- NO ERRORS WERE DETECTED BY SELF-TEST SOFTWARE
045F F0            1869        MOV     A,@R0          ; READ 'GOOD BOARD' DOWN COUNTER
0460 9663          1870        JNZ     $+3            ; SKIP NEXT INSTR. IF DOWN COUNT NON ZERO
0462 93            1871        RETR
0463 18            1872        INC     R0             ; ADDR. OF 'BLINK COUNTER'
0464 10            1873        INC     @R0            ; INCREMENT 'BLINK COUNTER'
0465 F0            1874        MOV     A,@R0
0466 C66C          1875        JZ      DTR3
0468 F27D          1876        JB7     BLNK1          ; SLOW BLINK FOR A GOOD BOARD
046A 847A          1877        JMP     BLNK0
                   1878 DTR3:
                   1879 ; IF 'BLINK COUNTER' = 0, THEN DECREMENT 'GOOD BOARD' DOWN COUNTER
046C C8            1880        DEC     R0
046D F0            1881        MOV     A,@R0
046E 07            1882        DEC     A
046F A0            1883        MOV     @R0,A
0470 93            1884        RETR
                   1885
```

```
               1886 BADB:
               1887 ; BOARD BAD — SELF-TEST SOFTWARE DETECTED A HARDWARE MALFUNCTION
0471 B82F      1888         MOV     R0,#BLINKC
0473 10        1889         INC     @R0       ; INCREMENT 'BLINK COUNTER'
0474 F0        1890         MOV     A,@R0
0475 F278      1891         JB7     BLNKX     ; BLINK ONLY HALF THE TIME, DISPLAY 'BUSY' STATUS
0477 93        1892         RETR              ;   THE OTHER HALF.
0478 927D      1893 BLNKX:  JB4     BLNK1     ; FAST BLINK FOR BAD BOARD
               1894
047A 9AEF      1895 BLNK0:  ANL     P2,#0EFH  ; TURN-OFF LED
047C 93        1896         RETR
               1897
047D 8A10      1898 BLNK1:  ORL     P2,#10H   ; TURN-ON LED
047F 93        1899         RETR
               1900 ;*** END OF DTR ***
               1901 $EJECT
               1902
               1903 ;     NAME          LDFXAD
               1904
               1905 ;
               1906 ;
               1907 ;
               1908
               1909 ; LDFXAD — LOAD LINE CARD'S FIXED ADDRESS INTO CONTROL COMM. I.C.'S
               1910 ;                 EXPECTED ADDRESS REG.
               1911
               1912 LDFXAD:
               1913 ; CLEAR 'LOAD BAR' & 'CLK' INPUTS OF 'FIXED ADDRESS' SHIFT REG.
0480 9ADE      1914         ANL     P2,#0DEH
               1915
               1916 ; SET 'LOAD BAR' INPUT OF 'FIXED ADDR.' S/R
0482 8A01      1917         ORL     P2,#01H
               1918
               1919 ; INITIALIZE BIT COUNTER
0484 B808      1920         MOV     R0,#8
               1921
0486 97        1922 LFA1:   CLR     C         ; CLEAR C FLAG
0487 269A      1923         JNT0    $+3
0489 A7        1924         CPL     C         ; SET C IF NEXT BIT=1
               1925
               1926 ; C = NEXT BIT OF FIXED ADDR.
048A F7        1927         RLC     A         ; MOVE NEXT BIT INTO LSB OF ACCUMULATOR
               1928
               1929 ; PULSE CLOCK LINE
048B 8A20      1930         ORL     P2,#20H
048D 9ADF      1931         ANL     P2,#0DFH
               1932
048F E886      1933         DJNZ    R0,LFA1
               1934
0491 B806      1935         MOV     R0,#CFXADD
0493 90        1936         MOVX    @R0,A     ; LOAD 'FIXED ADDRESS' INTO CONTROL COMM. I.C.
               1937
0494 83        1938         RET
               1939
               1940 ;*** END OF LDFXAD ***
               1941 $EJECT
```

```
                    1942
                    1943 ;        NAME            LNTST
                    1944
                    1945 ;
                    1946 ;
                    1947 ;
                    1948
                    1949 ; LNTST -- LINE TEST ROUTINE
                    1950
                    1951 LNTST:
0495 18             1952          INC     R0
0496 80             1953          MOVX    A,@R0
0497 90             1954          MOVX    @R0,A
0498 14E4           1955          CALL    FRWAIT ; ECHO COMMAND AS RESPONSE
                    1956
                    1957 ; TEST DIGITAL PER-LINE CUSTOM I.C.
049A F400           1958          CALL    DIGICT
                    1959
                    1960 ; TEST ANALOG PER-LINE CUSTOM I.C.
049C F44D           1961          CALL    ANAICT
                    1962
                    1963 ; PERFORM CHECKSUM TEST OF PROGRAM MEMORY
049E 9408           1964          CALL    ROMT
                    1965
                    1966 ; RETURN S/H DATA ON PORT 1 INPUTS
04A0 74E4           1967          CALL    RTNSH
                    1968
04A2 83             1969          RET
                    1970
                    1971 ;*** END OF LNTST ***
                    1972 $EJECT
                    1973
                    1974 ;        NAME            DELAY
                    1975
                    1976 ;
                    1977 ;
                    1978 ;
                    1979
                    1980 ; DELAY -- DELAY SUBROUTINE. THE CONTENTS OF THE 'A' REG AT ENTRY
                    1981 ;          IS THE DELAY IN MILLISECONDS.
                    1982
                    1983 DELAY:
04A3 AA             1984          MOV     R2,A
04A4 235A           1985          MOV     A,#90  ; 90 @ 4.096 MHZ, 132 @ 6 MHZ,
                    1986                         ; 180 @ 8.192 MHZ, 242 @ 11 MHZ
04A6 07             1987          DEC     A
04A7 96A6           1988          JNZ     $-1
04A9 EAA4           1989          DJNZ    R2,$-5
04AB 83             1990          RET
                    1991
                    1992 ;*** END OF DELAY ***
                    1993 $EJECT
                    1994
                    1995 ;        NAME            RSDHS
                    1996
                    1997 ;
```

```
              1998 ;
              1999 ;
              2000
              2001 ; RSDHS — RESET 'DELTA HOOK STATUS' BIT OF THE SPECIFIED LINE CKT.
              2002
              2003 RSDHS:
              2004 ; ECHO COMMAND BYTE 4 TO SET 'RESPONSE ENA' FF
04AC 18       2005          INC     R0
04AD 80       2006          MOVX    A,@R0
04AE 90       2007          MOVX    @R0,A
              2008
              2009 ; CLEAR SELECTED LINE CIRCUIT'S 'DELTA H/S' BIT
04AF B922     2010          MOV     R1,#DLTAHS
04B1 F1       2011          MOV     A,@R1
04B2 5F       2012          ANL     A,R7     ; CLEAR BIT OF 'DLTAHS' CORRESPONDING TO
04B3 A1       2013          MOV     @R1,A    ;   SPECIFIED LINE CKT.
04B4 96BC     2014          JNZ     RSDHS1
              2015
              2016 ; ALL 'DLTAHS' BITS ARE ZERO, CLEAR "OR'D DELTA H/S" BIT OF 'LNCRDS'
04B6 B920     2017          MOV     R1,#LNCRDS
04B8 F1       2018          MOV     A,@R1
04B9 53FE     2019          ANL     A,#0FEH
04BB A1       2020          MOV     @R1,A
              2021
04BC 83       2022 RSDHS1:  RET
              2023
              2024 ;*** END OF RSDHS ***
              2025 $EJECT
              2026
              2027 ;       NAME            SMPTX4
              2028
              2029 ;
              2030 ;
              2031 ;
              2032
              2033 ; SMPTX4 — SAMPLES TX PCM CHANNEL 4 AND COUNTS THE NUMBER OF OCCURRANCES
              2034 ;          OF THE PCM VALUE CORRESPONDING TO THE ABSOLUTE PEAK AMPLITUDE
              2035 ;          OF THE SIGNAL ON CHAN. 4.  THE NUMBER OF SAMPLES TAKEN IS
              2036 ;          SPECIFIED IN COMMAND BYTE 3 (THE MIN. NUMBER OF SAMPLES IS 1,
              2037 ;          THE MAX. IS 256 (0).)
              2038
              2039 SMPTX4:
04BD 9440     2040          CALL    RQST
04BF C8       2041          DEC     R0
04C0 80       2042          MOVX    A,@R0    ; FETCH NO. OF SAMPLES TO BE EXAMINED
04C1 AA       2043          MOV     R2,A
              2044
              2045 ; WAIT FOR RESPONSE FRAME, RETURN RESPONSE, THEN CONTINUE
04C2 14E4     2046          CALL    FRWAIT
              2047
              2048 ; SAMPLE TX CHAN. 4 (R2) TIMES
04C4 84C7     2049          CALL    FPL      ; TAKE THE NUMBER OF SAMPLES SPECIFIED IN R2
              2050                           ;   (ABSOLUTE PEAK PCM VALUE RETURNED IN R4,
              2051                           ;    NUMBER OF OCCURANCES IS RETURNED IN R3)
              2052
```

```
                    2053 ; PUT PEAK VALUE & NO. OF OCCURANCES IN REQUESTED DATA BYTES
84C6 B926           2054         MOV     R1,#RQBYT1
84C8 FC             2055         MOV     A,R4
84C9 A1             2056         MOV     @R1,A   ; FETCH PEAK VALUE AND PUT IN 'RQBYT1'
84CA 19             2057         INC     R1
84CB FB             2058         MOV     A,R3
84CC A1             2059         MOV     @R1,A   ; FETCH NO. OF OCCURANCES AND PUT IN 'RQBYT2'
                    2060
                    2061 ; JUMP INTO GNADJ SUBROUTINE TO FINISH UP
84CD A4B2           2062         JMP     ENDADJ
                    2063
                    2064 ;*** END OF SMPTX4 ***
                    2065 $EJECT
                    2066
                    2067 ;       NAME            RDROM
                    2068
                    2069 ;
                    2070 ;
                    2071 ;
                    2072
                    2073 ; RDROM -- READ BYTE OF PROGRAM MEMORY SPECIFIED BY BITS (2-0) OF FUNCTION
                    2074 ;         CODE BYTE AND BITS (7-0) OF COMMAND BYTE 3 TO FORM AN
                    2075 ;         ELEVEN-BIT ADDRESS (FUNCTION CODE BITS (2-0) ARE MOST SIGNIFICANT)
                    2076
                    2077 RDROM:
84CF FE             2078         MOV     A,R6
84D0 AA             2079         MOV     R2,A    ; PAGE SELECT
84D1 80             2080         MOVX    A,@R0
84D2 AB             2081         MOV     R3,A    ; BYTE SELECT
84D3 18             2082         INC     R0
84D4 F400           2083         CALL    GETROM
84D6 90             2084         MOVX    @R0,A   ; PUT FETCHED DATA IN RESPONSE REG. BYTE 4
84D7 83             2085         RET
                    2086
                    2087 ;*** END OF RDROM ***
                    2088 $EJECT
                    2089
                    2090 ;       NAME            ROMT
                    2091
                    2092 ;
                    2093 ;
                    2094 ;
                    2095
                    2096 ; ROMT -- CHECKSUM TEST OF PROGRAM MEMORY
                    2097
                    2098 ROMT:
                    2099 ; CLEAR 'ROM TEST FAILED' FLAG
84D8 B92A           2100         MOV     R1,#TESTR
84DA F1             2101         MOV     A,@R1
84DB 53FD           2102         ANL     A,#0FDH
84DD A1             2103         MOV     @R1,A
                    2104
                    2105 ; INITIALIZE CHECKSUM BYTE AND ADDRESS POINTERS
84DE BC00           2106         MOV     R4,#0   ; CHECKSUM BYTE
84E0 BB00           2107         MOV     R3,#0   ; BYTE POINTER
84E2 BA08           2108         MOV     R2,#8   ; PAGE POINTER
```

```
                2109
                2110 ; SUM ALL BYTES OF PROGRAM MEMORY
04E4 F4DD       2111        CALL    GETROM
04E6 6C         2112        ADD     A,R4
04E7 AC         2113        MOV     R4,A
04E8 EBE4       2114        DJNZ    R3,$-4   ; HAVE ALL BYTES OF THIS PAGE BEEN SUMMED?
04EA EAE4       2115        DJNZ    R2,$-6   ; HAVE ALL PAGES BEEN SUMMED?
                2116
                2117 ; TEST CHECK SUM FOR ZERO
04EC 96EF       2118        JNZ     ROMF     ; TEST FAILS IF CHECKSUM NOT ZERO
04EE 83         2119        RET
                2120
                2121 ROMF:
                2122 ; CHECKSUM NOT ZERO----SET 'ROM TEST FAILED' FLAG
04EF F1         2123        MOV     A,@R1
04F0 4302       2124        ORL     A,#2
04F2 A1         2125        MOV     @R1,A
04F3 83         2126        RET
                2127
                2128 ;*** END OF ROMT ***
                2129 $EJECT
                2130
                2131 ;       NAME            RGNADJ
                2132
                2133 ;
                2134 ;
                2135 ;
                2136
                2137 ; RGNADJ -- RX GAIN AUTO-ADJUST ROUTINE
                2138
0500            2139        ORG     500H
                2140 RGNADJ:
                2141 ; SET FLAG F0 (RX GAIN ADJ. OPERATION)
0500 85         2142        CLR     F0
0501 95         2143        CPL     F0
                2144
                2145 ; SAVE 2ND LINE CIRCUIT'S 'INDEX' IN TEMP1
0502 B96B       2146        MOV     R1,#TEMP1
0504 80         2147        MOVX    A,@R0
0505 5307       2148        ANL     A,#7
0507 A1         2149        MOV     @R1,A
                2150
                2151 ; ECHO COMMAND BYTE 4 TO SET 'RESPONSE ENA' FF
0508 18         2152        INC     R0
0509 80         2153        MOVX    A,@R0
050A 90         2154        MOVX    @R0,A
                2155
                2156 ; WAIT FOR RESPONSE FRAME
050B 14E4       2157        CALL    FRWAIT
                2158
                2159 ; ARE 2ND LINE CKT'S 'INDEX' & SELECTED LINT CKT'S 'INDEX' EQUAL?
050D B96B       2160        MOV     R1,#TEMP1
050F F1         2161        MOV     A,@R1
0510 DE         2162        XRL     A,R6
0511 9614       2163        JNZ     RGA1
                2164
```

```
                    2165 ; INDICES ARE EQUAL----TEST CANNOT BE PERFORMED
0513 83             2166        RET
                    2167
                    2168 RGA1:
                    2169 ; PULL-IN 'TEST RELAY', ETC. FOR SELECTED LINE CKT.
                    2170 ; EVEN BAR/ODD = 1, EURO SEL = 0, POWER = 1, TR BAR = 0,
                    2171 ; RR BAR = 1, LC ENA = 0, ILS = 0, A BAR/B PCM SEL = 0
0514 BAA8           2172        MOV     R2,#0A8H
0516 3431           2173        CALL    LDDIG   ; LOAD DIGITAL I.C. & RETURN WITH LINE CKT. IN
                    2174                        ;   'RETURN S/H' MODE
                    2175
                    2176 $EJECT
                    2177 ; PULL-IN 'TEST RELAY', ETC. FOR 2ND LINE CKT.
0518 B96B           2178        MOV     R1,#TEMP1
051A 2E             2179        XCH     A,R6
051B 21             2180        XCH     A,@R1
051C AE             2181        MOV     R6,A
051D 23EF           2182        MOV     A,#(CLKVCT-(100H*(CLKVCT/100H)))
051F 6E             2183        ADD     A,R6
0520 E3             2184        MOVP3   A,@A    ; TABLE LOOK-UP 2ND LINE CKT'S 'CLK VECTOR'
0521 AF             2185        MOV     R7,A
                    2186
                    2187 ; EVEN BAR/ODD = 0, EURO SEL = 0, POWER = 1, TR BAR = 0, RR BAR = 1,
                    2188 ; LC ENA = 1, ILS = 0, A BAR/B PCM SEL = 0
0522 BA2C           2189        MOV     R2,#2CH
0524 3431           2190        CALL    LDDIG   ; LOAD DIGITAL I.C. & RETURN WITH LINE CIRCUIT
                    2191                        ;   IN 'RETURN S/H' MODE
                    2192
                    2193 ; ASSIGN 2ND LINE CKT'S TX & RX CHANNELS
0526 2340           2194        MOV     A,#40H  ; TX PCM CH. 4 ===> CODEC TX CH. 0
0528 942F           2195        CALL    CODEC
052A 238A           2196        MOV     A,#8AH  ; RX PCM NOT USED ===> CODEC RX CH. 0AH
052C 942F           2197        CALL    CODEC   ; CODEC SUBROUTINE RETURNS WITH LINE CKT.
                    2198                        ;   IN 'RETURN S/H' MODE
                    2199
                    2200 ; ASSIGN SELECTED LINE CKT'S TX & RX CHANNELS
052E B96B           2201        MOV     R1,#TEMP1
0530 2E             2202        XCH     A,R6
0531 21             2203        XCH     A,@R1
0532 AE             2204        MOV     R6,A
0533 23EF           2205        MOV     A,#(CLKVCT-(100H*(CLKVCT/100H)))
0535 6E             2206        ADD     A,R6
0536 E3             2207        MOVP3   A,@A    ; TABLE LOOK-UP SELECTED LINE CKT'S 'CLK VECT'
0537 AF             2208        MOV     R7,A
                    2209
0538 2340           2210        MOV     A,#40H  ; NOT INTERESTED IN SELECTED LINE CKT'S TX PCM
053A 942F           2211        CALL    CODEC
053C 2389           2212        MOV     A,#89H  ; RECEIVE 'DIGITAL MILLIWATT' ON RX PCM CH. 9
053E 942F           2213        CALL    CODEC
                    2214
0540 A454           2215        JMP     GNADJ
                    2216
                    2217 ;*** END OF RGNADJ ***
                    2218 $EJECT
```

```
                 2219
                 2220 ;         NAME              TGNADJ
                 2221
                 2222 ;
                 2223 ;
                 2224 ;
                 2225
                 2226 ; TGNADJ -- TX GAIN AUTO-ADJUST ROUTINE
                 2227
                 2228 TGNADJ:
                 2229 ; CLEAR FLAG F0 (TX GAIN ADJ. OPERATION)
    0542 85      2230          CLR       F0
                 2231
                 2232 ; ECHO COMMAND BYTE 4 TO SET 'RESPONSE ENA' FF
    0543 18      2233          INC       R0
    0544 80      2234          MOVX      A,@R0
    0545 90      2235          MOVX      @R0,A
                 2236
                 2237 ; WAIT FOR RESPONSE FRAME
    0546 14E4    2238          CALL      FRWAIT
                 2239
                 2240 ; PULL-IN 'TEST RELAY', ETC.
                 2241 ; EVEN BAR/ODD = 0, EURO SEL = 0, POWER = 1, TR BAR = 0,
                 2242 ; RR BAR = 1, LC ENA = 1, ILS = 0, A BAR/B PCM SEL = 0
    0548 BA2C    2243          MOV       R2,#2CH
    054A 3431    2244          CALL      LDDIG
                 2245
                 2246 ; ASSIGN TX & RX CHANNELS
    054C 2340    2247          MOV       A,#40H  ; TX PCM CH. 4 ==> CODEC TX CH. 0
    054E 942F    2248          CALL      CODEC
    0550 230A    2249          MOV       A,#02AH ; RX PCM NOT NEEDED FOR TEST
    0552 942F    2250          CALL      CODEC   ; CODEC SUBROUTINE RETURNS WITH LINE CIRCUIT
                 2251                            ; IN 'RETURN S/H' MODE
                 2252
                 2253 ; ENTER 'GNADJ'
                 2254
                 2255 ;*** END OF TGNADJ ***
                 2256 $EJECT
                 2257
                 2258 ;         NAME              GNADJ
                 2259
                 2260 ;
                 2261 ;
                 2262 ;
                 2263
                 2264 ; GNADJ -- GAIN AUTO-ADJUST ROUTINE (CONTINUATION OF RGNADJ & TGNADJ)
                 2265
                 2266 GNADJ:
                 2267 ; WAIT FOR RELAY CONTACT BOUNCE TO STOP.
    0554 B868    2268          MOV       R0,#RELAYD
    0556 F0      2269          MOV       A,@R0   ; GET RELAY DEBOUNCE DELAY VALUE
    0557 94A3    2270          CALL      DELAY
                 2271
                 2272 ; INITIALIZE SELECTED LINE CKT'S GAIN SETTING (TX GAIN IF F0=0,
                 2273 ;   RX GAIN IF F0=1)
    0559 54E1    2274          CALL      RGNADD
```

```
055B B65E      2275            JF0     $+3     ; SKIP NEXT INSTR. IF RX GAIN ADJ.
055D C9        2276            DEC     R1      ; ADJUST R1 TO POINT TO 'TX GAIN' BYTE
055E B100      2277            MOV     @R1,#0
0560 3492      2278            CALL    LDGAIN  ; LOAD GAIN SETTING INTO ANALOG I.C.
               2279
               2280 GETPK:
               2281 ; WAIT FOR TEST SIGNAL TO STABILIZE AFTER GAIN CHANGE
0562 B869      2282            MOV     R0,#GNDEL
0564 F0        2283            MOV     A,@R0   ; GET GAIN ADJUST DELAY VALUE
0565 94A3      2284            CALL    DELAY
               2285
               2286 ; FIND PEAK PCM LEVEL (RETURNS 'PEAK LEVEL' IN R4, 'PEAK COUNT' IN R3)
0567 B4C7      2287            CALL    FPL
               2288
               2289 ; IS 'PEAK LEVEL' < 8 (GAIN TOO HIGH) ?
0569 FC        2290            MOV     A,R4
056A 03F8      2291            ADD     A,#0F8H ; ADD 2'S COMPLEMENT OF 8 TO 'PEAK LEVEL' VALUE
               2292                            ; CARRY FLAG WILL BE SET IF 'PEAK LEVEL')=8
056C E690      2293            JNC     GNERR1  ; GAIN TOO HIGH----HARDWARE ERROR
056E 9681      2294            JNZ     GNLO
               2295
               2296 ; 'PEAK LEVEL' VALUE = 8 OR 9
               2297 ; IS 'PEAK COUNT' < 9 (GAIN TOO LOW) ?
0570 FB        2298            MOV     A,R3
0571 03F7      2299            ADD     A,#0F7H ; ADD 2'S COMPLEMENT OF 9 TO 'PEAK COUNT'
               2300                            ; CARRY FLAG WILL BE SET IF 'PEAK COUNT'<9
0573 E681      2301            JNC     GNLO
               2302
               2303 ; IS 'PEAK COUNT' >= 16 (GAIN TOO HIGH) ?
0575 FB        2304            MOV     A,R3
0576 03F0      2305            ADD     A,#0F0H ; ADD 2'S COMPL. OF 16 TO 'PEAK COUNT'
0578 F690      2306            JC      GNERR1  ;   IF CARRY FLAG SET, 'PEAK COUNT')=16 WHICH
               2307                            ;   MEANS THAT GAIN CANNOT BE ADJUSTED WITHIN
               2308                            ;   THE REQUIRED BAND----HARDWARE ERROR
               2309
               2310 $EJECT
               2311 ; GAIN IS SET WITHIN TOLERANCE----CLEAR 'ANALOG I.C. FAILED' BIT OF 'TESTRA'
057A B92D      2312            MOV     R1,#TESTRA
057C F1        2313            MOV     A,@R1
057D 5F        2314            ANL     A,R7
057E A1        2315            MOV     @R1,A
057F A4A2      2316            JMP     GNADJ1
               2317
               2318 GNLO:
               2319 ; GAIN SETTING TOO LOW----INCREMENT PRESENT SETTING BY ONE
0581 54E1      2320            CALL    RGNADD
0583 B686      2321            JF0     $+3     ; SKIP NEXT INSTR. IF RX GAIN ADJ.
0585 C9        2322            DEC     R1
0586 F1        2323            MOV     A,@R1
0587 D31F      2324            XRL     A,#1FH  ; IS GAIN ALREADY AT MAX. VALUE?
0589 C69C      2325            JZ      GNERR2  ; IF ALREADY AT MAX. GAIN SETTING, THEN
               2326            ;                 MAX. GAIN TOO LOW----HARDWARE ERROR
058B 11        2327            INC     @R1     ; INCREMENT 'GAIN' BYTE IN MEMORY
058C 3492      2328            CALL    LDGAIN  ; LOAD NEW GAIN SETTING INTO ANALOG I.C.
058E A462      2329            JMP     GETPK
               2330
```

```
                    2331 GNERR1:
                    2332 ; DECREMENT GAIN SETTING BY ONE (IF NOT AT MIN.)
0590 54E1           2333         CALL    RGNADD
0592 B695           2334         JF0     $+3         ; SKIP NEXT INSTR. IF RX GAIN ADJ.
0594 C9             2335         DEC     R1
0595 F1             2336         MOV     A,@R1
0596 C69C           2337         JZ      GNERR2      ; CHECK IF ALREADY ZERO
0598 07             2338         DEC     A
0599 A1             2339         MOV     @R1,A
059A 3492           2340         CALL    LDGAIN
                    2341
                    2342 GNERR2:
                    2343 ; SET 'FAILED TEST' BIT OF 'TESTRA' FOR SELECTED LINE CKT.
059C B92D           2344         MOV     R1,#TESTRA
059E FF             2345         MOV     A,R7
059F 37             2346         CPL     A
05A0 41             2347         ORL     A,@R1
05A1 A1             2348         MOV     @R1,A
                    2349
                    2350 GNADJ1:
                    2351 ; PUT CODEC IN 'STANDBY' MODE
05A2 23FF           2352         MOV     A,#0FFH
05A4 942F           2353         CALL    CODEC
                    2354
                    2355 ; RELEASE 'TEST RELAY', ETC.
05A6 2330           2356         MOV     A,#LCST1
05A8 6E             2357         ADD     A,R6
05A9 A9             2358         MOV     R1,A
05AA B118           2359         MOV     @R1,#IDIG
05AC BA18           2360         MOV     R2,#IDIG
05AE 3431           2361         CALL    LDDIG
                    2362 $EJECT
                    2363 ; REPEAT FOR 2ND LINE CKT. IF RX GAIN ADJ.
05B0 B6BA           2364         JF0     GNADJ2
                    2365
                    2366 ENDADJ:
                    2367 ; RESET FRAME COUNTER TO INITIALIZATION VALUE
05B2 65             2368         STOP    TCNT
05B3 2318           2369         MOV     A,#18H
05B5 62             2370         MOV     T,A
05B6 45             2371         STRT    CNT
05B7 168A           2372         JTF     $+3         ; RESET TIMER FLAG
05B9 83             2373         RET
                    2374
                    2375 GNADJ2:
                    2376 ; PUT 2ND LINE CKT'S 'INDEX' & 'CLOCK VECTOR' INTO THE SELECTED
                    2377 ;   LINE CIRCUIT'S 'INDEX' & 'CLOCK VECTOR' REGISTERS.
05BA 85             2378         CLR     F0
05BB B96B           2379         MOV     R1,#TEMP1
05BD 2E             2380         XCH     A,R6
05BE 21             2381         XCH     A,@R1
05BF AE             2382         MOV     R6,A        ; 2ND LINE CKT'S 'INDEX' IN R6
05C0 23EF           2383         MOV     A,#(CLKVCT-(100H*(CLKVCT/100H)))
05C2 6E             2384         ADD     A,R6
05C3 E3             2385         MOVP3   A,@A
05C4 AF             2386         MOV     R7,A        ; 2ND LINE CKT'S 'CLOCK VECTOR' IN R7
```

```
85C5 A4A2      2387          JMP     GNADJ1
               2388
               2389 ;*** END OF GNADJ ***
               2390 $EJECT
               2391
               2392 ;        NAME            FPL
               2393
               2394 ;
               2395 ;
               2396 ;
               2397
               2398 ; FPL — FIND PEAK PCM LEVEL SUBROUTINE
               2399
               2400 FPL:
85C7 BA7D      2401          MOV     R2,#125 ; INITIALIZE SAMPLE COUNTER
85C9 B809      2402          MOV     R0,#9   ; ADDR. OF PCM SAMPLING REG.
85CB E800      2403          MOV     R3,#0   ; INITIALIZE PEAK COUNTER
85CD BC7F      2404          MOV     R4,#7FH ; INITIALIZE PEAK LEVEL BYTE
               2405
85CF 45        2406          STRT    CNT
85D0 42        2407          MOV     A,T
85D1 37        2408          CPL     A
85D2 07        2409          DEC     A       ; 2'S COMPL. OF STARTING FRAME COUNT
85D3 A9        2410          MOV     R1,A
               2411
85D4 42        2412 NXTSMP:  MOV     A,T
85D5 69        2413          ADD     A,R1
85D6 96D4      2414          JNZ     NXTSMP  ; WAIT UNTIL NEXT SAMPLE'S FRAME BEGINS
85D8 00        2415          NOP
85D9 00        2416          NOP             ; WILL WORK AS-IS UP TO 8.192 MHZ
85DA 00        2417          NOP             ; TWO MORE NO-OP'S ARE NEEDED FOR RELIABLE
               2418                          ;   OPERATION AT 11 MHZ
85DB 80        2419          MOVX    A,@R0   ; FETCH NEXT PCM SAMPLE
85DC C9        2420          DEC     R1
85DD 537E      2421          ANL     A,#7EH  ; MASK OFF SIGN BIT & LSB
85DF AD        2422          MOV     R5,A    ; TEMP. SAVE IN R5
               2423
85E0 37        2424          CPL     A
85E1 17        2425          INC     A       ; 2'S COMPL. OF SAMPLE
85E2 6C        2426          ADD     A,R4    ; CARRY SET IF SAMPLE <= CURRENT PEAK VALUE
85E3 E6E8      2427          JNC     NOPEAK
85E5 96EB      2428          JNZ     NEWPK
85E7 1B        2429          INC     R3      ; SAMPLE=CURRENT PEAK VALUE, INCREMENT PEAK CNT.
85E8 EAD4      2430 NOPEAK:  DJNZ    R2,NXTSMP ; ANY MORE SAMPLES?
85EA 83        2431          RET
               2432
85EB FD        2433 NEWPK:   MOV     A,R5
85EC AC        2434          MOV     R4,A    ; SAMPLE VALUE BECOMES NEW PEAK VALUE
85ED BB01      2435          MOV     R3,#1   ; RESET PEAK COUNTER
85EF EAD4      2436          DJNZ    R2,NXTSMP ; ANY MORE SAMPLES?
85F1 83        2437          RET
               2438
               2439 ;*** END OF FPL ***
               2440 $EJECT
               2441
               2442 ;        NAME            SLFTST
```

```
                    2443
                    2444 ;
                    2445 ;
                    2446 ;
                    2447
                    2448 ;   SLFTST -- LINE CARD SELF-TEST ROUTINE
                    2449
0600                2450         ORG     600H
                    2451 SLFTST:
                    2452 ; CHECK DATA MEMORY
0600 E48A           2453         JMP     RAMT
                    2454 RAMRET:
                    2455 ; INITIALIZE TEST RESULTS BYTES
0602 B820           2456         MOV     R0,#TESTR+3
0604 B903           2457         MOV     R1,#3
0606 B000           2458         MOV     @R0,#0
0608 C8             2459         DEC     R0
0609 E906           2460         DJNZ    R1,$-3
                    2461
                    2462 ; CHECK PROGRAM MEMORY
060B 9408           2463         CALL    ROMT
                    2464
                    2465 ; CHECK PER-CARD CUSTOM CONTROL COMMUNICATIONS I.C.
060D D424           2466         CALL    COMICT
                    2467
                    2468 ; CHECK DIGITAL & ANALOG PER-LINE CUSTOM I.C.'S
060F 7445           2469         CALL    RAMRS
                    2470 ;##############################################################
0611 BE02           2471         MOV     R6,#2       ;
0613 BFFD           2472         MOV     R7,#0FDH    ;
                    2473 ;##############################################################
0615 CE             2474 ST1:    DEC     R6          ; NEXT LINE CKT. TO BE TESTED
0616 F400           2475         CALL    DIGICT      ; TEST DIGITAL PER-LINE CUSTOM I.C.
0618 F440           2476         CALL    ANAICT      ; TEST ANALOG PER-LINE CUSTOM I.C.
061A FF             2477         MOV     A,R7
061B 77             2478         RR      A
061C AF             2479         MOV     R7,A        ; NEXT LINE CKT'S CLOCK VECTOR
061D FE             2480         MOV     A,R6
061E 9615           2481         JNZ     ST1         ; HAVE ALL LINE CKTS. BEEN TESTED?
                    2482
                    2483 ; RETURN S/H ON PORT 1
0620 74E4           2484         CALL    RTNSH
                    2485
                    2486 ; RETURN TO POWER-ON RESET SEQUENCE
0622 6413           2487         JMP     STRET       ; SELF TEST ROUTINE'S RETURN ADDRESS
                    2488
                    2489 ;*** END OF SLFTST ***
                    2490 $EJECT
                    2491
                    2492 ;       NAME            COMICT
                    2493
                    2494 ;
                    2495 ;
                    2496 ;
                    2497
                    2498 ;   COMICT -- TEST ROUTINE FOR THE PER-CARD CUSTOM CONTROL
```

```
                    2499 ;              COMMUNICATIONS I.C.
                    2500
                    2501 COMICT:
0624 15             2502          DIS     I
                    2503
                    2504 ; RESET 'COM I.C. FAILED' BIT OF TESTR
0625 B92A           2505          MOV     R1,#TESTR
0627 F1             2506          MOV     A,@R1
0628 53FB           2507          ANL     A,#0FBH
062A A1             2508          MOV     @R1,A
                    2509
                    2510 ; CHECK OPERATION OF MODE REGISTER (WALKING 1/0 TEST)
                    2511 ;   WALKING 1'S TEST
062B E900           2512          MOV     R1,#CMODE
062D BC00           2513          MOV     R4,#0   ; INITIALIZE TEST DATA BYTE
062F BA08           2514          MOV     R2,#8   ; INITIALIZE TEST COUNTER
                    2515 WALK1:
0631 FC             2516          MOV     A,R4
0632 91             2517          MOVX    @R1,A
0633 81             2518          MOVX    A,@R1   ; WRITE THEN READ BACK NEXT TEST BYTE
0634 DC             2519          XRL     A,R4    ; COMPARE WITH EXPECTED DATA
0635 96C7           2520          JNZ     CFAIL
0637 FC             2521          MOV     A,R4
0638 97             2522          CLR     C
0639 A7             2523          CPL     C       ; SET C
063A F7             2524          RLC     A
063B AC             2525          MOV     R4,A    ; PUT NEXT TEST DATA BYTE INTO R4
063C EA31           2526          DJNZ    R2,WALK1
                    2527
                    2528 ;   WALKING 0'S TEST
063E BA08           2529          MOV     R2,#8
                    2530 WALK0:
0640 FC             2531          MOV     A,R4
0641 91             2532          MOVX    @R1,A
0642 81             2533          MOVX    A,@R1
0643 DC             2534          XRL     A,R4    ; COMPARE WITH EXPECTED DATA
0644 96C7           2535          JNZ     CFAIL
0646 FC             2536          MOV     A,R4
0647 97             2537          CLR     C       ; CLEAR C
0648 F7             2538          RLC     A
0649 AC             2539          MOV     R4,A
064A EA40           2540          DJNZ    R2,WALK0
                    2541
                    2542 $EJECT
                    2543
                    2544 ; SET UP MODE CONTROL REG. FOR TEST
064C 2383           2545          MOV     A,#083H ; 'A' SHIFT REG. FEEDBACK SELECTED
064E 91             2546          MOVX    @R1,A
                    2547
                    2548 ; SET UP TEST DATA IN REGS 2,3,4,&5
064F BD63           2549          MOV     R5,#63H    ; BYTE 1
0651 BCC1           2550          MOV     R4,#0C1H   ; BYTE 2
0653 BBF8           2551          MOV     R3,#0F8H   ; BYTE 3
0655 BA0F           2552          MOV     R2,#0FH    ; BYTE 4
                    2553
                    2554 ; LOAD S/R'S WITH TEST DATA AND VERIFY
```

```
0657 BE02      2555           MOV     R6,#2
0659 B80E      2556           MOV     R0,#0EH
065B 27        2557           CLR     A
065C 90        2558 COM00:    MOVX    @R0,A
065D 18        2559           INC     R0
065E B905      2560           MOV     R1,#5    ; INIT. TEST DATA POINTER
0660 BF04      2561           MOV     R7,#4    ; INIT. BYTE COUNTER
               2562 COM01:
0662 F1        2563           MOV     A,@R1
0663 37        2564           CPL     A        ; INVERT TEST DATA
0664 90        2565           MOVX    @R0,A    ; & WRITE INTO S/R
0665 C9        2566           DEC     R1
0666 EF62      2567           DJNZ    R7,COM01
               2568
               2569 ; LOAD OTHER S/R WITH TEST DATA
0668 B905      2570           MOV     R1,#5
066A BF04      2571           MOV     R7,#4
               2572 COM02:
066C F1        2573           MOV     A,@R1
066D 90        2574           MOVX    @R0,A    ; WRITE TEST DATA INTO S/R
066E C9        2575           DEC     R1
066F EF6C      2576           DJNZ    R7,COM02
               2577
               2578 ; VERIFY INVERTED TEST DATA IN S/R
0671 B905      2579           MOV     R1,#5
0673 BF04      2580           MOV     R7,#4
               2581 COM03:
0675 80        2582           MOVX    A,@R0    ; FETCH NEXT BYTE FROM S/R
0676 37        2583           CPL     A        ; & INVERT
0677 D1        2584           XRL     A,@R1    ; COMPARE WITH EXPECTED DATA
0678 96C7      2585           JNZ     CFAIL
067A C9        2586           DEC     R1
067B EF75      2587           DJNZ    R7,COM03
               2588
               2589 $EJECT
               2590 ; VERIFY DATA IN OTHER S/R
067D B905      2591           MOV     R1,#5
067F BF04      2592           MOV     R7,#4
               2593 COM04:
0681 80        2594           MOVX    A,@R0    ; FETCH NEXT BYTE FROM S/R
0682 D1        2595           XRL     A,@R1    ; & COMPARE WITH EXPECTED DATA
0683 96C7      2596           JNZ     CFAIL
0685 C9        2597           DEC     R1
0686 EF81      2598           DJNZ    R7,COM04
               2599
               2600 ; REPEAT ONLY INVERTING THE DATA WRITTEN EACH S/R
0688 B80E      2601           MOV     R0,#0EH
068A 2304      2602           MOV     A,#4
068C 90        2603           MOVX    @R0,A
068D EE5C      2604           DJNZ    R6,COM00
               2605
               2606 ; LOAD 'FIXED ADDRESS' REGISTER
068F B808      2607           MOV     R0,#CFXADD
0691 FB        2608           MOV     A,R3
0692 90        2609           MOVX    @R0,A
               2610
```

```
                    2611 ; INITIALIZE FRAME COUNTER FOR TEST
0693 65             2612        STOP    TCNT
0694 23F6           2613        MOV     A,#0F6H ; (-10 DECIMAL)
0696 62             2614        MOV     T,A
0697 1699           2615        JTF     $+2     ; RESETS 'TIMER FLAG'
0699 B908           2616        MOV     R1,#8
069B 45             2617        STRT    CNT
                    2618
                    2619 ; BEGIN TEST OF THE DYNAMIC OPERATION OF THE I.C.
069C 14D9           2620        CALL    CNTLE1  ; SYNCHRONIZES SOFTWARE TO FRAME CLOCK, THEN
                    2621                        ;   ENABLES CONTROL S/R SHIFTING
069E B800           2622        MOV     R0,#CMODE
06A0 B90C           2623        MOV     R1,#CSTS
                    2624
                    2625 ; WAIT UNTIL FRAME COUNTER OVERFLOWS
06A2 16A6           2626 LC005: JTF     CCNT    ; EXIT LOOP IF TERMINAL COUNT IS REACHED
06A4 C4A2           2627        JMP     LC005   ; REPEAT LOOP
                    2628
06A6 81             2629 CCNT:  MOVX    A,@R1
06A7 92A6           2630        JB4     CCNT    ; LOOP UNTIL 'CNTRL WINDOW' = 0
06A9 65             2631        STOP    TCNT    ; HALT FRAME COUNTER
06AA 27             2632        CLR     A       ;    &
06AB 90             2633        MOVX    @R0,A   ;      SHIFTING
                    2634
                    2635 $EJECT
                    2636 ; VERIFY THAT BOTH ADDR. MATCH FLAGS ARE SET AND THAT THE FRAME
                    2637 ;   COUNT IS CORRECT.
06AC 81             2638        MOVX    A,@R1
06AD 37             2639        CPL     A
06AE 12C7           2640        JB0     CFAIL   ; TEST 'A' ADDR. MATCH FLAG
06B0 32C7           2641        JB1     CFAIL   ;  "  'B'  "     "     "
                    2642
                    2643 ; LOAD EXPECTED DATA INTO REGS. R5, R4, R3, & R2
06B2 BDF8           2644        MOV     R5,#0F8H
06B4 BC0F           2645        MOV     R4,#0FH
06B6 BB63           2646        MOV     R3,#63H
06B8 BAC1           2647        MOV     R2,#0C1H
                    2648
                    2649 ; VERIFY THE CONTENTS OF BOTH SHIFT REGISTERS
06BA D4D0           2650        CALL    DATCHK
06BC B804           2651        MOV     R0,#4
06BE D4D2           2652        CALL    DATCHK+2
06C0 748F           2653        CALL    CNTLRS  ; RESET COMM. I.C.
06C2 83             2654        RET
                    2655
06C3 C7             2656 CFAIL1: MOV    A,PSW
06C4 0307           2657        ADD     A,#7    ; MODULO 8 DECREMENT OF STACK POINTER
06C6 D7             2658        MOV     PSW,A
06C7 B82A           2659 CFAIL: MOV     R0,#TESTR
06C9 F0             2660        MOV     A,@R0
06CA 4304           2661        ORL     A,#04H  ; SET 'CTEST FAILED' FLAG
06CC A0             2662        MOV     @R0,A
06CD 748F           2663        CALL    CNTLRS  ; RESET COMM. I.C.
06CF 83             2664        RET
                    2665
                    2666 ; SUBROUTINE DATCHK ***********************************************
```

```
86D0 B800        2667 DATCHK: MOV    R0,#0    ; R0 POINTS TO BYTE 1 OF 'A' S/R
86D2 BF04        2668         MOV    R7,#4    ; INIT. BYTE COUNTER
86D4 B905        2669         MOV    R1,#5    ; INIT. TEST DATA POINTER
                 2670
86D6 80          2671 LC008:  MOVX   A,@R0    ; READ NEXT BYTE OUT OF S/R
86D7 D1          2672         XRL    A,@R1    ;   & COMPARE WITH THE EXPECTED VALUE
86D8 96C3        2673         JNZ    CFAIL1
86DA 18          2674         INC    R0       ; ADJUST R0 TO POINT TO NEXT BYTE
86DB C9          2675         DEC    R1       ; ADJUST R1 TO POINT TO NEXT EXPECTED BYTE
86DC EFD6        2676         DJNZ   R7,LC008 ; REPEAT UNTIL ALL 4 BYTES OF S/R ARE CHECKED
                 2677
86DE 83          2678         RET
                 2679 ; END OF DATCHK ****************************************
                 2680
                 2681
                 2682 ;*** END OF COMICT ***
                 2683 $EJECT
                 2684
                 2685 ;       NAME            DIGICT
                 2686
                 2687 ;
                 2688 ;
                 2689 ;
                 2690
                 2691 ; DIGICT -- CHECKS DIGITAL PER-LINE CUSTOM I.C.'S
                 2692
0700             2693         ORG    700H
                 2694 DIGICT:
                 2695 ; INITIALIZE 'TEST FAILED' BITS FOR DIGITAL PER-LINE CUSTOM I.C.
0700 B82C        2696         MOV    R0,#TESTRD
0702 F0          2697         MOV    A,@R0
0703 5F          2698         ANL    A,R7     ; INITIALIZE LINE CKT'S 'TESTRD' BIT
0704 A0          2699         MOV    @R0,A
                 2700
0705 B82B        2701         MOV    R0,#TESTRC
0707 F0          2702         MOV    A,@R0
0708 5F          2703         ANL    A,R7     ; INITIALIZE LINE CKT'S 'TESTRC' BIT
0709 A0          2704         MOV    @R0,A
                 2705
                 2706 ; SET UP FOR DIGITAL I.C. STATUS REG. TEST
070A BC00        2707         MOV    R4,#WRDIG
070C BD98        2708         MOV    R5,#RDDIG
070E 85          2709         CLR    F0       ; DIG TEST--F0=0, CDR TEST--F0=1
                 2710
070F BA02        2711 DIG1:   MOV    R2,#2    ; INIT. TEST COUNTER
0711 B94B        2712         MOV    R1,#(LOW DTDATA) ; INITIALIZE TEST DATA POINTER
                 2713
                 2714 ; LOAD TEST DATA INTO CUSTOM I.C.'S REG.
0713 FC          2715 DIG2:   MOV    A,R4
0714 9400        2716         CALL   XMIT4
0716 F8          2717         MOV    A,R0
0717 A3          2718         MOVP   A,@A     ; LOAD TEST DATA INTO CUSTOM I.C. REG.
0718 9406        2719         CALL   XMIT8
                 2720
                 2721 ; VERIFY THAT DATA WERE WRITTEN CORRECTLY
071A FD          2722         MOV    A,R5
```

```
871B 9400      2723            CALL    XMIT4
871D 941C      2724            CALL    RCV8
871F A9        2725            MOV     R1,A
8720 F8        2726            MOV     A,R0
8721 A3        2727            MOVP    A,@A
8722 D9        2728            XRL     A,R1    ; COMPARE READ DATA WITH TEST DATA
8723 C62F      2729            JZ      NXTDIG
               2730
               2731 $EJECT
               2732 ; DATA DO NOT MATCH — ERROR DETECTED
8725 B92B      2733            MOV     R1,#TESTRC
8727 B62B      2734            JF0     CDRF
8729 B92C      2735            MOV     R1,#TESTRD
872B FF        2736 CDRF:      MOV     A,R7
872C 37        2737            CPL     A
872D 41        2738            ORL     A,@R1   ; SET BIT CORRESPONDING TO THIS LINE CKT.
872E A1        2739            MOV     @R1,A
               2740
               2741 NXTDIG:
872F 18        2742            INC     R0      ; ADJUST TEST DATA POINTER FOR NEXT TEST ITER.
8730 EA13      2743            DJNZ    R2,DIG2
               2744
8732 FC        2745            MOV     A,R4
8733 9400      2746            CALL    XMIT4
8735 23FF      2747            MOV     A,#ICODEC
8737 B63E      2748            JF0     CINIT
8739 2330      2749            MOV     A,#LCST1
873B 6E        2750            ADD     A,R6
873C A9        2751            MOV     R1,A
873D F1        2752            MOV     A,@R1
               2753
873E 9406      2754 CINIT:     CALL    XMIT8   ; RESORE CONTENTS OF REGISTER
               2755
8740 B64A      2756            JF0     DIGEND  ; HAS CDR TEST BEEN PERFORMED?
               2757
               2758 ; SET UP FOR CDR TEST
8742 BC20      2759            MOV     R4,#WRCDRC
8744 BDA0      2760            MOV     R5,#RDCDR
8746 85        2761            CLR     F0
8747 95        2762            CPL     F0      ; SET F0 (INDICATES CDR TEST PHASE)
8748 E40F      2763            JMP     DIG1
               2764
               2765 ; DIGITAL I.C. TEST COMPLETED
874A 83        2766 DIGEND:    RET
               2767
               2768 ; DIGITAL I.C. TEST DATA
               2769 ;++++++++++++++++++++++++++++++++++++++++++
874B 63        2770 DTDATA: DB  063H    ; TEST DATA BYTE 1
874C 9C        2771         DB  09CH    ;   "    "    "  2
               2772 ;++++++++++++++++++++++++++++++++++++++++++
               2773
               2774 ;*** END OF DIGICT ***
               2775 $EJECT
               2776
               2777 ;       NAME            ANAICT
               2778
```

```
                2779 ;
                2780 ;
                2781 ;
                2782
                2783 ; ANAICT — CHECKS ANALOG PER-LINE CUSTOM I.C.'S
                2784
                2785 ANAICT:
                2786 ; RESET LINE CKT'S 'TESTRA' BIT
074D B820       2787        MOV     R0,#TESTRA
074F F0         2788        MOV     A,@R0
0750 5F         2789        ANL     A,R7
0751 A0         2790        MOV     @R0,A
                2791
0752 B804       2792        MOV     R0,#(LOW ATDATA)  ; INITIALIZE TEST DATA POINTER
0754 BA02       2793        MOV     R2,#2             ; INITIALIZE TEST DATA COUNTER
                2794
                2795 ; LOAD TEST DATA INTO ANALOG I.C.'S REG.
0756 2340       2796 ANA3:  MOV     A,#WRANA
0758 9400       2797        CALL    XMIT4
075A BC03       2798        MOV     R4,#3    ; INIT. BYTE COUNTER
                2799
075C F8         2800 ANA35: MOV     A,R0
075D A3         2801        MOVP    A,@A     ; FETCH NEXT TEST DATA BYTE
075E 9406       2802        CALL    XMIT8    ; LOAD NEXT BYTE OF TEST DATA INTO ANA. REG
0760 18         2803        INC     R0       ; INCREMENT TEST DATA POINTER
0761 EC5C       2804        DJNZ    R4,ANA35
                2805
                2806 ; VERIFY THAT DATA WERE WRITTEN CORRECTLY
0763 C8         2807        DEC     R0
0764 C8         2808        DEC     R0
0765 C8         2809        DEC     R0
0766 23C0       2810        MOV     A,#RDANA
0768 9400       2811        CALL    XMIT4
                2812
076A BC03       2813        MOV     R4,#3    ; INIT. BYTE COUNTER
                2814
076C 941C       2815 ANA4:  CALL    RCV8     ; VERIFY NEXT BYTE
076E A9         2816        MOV     R1,A
076F F8         2817        MOV     A,R0
0770 A3         2818        MOVP    A,@A
0771 D9         2819        XRL     A,R1
0772 18         2820        INC     R0
0773 967C       2821        JNZ     ANAF
0775 EC6C       2822        DJNZ    R4,ANA4
                2823
0777 EA56       2824        DJNZ    R2,ANA3
                2825
                2826 $EJECT
                2827 ANA5:
                2828 ; TEST COMPLETED——RELOAD ANALOG REG. WITH DATA STORED IN RAM
0779 3492       2829        CALL    LDGAIN
077B 83         2830        RET
                2831
                2832 ANAF:
                2833 ; ERROR WAS DETECTED
077C B820       2834        MOV     R0,#TESTRA
```

```
077E FF      2835         MOV    A,R7
077F 37      2836         CPL    A
0780 40      2837         ORL    A,@R0   ; SET 'ANA I.C. FAILS' FLAG
0781 A0      2838         MOV    @R0,A
0782 E479    2839         JMP    ANA5
             2840
             2841 ; ANALOG I.C. TEST DATA
             2842 ;+++++++++++++++++++++++++++++++++++++++++++++++++++
0784 63      2843 ATDATA: DB     063H, 0C1H, 0F8H   ; TEST DATA TRIPLET 1
0785 C1
0786 F8
0787 9C      2844         DB     09CH, 03EH, 007H   ;  "    "     "    2
0788 3E
0789 07
             2845 ;+++++++++++++++++++++++++++++++++++++++++++++++++++
             2846
             2847 ;*** END OF ANAICT ***
             2848 $EJECT
             2849
             2850 ;       NAME            RAMT
             2851
             2852 ;
             2853 ;
             2854 ;
             2855
             2856 ; RAMT -- CHECKS 8049'S DATA MEMORY
             2857
             2858 RAMT:
             2859 ; LOAD DATA MEMORY WITH TEST PATTERN 1 (EVEN BYTES=55H, ODD BYTES=AAH)
078A B87F    2860         MOV    R0,#LSTBYT
078C 23AA    2861         MOV    A,#0AAH
078E A0      2862 RAMT1:  MOV    @R0,A
078F 37      2863         CPL    A
0790 E88E    2864         DJNZ   R0,RAMT1
             2865
             2866 ; VERIFY TEST PATTERN 1
0792 B87F    2867         MOV    R0,#LSTBYT        ; (7FH IN THE 8049)
0794 B93F    2868         MOV    R1,#(LSTBYT-1)/2  ; (3FH)
0796 F0      2869 RAMT2:  MOV    A,@R0
0797 D3AA    2870         XRL    A,#0AAH
0799 96C4    2871         JNZ    RAMF
079B C8      2872         DEC    R0
079C F0      2873         MOV    A,@R0
079D D355    2874         XRL    A,#55H
079F 96C4    2875         JNZ    RAMF
07A1 C8      2876         DEC    R0
07A2 E996    2877         DJNZ   R1,RAMT2
             2878
             2879 ; LOAD DATA MEMORY WITH TEST PATTERN 2 (EVEN BYTES=AAH, ODD BYTES=55H)
07A4 B87F    2880         MOV    R0,#LSTBYT
07A6 2355    2881         MOV    A,#55H
07A8 A0      2882 RAMT3:  MOV    @R0,A
07A9 37      2883         CPL    A
07AA E8A8    2884         DJNZ   R0,RAMT3
             2885
             2886 $EJECT
```

```
                2887 ; VERIFY TEST PATTERN 2
07AC B87F       2888            MOV     R0,#LSTBYT          ; (7FH)
07AE 693F       2889            MOV     R1,#(LSTBYT-1)/2    ; (3FH)
07B0 F0         2890 RAMT4:     MOV     A,@R0
07B1 D355       2891            XRL     A,#55H
07B3 96C4       2892            JNZ     RAMF
07B5 C8         2893            DEC     R0
07B6 F0         2894            MOV     A,@R0
07B7 D3AA       2895            XRL     A,#0AAH
07B9 96C4       2896            JNZ     RAMF
07BB C8         2897            DEC     R0
07BC E9B0       2898            DJNZ    R1,RAMT4
                2899
                2900 ; RAM TEST PASSED----CLEAR 'RAM TEST FAILED' BIT OF 'TESTR'
07BE B82A       2901            MOV     R0,#TESTR
07C0 B000       2902            MOV     @R0,#0              ; RESET 'TEST RESULTS' BYTE
                2903
                2904 ; RETURN TO SLFTST
07C2 C402       2905            JMP     RAMRET              ; RAM TEST ROUTINE'S RETURN ADDRESS
                2906
                2907 RAMF:
                2908 ; RAM TEST FAILED----SET 'RAM TEST FAILED' BIT OF 'TESTR'
07C4 B82A       2909            MOV     R0,#TESTR
07C6 B001       2910            MOV     @R0,#01H            ; SET 'RAM TEST FAILED' BIT
                2911
                2912 ; RETURN TO SLFTST
07C8 C402       2913            JMP     RAMRET
                2914
                2915 ;*** END OF RAMT ***
                2916 $EJECT
                2917
                2918 ;       NAME            GETROM
                2919
                2920 ;
                2921 ;
                2922 ;
                2923
                2924 ; GETROM -- FETCH BYTE OF PROGRAM MEMORY
                2925
                2926 ;       R2 = PAGE ADDRESS (0 - 7)
                2927 ;       R3 = BYTE ADDRESS (0 TO 0FFH)
                2928
07DD            2929            ORG     7DDH
                2930 GETROM:
07DD FA         2931            MOV     A,R2                ; FETCH PAGE ADDRESS
07DE 5307       2932            ANL     A,#7
07E0 03E3       2933            ADD     A,#(LOW ROMTBL)
07E2 B3         2934            JMPP    @A
                2935
                2936 ROMTBL:
                2937 ; PROGRAM MEMORY PAGE JUMP TABLE
07E3 EB         2938            DB      (LOW ($+8))
07E4 ED         2939            DB      (LOW ($+9))
07E5 EF         2940            DB      (LOW ($+10))
07E6 F1         2941            DB      (LOW ($+11))
07E7 F3         2942            DB      (LOW ($+12))
```

```
87E8 F5        2943           DB      (LOW ($+13))
87E9 F7        2944           DB      (LOW ($+14))
87EA F9        2945           DB      (LOW RDPG7)
               2946
87EB 04FD      2947           JMP     RDPG0
87ED 24FD      2948           JMP     RDPG1
87EF 44FD      2949           JMP     RDPG2
87F1 64FD      2950           JMP     RDPG3
87F3 84FD      2951           JMP     RDPG4
87F5 A4FD      2952           JMP     RDPG5
87F7 C4FD      2953           JMP     RDPG6
87F9 FB        2954 RDPG7:    MOV     A,R3    ; FETCH BYTE ADDRESS
87FA A3        2955           MOVP    A,@A    ; FETCH ROM DATA BYTE
87FB 83        2956           RET
               2957
               2958 ;++++++++++++++++++++++++++
               2959 ; ROM TEST CHECKSUM BYTE
87FC 00        2960           DB      0
               2961 ;++++++++++++++++++++++++++
               2962 $EJECT
               2963 ; ROMT----PAGE 0
00FD           2964           ORG     0FDH
00FD FB        2965 RDPG0:    MOV     A,R3    ; FETCH BYTE ADDRESS
00FE A3        2966           MOVP    A,@A    ; FETCH ROM DATA BYTE
00FF 83        2967           RET
               2968
               2969 ; ROMT----PAGE 1
01FD           2970           ORG     1FDH
01FD FB        2971 RDPG1:    MOV     A,R3
01FE A3        2972           MOVP    A,@A
01FF 83        2973           RET
               2974
               2975 ; ROMT----PAGE 2
02FD           2976           ORG     2FDH
02FD FB        2977 RDPG2:    MOV     A,R3
02FE A3        2978           MOVP    A,@A
02FF 83        2979           RET
               2980
               2981 ; ROMT----PAGE 3
03FD           2982           ORG     3FDH
03FD FB        2983 RDPG3:    MOV     A,R3
03FE A3        2984           MOVP    A,@A
03FF 83        2985           RET
               2986
               2987 ; ROMT----PAGE 4
04FD           2988           ORG     4FDH
04FD FB        2989 RDPG4:    MOV     A,R3
04FE A3        2990           MOVP    A,@A
04FF 83        2991           RET
               2992
               2993 ; ROMT----PAGE 5
05FD           2994           ORG     5FDH
05FD FB        2995 RDPG5:    MOV     A,R3
05FE A3        2996           MOVP    A,@A
05FF 83        2997           RET
```

```
                2998
                2999 ; ROMT---PAGE 6
86FD            3000            ORG         6FDH
86FD  FB        3001 RDPG6:     MOV         R,R3
86FE  R3        3002            MOVP        R,@R
86FF  83        3003            RET
                3004
                3005 ;*** END OF GETROM ***
                3006 $EJECT
```

What is claimed is:

1. In a telephone switching system:

a line circuit coupled to a telephone line, said line circuit comprising:

a line interface circuit coupled to said telephone line for providing transmit and receive paths, a PCM bus, a CODEC coupled between said interface circuit and said PCM bus for converting analog signals provided from said transmit path to PCM signal representations on said PCM bus and for converting PCM signal representations on said PCM bus to analog signals on said receive path, transmit gain means interposed in said transmit path for determining the gain of said transmit path, receive gain means interposed in said transmit path for determining the gain of said transmit path, said transmit gain means comprising a first plurality of circuit elements, a first plurality of controlled switch means for selectively connecting selected ones of said first plurality of circuit elements into said transmit path such that said transmit paths gain is determined, first control means for selectively operating said first plurality of switch means in accordance with first control information, and processor means for generating said first control information.

2. An arrangement in accordance with claim 1 wherein:

said receive gain means comprises a second plurality of circuit elements, a second plurality of controlled switch means for selectively connecting selected ones of said second plurality of circuit elements into said receive path such that said receive path gain is determined;

said arrangement comprising second control means for selectively operating said second plurality of switch means in accordance with second control information; and said processor means generates said second control information.

3. An arrangement in accordance with claim 1, wherein said processor means includes a program for determining said first control information.

4. An arrangement in accordance with claim 2, wherein said processor means includes a program for determining said second control information.

5. An arrangement in accordance with claim 2, wherein said processor means includes a program for generating said first and second control information.

6. An arrangement in accordance with claim 1, wherein said first control means comprises a register for receiving and storing said first control information, said register being coupled to said first plurality of controlled switch means.

7. An arrangement in accordance with claims 2 or 4, wherein said second control means comprises a register for receiving and storing said second control information, said register being coupled to said second plurality of controlled switch means.

8. An arrangement in accordance with claim 2, wherein said first and second control means comprises a register for receiving and storing said first and second control information, said register being coupled to said first and second plurality of controlled switch means.

9. An arrangement in accordance with claims 1, 2, 3, 4, 5 or 6, wherein said line circuit includes means for determining the operating characteristics of said line interface circuit, said determining means comprising a third plurality of circuit elements, a third plurality of controlled switch means for selectively connecting selected ones of said third plurality of circuit elements to said line interface circuit for determining the operating characteristics thereof;

said arrangement including third control means for selectively operating said third plurality of switch means in accordance with third control information; and said processor means generates said third control information.

10. An arrangement in accordance with claim 9, wherein said processor means includes a program for determining said control information.

11. An arrangement in accordance with claim 9, wherein said operating characteristics are the balance characteristics of said line interface circuit.

12. An arrangement in accordance with claim 9, wherein said third control means comprises a register for receiving and storing said third control information, said register being coupled to said third plurality of controlled switch means.

13. An arrangement in accordance with claim 5, wherein said first and second control means comprises a register for receiving and storing said first and second control information, said register being coupled to said first and second plurality of controlled switch means.

14. A line circuit coupled to a subscriber line, said line circuit comprising:

a transmission circuit coupled to said subscriber line;

a plurality of circuit means;

a plurality of controlled switch means for connecting said plurality of circuit means to said transmission circuit; and processor means for selectively controlling said plurality of controlled switch means to connect selected ones of said plurality of circuit means to said transmission circuit to thereby determine certain transmission characteristics of said transmission circuit; wherein said transmission circuits include gain circuits and whereby said plurality of controlled switch means are operable to selectively connect said plurality of circuit means to said gain circuits to determine the gain of said gain circuits.

15. A line circuit in accordance with claim 14, wherein said transmission circuits include hybrid means for performing two-wire to four-wire conversion, and whereby said plurality of controlled switch means are operable to selectively connect said plurality of circuit means to said hybrid means to determine the balance characteristics of said hybrid means.

16. In a telephone switching system:

a group of subscriber lines for carrying analog signals;

a group of line circuits each connected to one of said group of subscriber lines for converting between said analog signals and pulse signals;

a bus coupoled to said group of line ciruits;

processor means for controlling the transmission characteristics of each of said line circuits;

each of said line circuits comprising:

a transmission circuit coupled to the respective subscriber line;

conversion means for converting between pulse signals and analog signals coupled to said transmission circuit and to said bus, a plurality of circuit means, a plurality of controlled switch means for connecting said plurality of circuit means to said transmission circuit, control means for selectively operating said plurality of switch means in accordance with control information;

said processor means supplying said control information to each line circuit in said group of line circuits;

whereby said processor means controls the operational characteristics of each line circuit; wherein said operational characteristics are the transmit and receive gain of said transmission circuit; and wherein said transmission circuit includes a first amplifier coupled in a transmit path and a second amplifier coupled in a receive path and wherein a first group of said plurality of controlled switch means are selectively operable to connect selected ones of a first group of said plurality of circuit means to said first amplifier to control the gain thereof, and wherein a second group of said plurality of controlled switch means are selectively operable to connect selected ones of a second group of said plurality of circuit means to said second amplifier to control the gain thereof.

17. An arrangement in accordance with claim 16 wherein said transmission circuit includes a hybrid means for performing two-wire to four-wire conversion and wherein said operational characteristics include the balance characteristics of said hybrid means.

18. An arrangement in accordance with claim 17, wherein a third group of said plurality of controlled switch means are selectively operable to connect selected ones of a third group of said plurality of circuit means to said hybrid means to control said balance characteristics.

19. An arrangement in accordance with claim 16 further comprising bus means connecting said processor means to each of said line circuits, each of said line circuits comprising control means responsive to address information, said processor means being operable to selectively address each of said line circuit control means and to transmit control information to a selected line circuit control means.

20. An arrangement in accordance with claim 19, wherein each of said control means comprises register means for receiving and storing control information, said register means being coupled to said plurality of switch means, said control information stored in said register means determining the operational state of each of said plurality of switch means, and wherein said processor means generating said control information and transmits said information to a selected one of said control means over said bus means.

21. An arrangement in accordance with claim 20, wherein each of said control means comprises means for transmitting control information stored in said register means over said bus means, said processor means selectively controlling said control means to read said stored information.

22. In a telephone switching system, a group of lines for carrying signals of a first type;

a group of line circuits each line circuit being connected to one of said lines said line circuits including means for converting between said signals of a first and signals of a second type;

bus means for carrying signals of said second type, said bus means being coupled to said line circuits;

processor means for controlling said group of line circuits and for generating control information;

means coupled to said bus means and to said processor means and controllable by said processor means for selectively receiving said second type signals carried on said bus means;

each of said groups of line circuits comprising a transmission circuit, the operating characteristics of said transmission circuit being determined in accordance with said control information;

means for supplying reference signals of said first type; and means responsive to said processor means for coupling said supplying means to a selected one line circuit of said group of line circuits;

said processor means utilizing said receiving means for reading signals of said second type produced by said selected one line circuit, said processor means changing said control information of said selected one line circuit such that said second type signals carried on said line means have predetermined values.

23. An arrangement in accordance with claim 22 comprising:

second means for supplying reference signals of said second type;

means responsive to said processor means for coupling said second supplying means to a first selected one line circuit of said group of line circuits;

second means for coupling signals of said first type generated by said set first selected one line circuit in response to said reference signals of said second type to said receiving means;

said processor means utilizing said receiving means for reading signals of said second type produced by said second coupling means, said processor means changing said control information of said selected one line circuit such that said first type signals generated by said first selected one line circuit have predetermined values.

24. An arrangement in accordance with claim 23, wherein said second coupling means comprises a second selected one line circuit of said group of line circuits.

25. An arrangement in accordance with claim 24, wherein said second coupling means comprises list means selectively operable by said processor means for coupling said second selected one line circuit to said selected one line circuit.

26. An arrangement in accordance with claim 25, wherein said second selected one line circuit is coupled to said bus means.

27. An arrangement in accordance with claim 22 wherein:

said signals of a first type are analog signals;

said signals of a second type are PCM signals;
said bus means comprises a PCM bus,
said PCM bus comprises a plurality of channels.

28. An arrangement in accordance with claim 27, wherein said receiving means comprises a register and selection means for coupling PCM signals from a selected one of said channels to said register,
said selection means being responsive to control signals from said precessor for selecting said selected one of said channels.

29. An arrangement in accordance with claim 28, wherein each of said line circuits communicates PCM signals over a predetermined one of said plurality of channels.

30. An arrangement in accordance with claim 29, wherein said processor means determines each said predetermined one of said channel.

31. An arrangement in accordance with claim 28, wherein each of said transmission circuits comprises a transmit path and a receive path and said operating characteristics include the gain of said transmit path and the gain of said receive path.

32. An arrangement in accordance with claim 31, wherein each of said line circuits comprises:
a plurality of first circuit means;
a plurality of first controlled switch means responsive to said control information for connecting selected ones of said first circuit means to said transmit path;
a plurality of second circuit means; and
a plurality of second controlled switch means responsive to said control information for connecting selected ones of said second circuit means to said transmit path.

33. An arrangement in accordance with claim 32, wherein each of said line circuits comprises register means for receiving and storing control information provided by said processor means, said register means being coupled to said plurality of first and second controlled switch means.

34. An arrangement in accordance with claim 22, wherein said means for supplying reference signals comprises a tone source;
and said coupling means comprises switch means under control of said processor means for connecting said tone source to said selected one line circuit.

35. An arrangement in accordance with claim 23, wherein said means for supplying reference signals comprises a tone source;
and said coupling means comprises switch means under control of said processor means for connecting said tone source to said selected one line circuit.

36. An arrangement in accordance with claim 35, wherein said second coupling means comprises:
a third selected one of said line circuits and switch means for coupling said third selected one of said line circuits to said first selected one of said line circuits.

37. An arrangement in accordance with claim 32, wherein said transmit path comprises a first high input impedance amplifier, said receive path comprises a second high input impedance amplifier, each of said first and second controlled switch means comprises an analog electronic switch for respectively coupling said first and second circuit means to said first and second amplifiers.

38. An arrangement in accordance with claim 37, wherein said first and second circuit means comprise resistive elements.

* * * * *